United States Patent
Ueda et al.

[19]

[11] Patent Number: 5,960,150
[45] Date of Patent: Sep. 28, 1999

[54] DIGITAL VTR

[75] Inventors: Tomohiro Ueda; Taketoshi Hibi; Junko Ishimoto; Masako Asamura; Nobuyoshi Okumura; Sadayuki Inoue; Tohru Inoue; Ken Onishi, all of Nagaokakyo, Japan

[73] Assignee: Mitsubishi Denki Kabushiki Kaisha, Tokyo, Japan

[21] Appl. No.: 08/902,313

[22] Filed: Jul. 29, 1997

Related U.S. Application Data

[62] Division of application No. 08/420,141, Apr. 11, 1995, Pat. No. 5,684,915.

[30] Foreign Application Priority Data

| Apr. 12, 1994 | [JP] | Japan | 6-99369 |
|---|---|---|---|
| May 20, 1994 | [JP] | Japan | 6-107048 |
| May 20, 1994 | [JP] | Japan | 6-107049 |
| May 20, 1994 | [JP] | Japan | 6-107050 |
| May 23, 1994 | [JP] | Japan | 6-108570 |
| May 23, 1994 | [JP] | Japan | 6-108571 |
| Aug. 23, 1994 | [JP] | Japan | 6-198417 |

[51] Int. Cl.$^6$ .................................................. H04N 5/783
[52] U.S. Cl. .............................. 386/68; 386/81; 386/111
[58] Field of Search ................................. 386/68, 81, 82, 386/6–8, 111–112, 116, 124; 360/32, 48, 77.14–77.17; 371/30, 37.5, 37.7, 48, 49.1, 49.2, 49.3, 49.4, 50.1, 51.1; H04N 5/76, 5/92, 9/79, 5/93, 5/783

[56] References Cited

U.S. PATENT DOCUMENTS 5,229,862  7/1993  Takahashi et al. .
5,253,122  10/1993  Chiba et al. .

(List continued on next page.)

FOREIGN PATENT DOCUMENTS

| 0367264 | 5/1990 | European Pat. Off. . |
|---|---|---|
| 0464698 | 6/1991 | European Pat. Off. . |
| 0476767 | 3/1992 | European Pat. Off. . |
| 0570214 | 5/1993 | European Pat. Off. . |
| 0546691 | 6/1993 | European Pat. Off. . |
| 0562845 | 9/1993 | European Pat. Off. . |
| 0579156 | 1/1994 | European Pat. Off. . |
| 0606856 | 7/1994 | European Pat. Off. . |
| 0606857 | 7/1994 | European Pat. Off. . |
| 0606868 | 7/1994 | European Pat. Off. . |
| 0684285 | 3/1994 | Japan . |
| 2265046 | 9/1993 | United Kingdom . |
| 2265047 | 9/1993 | United Kingdom . |
| 9527978 | 10/1995 | WIPO . |

OTHER PUBLICATIONS

Yanagihara et al.; HDTV'93, *International Workshop on HDTV'93*; "A Recording Method of ATV Data on a Consumer Digital VCR", Oct. 26–28, 1993, Ottawa, Canada; vol.II.

"A Study on Variable–Speed Reproduction of the Digital VTR" by Y. Hirano et al.; *SMPTE Journal*; Jun. 1983; pp. 636–641.

"Discrete–Time Signal Processing" by A. Oppenheim et al.; Prentice Hall, Englewood Cliffs, NJ 07632; 1989; pp. 101–112.

Grand Alliance HDTV System Specification–Draft Document submitted to the ACATS Technical Subgroup –Feb. 22, 1994.

*Primary Examiner*—Thai Tran

[57] ABSTRACT

A data separating device extracts intra-frame or intra-field encoded blocks from an intra-frame or intra-field encoded, and inter-frame or inter-field encoded digital video signal, and a digital audio signal contained in an input bit stream. An error correction code appending device appends error correction codes to the extracted intra-encoded blocks. A recording device records the data having the error correction code appended, in special replay data recording areas predefined on the magnetic recording tape. During fast replay or slow replay, error correction is achieved even for the replay signal with a low output level and a poor symbol rate.

26 Claims, 96 Drawing Sheets

U.S. PATENT DOCUMENTS

| | | |
|---|---|---|
| 5,282,049 | 1/1994 | Hatakenaka et al. . |
| 5,337,194 | 8/1994 | Wilkinson et al. . |
| 5,377,051 | 12/1994 | Lane et al. . |
| 5,455,684 | 10/1995 | Fujinami et al. . |
| 5,504,585 | 4/1996 | Fujinami et al. . |
| 5,587,803 | 12/1996 | Inoue et al. ............................... 386/33 |
| 5,729,649 | 3/1998 | Lane et al. ............................... 386/68 |

FIG.6

| SYSTEM \ REPLAY SPEED | TWICE | FOUR-TIMES | EIGHT-TIMES | 16-TIMES |
|---|---|---|---|---|
| 9000rpm | 186SB | 62SB | 26SB | 12SB |
| 4500rpm | 93SB | 31SB | 13SB | 6SB |

SB : SYNC BLOCK aa1, aa2 : TWICE-SPEED, 8-TIME (-2-TIME) SPEED DATA
bb1, bb2 : 8-TIME (-6-TIME) SPEED DATA
cc1, cc2, : 16-TIME (-14-TIME) SPEED DATA

SB : SYNC BLOCK

| DC | 1 | 5 | 6 | 14 | 15 | 27 | 28 |
|---|---|---|---|---|---|---|---|
| 2 | 4 | 7 | 13 | 16 | 26 | 29 | 42 |
| 3 | 8 | 12 | 17 | 25 | 30 | 41 | 43 |
| 9 | 11 | 18 | 24 | 31 | 40 | 44 | 53 |
| 10 | 19 | 23 | 32 | 39 | 45 | 52 | 54 |
| 20 | 22 | 33 | 38 | 46 | 51 | 55 | 60 |
| 21 | 34 | 37 | 47 | 50 | 56 | 59 | 61 |
| 35 | 36 | 48 | 49 | 57 | 58 | 62 | 63 |

HORIZONTAL COMPONENT →

VIRTICAL COMPONENT ↓

$f_0$ $f_1$ $f_0$ $f_2$

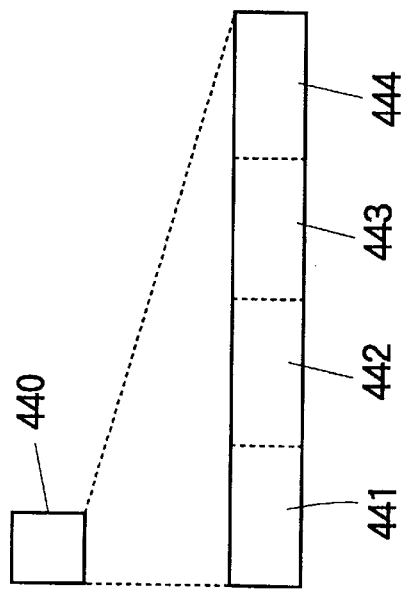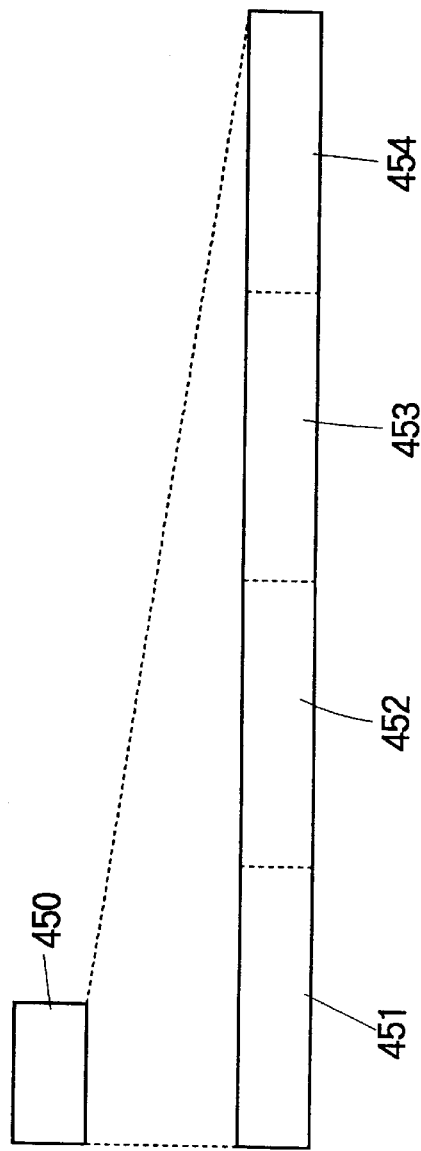

FIG.90

SYNC BLOCK NO. IN
SPECIAL REPLAY AREA →

TRACK NO.

|  | 1 | 2 | 3 | 4 | 5 | 6 | 7 | 8 | 9 | 10 |
|---|---|---|---|---|---|---|---|---|---|---|
| A1 | $D_1$ | $D_2$ | $D_1$ | $D_2$ | $D_1$ | $D_2$ | $D_1$ | $D_2$ | $D_1$ | $D_2$ |
| B1 |  |  |  |  |  |  |  |  |  |  |
| A2 | $D_1$ | $D_2$ | $D_1$ | $D_2$ | $D_1$ | $D_2$ | $D_1$ | $D_2$ | $D_1$ | $D_2$ |
| B2 |  |  |  |  |  |  |  |  |  |  |
| A3 | $D_1$ | $D_2$ | $D_1$ | $D_2$ | $D_1$ | $D_2$ | $D_1$ | $D_2$ | $D_1$ | $D_2$ |

HEAD A

NORMAL REPLAY

FAST REPLAY

FIG.98
PRIOR ART
<4-TIME SPEED>
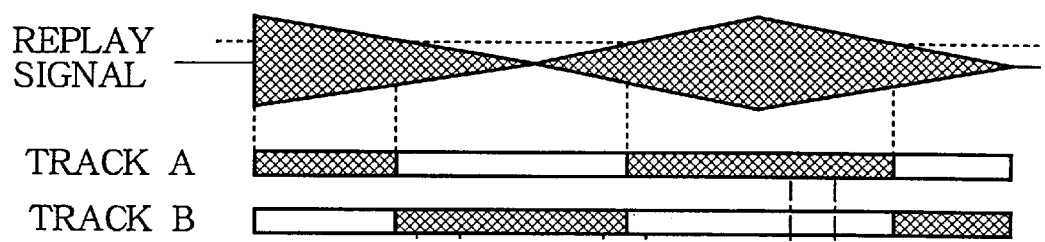
<9-TIME SPEED>
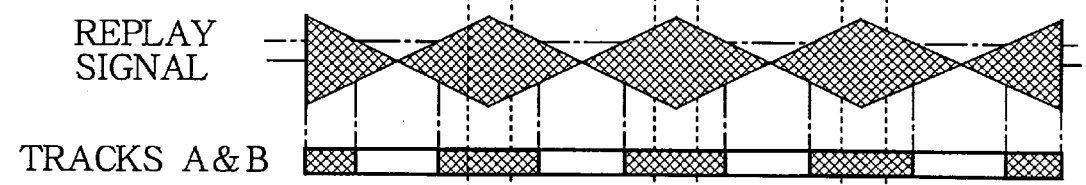
<17-TIME SPEED>
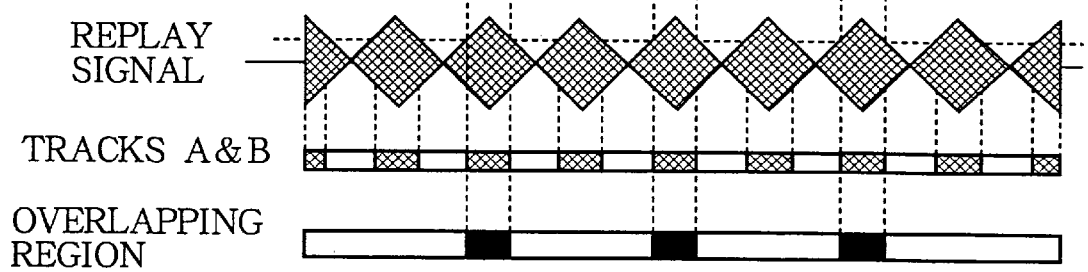

CASE 1

CASE 2

DIGITAL VTR

This application is a divisional of application Ser. No. 08/420,141, filed on Apr. 11,1995, now U.S. Pat. No. 5,684,415, the entire contents of which are hereby incorporated by reference.

BACKGROUND OF THE INVENTION

The present invention relates to a digital video tape recorder (hereinafter referred to as digital VTR) having a track format for recording digital video and audio signals in predetermined areas on oblique tracks, and relates to a digital VTR in which the digital video and audio signals are input in the form of a bit stream, and the bit stream is magnetically recorded and played back.

FIG. 93 is a diagram is a diagram showing a track pattern of a conventional, general consumer digital VTR. Referring to the drawing, a plurality of tracks are formed on a magnetic tape 10, in a head scanning direction inclined to the tape transport direction, and digital video and audio signals are recorded therein. Each track is divided into two areas, a video area 12 for recording a digital video signal and an audio area 14 for recording a digital audio signal.

Two methods are available for recording video and audio signals on a video tape for such a consumer digital VTR. In one of the methods, analog video and audio signals are input, and recorded, using a video and audio high-efficiency encoding means; this is called a baseband recording method. In the other method, the bit stream having been digitally transmitted; this method is called a transparent recording method.

For the system of recording ATV (advanced television) signals, now under consideration in the United States, the latter transparent recording method is suitable. This is because the ATV signal is digitally compressed signals, and does not require a high-efficiency encoding means or a decoding means, and because there is not degradation in the picture quality due to transmission.

The transparent recording system however is associated with a problem in the picture quality in a special playback mode, such as a fast playback mode, a still mode and a slow mode. In particular, when a rotary head scans the tape obliquely to record a bit stream, almost no image is playback at the time of fast playback, if not specific measure is taken.

An improvement for the picture quality for the transparent recording system recording the ATV signal is described in an article Yanagihara, et al, "A Recording Method of ATV data on a Consumer Digital VCR", in International Workshop on HDTV, 93, October 26 to 28, 1993, Ottawa, Canada, Proceedings, Vol. II. This proposal is now explained.

In one basic specification of a prototype consumer digital VTR, in SD (standard definition) mode, when the recording rate of the digital video signal is 25 Mbps, and the field frequency is 60 Hz, two rotary heads are used for recording a digital video signal of one frame, being divided into video areas on 10 tracks. If the data rate of the ATV signal is 17 to 18 Mbps, transparent recording of the ATV signal is possible with the recording rate in this SD mode.

FIG. 9A and FIG. 94B show tracks formed in a magnetic tape using a conventional digital VTR. FIG. 94A is a diagram showing scanning traces of the rotary heads during normal playback. FIG. 94B shows scanning traces of the rotary heads during fast playback. In the example under consideration, the rotary heads are provided in opposition, 180° spaced apart on a rotary drum, and the magnetic tape is wrapped around over 180°. In the drawing, adjacent tracks on the tape 10 are scanned by two rotary heads A and B having differential azimuth angles, alternately and obliquely, to record digital data. In normal playback, the transport speed of the tape 10 is identical to that during recording so that the heads trace along the recorded tracks. During fast playback, the tape speed is different, so that the heads A and B traces the magnetic tape 10 crossing several tracks. The arrow in FIG. 94B indicates a scanning trace by a head A at the time of five-time fast feeding. The width of arrow represents the width of the region read by the head. Fractions of digital data recorded on tracks having an identical azimuth angle are played back from regions meshed in the drawings, within five tracks on the magnetic tape 10.

The bit stream of the ATV signal is according to the standard of the MPEG2. In this bit stream according to the MPEG2, only the intra-frame or intra-field encoded data of the video signal, i.e., the data of intra encoded block (intra encoded block) alone can be decoded independently, without reference to data of other frame or field. Where the bit stream is recorded in turn on the respective tracks, the recorded data are replayed intermittently from the tracks during fast replay, and the image must be reconstructed from only the intra-encoded blocks contained in the replay data. Accordingly, the video area updated on the screen is not continuous, and only the fractions of data of intra coded blocks are replayed, and may be scattered over the screen. The bit stream is variable-length encoded, so that it is not ensured that all the replay data over the screen is periodically updated, and the replay data of certain parts of the video area may not be updated for a long time. As a result, this type of bit stream recording system does not provide a sufficient picture quality during fast replay in order to be accepted as a recording method for a consumer digital VTR.

FIG. 95 is a block configuration diagram showing an example of recording system in a conventional digital VTR. Referring to the drawing, reference numeral 16 denotes an input terminal for the bit stream, 18 denotes an output terminal for the bit stream, 20 denotes an HP data format circuit, 22 denotes a variable-length decoder, 24 denotes a counter, 26 denotes data extractor, and 28 denotes an EOB (end of block) appending circuit.

To improve the quality of fast replay pictures, the video area on each track is divided into two types of areas. That is, the video area on each track is divided into main areas 30 for recording the bit stream of the ATV signal, and copy areas for recording important part of the bit stream which are used for reconstruction of the image in fast replay. Only the intra-encoded blocks are effective during fast replay, so that they are recorded in the copy areas. To reduce the data further, only the low-frequency components are extracted from all the intra-encoded blocks, and recorded as HP (high priority) data.

The bit stream of MPEG2 is input via the input terminal 16, and output via the output terminal 18, without modification, and sequentially recorded in the main areas 30 on each track of the tape. The bit stream from the input terminal 16 is also input to the variable-length decoder 22, and the syntax of the bit stream of the MPEG2 is analyzed, and the intra-picture data is detected, and timing signals are generated by the counter 24, and the low-frequency components of all the blocks in the intra-picture data are extracted at the data extractor 26. Furthermore, EOBs are appended at the EOB appending circuit 28, and HP data is constructed at an HP data format circuit, not shown. The HP data is incorporated in the recording data for one track, and recorded in the copy areas 32.

FIG. 96A and FIG. 96B show an example of replay system in a conventional digital VTR. FIG. 96A schematically shows normal replay. FIG. 96B schematically shows fast replay.

Separation of data from the magnetic tape during normal replay and fast replay are performed respectively in the following ways. During normal replay, all the bit stream recorded in the main areas 30 is replayed, and the bit stream from the data separation means 34 is sent as the normal replay data, to an MPEG2 decoder, provided outside the replay system. The HP data from the copy areas 32 are discarded. During fast replay, only the HP data from the copy areas 32 are collected, and sent, as fast replay data, to the decoder. At the data separation means 34, the bit stream from the main areas 30 is discarded.

A method of fast replay from a track in which main areas 30 and copy areas 32 is next described. FIG. 97A shows a scanning trace of a head. FIG. 97B shows track regions from which the replay is possible. When the tape speed is an integer multiple of the normal playback speed, if phase-locking control is conducted by an ATF (automatic track following) method or the like for tracking by moving the head itself, the head scanning is in a predetermined phase relationship with tracks having an identical azimuth. As a result, the data replayed by the head A from the tracks recorded alternately by the heads A and B, are fixed to those from the meshed regions.

In FIG. 97B, if the signal having an output level larger than −6 dB is replayed by the heads, the data is replayed by one head from the meshed tape regions. The drawing shows an example of nine-time speed replay. If replay of the signals from the meshed regions is ensured at the nine-time replay, the regions are used as copy areas, and the HP data are recorded in the copy areas, so that the reading of the HP data from these regions at this speed is possible. However, reading of these signals at different speeds is not ensured. Accordingly, a plurality of areas need to be selected for the copy areas, so that the replay signals can be read at different tape speeds.

FIG. 98 shows regions where the copy areas overlap for a plurality of different replay speeds. It shows examples of scan regions for three different tape speeds, for cases where the head is in synchronism with an identical-azimuth track. The scan regions where the reading by the head is possible at different tape speeds overlap, at some of the regions. By selecting the regions at which the overlapping occurs as the copy areas, reading of the HP data at different tape speeds can be ensured. The drawings show the regions at which overlapping occurs at the fast-forward at four-time, nine-time, and 17-time speed. These scan regions are identical to those of feed-forward at −2-time, −7-time and −15-time high speeds (i.e., rewind at 2-time, 7-time and 15-time speeds).

Even though there are overlapping regions for different tape speeds, it is not possible to determine a recording pattern so that identical regions are always traced at different speeds. This is because the number of tracks crossed by the head differs depending on the tape speed. Moreover, it is necessary for the head to be capable of starting tracing at whichever identical-azimuth track. For this reason, identical HP data is repeatedly recorded over a plurality of tracks, to solve the above problem.

FIG. 99 shows examples of scanning traces of the rotary head at different tape speeds. Regions 1, 2 and 3 are selected from among the overlapping regions for five-time and nine-time speeds. If identical HP data are repeatedly recorded over 9 tracks, the HP data can be read at either of five-time and nine-time speeds.

FIG. 100A and FIG. 100B show scanning traces at five-time speed replay. In the illustrated example, identical HP data is repeatedly recorded over five consecutive tracks.

As will be seen from the drawings, identical HP data is recorded over the number of tracks identical to the number of times of the tape speed (i.e., 5). In either of case 1 and case 2, either the head A or B can read HP data from corresponding azimuth track. Accordingly, providing the copy areas in each track, in a number identical to the number of times of the tape speed at the fast replay, and repeatedly recording the HP data there, the copied HP data can be read at various speeds, and in either the forward or reverse direction.

In the manner described, the special replay data is recorded in the copy areas, repeatedly, to improve the picture quality during the special replay in the transparent recording system.

FIG. 101 shows a recording format on a track in a conventional digital VTR. Main areas and copy areas are provided in one track. In a consumer digital VTR, a video area in each track has 135 sync blocks (SB), and 97 sync blocks are assigned to main areas and 32 sync blocks are assigned to copy areas. The sync blocks at the regions corresponding to the 4-, 9- and 17-time speed shown in FIG. 98 are selected for the copy areas. The data rate of the main areas if about 17.46 Mbps (97×75×8×10×30), and the data rate of the copy areas where identical data is repeated 17 times is about 338.8 kbps (32×75×8×10×10/17).

FIG. 102A and FIG. 102B show an example of the configuration of a track containing video and audio data.

The magnetic tape of a digital VTR according to the specification (hereinafter referred to as SC specification) defined by the the SD mode, a video area of 149 SB and an audio area of 14 SB are provided on both sides of a gap, as shown in FIG. 93, and the video and audio data are recorded in these areas, together with error correction codes. Employed as the error correction codes for the video areas in the SD specification are (85, 77, 9) code (hereinafter referred to as C1 check code) in the recording direction (right-left direction in the drawing), and (149, 183, 12) Reed-Solomon code (hereinafter referred to as C2 check code) in the vertical direction. Employed as the error correction codes for the audio areas are (85, 77, 9) Reed-Solomon code (C1 check code) in the recording direction, like the video signal, and (14, 9, 6) Reed-Solomon code (hereinafter referred to as C3 check) in the vertical direction. Auxiliary data (VAUX data) is recorded in front of and at the back of the video data.

FIG. 103 shows an example of configuration of one sync block on the magnetic tape. As illustrated, the region of 1 SB is formed of 90 bytes, and a header consisting of sync pattern recording regions 36 of two bytes, and ID signal region 38 of three bytes are formed at the head end, and recording region 42 for the error correction code (C1 check code, in the example illustrated) of 8 bytes is provided at the back of the data region 40 of 77 bytes. In FIG. 102A and FIG. 102B, the header parts are omitted.

Because the conventioned VTR is configured as described above, and special replay data is repeatedly recorded in the copy areas, the recording rate for the special replay data is very low. In particular, the quality of the reconstructed pictures formed during slow replay or fast replay is low.

For instance, if the intra-frame is formed twice a second, the amount of data of intra-encoded blocks of the ATV signal is predicted to be about 3 Mbps. In the prior art, only 340 kbps can be recorded, and the quality of the reproduced picture is very degraded.

Moreover, the data for the respective fast replay speeds is recorded, being dispersed over a wide region. Accordingly, if the track is non-linear, it is difficult to achieve accurate tracking control over the entire data region, and the replay signal from some of the regions may not be of a sufficient level.

Furthermore, during special replay (fast replay, slow replay, still replay and the like), the rotary head crosses a plurality of recording tracks obliquely to pick up the replay data intermittently, as was described above. It is therefore not possible to form error correction block (video data) shown in FIG. 102A and FIG. 102B from the replay data during special replay. That is, during special replay, the error correction using C2 or C3 check code is not performed, but error correction using C1 check code alone is applied to the replay data.

If the error correction using the C1 check code alone is applied, if the symbol error rate 0.01, the error detection probability is $1.56 \times 10^{-3}$. This means one error per about 8 sync blocks is detected. Because the replay data output is not stable during special replay, so that the symbol error rate can often be more than 0.01. Moreover, the recording data is variable-length encoded, so that when an error is present, the succeeding replay data cannot be used, leading to degradation in the picture quality. The rate of undetected errors is also about $7.00 \times 10^{-8}$. Thus, the frequency of occurrence of undetected errors is high.

Moreover, during fast replay, the data rate is low, and only the low-frequency components are replayed, so that the resolution of the picture is poor.

Furthermore, it is necessary to pick up data for a plurality of fast replay regions in one scanning of the head during fast replay, so that when the track is no-linear, or when the scanning trace is non-linear, the data at the fast replay region where the non-linearity is present cannot be reproduced.

Moreover, since it is necessary to pick up data for a plurality of fast replay regions by one scanning of the head, replay can be performed only at certain speeds. The speed at which replay can be performed is limited, and the number of the replay speeds is small.

Moreover, the rotary speed of the drum of the four-head configuration is half that of the drum of two-head configuration, so that the angle with which the head scanning trace crosses the track is larger, and the replay with the four-head configuration drum from the fast replay region is possible only at a speed half the speed at which the replay with two-head configuration drum is possible from the same fast replay region.

Furthermore, when the level of the replay signal fluctuates, the sync bit and the succeeding ID bits, and the first parity are reproducible, and the succeeding digital data is reproducible only up to its middle, and the rest cannot be reproduced because of the decrease in the level of the replay signal. In such a situation, the errors in the digital data is not detected until the result of the check using the second parity is produced. It is therefore necessary to conduct the predefined calculation for performing the check, and time is spent before the error detection.

Moreover, the amplitude of the replay signal varies periodically because the head crosses the recording tracks, so that burst errors frequently occur, and this cannot be detected easily nor quickly.

Moreover, the data used for fast replay is formed by extracting part of the data of the packets transparent-recorded, so that the length of data for forming a block of image is shorted. For this reason, when recording is made for the region used for transparent recording, disposing sync, ID, header, and packets in a predefined format, the fast replay signal cannot be recorded using the same format. The recording signal format forming means is therefore complicated.

Moreover, the fast replay data is used in common for all the replay speeds, so that the period at which one screen of image data is reproduced and displayed during fast replay at each speed is determined by the time for which the region in the tape longitudinal direction in which one screen for fast replay is recorded. Accordingly, the time for which one screen of image data is reproduced is inversely proportional to the speed. With higher speed, the picture changes quickly, while with lower speed, the picture changes slowly. As a result, the displayed image is easy to see for the viewer.

Furthermore, the region used for recording fast replay signal is limited to the region where reproduction is possible commonly for a plurality of fast replay speeds. Accordingly, the number of sync blocks for recording the fast replay signal is limited to the head scanning traces at the time of highest-speed replay, and the amount of data which can be recorded is small.

Moreover, when considering the fluctuation in the position of the head scanning trace due to fluctuation in the tape transport speed or the drum rotary speed, the region from which the data is reproduced without fail during fast replay is further reduced. This is particularly problematical in connection with fast replay with a higher speed.

SUMMARY OF THE INVENTION

The invention has been achieved to solve the problems described above, and its object is to provide a digital VTR with which the picture quality is higher in special replay, such as slow replay, still replay and fast replay.

Another object is to improve the resolution during fast replay.

A further object of the invention is to provide a digital VTR with which a fast replay signal can be reproduced without fail even when the track is non-linear or the scanning trace is non-linear, and which is reliable.

A further object of the invention is to provide a digital VTR with which a fast replay is possible at a large number of speeds, and which is convenient to use.

A further object of the invention is to provide a digital VTR with which a fast replay is possible at the same speed without regardless of whether the drum is of two-head configuration or four-head configuration.

A further object of the invention is to provide a digital VTR which permits detection of burst errors at a short processing time using a means of a simple configuration, and detection of erroneous correction.

A further object of the invention is to enable use of a common recording format for the normal data and the fast replay data, and to thereby simplify the format forming means in the recording system and the ID and header reading means in the replay system.

A further object of the invention is to provide a digital VTR with which a fast replay is possible at a plurality of speeds, and the screen is switched at an interval to provide pictures which are easy to see.

A further object of the invention is to provide a device capable of replaying the fast replay signal without being affected by the fluctuation in the head scanning traces.

A further object of the invention is to provide a device capable of fast replay at a very high speed.

According to one aspect of the invention, there is provided a digital VTR for recording recording data having digital video and audio signals, with error correction codes respectively appended in the recording and vertical directions, in respective predetermined areas on oblique tracks of a magnetic recording tape in a predetermined track format, and replaying from the areas, comprising:

data separating means for extracting data of intra encoded blocks in the form of intra-frame or intra-field blocks from the intra-frame or intra-field encoded, or inter-frame or inter-field encoded digital video signal, and the digital audio signal, contained in an input bit stream;

error correction code appending means for appending error correction code to the data of the intra-encoded blocks extracted by said data separating means; and recording means for recording the data with the error correction code appended, in the recording areas allocated in the magnetic recording tape to special replay data.

With the above arrangement, when replay signal obtained intermittently by scanning the magnetic recording tape during fast replay or slow replay is used to form a replay picture, it is possible to achieve error correction, and accordingly, even for the replay signal having a low output level and a poor symbol error rate, a special replay picture of a satisfactory quality can be formed by applying error correction.

It may so arranged that the recording means disposed the special replay data recording areas in such recording areas that by scanning the magnetic recording tape once with a rotary head at a predetermined replay speed during replay of the special replay data, said error correction code can be reconstructed.

With the above arrangement, the capacity of the memory required in the error correction decoder for forming an error correction block can be reduced. Moreover, the timings for control over writing and reading the replay data into or from the memory, and starting the error correction can be synchronized with the rotation of the rotary head, so that the control over the memory and control over the error correction decoder can be simplified, and the overall circuit size can be reduced.

It may so arranged that the recording means disposes the special replay data recorded on the magnetic recording tape, taking error correction block for the respective replay speed as a unit, in recording areas concentrated on oblique tracks of the magnetic recording tape.

With the above arrangement, even where there is non-linearity in the track, its effect can be avoided, and the special replay data can be reconstructed without being influenced by the non-linearity, and a special replay picture of a good quality can be obtained.

It may be so arranged that the error correction code appending means appends, to said special replay data, error correction code set to have a minimum distance identical to that of error correction code appended to the digital video or audio signal.

With the above arrangement, by slightly modifying the error correction decoder for the digital video signal or the digital audio signal, error correction decoding can be achieved, and it is not necessary to add a separate error correction decoder, so that the circuit size can be reduced.

It may be so arranged that the error correction code appending means appends, to said intra-encoded block, error correction code having identical magnitude for each of the replay speeds.

With the above arrangement, special replay data can be decoded using the same error correction decoder for various replay speeds, and the circuit size can be reduced.

It may be so arranged that the recording means disposes the error correction code in such recording areas that by scanning the magnetic recording tape once with a rotary head at a predetermined positive or negative symmetrical replay speed (which may be either of the values corresponding to positive and negative tape transport speeds having the same absolute value) during replay of the special replay data, said error correction code can be reconstructed.

With the above arrangement, maximum use is made of the special replay data recording areas to form error correction blocks. Moreover, it is possible to avoid repetition of the special replay data more than necessary, and the sizes of the error correction blocks for the respective replay speeds can be made uniform, and the overall circuit size can be reduced.

According to another aspect of the invention, there is provided a digital VTR for recording digital video and audio signals in respective predetermined areas on oblique tracks of a magnetic recording tape in a predetermined track format, and replaying from the areas, comprising:

data separating means for extracting intra-encoded data in the form of intra-frame or intra-field data from the intra-frame or intra-field encoded, or inter-frame or inter-field encoded digital video signal the intra-frame or intra-field digital video signal, and the digital audio signals, contained in an input bit stream;

recording means for recording the bit stream in areas for the digital video signal, and recording the intra-encoded data extracted at the data separating means, in areas for the digital audio signal.

With the above arrangement, the intra-frame or intra-field, and inter-frame and inter-field encoded digital video signal and the digital audio signal are input in the form of a bit stream, and the bit stream is recorded in the digital video areas, while the extracted intra-frame or intra-field encoded data only is also recorded in the digital audio areas. In this way, the still replay data and slow replay data are formed.

It may be so arranged that the data separating means extracts the intra-frame or intra-field encoded data packet by packet from the bit stream in which the digital video and audio signals are mixed in the form of packets of respectively constant lengths.

With the above arrangement, intra-frame or intra-field encoded data is extracted packet by packet from the bit stream in which the digital video and audio signals are mixed in the form of packets of respectively constant lengths, so that the still replay data and slow replay data can be separated packet by packet. Accordingly, the bit stream can be recorded without modification, on the magnetic tape.

It may be so arranged that the data separation means extracts the intra-frame or intra-field data macro block by macro block from the bit stream forming the digital video data of one macro block, having a plurality of luminance signal blocks and chrominance signal blocks collectively, each block consisting of 8 pixels by 8 lines.

With the above arrangement, intra-frame or intra-field data is extracted macro block by macro block, so that the still replay data and the slow replay data can be separated macro block by macro block. It is therefore possible to cope with the data, formed taking a macro block as a unit, such as that of progressive refreshing.

The digital VTR may further comprise memory means for storing one frame of field of the intra encoded data extracted by said data separating means, data being read from said memory means at a data rate at which data is recorded in the digital audio signal areas.

With the above arrangement, at least one frame or field of intra encoded data is sequentially written, and read at a data rate at which it is recorded in the digital audio signal areas, so that the data is extracted frame by frame or field by field. Accordingly, a still picture can always be recorded by extracting the data frame by frame or field by field.

The digital VTR may further comprises picture replay means for replaying video data for special replay, such as fast replay, still replay, and slow replay, from the intra-encoded data recorded in the digital audio signal areas.

With the above arrangement, by replaying video data for special replay, such as fast replay, still replay and slow replay, pictures with a high definition can be produced.

According to another aspect of the invention, there is provided a digital VTR for recording recording digital video and audio signals in respective designated areas of oblique tracks in a predetermined track format, and replaying from the areas, comprising:

data separating means for extracting intra-encoded data in the form of intra-frame or intra-field encoded data from the intra-frame or intra-field encoded, or inter-frame or inter-field encoded digital video signal, and the digital audio signal contained in an input bit stream; and recording means for recording the bit stream in the digital video signal areas, and recording the intra-encoded data extracted by said data separating means in the digital audio signal areas, and in the digital video signal areas.

With the above arrangement, the input bit stream is recorded in the digital video areas, and the intra-frame or intra-field encoded data extracted from the bit stream is recorded in the digital video signal areas and the digital audio signal areas, so that by using both of the digital video signal areas and the digital audio signal areas, special replay data with a good picture quality can be obtained.

It may be so arranged that the recording means records a first low-frequency component of the intra-frame or intra-field encoded data in the digital video signal areas, and records a second low-frequency component of a higher-frequency band than the first low-frequency component, of the intra-frame or intra-field decoded data, in the digital audio signal areas.

With the above arrangement, the first low-frequency component of the intra-frame or intra-field encoded data is recorded in the digital video signal areas, and the second low-frequency component of a higher-frequency band than the first low-frequency component is recorded in the digital audio signal areas. Accordingly, a better picture quality can be obtained, and the special replay image can be obtained even if the data in the digital audio signal areas is not reproduced.

According to another aspect of the invention, there is provided a digital VTR for recording recording digital video and audio signals in respective designated areas of oblique tracks in a predetermined track format, using a rotary drum on which head of two different azimuths are mounted, comprising:

data separating means for extracting a fast replay signal from the normal recording signal;

recording means for recording the fast replay signal in one region in one track per one scanning of the head, of the regions covered by the head traces and in the tracks of identical azimuth;

identification signal recording means for recording an identification signal for identifying the track; and replay means for replaying the identification signal.

With the above arrangement, the fast replay data can be reproduced from one location in one track per one scanning of the head during fast replay, so that even when the track is non-linear or the scanning trace is non-linear, the head can be scanned with reference to the region at said location where the fast replay data is recorded, and the data can be accurately reproduced.

It may be so arranged that a first recording region is provided in one track of one azimuth in which said fast replay signal is recorded, and a second recording region for recording the fast replay signal is also provided in the track of the other azimuth, and succeeding said one track;

the length of the second recording region is about half the length of the first recording region, and the center of the second recording region within the track is at about the same position as the center of the first recording region within the track.

With the above arrangement, in the case of a drum of two-head configuration, the fast replay signal in the tracks of one azimuth can be reproduced from the first recording region, while in the case of four-head configuration, the fast replay signal in the tracks of both azimuths can be reproduced from the first and second recording regions. As a result, the total amount of fast replay data, given as the sum of the data from the heads of two different azimuths, is the same, and the screen (whole picture) can be formed from the same amount of fast replay data, regardless of the head configuration, during fast replay at the same speed.

As a result, it is possible to obtain a device with which the fast replay speed is not limited by the head configuration, and the fast replay picture quality is identical regardless of the head configuration, and the device is therefore convenient to use.

It may be so arranged that, in the upper and lower end parts of the first recording region which extend out of the region corresponding to the second recording region of the adjacent track of a different azimuth, the signal identical to those in said second recording region is recorded.

With the above arrangement, where the sub-regions formed by equally dividing the first recording region is called A1, A2, A3 and A4, in turn, the signals recorded in the regions A1 and A4 are extracted, and recorded, without modification, in the second recording region, as well. In other words, the fast replay data recorded in the track of a first azimuth is divided equally and the first and fourth quarter data are recorded in the track of a succeeding, second azimuth. The data recorded in the track of the second azimuth can therefore be obtained by simple rearrangement means.

It may be so arranged that the recording means forms the fast replay signal dedicated for the particular fast replay signal for each of the fast replay speeds, and records the fast replay signal at different positions on the magnetic recording tape.

With the above arrangement, the fast replay signals are prepared for the respective fast replay speeds, and the data is configured so that the picture is switched at an interval which facilitates watching of the reproduced picture during fast replay at each speed.

It may be so arranged that the recording means repeatedly records the fast replay signal for (M×i)-time speed relay (i=1, 2, . . . n) at predetermined positions in predetermined tracks of consecutive M (M being a natural number) tracks, and repeatedly records the fast replay signal for (M×i)-time speed replay, 2×i times, taking the M tracks as one unit for each speed.

With the above arrangement, the fast replay signal for the predetermined speed is recorded in the predetermined position in the predetermined track, of the consecutive M tracks, and the fast replay signal for the (M×n)-time speed replay is repeatedly recording 2n times, taking the M tracks as a unit. Accordingly, during fast replay, it is sufficient if the control over the drum rotation and the tape transport speed performed in such a manner that the fast replay signal recorded at one location in the M tracks is reproduced. For instance, when the fast replay is effected at (M×n)-time speed, compared with the case in which the fast replay data is recorded at one location in M×n tracks, the amount of movement to a predetermined track in the state of transition at the time of changing the replay speed is smaller, and the reproduction of the fast replay data at the newly selected speed can be started in a shorter time.

It may be so arranged that the recording means repeatedly records that the fast replay signal for 4i-time speed replay (i=1, 2, . . . n) at predetermined positions in predetermined tracks of consecutive four (M being a natural number) tracks, and said identification signal recording means records three types of frequency signals as pilot signal for tracking control on these four tracks, being in superimposition with the digital data.

With the above arrangement, the fast replay data is disposed taking four tracks as a unit, and the identification signals (such as the three pilot signals f0, f1 and f2 two of which (f1 and f2) may consist of two different frequency signals superimposed on the digital data signal, and the last one of which (f0) may be featured by the absence of any signal superimposed on the digital data signal) for tracking control are recorded, so that, during fast replay, by the use of the identification signal, the desired track can be selected, and the fast replay data recorded in the track can be reproduced.

It may be so arranged that the digital VTR further comprises error correction code appending means for appending the error correction code formed of a predetermined number of sync bits inserted at a predetermined period in the signal sequence recorded in the magnetic recording tape, a predetermined number of ID bits succeeding said sync bits, a predetermined number of first parity bits generated from the ID bits, second parity bits generated from a predetermined number of digital data succeeding the first parity bits, third parity bits generated from a plurality of digital data extending over said sync bits, and fourth parity bits generated from the digital data and positioned at the back of said digital data;

erroneous correction detection means for comparing the fourth parity bits with the first parity bits reproduced by said replay means, and detecting erroneous correction on the basis of the result of comparison.

With the above arrangement, a fourth parity is appended only to the digital data recorded in the sync blocks, and on the basis of the result of the fourth parity check, the burst error in which the digital data is continuously missing in the middle of it can be detected quickly by a relatively simple comparison means.

Moreover, on the basis of such information, the erroneous correction at the error correction decoder in a replay system at the next stage can be detected.

It may be so arranged that the error correction code appending means appends the fourth parity bits only to the fast replay signal.

With the above arrangement, errors can be detected promptly even in a fast replay in which burst errors occur frequently due to the periodical amplitude fluctuation in the replay signal.

According to another aspect of the invention, there is provided a digital VTR for recording digital video and audio signals, in designated areas on oblique tracks of a magnetic recording tape, in a predefined format, using a rotary drum on which heads of two different azimuths are mounted, and replaying from the areas, comprising:

data separating means for extracting digital video signal (hereinafter referred to as fast replay signal) used for fast replay, from a normal recording signal;

recording means for recording the fast replay signals for the respective fast replay speeds, in predefined consecutive regions in a predefined track of a group of four consecutive tracks;

identification signal recording means for recording identification signal for identifying the tracks;

replay means for replaying the recording signal for normal replay, or fast replay signals for +2-time speed replay, or +4N-time speed replay or (−4N+2)-time speed replay (N being a positive integer); and tracking control means for performing tracking control so that said head scans the predefined regions in the predefined track of the four tracks in accordance with the identification signal.

With the above arrangement, four tracks are taken as a unit, and identical pattern is repeated every four tracks, and the data for each fast replay speed is recorded in the specific consecutive sync blocks in specific track, and during fast replay, the tracking is controlled at the specific position on the specific track. As a result, it is possible to increase the recording rate of the fast replay data.

It may be so arranged that the identification signal recording means comprises:

recording means for recording, as said identification signal, pilot signals of two different frequencies alternately, every other tracks; and said tracking control means includes comparison means for comparing the levels of the identification signals of the two different frequencies contained in the replay signal, while the head is scanning the position corresponding to the center of the area where the fast replay signal for the particular fast replay speed is recorded.

With the above arrangement, during fast replay, by comparing, at a specific timing, the levels of the identification signals of two different frequencies contained in the replay signal, and effecting tracking control on the basis of the result of the comparison, the head scans the areas where the data for the respective fast replay speed is recorded. As a result, even if the there is non-linearity in the track, or the like, it is possible to accurately track the region where the necessary data is recorded.

It may be so arranged that the identification signal recording means comprises:

recording means for recording, as said identification signal, pilot signals of two different frequencies alternately, every other tracks; and said recording means records sync block numbers together with the fast replay signal;

said tracking control means compares the levels of the identification signals of of the two different frequencies contained in the replay signal, when the sync block number of the predefined sync block in the area where the fast replay speed signal for the particular fast replay speed is recorded, to achieve tracking control.

With the above arrangement, when the predefined sync block number is detected during fast replay, the levels of the identification signals of two different frequencies are compared, to detect the tracking error, and tracking is controlled on the basis of the result of the comparison, i.e. on the basis of the detected tracking error. Accordingly, the head accurately scans the area where the fast replay data is recorded. That is, even if the position at which the fast replay data is recorded is shifted in the longitudinal direction of the tape, the area where the necessary data is recorded can be tracked accurately.

According to another aspect of the invention, there is provided a digital VTR for recording digital video and audio signals, in designated areas on oblique tracks of a magnetic recording tape, in a predefined format, using a rotary drum on which heads of two different azimuths are mounted, and replaying from the areas, comprising:

data separating means for extracting digital video signal (hereinafter referred to as fast replay signal) used for fast replay, from a normal recording signal;

appending means for appending sync byte, ID byte, header byte to the fast replay signal, in the same sync block configuration as said recording signal;

recording means for recording the fast replay signal in areas on tracks, such that during fast replay, only one location on one track of an azimuth identical to the head is covered by the head scanning trace;

identification signal recording means for recording identification signal for identifying the tracks; and replay means for replaying the identification signal.

With the above arrangement, the areas where normal replay data is recorded, and the areas where fast replay data is recorded have an identical sync block configuration, (with identical sync, ID and header configurations) so that the appending means for appending sync byte, ID byte and header byte in the recording system, and the reading means (including the ID and header reading means) can be used in common.

The digital VTR may further comprise:

input means for inputting a password from outside;

recording means for recording the password together with the digital video signal;

replay means for replaying the password at the time of replay of the digital video signal; and replay inhibiting means for inhibiting display of the digital video signal unless a correct password is input at the time of replay.

With the above arrangement, it is possible to protect the program or the whole tape from unauthorized replay.

According to another aspect of the invention, there is provided a digital VTR for recording digital video and audio signals, in designated areas on oblique tracks of a magnetic recording tape, in a predefined format, using a rotary drum on which heads of two different azimuths are mounted, and replaying from the areas, comprising:

data separating means for extracting digital video signal (hereinafter referred to as fast replay signal) used for fast replay, from a normal recording signal;

recording means for disposing a fast replay signal for an (M×i)-time speed replay (i=1, 2, . . . , n), at predefined positions on predefined tracks of consecutive M tracks (M being a natural member), and repeatedly recording the fast replay signal for (M×i)-time speed replay, (2×i) times;

identification signal recording means for recording identification signal for identifying the tracks on which the fast replay signal is recorded; and replay means for performing replay at an arbitrary replay speed which is an even-number of times the normal speed, and is lower than the (M×n)-time speed, using the fast replay signal recorded for (M×n)-time speed replay.

With the above arrangement, the data recorded for (M×n)-time speed replay can be all replayed at an even-multiple speed lower than the (M×n)-time speed, although the reproduced data may be duplicated.

According to another aspect of the invention, there is provided a digital VTR for recording digital video and audio signals, in designated areas on oblique tracks of a magnetic recording tape, in a predefined format, using a rotary drum on which heads of two different azimuths are mounted, and replaying from the areas, comprising:

data separating means for extracting intra-frame encoded image data, from an input bit stream;

recording means for forming fast replay signals for a plurality of fast replay speeds from the image data, and recording the n1-time fast speed signal in an area therefor, at positions designated according to the corresponding position on the screen of the signals, with the signals corresponding to the edges of the screen being positioned at the ends of the recording region on the oblique track, and with the signals corresponding to the position toward the center of the screen being positioned toward the center of the recording region on the oblique track; and replay means for performing fast replay at an n2 time speed (n2>n1) by replaying the n1-time fast replay signal.

With the above arrangement, the fast replay signal of the central part of the screen is collectively recorded in the center of the area recording the n1-time fast replay signal, and replay is conducted at a fast replay speed n2, higher than n1.

Accordingly, although the areas from which the signal is replayed is narrowed because of the increase of the replay speed to n2, the central part of the screen can be replayed.

According to another aspect of the invention, there is provided a digital VTR for recording digital video and audio signals, in designated areas on oblique tracks of a magnetic recording tape, in a predefined format, using a rotary drum on which heads of two different azimuths are mounted, and replaying from the areas, comprising:

sync block forming means for forming sync blocks by appending sync bytes to digital signal recorded in the magnetic recording tape at a predetermined interval;

data separating means for extracting a fast replay signal from the normal recording signal;

recording means for sequentially and repeatedly recording n pieces of data Di (i=1, 2, . . . n, n being a natural number) each of which can be recorded in one sync block, over (n+2×w) consecutive sync blocks Sj (j=1, 2, . . . (n+2×w)) at identical positions on predefined tracks;

wherein n is a maximum number of sync blocks which can always be reproduced from the track regions overlapping with the head scanning traces during m-time speed replay, w is a minimum natural number which is not smaller than the maximum shift from the reference position at which the head crosses a specific track, during m-time speed repay.

With the above arrangement, the maximum amount of data a head can reproduce from one track at a predefined fast replay speed is recorded repeatedly in the vicinity of the head scanning trace, taking account of the head position fluctuation, the maximum amount of data which is recorded can all be reproduced during fast replay. All the data can be read during fast replay in which the effect of the head position fluctuation is large.

It may be so arranged that the recording means repeatedly records the fast replay signal in (n+2×w) consecutive sync blocks Sj at an identical sync block position on each track, on at least m consecutive identical-azimuth tracks.

With the above arrangement, the fast replay signal is repeatedly recorded at identical positions on consecutive tracks, so that the fast replay signal can be replayed whichever track the head begins scanning during fast replay.

Accordingly, control over the head scanning position is simplified, and the fast replay at an arbitrary speed is possible as long as the head passes the predefined track positions.

According to another aspect of the invention, there is provided a digital VTR for recording digital video and audio signals, in designated areas on oblique tracks of a magnetic recording tape, in a predefined format, using a rotary drum on which heads of two different azimuths are mounted, and replaying from the areas, comprising:

sync block forming means for forming sync blocks by appending sync bytes to digital signal recorded in the magnetic recording tape at a predetermined interval;

data separating means for extracting a fast replay signal from the normal recording signal;

recording means for sequentially and repeatedly recording p pieces of data Di (i=1, 2, . . . p, p being a natural number not more than n) each of which can be recorded in one sync block, in (p+L+1) consecutive sync blocks Sj (j=1, 2, . . . (p+L+1)) at the same position in each track, in at least m tracks of consecutive identical-azimuth tracks in such a manner as to satisfy $$ek+1 = \mathrm{mod}[\{ek+p-\mathrm{mod}(p+L+1, p)\}, p]$$

where ek and ek+1 (integers not less than 1 and not more than p) are the suffixes i to the data D first recorded, where n is the maximum number of sync blocks which can always be reproduced consecutively from the region of the track on the tape overlapping with the head scanning trace during m-time speed replay, L is the number of sync blocks which is a minimum integer not smaller than (D−B+C)
where C is the difference between the starting positions of the tracks Tk and Tk+1 in the track longitudinal direction, D is the difference between the positions, in the track longitudinal direction, at which the head crosses with the respective tracks, B is the length of the region from which the reproduction from one track is possible consecutively, during m-time speed replay, and mode [a, b] expresses the remainder of a divided by b.

With the above arrangements, the arrangement of data repeatedly recorded on the tracks is such that the different data recorded on two identical-azimuth tracks proximate to each other and crossed by the head during one scanning are reproduced at least once without fail, so that the fast replay data can be recorded with a minimum number repetitions. With the arrangement of data described above even when the head scanning trace position fluctuates or the head trace phase is shifted, reading of the fast replay data is ensured, and images can be reproduced with a good quality, and much fast replay data can be recorded and reproduced.

BRIEF DESCRIPTION OF THE DRAWINGS

In the drawings:

FIG. 6 is a table showing the number of sync blocks from which data is obtainable at each replay speed;

FIG. 60A and FIG. 60B show the configuration of a password area according to Embodiment 13;

FIG. 64 shows rotary head scanning traces during +12-time speed replay of 4-time speed replay data of a recording format according to Embodiment 15 of the invention, by means of a 1 ch×2 system;

FIG. 90 shows an example of disposition of fast replay data according to Embodiment 19;

FIG. 98 shows overlapping portions of the copy areas between a plurality of fast replay speeds;

DETAILED DESCRIPTION OF THE PREFERRED EMBODIMENTS

Embodiment 1

Figure 1:
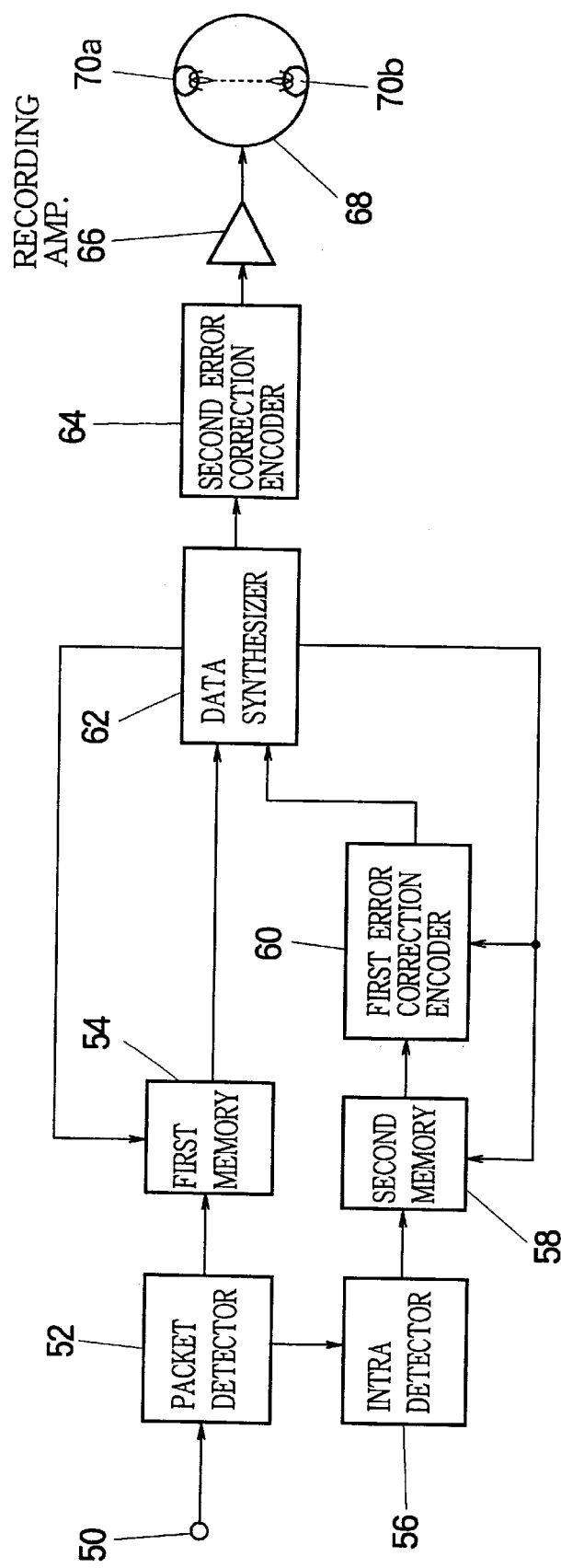
FIG. 1 is a block diagram showing a recording system of a digital VTR of Embodiment 1.

FIG. 1 is a block diagram showing a recording system of a digital VTR of an embodiment of the invention. In the drawing, reference numeral 50 denotes an input terminal for receiving digital video and audio signals in the form of a bit stream, 52 denotes a packet detector for detecting packets of the video and audio signals from the bit stream that is received, 54 denotes a first memory for storing the bit stream, and 56 denotes an intra detector for detecting intra-encoded data in the bit stream, 58 denotes a second memory for storing the intra-encoded data output from the intra detector 56. Reference numeral 60 denotes a first error correction encoder for appending error correction codes to the data output from the second memory 58. Reference numeral 62 denotes a data synthesizer for synthesizing the data output from the first memory 54 and the first error correction encoder 60 to form a recording bit stream, and 64 denotes a second error correction encoder for appending error correction codes stipulated by the SD standard, to the recording bit stream output from the data synthesizer 62. Reference numeral 66 denotes a recording amplifier, 68 denotes a rotary drum and 70a and 70b denote rotary heads.

Figure 2A:
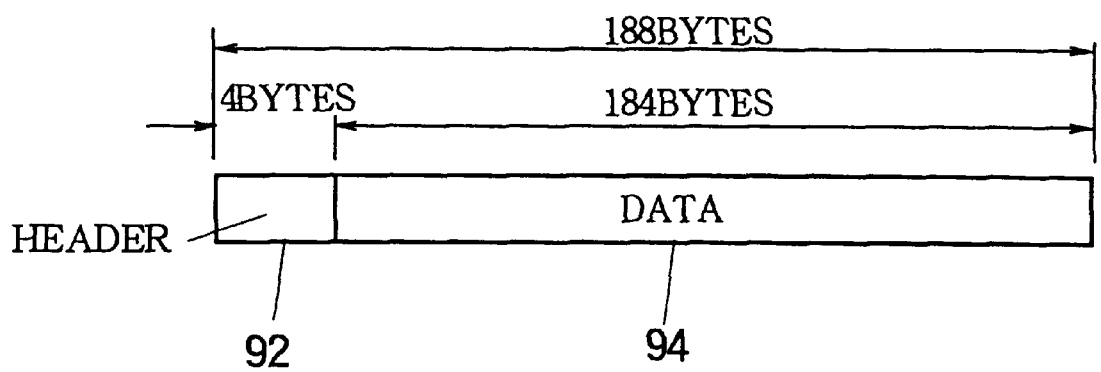
FIG. 2A shows a transport packet of an input bit stream.
Figure 2B:
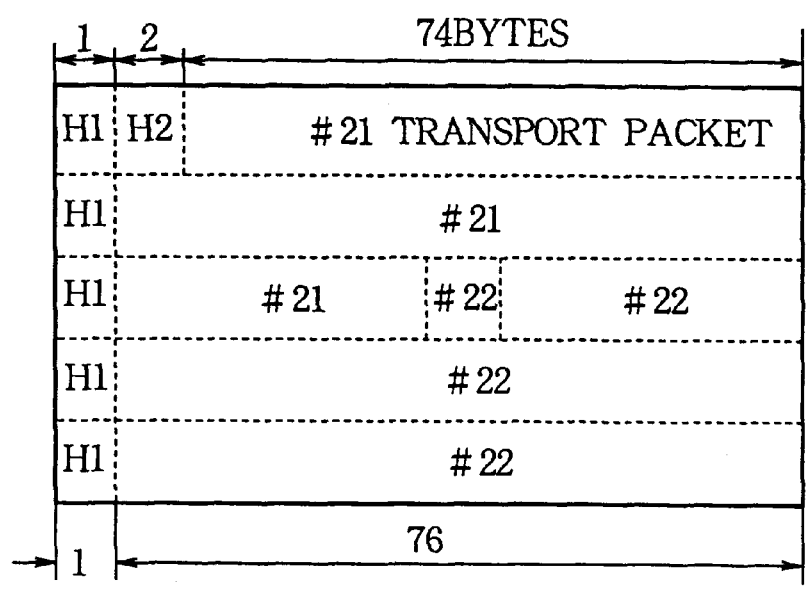
FIG. 2B shows a data packet recorded on the magnetic tape.
Figure 3:
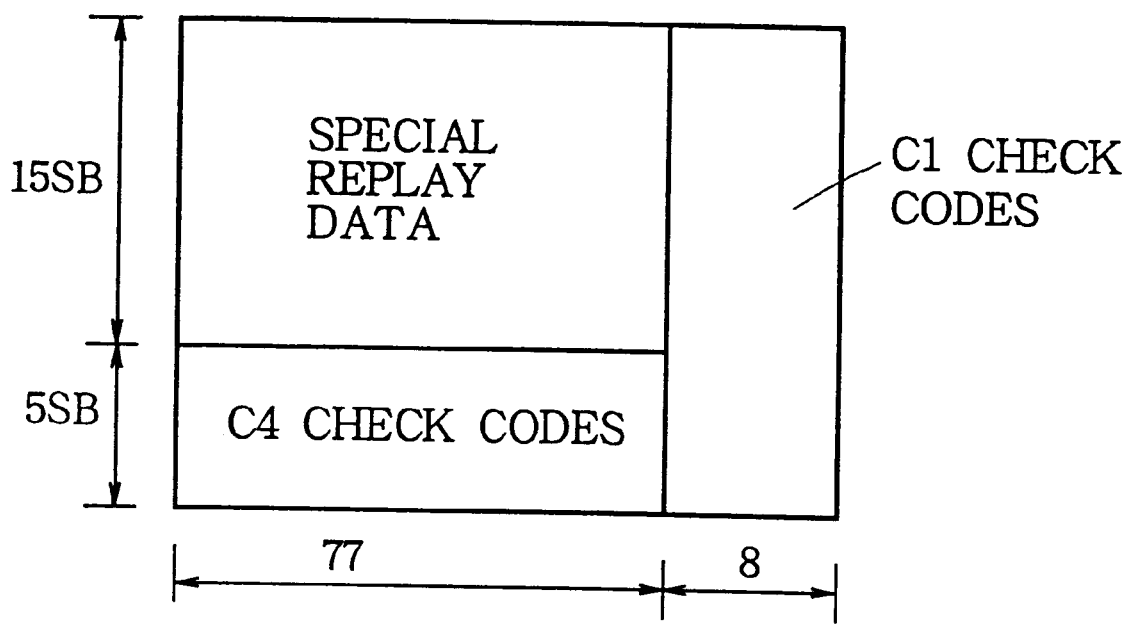
FIG. 3 shows a code configuration of the error correction block in a digital VTR of Embodiment 1.
Figure 4:
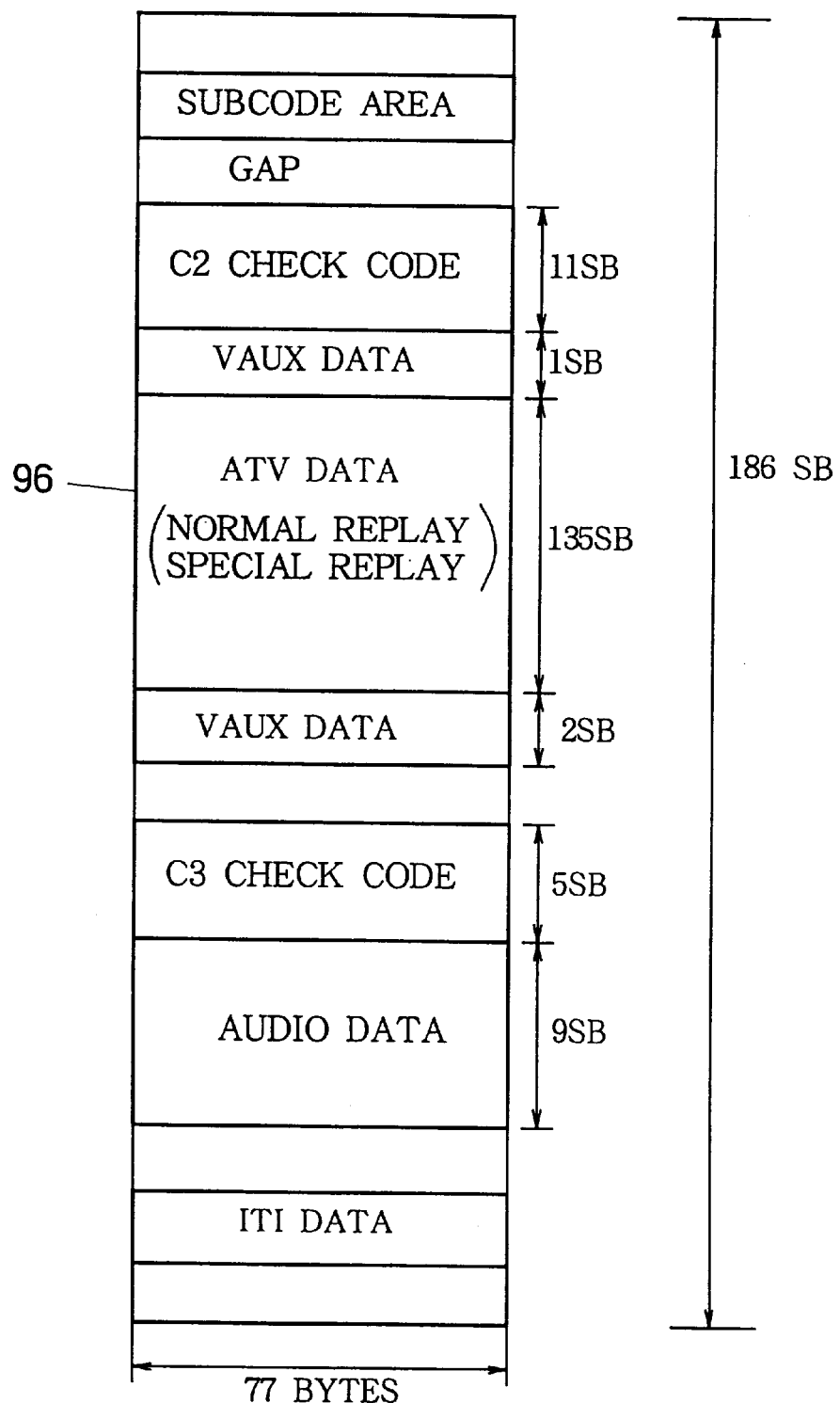
FIG. 4 shows a track configuration of a digital VTR of Embodiment 1.

FIG. 2A and FIG. 2B show an example of configuration of a packet of the digital data. FIG. 2A shows a transport packet of the input bit stream, and FIG. 2B shows a data packet recorded on the magnetic tape. FIG. 3 is a diagram showing the configuration of the codes of an error correction block of the digital VTR of the embodiment of the invention. FIG. 4 is a diagram showing a track configuration of the digital VTR of an embodiment of the invention.

Figure 5A:
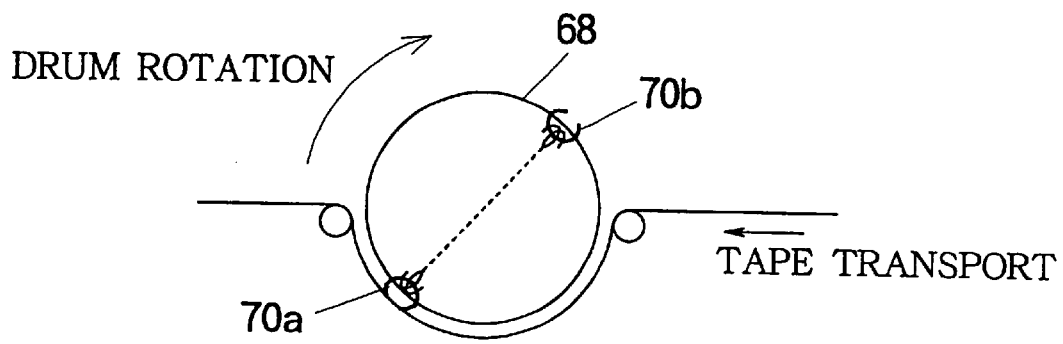
FIG. 5A to FIG. 5C show typical head arrangement on a rotary drum used in the SD mode, of 1 ch×2 system, 2 ch×1 system and 2 ch×2 system, respectively.
Figure 5B:
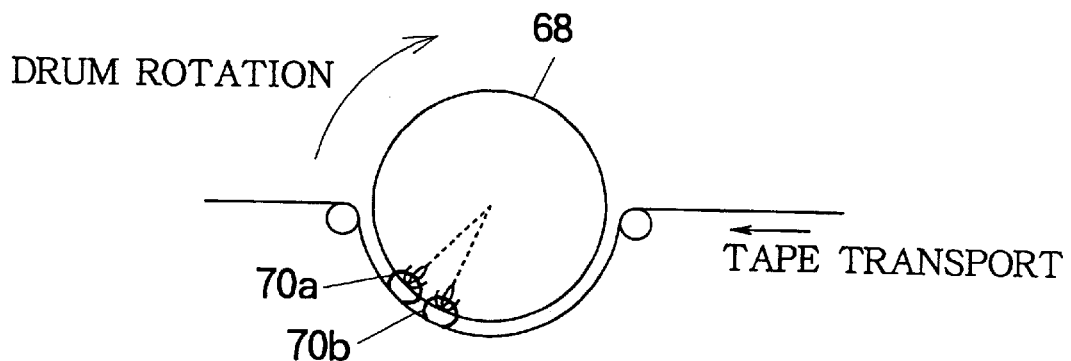
Figure 5C:
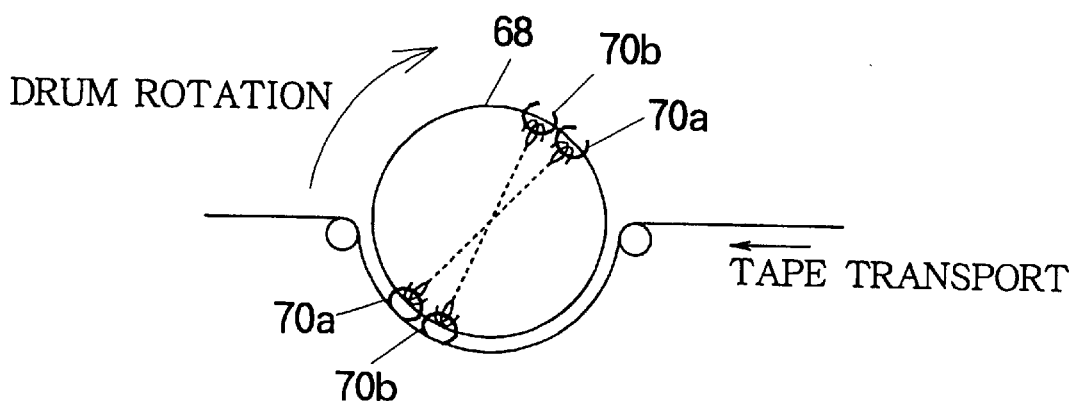
Figure 7A:
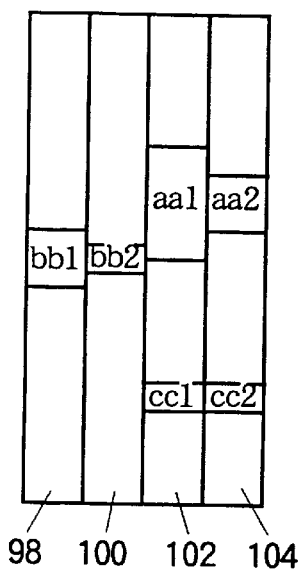
FIG. 7A shows disposition of the special replay data recording areas in the track in an example of recording format of a digital VTR of Embodiment 1.
Figure 7B:
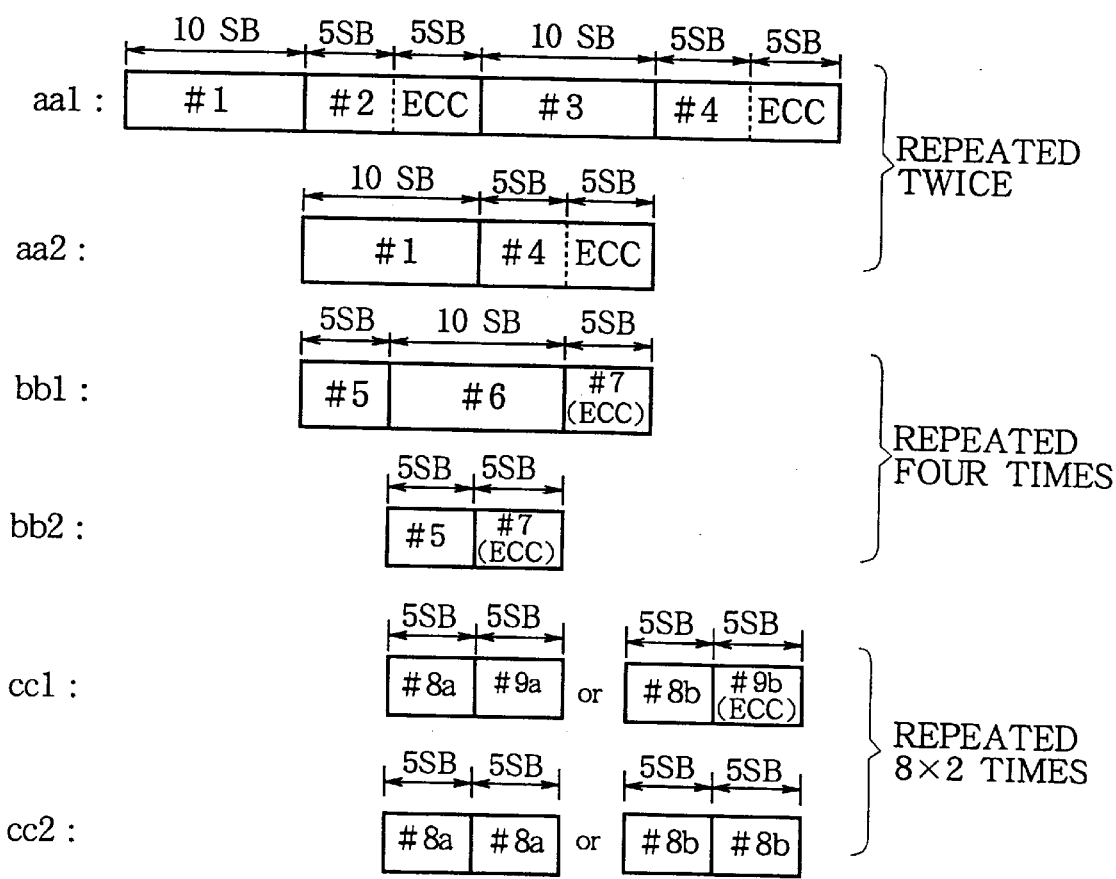
FIG. 7B shows the data and the magnitude of the recording areas in the same example.

FIG. 5A to FIG. 5C show typical head arrangements on the rotary drum used in the SD mode. FIG. 6 is a table showing the number of sync blocks from which data can be obtained at each of various replay speeds. FIG. 7A and FIG. 7B show an example of a recording format. FIG. 7A shows an arrangement of the special replay data recording areas, and FIG. 7B shows the data in the recording areas and their sizes.

Figure 8:
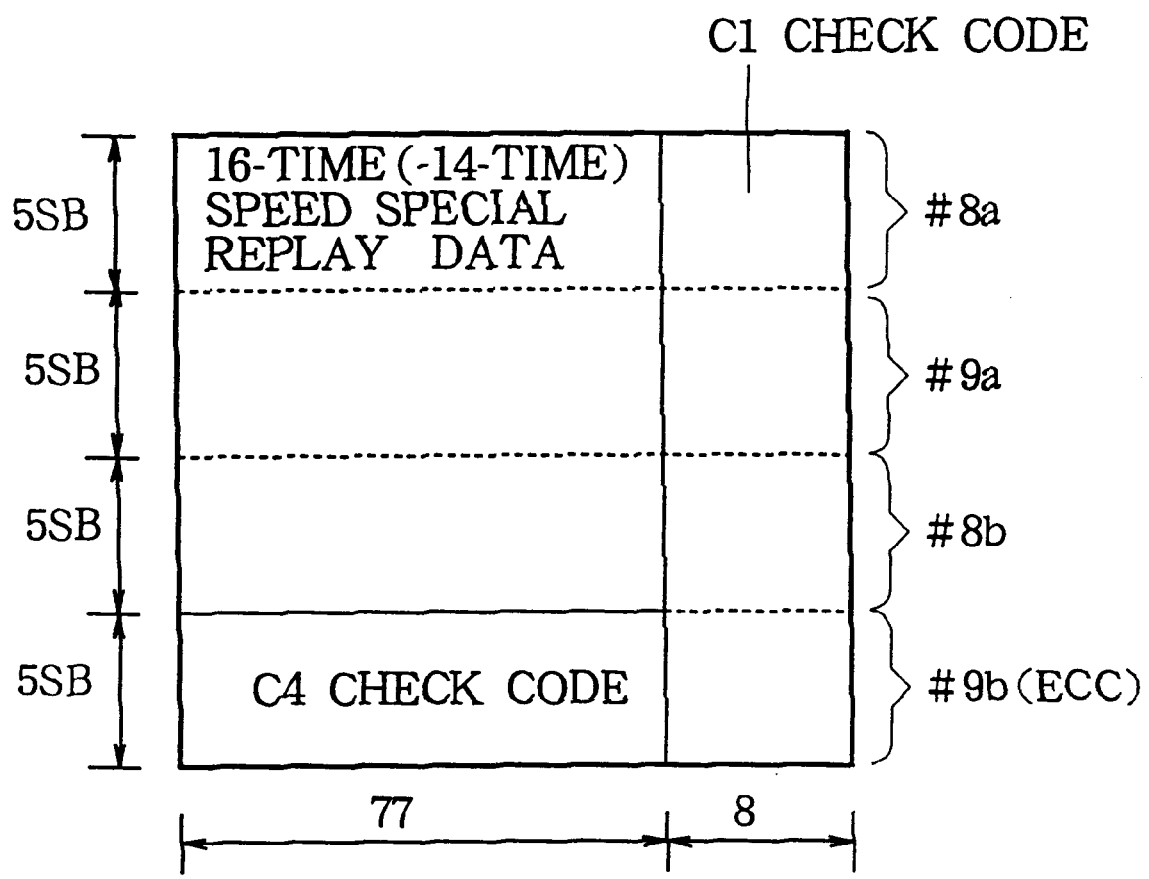
FIG. 8 shows an example of manner of division of the error correction block in a digital VTR of Embodiment 1.
Figure 9:
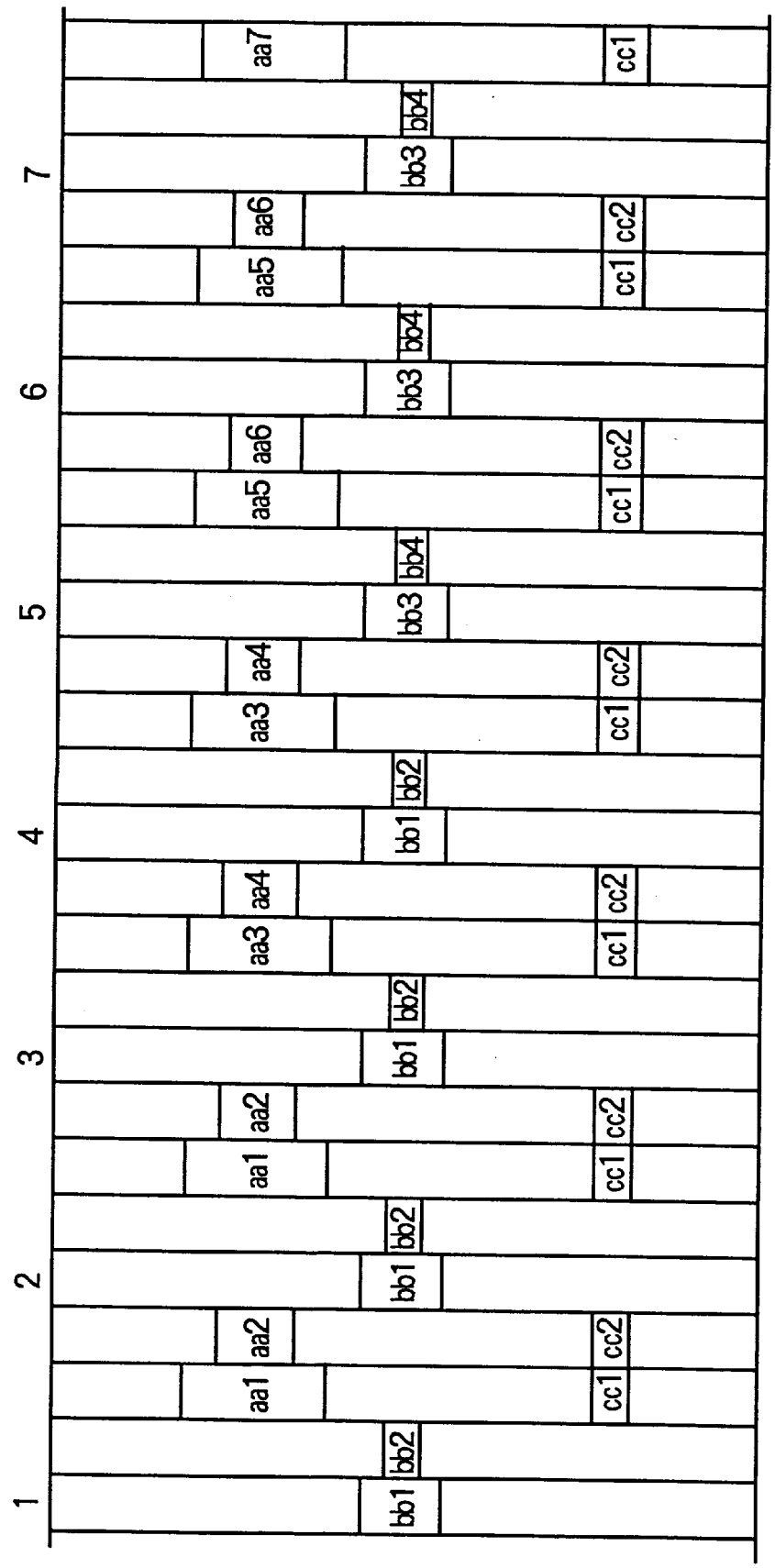
FIG. 9 shows a recording format on a track in a digital VTR Embodiment 1.

FIG. 8 shows an example of manner of division of the error correction block of the digital VTR of an embodiment of the invention. FIG. 9 shows a recording format on tracks of the digital VTR of an embodiment of the invention.

Operation during recording of Embodiment 1 will next be described with reference to FIG. 1 to FIG. 9. The bit stream received at the input terminal 50 contains digital video signal, the digital audio signal, and digital data concerning the video and audio signals. The bit stream is transmitted, being divided into packets shown in FIG. 2A. Each packet is formed of a header section 92 of 4 bytes and data section 94 of 184 bytes.

In Embodiment 1, the bit stream is detected, transport packet by transport packet. Two transport packets having been detected and converted into a recording data block of 5 sync blocks as shown in FIG. 2B, and recorded. Accordingly, the transport packets of the bit stream input via the input terminal 50 are detected by the packet detector 52, and are input in the first memory 54 and the intra detector 56.

At the first memory 54, the data of the bit stream is stored packet by packet, and read to form the configuration of the recording data block shown in FIG. 2B. In the example shown in FIG. 2B, the data length in one sync block is 77 bytes, and five sync blocks form two transport packets. In the drawing, H1 denotes a first header, H2 denotes a second header. Recorded in the first header H1 are identification data for indication the number of the sync block in the five sync blocks, and the like. Recorded in the second header H2 are identification data for indicating whether the data in the data section is video data or audio data. Incidentally, in Embodiment 1, reading of data from the first memory 54, the second memory 58, to be described later, is conducted in accordance with a command from the data synthesizer 62.

The bit stream output from the packet detector 52 is input to the intra detector 56, where judgement is made on whether the data in the transport packet is intra-encoded data or not. In the MPEG2 bit stream, when the bit stream is intra-frame or intra-field encoded (intra encoded), the intra transport packets are transmitted consecutively. These are detected, and the only intra transport packets are extracted. The extracted transport packets are input to the second memory 58.

The intra-frame transport packet data input to the second memory 58 is stored packet by packet, as at the first memory 54. The data is read from the second memory 58 so that it is of the recording data block configuration shown in FIG. 2B, like the data from the first memory 54

That is, the data length within one sync block is 77 bytes, and two transport packets are recorded over five sync blocks. In the drawings, H1 denotes a first header having a data length of one byte, and H2 denotes a second header having a data length of 2 bytes. Recorded in the first header H1 are identification data for discriminating each sync block from other sync blocks in the block, identification data indicating special replay data, and the like. Recorded in the second header H2 are identification data indicating the speed of the fast replay for which the recorded special replay data is intended, and the like. In Embodiment 1, reading from the second memory 58 is also conducted according to a command from the data synthesizer 62.

The special replay data read from the second memory 58, taking the five sync blocks as a unit (data length within one sync block is 77 bytes) is supplied to the first error correction encoder 60 where error correction codes are appended. The operation of the first error correction encoder 60 will next be described with reference to FIG. 3.

FIG. 3 shows the code configuration of the error correction code appended to the special replay data. In embodiment 1, (85, 77, 9) Reed-Solomon code (C1 check code) identical to the error correction code appended to the bit stream of the ATV signal, and (20, 16, 6) Reed-Solomon code (C4 check code) and having a minimum distance identical to that of the the error correction code for the audio signal are used in the recording direction and in the vertical direction, both as first error correction code for the special replay data.

The special replay data is read from the second memory 58, five sync blocks as a unit, and 15 sync blocks are collected at the first first error correction encoder 60, and one error correction block is formed of the 15 sync blocks. C4 check code is appended in the vertical direction, and the C1 check code in the recording direction is appended at the second error correction encoder 64, in the same way as the ATV signal output from the first memory 54, and the error correction block of the product configuration is formed.

Because the minimum distance of the C4 check code is identical to the C3 check code of the audio signal, the encoder may be used in common, by simply switching the code length. The code length is 14 in the case of the audio signal, and is 20 in the case of the special replay data.

Figure 102A:
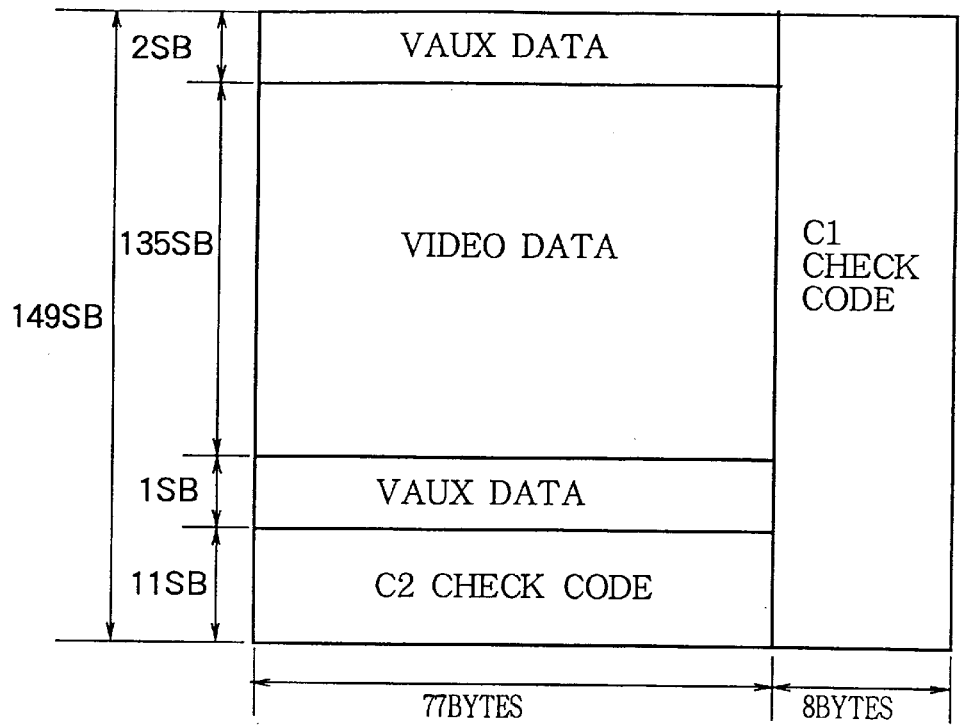
FIG. 102A and FIG. 102B show an example of configurations of a track containing video and audio data.
Figure 102B:
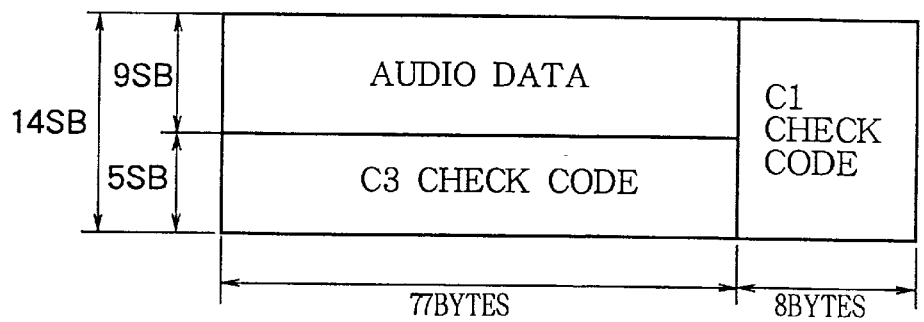
Figure 103:
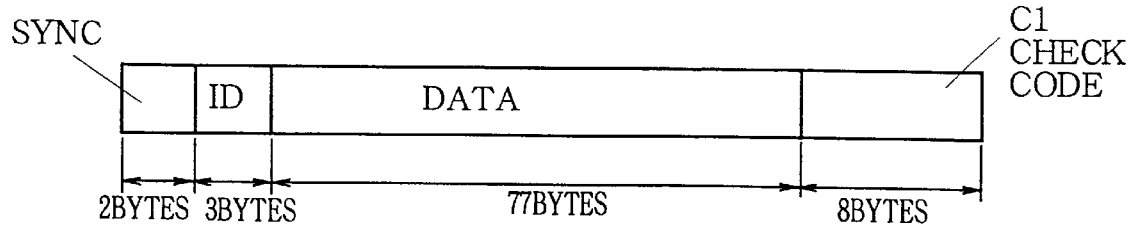
FIG. 103 shows an example of the configuration of one sync block on a magnetic tape.

With the track configuration of the SD (of the current television system) shown in FIG. 4, 149 sync blocks are provided per track for an area 96 for recording video data, as described in connection with the prior art example (or FIG. 102A and FIG. 102B). Out of the 149 sync blocks, three blocks are used for recording VAUX data, and eleven blocks are used for recording error correction code (C2 check code). One sync block is formed of 90 bytes as in the prior art example shown in FIG. 103. Out of the 90 bytes, five bytes at the head are used for recording a sync pattern and an ID signal, and eight bytes at the tail are used for recording error correction code (C1 check code), as shown in FIG. 4. The data which can be recorded in one sync block is therefore 77 bytes as shown in FIG. 103 and FIG. 4.

The data synthesizing operation at the data synthesizer 62 will next be described with reference to FIG. 5A to FIG. 9.

FIG. 5A to FIG. 5C show different arrangements of the heads on the rotary drum, and respectively show 1 ch×2 system in which two heads are disposed in opposition, 2 ch×2 system in which two heads are juxtaposed, and 2 ch×2 system in which two sets of heads are disposed in opposition. The angle over which the magnetic tape is wrapped around the drum is 180°. In FIG. 6, the number of the sync blocks from which data can be obtained from one track at each of the replay speeds is shown. In the drawing, 9000 rpm system means the system having the heads as shown in FIG. 5A and FIG. 5B, and 4500 rpm system means the system having the heads as shown in FIG. 5C. The track pitch in the SD standard is 10 μm, and the values in the drawing show the number of sync blocks per track which can be replayed at each of the replay speeds, where special replay is conducted using a rotary head having a width of 10 μm. It is assumed in the calculation that the number of sync blocks per track (corresponding to 180°) is 186 (see FIG. 4), and as in the prior art example the data can be obtained from the part where the output level of the replay signal is greater than −6 dB.

FIG. 7A shows the arrangement of the special replay data recording areas in the tracks of a digital VTR of Embodiment 1 of the invention, taking account of the number of sync blocks from which data can be obtained as shown in FIG. 6. In this recording format, the special relay data recording areas are repeated at an interval of four tracks, and the special replay data recording areas for each of the fast replay speeds are provided on the four tracks 98, 100, 102 and 104 forming one interval. In the drawing, aa1 and aa2 indicate special replay data for 2-time speed, 4-time speed and −2-time speed, and bb1 and bb2 indicate special replay data for 8-time speed and −6-time speed, and cc1 and cc2 indicate special replay data for 16-time speed, and −14-time speed. Provided in the first track 98 is a recording area for the special replay data bb1. Provided in the second track 100 is a recording area for the special replay data bb2. Provided in the third track 102 are recording areas for the special replay data aa1 and cc1. Provided in the fourth track 104 are recording areas for the special replay data aa2 and cc2.

FIG. 7B shows data (the number of sync blocks) recorded in each of the special replay data recording areas. FIG. 8 shows an example of manner of division of an error correction block at 16-time speed (−14-time speed). In FIG. 7B, identical signals are recorded in the recording areas designated with identical reference marks. For instance, data #1 in special replay data aa1 is recorded also as special replay data aa2. The special replay data aa1 and aa2 are repeatedly recorded over two tracks as shown in FIG. 9. The special replay data bb1 and bb2 are repeatedly recorded over four tracks as shown in FIG. 9.

Referring to FIG. 8, twenty sync blocks of the special replay data cc1 and cc2 for the 16-time speed and −14-time speed form one error correction block, with the above-mentioned error correction codes (C1 and C4 codes) being appended, which is divided into four sections, each consisting of five sync blocks. The data #8a and #9a of two upper blocks are repeatedly recorded over eight tracks, and the data #8b and #9b (ECC) of the two lower blocks are repeatedly recorded over eight tracks.

FIG. 9 shows a recording format of the special replay data for 27 tracks. Recording areas for the special replay data aa1, aa2, aa3, . . . , bb1, bb2, bb3, . . . , cc1, cc2, cc3, . . . , are repeated at an interval of four tracks on the magnetic tape. The areas designated with identical reference marks are used for recording identical special replay data.

The operation during the special replay is next described with reference to FIG. 9.

With reference to FIG. 6, in a system of 9000 rpm, data of 62 sync block can be reproduced at four-time speed, while in a system of 4500 rpm, data of only 31 sync blocks can be reproduced. With the recording format shown in FIG. 9, in a system of 9000 rpm, all the special replay data aa1 recorded in one track can be reproduced, at four-time speed replay. This is because, as shown in FIG. 7B, data #1, #2, #3 and #4 are 40 SBs in all, all the signals can be reproduce. In a system of 4500 rpm, however, about 9 sync blocks can be reproduced.

Accordingly, of the special replay data aa1 shown in FIG. 7B, data of several sync blocks at the head of data #1, and data of several sync blocks at the tail of data #4 cannot be reproduced. In the digital VTR of Embodiment 1 of the present invention, auxiliary data for use in a system of 4500 rpm is recorded as the special replay data aa2. (The manner of configuring one error correction block in a system of 4500 rpm will later be described in connection with Embodiment 2.)

Referring again to FIG. 1, the data output from the first memory 54 and the first first error correction encoder 60 are input to the data synthesizer 62, at which the data from the first memory 54 and the first first error correction encoder 60 are synthesized, to form a determined track format. The operation of the data synthesizer 62 will next be described briefly.

Five sync blocks of the bit stream of the ATV signal stored in the first memory 54 form two transport packets, as shown in FIG. 2B, and the bit stream is read from the first memory 54, one sync block as a unit, at a predetermined timing, and are disposed in areas other than the special replay data recording areas in the ATV areas (hereinafter referred to as main areas) on the recording tracks in FIG. 4. The data synthesizer 62 generates a control signal for controlling the timing of reading the data from the first memory 54, and the data read out are synthesized on the basis thereof.

The data of the 20 sync blocks having the error correction code appended at the first error correction encoder 60 is output to the data synthesizer 62 at a predetermined timing. Specifically, prior to the time (delay time) necessary for the formation of the error correction code from the second memory 58, a control signal for reading data from the second memory 58 is output from the data synthesizer 62. That is, the data synthesizer 62 synthesizes the data from the first memory 54 and the second memory 58, to form a recording format shown in FIG. 9. The ATV signal synthesized into a predetermined format at the data synthesizer 62, and recorded in the vide areas for one track, and the special replay data having the C4 check code appended is input to the second error correction encoder 64. At the data synthesizer 62, the track format for each track is formed, so that four tracks form a one cycle. In Embodiment 1, the recording of the special replay data repeated according to each of the replay speeds is prepared in the second memory 58. That is, memory regions for storing data for each of the replay speeds are prepared in the memory 58, and the data is refreshed at a predetermined period.

In the second error correction encoder 64, error correction code (C2 check code) is appended, in the vertical direction, to the data recorded in the video areas synthesized at the data synthesizer 62, and the error correction code (C1 check code) is appended, in the recording direction, thereafter. Thus, the C1 check code is appended to the special replay data shown in FIG. 3, at this timing. The recording data having the error correction code appended are subject to digital modulation, and amplified at the recording amplifier 66, and recorded on the magnetic tape by means of the rotary heads 70a and 70b.

Figure 10:
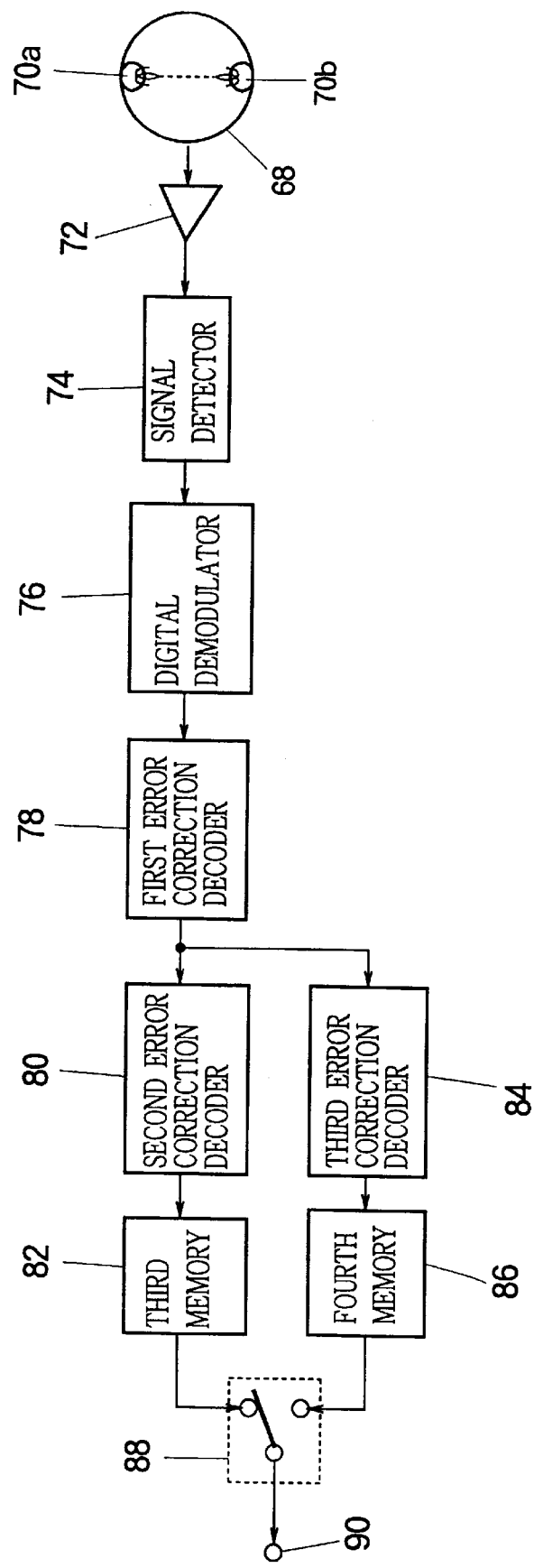
FIG. 10 is a block diagram showing a replay system of a digital VTR of Embodiment 1.

FIG. 10 shows a block diagram of a replay system of a digital VTR of an embodiment of the invention. In the drawing, the rotary drum 68, the rotary heads 70a and 70b are identical to those in FIG. 1. Reference numeral 72 denotes a head amplifier, 74 denotes a signal detector for detecting digital data from the replay signal, and 76 denotes a digital demodulator for applying digital demodulation to the replay digital data output from the signal detector 74. Reference numeral 78 denotes a first error correction decoder for correcting or detecting errors contained in the replay signal, using the C1 check code (the error correction code in the recording direction), 80 denotes a second error correction decoder for correcting or detecting errors which have not been corrected by the C1 check code (the error correction code appended to the video signal in the vertical direction), 82 denotes a third memory, 84 denotes a third error correction decoder for correcting or detecting errors, using the error correction code (hereinafter referred to as C4 check code) in the vertical direction for the special replay data shown in FIG. 3, during replay of the ATV signal, 86 denotes a fourth memory, 88 denotes a switch, and 90 denotes a data output terminal.

Figure 11:
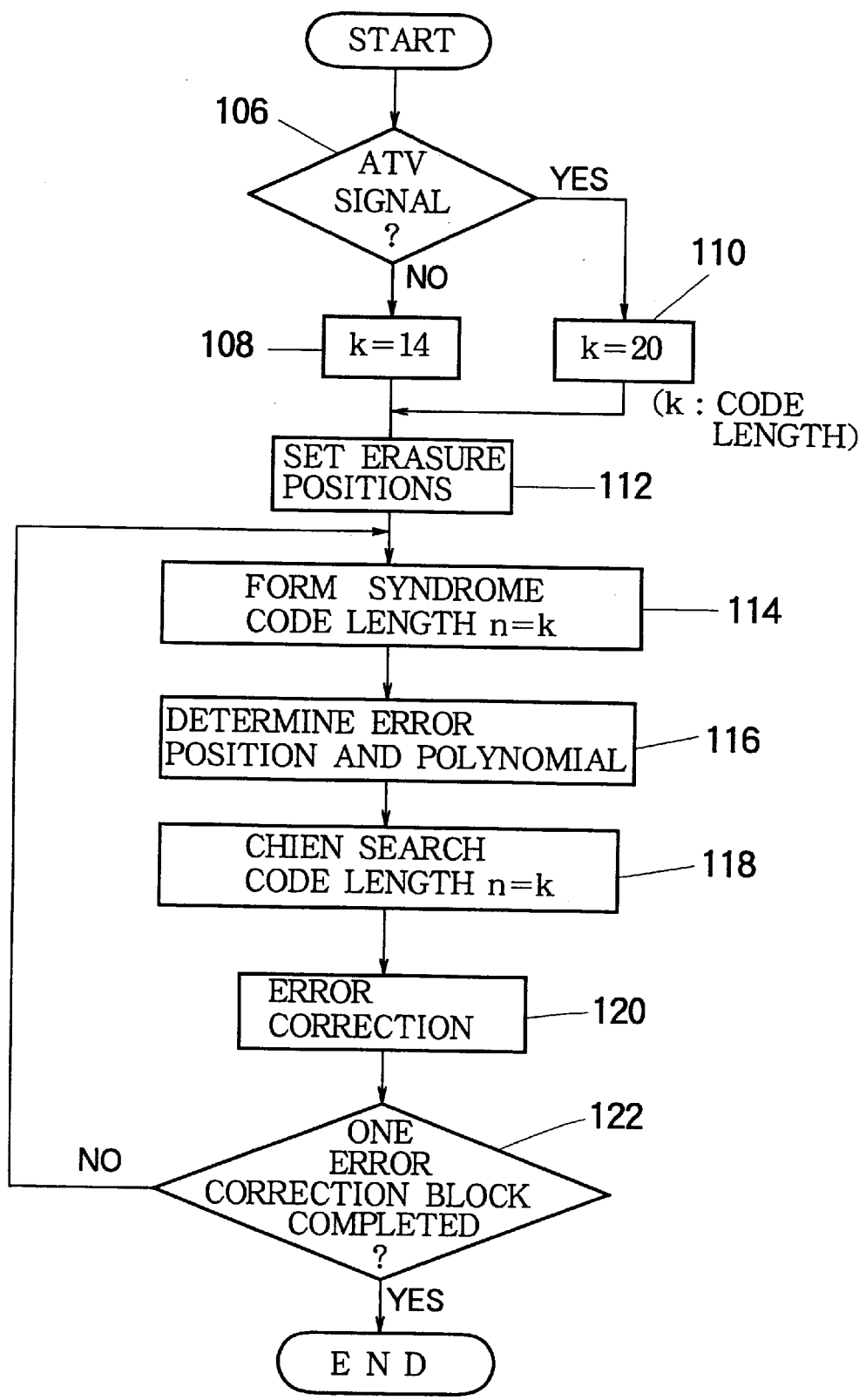
FIG. 11 is a flow chart showing the decoding algorithm in the third error correction decoder.
Figure 12:
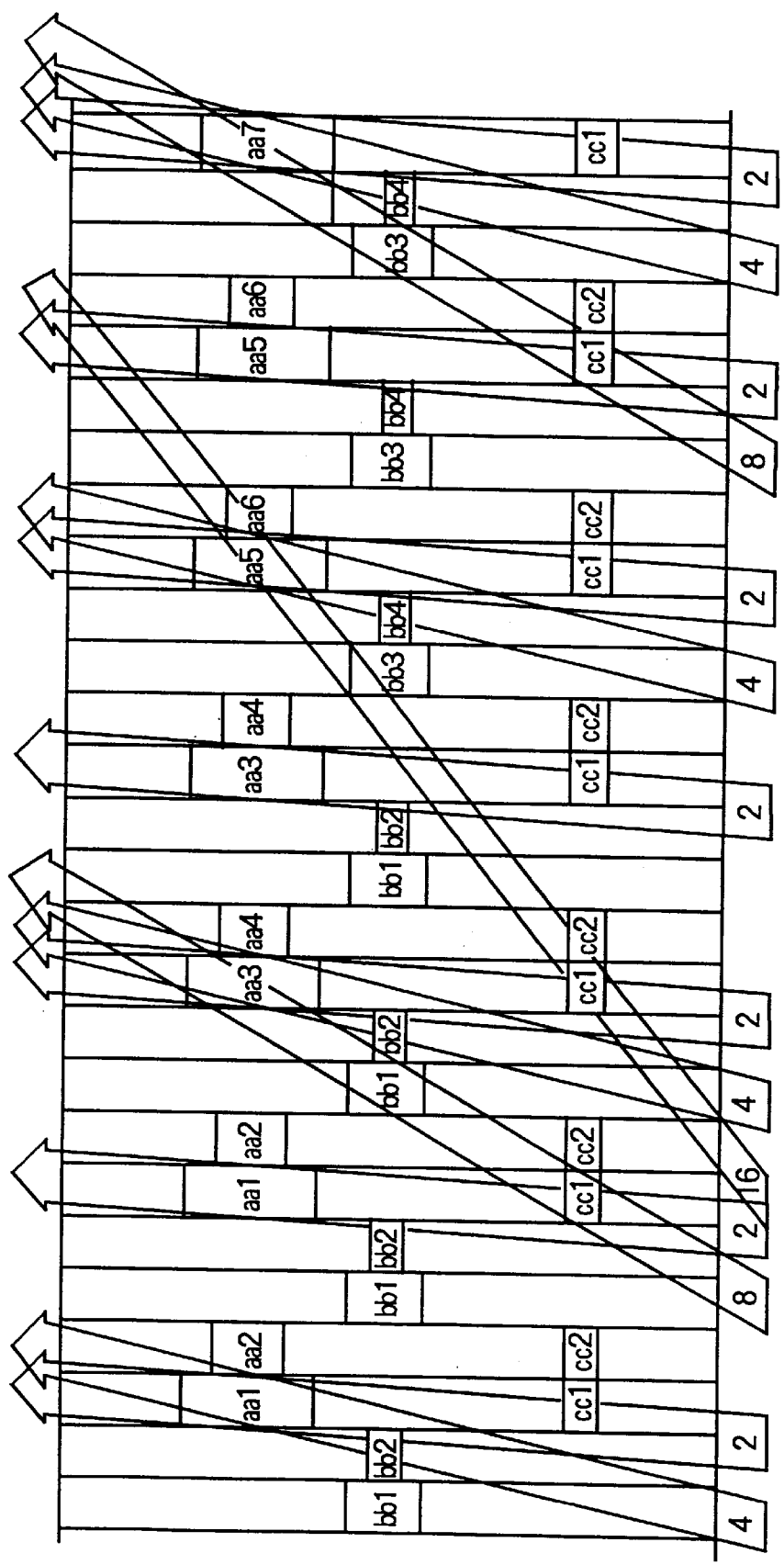
FIG. 12 is a diagram showing the rotary head scanning trace during fast replay in a 1 ch×2 head system.

FIG. 11 shows a decoding algorithm in the third error correcting decoder. FIG. 12 shows scanning traces of the rotary head 70a in a digital VTR at fast replays in a 1 ch×2 head system.

The numerals "2", "4", "8", and "16" at the starting points of the arrows in the drawing indicate that the respective arrows are scanning traces for double speed replay, four-time speed replay, eight-time speed replay, and 16-time speed replay are conducted with the digital VTR.

Figure 13A:
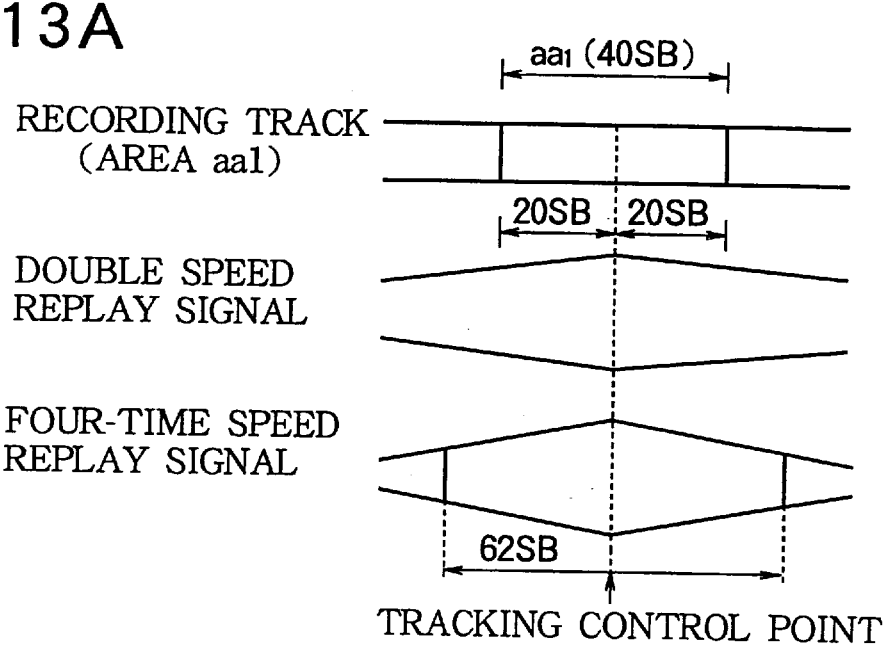
FIG. 13A to FIG. 13C respectively show the tracking control point for the rotary head at each of different replay speeds, for explaining the tracking control operation of a digital VTR of Embodiment 1.
Figure 13B:
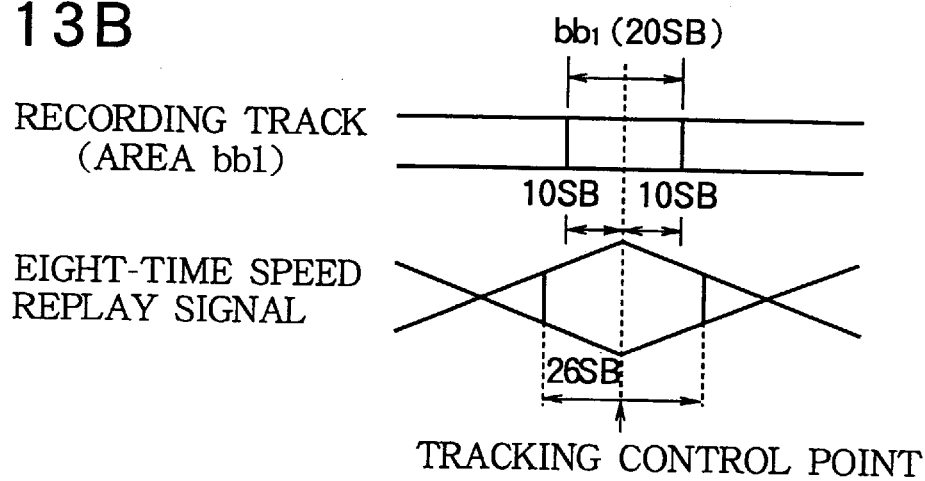
Figure 13C:
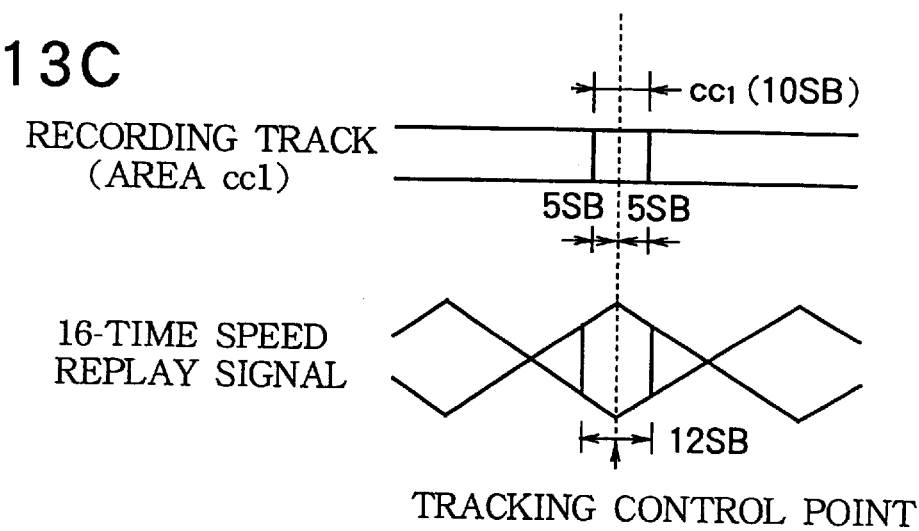

FIG. 13A to FIG. 13C are for explaining the tracking control operation in a digital VTR of an embodiment of the invention. FIG. 13A to FIG. 13C respectively show tracking control points of the rotary head at the respective replay speeds. They show the tracking control positions, and the output patterns of the replay signal output from the rotary head 70a which result when double speed replay, four-time speed replay, eight-time speed replay and 16-time speed replay are conducted in a digital VTR having a rotary head configuration shown in FIG. 5A or FIG. 5B.

The operation of the replay system will next be described with reference to FIG. 10 to FIG. 13.

During normal replay, data replayed via the rotary heads 70a and 70b from the magnetic tape is amplified at the head amplifier 72, and a signal is detected at the signal detector 74, and converted into replay digital data at the digital demodulator 76. The digital-demodulated signal is subjected to error correction and detection at the first error correction decoder 78, using the C1 check code appended in the recording direction (this decoding will herein after referred to as C1 decoding). The error-corrected data is input to the second error correction decoder 80 and the third error correction decoder 84.

At the second error correction decoder 80, error correction or decoding is conducted using the C2 check code (error correction code appended in the vertical direction) for the data which have not been error-corrected by the C1 check code (the data for which an error has been detected, and the data which contains an undetected error). This error correction decoding is hereinafter referred to as C2 decoding. The data having received the C2 decoding is input to the third memory 82, where the bit stream of the ATV signal is separated from the input data, and only the bit stream is stored in the memory. The special replay data is discarded at this stage, as in the prior art example.

At the third error correction decoder 84, data replayed from the special replay data recording area is separated from the data input to the third error correction decoder 84, to form one error correction block shown in FIG. 3. The separation of the data from the special replay data recording areas is accomplished by detecting the positions of the special replay data recording areas on the track by referring to the sync block numbers recorded in the ID signals in the sync blocks, and detecting the identification data in the header H2 in the sync blocks, and judging whether the data is the special replay data or the bit stream of the ATV signal.

When the above-mentioned one error correction block is formed, the third error correction decoder 84 conducts error correction or detection on the data which has not been error-corrected (the data for which an error has been detected, and the data which contains an undetected error) with the C1 check code, using the C4 check code (error correction code appended in the vertical direction of the special replay data). This decoding is hereinafter referred to as C4 decoding. The data having received the C4 decoding is input to the fourth memory 86.

In Embodiment 1, the minimum distance of the C4 check code for the special replay data, and the minimum distance for the C3 check code for the audio data are made to be identical. The reason for this is as follows. The audio signal in the ATV signal is transmitted together with the digital video signal, it is recorded in the video signal areas, rather than in separate audio signal areas. Accordingly, during replay from a magnetic tape of the digital VTR recording the ATV signal, the error correction decoder for the audio signal is not used. In Embodiment 4, by making the minimum distance of the C4 check code and the minimum distance of the C3 check code identical, as described above, the third error correction decoder 84 is used also as the error correction decoder for the audio signal. In this way, the size of the circuit is reduced. There is however some addition of circuits. This will be later described.

The fourth memory 86 stores the special replay data having been subjected to the error correction. During normal replay, the data selector 88 selects the output of the third memory 82, and the bit stream of the ATV signal restored at the third memory 82 into packet information of 188 bytes is output via the output terminal 90.

The operation in the still mode will next be described.

The still replay may be started by transition from a normal replay, or by selection in the state of halting. First, description is made for the case where the still replay is started by transition from normal replay.

When the still mode is selected during normal replay, the replay data is stopped, and input of data to the third memory 82 and the fourth memory 86 is interrupted. The selector 88 selects the output of the fourth memory 86 to output the still picture via the output terminal 90. Data shown in FIG. 2B, other than H1 and H2, i.e., the data of the transport packet is stored in the third and fourth memories 82 and 86. The intra-encoded data having received the error-correction at the third error correction decoder 84 is stored in the fourth memory 86, so that it is only necessary to sequentially read the data stored, transport packet by transport packet. The configuration may be such that, during still replay, the data of the transport packets replayed from the special replay data recording areas for the double speed, four-time speed and −2-time speed having the most recording data amount is output. During normal replay, as the data used for still replay, the special replay data for 2-time, 4-time or −2-time speed replay may be decoded, and stored for use as the data for still replay.

Next, the situation where the still mode is selected from the state of halting is described. In the state of halting, no data is present in the third and fourth memories 82 and 86. If, in this state, the still mode is selected, it is necessary to conduct normal replay to store the data for one screen in the fourth memory 86, and stop the tape. In the case of still replay, the still mode signal is output to the decoder of the ATV, and the still picture may be formed at the memory of the ATV. Alternatively, transport packets indicating no motion compensation prediction error (i.e., the transport packets indicating a still picture) may be formed at the digital VTR and is kept output.

The operation during fast replay will next be described.

The description will be made with regard to the rotary head configuration shown in FIG. 5A. FIG. 12 shows scanning traces of the rotary head 70a which result when replay is made at double speed, four-time speed, eight-time speed and 16-time speed. The scanning traces of the rotary head also result when the rotary head configuration is as shown in FIG. 5B. However, with regard to the head 70b, the traces will be entirely different because of the different head disposition.

First, the tracking control system during fast replay in Embodiment 1 is described with reference to FIG. 12 and FIG. 13A to FIG. 13C. During fast replay, the data is intermittently replayed, as described above. The number of sync blocks replayed from one track at the respective replay speeds is as shown in FIG. 6. The special replay data can be obtained effectively, by controlling the tracking of the rotary head 70a so as to maximize the replay output around the areas where the special replay data is recorded at the respective replay speeds. FIG. 13A to FIG. 13C show the tracking control points for the rotary head 70a at the respective replay speeds. With the recording format shown in Embodiment 1, in a system of 9000 rpm, the data of one error correction block shown in FIG. 3 can be formed without using the data replayed via the rotary head 70b. Accordingly, FIG. 12 omits showing the scanning traces of the rotary head 70b.

The operation of the replay system during fast replay will next be described with reference to FIG. 10 to FIG. 13C. When a fast replay mode signal is input, the selector selects the output of the fourth memory 86. The replay data intermittently replayed via the rotary heads 70*a* and 70*b* is amplified at the head amplifier 72, and converted to the replay digital data at the signal detector 74, and digital-decoded at the digital decoder 76. The data having its sync data correctly detected at the signal detector 74 is subjected to error correction using the C1 check code at the first error correction decoder 78. The C1-decoded data is input to the third error correction decoder 78. The output of the first error correction decoder 78 is also input to the second error correction decoder 80, but as the data is intermittently replayed, C2 decoding cannot be conducted, and transport packets cannot be generated.

The operation of the third error correction decoder 84 will next be described with reference to FIG. 11 and FIG. 12.

From the data input to the third error correction decoder 84, the data from the special replay data recording areas is detected, and one error correction block shown in FIG. 3 is formed. The separation of the data from the special replay data recording areas is accomplished by detecting the positions of the special replay data recording areas on the track by referring to the sync block numbers recorded in the ID signals in the sync blocks, and judging whether the data is the bit stream of the ATV signal or the special replay data by referring to the header in the sync block.

When one error correction block is thus formed, the third error correction decoder 84 conducts decoding using the C4 code according to the algorithm shown in FIG. 11. When data of one error correction block is formed, the third error correction decoder 84 judges whether the replay mode is the one for selecting the ATV signal or not according to the control signal output from a system controller, not shown (step 106). If the replay mode is not the one for selecting the ATV signal, the code length k for conducting the C3 decoding is set to be "14" (step 108). If the replay mode is the one for selecting the ATV signal, the code length k is set to be "20" (step 110). When the code length is set, the third error correction decoder 84 sets the erasure positions detected at the time of C1 decoding, in the third error correction decoder 84 (step 112). Then, the syndrome for the case where the code length k equals to "20" is formed on the basis of the erasure positions (step 114). For using the circuits in common with the C3 decoding of the audio signal, it is necessary to add a selector for changing the initial value of the counter counting the code length.

When the syndrome is formed, on the basis of the result of the syndrome formation, calculation of the error position polynomial and the error value polynomial is conducted (step 116). This part can be used in common with the C3 decoding because the minimum distance is equal. In the Chien search, the error positions and error values are determined on the basis of the error positions and the coefficient data of the error polynomial (step 118). To use the circuits in common with the C3 decoding of the audio signal, it is necessary to add a selector for altering the initial value of the Chien search, and a selector for altering the initial value of the counter counting the code length. The error correction is effected on the basis of the error positions and the error values (step 120). The above steps are repeated until all the data of one correction block is completed (step 122). The C4-decoded special replay data is input to the fourth memory 86. From the fourth memory 86, the ATV bit stream having been restored into packet information of 188 bytes is output via the selector 88 and the output terminal 90.

The manner of configuring the error correction block shown in FIG. 3 will next be described. In the digital VTR of Embodiment 1, the manner of configuring one error correction block differs between the the low-speed fast replay (double speed, four-time speed, −2-speed, eight-time speed and −6-time speed), and high-speed fast replay (16-time speed and −14-time speed). This is because the number of the sync blocks replayed by the rotary head 70*a* is "12" which is smaller in the case of the 16-time replay. Accordingly, all the data forming one error correction block is not replayed during one scanning by the rotary head 70*a*, and the data is disposed on the recording tracks so that one error correction block is formed by two scannings of the rotary head 70*a*. This is because changing the minimum distance of the error correction code causes increase of the size of the circuit of the error correction decoder.

Accordingly, if, only for the 16-time speed (−14-time speed), the minimum distance were made to be identical only for the 16-time speed (−14-speed) replay data and the size of the error correction block were altered, then five or six sync blocks of special replay data would be obtained for five sync block of error correction code, so that the rate of data collection would below. It is for this reason that, in Embodiment 1, data is disposed on the recording tracks such that data of an error correction block identical to that in other fast replay speeds can be formed over two scanning periods by the rotary head 70*a*.

The manner of configuring one error correction block in the case of double speed, four-time speed and −2-time speed will next be described. As illustrated in FIG. 12, in the case of double speed replay, the part aa1 is replayed during one scanning period of the rotary head 70*a*. As illustrated in FIG. 7B, data of two error correction blocks is disposed in the part aa1, so that the third error correction decoder 84 applies C4 decoding to each of the error correction blocks. In the case of double speed replay, identical error correction block is replayed twice, the decoding may be conducted only one of the error correction blocks. The control will be the same for the reverse double speed repay (−2-time speed). In the case of the four-time replay, the data of the part aa1 is replayed during one scanning period of the rotary head, so that the operation is similar to that for the double speed.

During eight-time speed replay, the data of part bb1 is replayed during one scanning period of the rotary head. As shown in FIG. 7B, data of one error correction block is disposed in the part bb1, so that the third error correction decoder 84 conducts C4 decoding when the data of part bb1 is replayed. In the case of −6-time speed replay, the operation is similar, but an identical error correction block is replayed one out of five rotations, so that this block need not be decoded. In the case of 16-time speed replay, as shown in FIG. 6, the data replayed from one track consists of 12 sync blocks, one error correction block cannot be configured from data replayed from one track only. Accordingly, in Embodiment 1, the 16-time speed replay data is divided into two tracks (see FIG. 7).

In this way, the third error correction decoder 84 configures one error correction block from the data replayed over two scanning periods of the rotary heads 70*a*, and conducts the C4 decoding. During the first scanning period, 10 sync blocks including the data #8*a* and #9*a* are replayed, and, in the next scanning period, 10 sync blocks including the data #8*b* and #9*b* are replayed, and one error correction block is thereby configured.

The operation in the slow replay will next be described.

During slow replay, the speed of magnetic tape transport is lower than in normal replay, and each oblique track is scanned and replayed several times as the tape is transported. Accordingly, of the replay digital signal, the data for which the sync signals have been correctly detected at the signal detector 74, and the sync blocks have been correctly decoded at the digital decoder 76 is extracted, and is subjected to error correction using the C1 check code, and the replay data for double speed, four-time speed and −4-time speed stored in the special replay data recording areas is extracted, and output to the third error correction decoder 84. The separation of the data can be accomplished, as in normal replay, by detecting the positions within the track, by referring to the ID signals contained in the sync blocks, and identifying the track by referring to the header information recorded in the data areas.

The third error correction decoder 84 configures one error correction block using the above mentioned data, and conducts C4 decoding as in normal replay. The C4-decoded data is stored in the fourth memory 86. The fourth memory 86 synthesizes a still picture, and data stored transport packet by transport packet is sequentially read. The selector 88 selects the output of the fourth memory 86.

As described in connection with the prior-art example, during special replay (slow replay, fast replay, etc.), the rotary head crosses the recording tracks obliquely, so that the replay signal obtained from the tracks is intermittent. As a result, the error correction block (video data) shown in FIG. 102A cannot be obtained as in the prior art example. However, in Embodiment 1, one error correction block for special replay shown in FIG. 3 is formed and recorded, so that it is possible to conduct error correction using the C4 check code for the data for which error correction using the C1 check code was not conducted. As a consequence, in the case where the symbol error rate is 0.01, the error detection rate will be $1.54 \times 10^{-3}$, and the error detection rate is improved by $10^{10}$, so that it is a level which is practically satisfactory. The undetected error rate is also $2.38 \times 10^{-16}$, which is practically satisfactory.

In addition, as described in connection with the prior art example, it often happens that the symbol error rate is 0.01 or more during special replay. However, with regard to the result of calculation, the error rate is of the practically satisfactory level when the above code configuration is used, so that satisfactory special pictures can be obtained.

Embodiment 2

In Embodiment 2, description is made of the operation of a system of 4500 rpm shown in FIG. 5C. It is assumed that the recording format is the same as in Embodiment 1. The operation during normal replay, still replay, and slow replay is identical to that in Embodiment 1, so its description is omitted, and the description is made only in connection with the fast replay.

Figure 14:
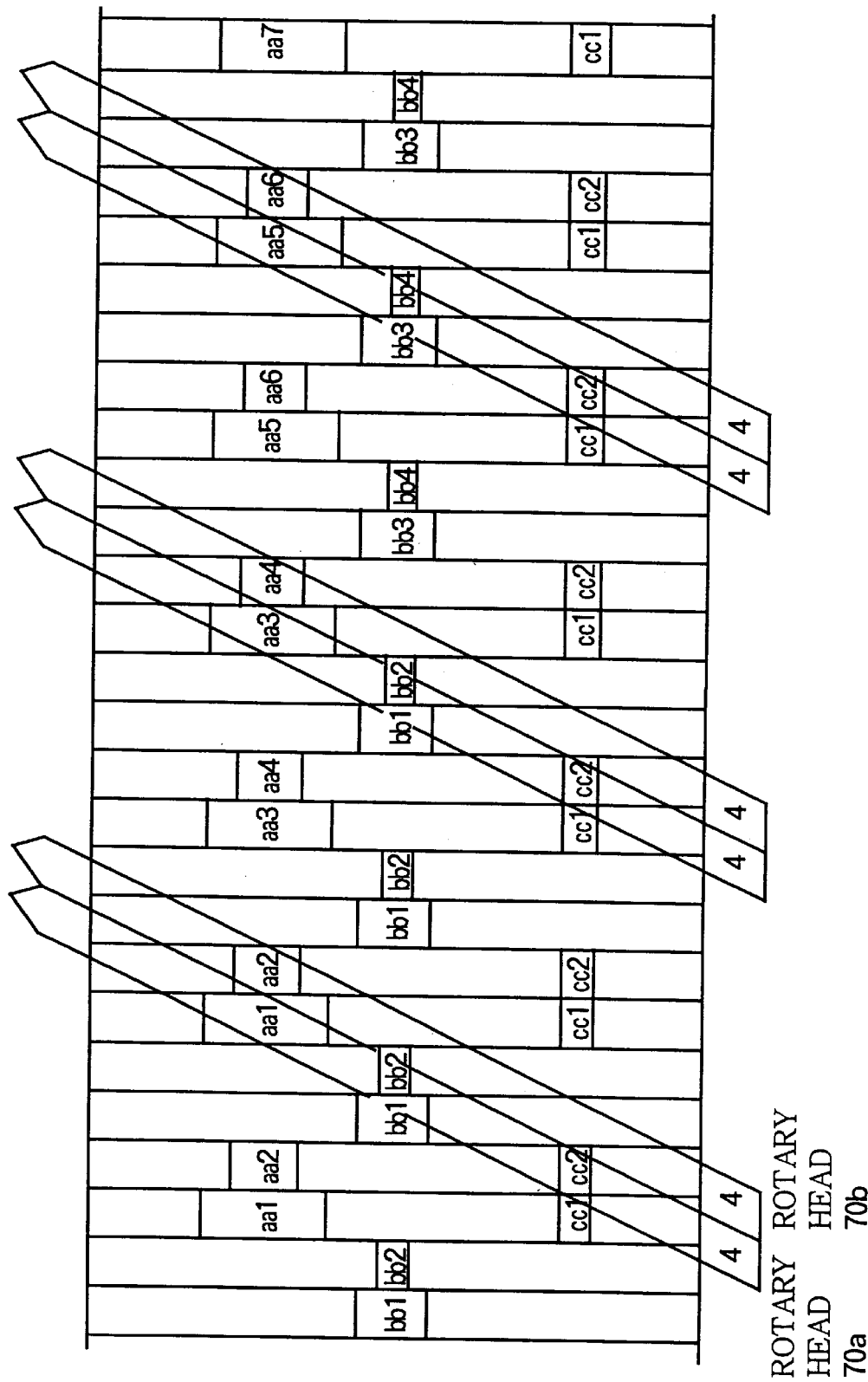
FIG. 14 is a diagram showing the head scanning trace during four-time speed replay in Embodiment 2 of the invention.

FIG. 14 shows the scanning traces of the rotary head at the time of four-time speed replay in Embodiment 2. In the drawing, the scanning traces of the rotary heads 70a and 70b are shown by arrows. The method of tracking control during fast replay in Embodiment 2 is similar to that in Embodiment 1, and the tracking of the rotary head 70a is controlled so that the replay output is maximum around the areas where the special replay data is recorded.

The operation of the replay system of Embodiment 2 will next be described referring also to FIG. 10. When the fast replay mode signal is input, the selector 88 selects the output of the memory 88. The replay data obtained intermittently via the rotary heads 70a and 70b is amplified at the head amplifier 72, and converted into replay digital data at the signal detector 74, and digital decoded at the digital decoder 76. The data for which the sync data is correctly detected at the signal detector 74 is subjected to error correction using the C1 check code at the first error correction decoder 78. The C1-decoded data is input to the third error correction decoder 84. In the system of 4500 rpm shown in FIG. 5C, the same number of replay signal systems (from the head amplifier 72 to the first error correction decoder 78) as the number of the channels (i.e., two) are provided, although not shown as such, as it does not relate to the essential feature of Embodiment 2.

With regard to the data input to the third error correction decoder 84, the data from the special replay data recording areas is detected, and one error correction block shown in FIG. 3 is formed. In a system of 4500 rpm, the number of sync blocks replayed from one track during four-time speed replay is 31 as shown in FIG. 6. It is therefore not possible to configure one error correction block from the data replayed by the rotary head 70a. That is, data necessary to form an intra-picture of one frame is not replayed.

Figure 15A:
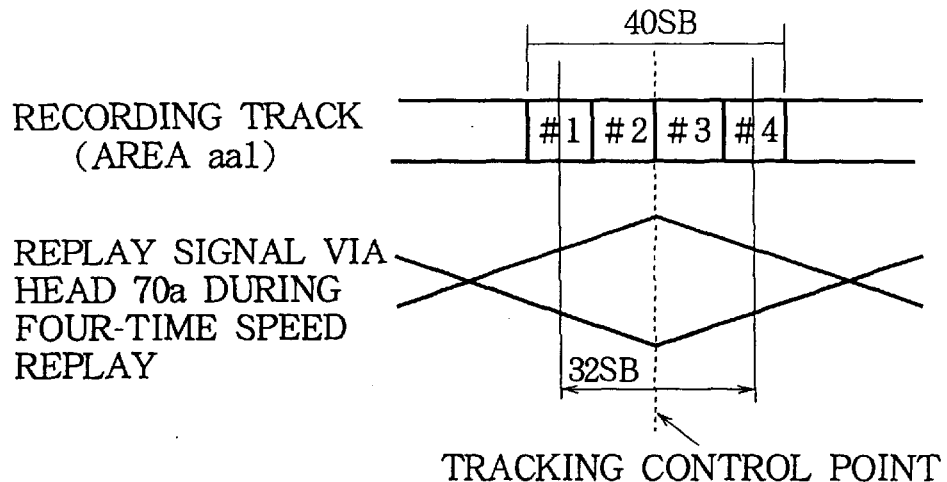
FIG. 15A and FIG. 15B respectively show the replay signals from the respective rotary heads, and the tracking control points for explaining the tracking control operation in Embodiment 2.
Figure 15B:
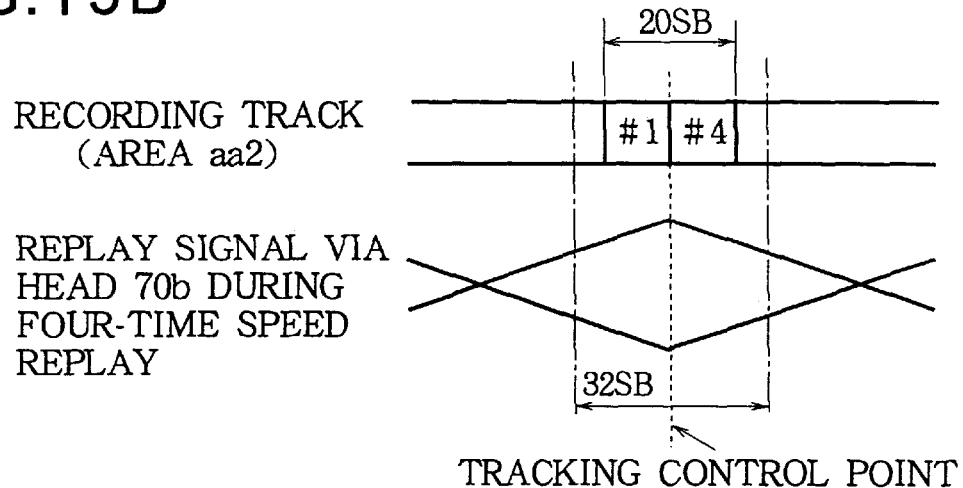
Figure 15C:
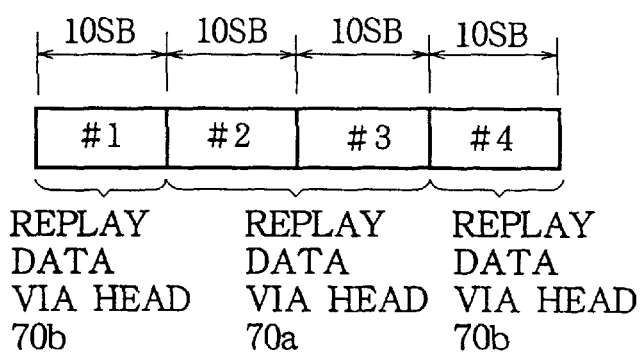
FIG. 15C shows the synthesized replay data.

FIG. 15A to FIG. 15C are for explaining the tracking control operation in Embodiment 2. FIG. 15A and FIG. 15B show the replay signal replayed by the respective rotary heads, and the tracking control points. FIG. 15C shows the synthesized replay data. In the drawing, in the parts designated with identical reference marks (the parts designated by "#1" and "#4"), identical data is recorded.

In the system of 4500 rpm, auxiliary data replayed by the head 70b is used to form data of one error correction block. That is, during four-time speed replay, a first error correction block is formed by combining the data #1 replayed by the rotary head 70b and the data #2 replayed by the rotary head 70a, and a second error correction block is formed by combining the data #3 replayed by the rotary head 70a and the data #4 replayed by the rotary head 70b. FIG. 15C shows two error correction blocks configured in the above described manner. The separation of the data from the special replay data recording areas is accomplished by detecting the positions of the special replay data recording areas by referring to the sync block numbers recorded in the ID signals in the sync blocks, and judging whether the data is from the bit stream of the ATV signal or the special replay data by referring to the headers in the sync blocks.

When the data of one error correction block is configured, the third error correction decoder 84 conducts the decoding using the C4 code according t the algorithm shown in FIG. 11. The operation of the C4 decoding is similar to that in Embodiment 1, so that its detailed description is omitted. The C4-decoded special replay data is input to the fourth memory 86. The ATV bit stream having been restored into the packet information of 188 bytes in the fourth memory 86 is output via the selector 88 and the output terminal 90.

In Embodiment 2, description is made of the case of four-time speed replay. However, fast replay can be similarly effected at the double speed, −2-time speed, 8-time speed, −6-time speed, 16-time speed, or −14-time, as in Embodiment 1. Moreover, by using the special replay auxiliary data reproduced by the rotary head 70b, one error correction block can be formed in the system of 4500 rpm, like Embodiment 1. That is, data necessary for forming an intra picture of one frame can be reproduced. With regard to 16-time speed and −14-time speed replay, one error correction block is formed by two scannings of the rotary heads 70a and 70b.

For special replay (slow replay, fast replay), the rotary head crosses the recording tracks obliquely, so that the replay signal is obtained intermittently from the respective tracks. Accordingly, error correction blocks (video data) shown in FIG. 102A is not formed in this embodiment, like the prior art example. However, one error correction block shown in FIG. 3 can be formed by the use of the special replay auxiliary data reproduced by the rotary head 70b in the system of 4500 rpm described in connection with Embodiment 2. It is therefore possible to apply error correction using C4 check code on the data whose errors were not corrected by the error correction using the C1 check code. The error detection probability for the symbol error rate of 0.01 is about $1.54 \times 10^{-13}$, and the error detection probability is improved by $10^{10}$ times, and practically satisfactory results are obtained. Undetected error rate will be about $2.38 \times 109^{-16}$, which is practically satisfactory.

As described in connection with the prior art example, the symbol error rate is often more than 0.01 during special replay, but as far as the result of calculation concerning the error rate, practically satisfactory levels are attained with the above code configuration, and special replay pictures with good qualities are obtained. That is, the recording formats described in connection with Embodiment 1 is also suitable for all the rotary head arrangements shown in FIG. 5A to FIG. 5C.

In Embodiment 1 and Embodiment 2, sync block special replay data recording areas are disposed on the recording tracks such that an error correction block is formed by one scanning of the rotary head 70a at the low-speed special replay speed (still replay, slow replay, and double, four-time and eight-time speed replay). Accordingly, the storage capacity of the memory in the third error correction decoder 84 for forming one error correction block can be reduced. Moreover, the timings for control over writing of replay data into the memory and reading from the memory, and starting the error correction are synchronized with the rotation of the rotary head 70a, and the control over the memory and the error correction decoder is simplified, and the size of the circuit can be reduced.

In Embodiment 1 and Embodiment 2, where special replay is conducted at predetermined replay speeds, the special replay data recording areas for the respective replay speeds are disposed collectively at predetermined positions on the tracks, as shown in FIG. 7A and FIG. 7B or FIG. 9. This is for the following reason. During fast replay, the tracking control is effected at the central parts of the special replay data recording area, as described above, so that if they were disposed over a plurality of tracks, it could happen that the predetermined areas cannot be replayed because of the non-linearity inherent to a VTR.

If the special replay data for the respective replay speed is collectively recorded, the special replay data can be replayed without being influenced by the non-linearity of the tracks so much, and a special replay picture with a good quality can be obtained.

In Embodiment 1 and Embodiment 2, the minimum distance of the error correction code appended at the error correction appending means is identical to the minimum distance of the error correction code appended to the digital audio signal. With this feature, by slightly modifying the error correction circuit for the digital video signal or the digital audio signal, error correction decoding can be achieved without adding a separate error correction circuit, and the size of the circuit can be reduced.

In particular, in Embodiment 1, the minimum distance of the error correction code appended at the error correction appending means is identical to the minimum distance of the C3 code for the audio signal. It is sufficient, in connection with the decoding, to add a circuit for setting the value of the counter counting the code length of the syndrome forming circuit, and a circuit for setting the value of the counter counting the number of times of Chien search. In Embodiment 1, the minimum distance of the error correction code appended at the error correction appending means is identical to the minimum distance of the C3 code for the audio signal. The invention is not limited to this, and it may be identical to the minimum distance of the C1 code (the C1 decoder decodes only the special replay data during special replay, so that it has time to spare), or of the C2 code (C2 decoding is not conducted during special decoding), and yet similar effects are obtained.

In Embodiment 1 and Embodiment 2, the error correction blocks are so formed that the size of one error correction block is identical for the respective replay speeds, so that the decoding of the special replay data can be decoded at an identical error correction circuit. As a result, the size of the circuit can be reduced.

Where the block size of the error correction block is changed for the respective replay speeds, it is so arranged that the minimum distance of the error correction code within one error correction block is made to be identical for the respective replay speed. With such an arrangement, the error correction decoder can be used in common, by simply adding a selector circuit for setting an initial value of the code length setting counter at the time of syndrome formation, and the initial values of the registers and the initial value of the code length setting counter at the time of Chien search. The effects similar to those described (such as the reduction in the circuit size) can also be obtained.

In Embodiment 1 and Embodiment 2, the predetermined replay speeds are those corresponding to positive and negative tape transport speeds having the same absolute value. In this connection, it should be noted that +n-time replay speed and −(n−2)-time replay speed (n being an arbitrary number larger than 1) correspond to positive and negative tape transport speeds having the same absolute value. Because the predetermined replay speeds are set as described above, it is possible to use the special replay data recording area for the positive and negative symmetrical speeds for which the data amount (the number of sync blocks) reproduced from one track at the replay speeds corresponding to positive and negative tape transport speeds having the same absolute value, and the maximum use can be made of the special replay data recording areas to form one error correction block. In particular, in the case of a high-speed fast replay, the number of sync blocks replayed from one track is very small, as shown in FIG. 6. Accordingly, the special replay speeds are set to be values corresponding to positive and negative tape transport speeds having the same absolute value, and the special replay data recording areas are so disposed on the recording tracks that one block is formed by two scannings of the rotary head, so that it is not necessary to repeat special replay data more than necessary. Moreover, the size of one error correction block for the respective replay speeds can be made to be identical, and the circuit size can be reduced.

In connection with Embodiment 1 and Embodiment 2, description is made with respect to the cases where the replay speed is 2-time, 4-time, 8-time, 16-time, −2-time, −6-time, and −14-time speed. In the digital VTR having a recording format shown in FIG. 7A and FIG. 7B, satisfactory special replay can be achieved at any arbitrary speed of from −14-time to 14-time speed, and the effects similar to those described above (including the reduction of the circuit size) can also be achieved.

In Embodiment 1 and Embodiment 2, description is made of the digital VTR having the recording format shown in FIG. 9. However, the invention is not limited to this. Similar effects are obtained with any other recording format as long as it can be used for recording a special replay signal with new error correction code appended to it. The error correction code configuration is not limited to that shown in FIG. 3.

Embodiment 3

Figure 16:
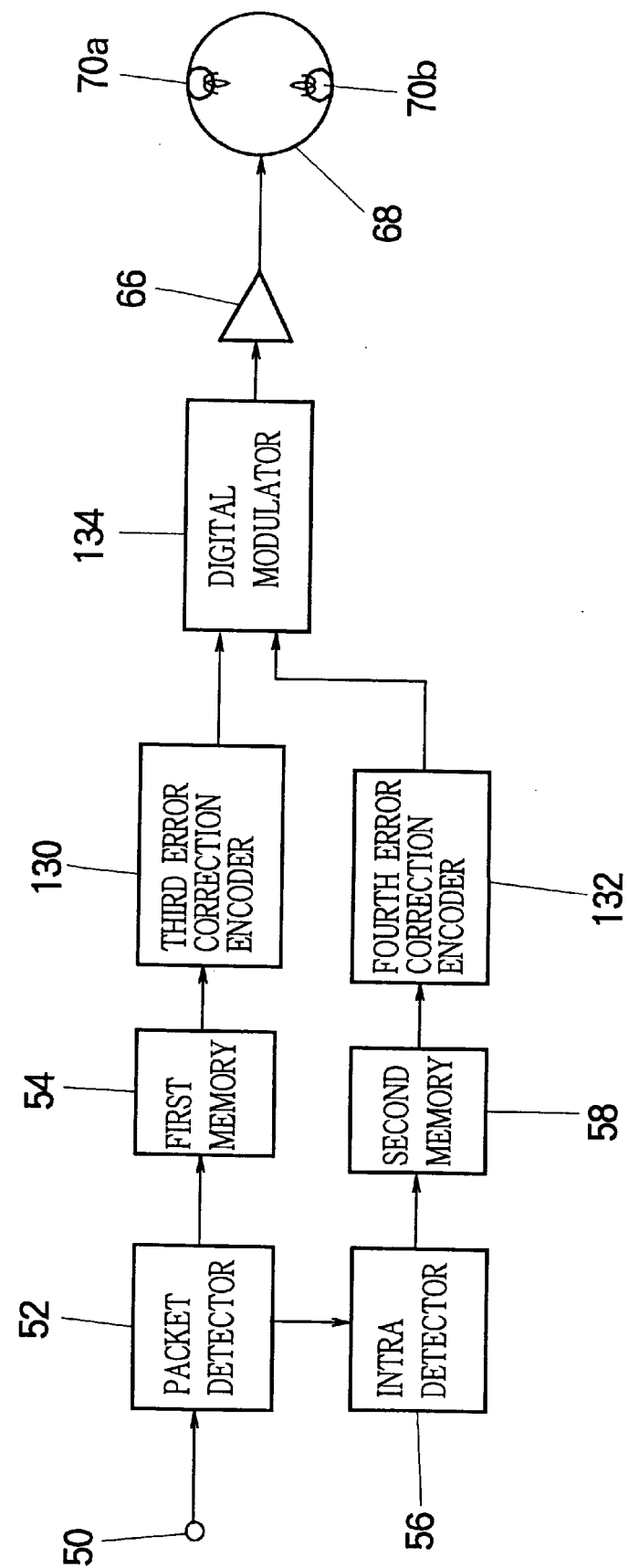
FIG. 16 is a block diagram showing a recording system of a digital VTR of Embodiment 3 of the invention.

FIG. 16 is a block diagram showing an example of a recording system of a digital VTR of Embodiment 3 of the invention. In FIG. 16, reference numeral 50 denotes an input terminal for receiving digital video and audio signals in the form of a bit stream, 52 denotes a packet detector for detecting packets of video and audio signals from the bit stream, 54 denotes a first memory for storing the bit stream, 130 denotes a third error correction encoder for forming video areas and conducting error correction encoding, 56 denotes an intra detector for detecting intra encoded data from the bit stream, 58 denotes a second memory for storing the intra encoded data, 132 denotes a fourth error correcting encoder for forming audio areas and conducting error correction encoding, 134 denotes a digital modulator for conversion into data suitable for recording on the magnetic tape, 66 denotes a recording amplifier, 68 denotes a rotary drum, and 70a and 70b denote magnetic heads.

Figure 17:
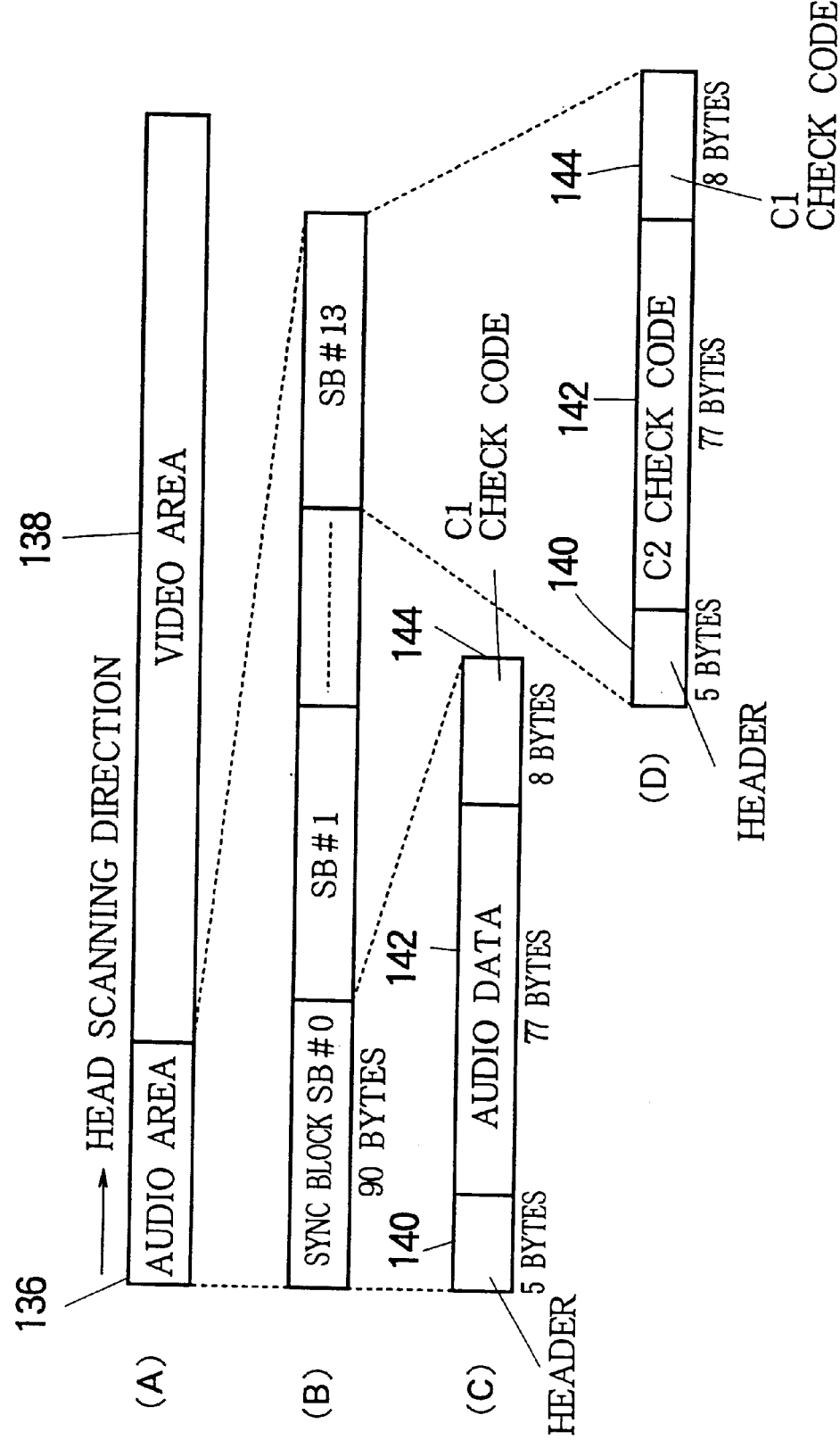
FIG. 17 shows the configuration of one track in a recording format in Embodiment 3.

FIG. 17 shows the recording format on the tracks in Embodiment 3. FIG. 17(A) shows the configuration of the entire track, FIG. 17(B) is an enlarged view of the audio area, FIG. 17(C) shows the configuration of a sync block (SB #0) in the data area, and FIG. 17(D) shows the configuration of another sync block (SB #13).

Figure 18:
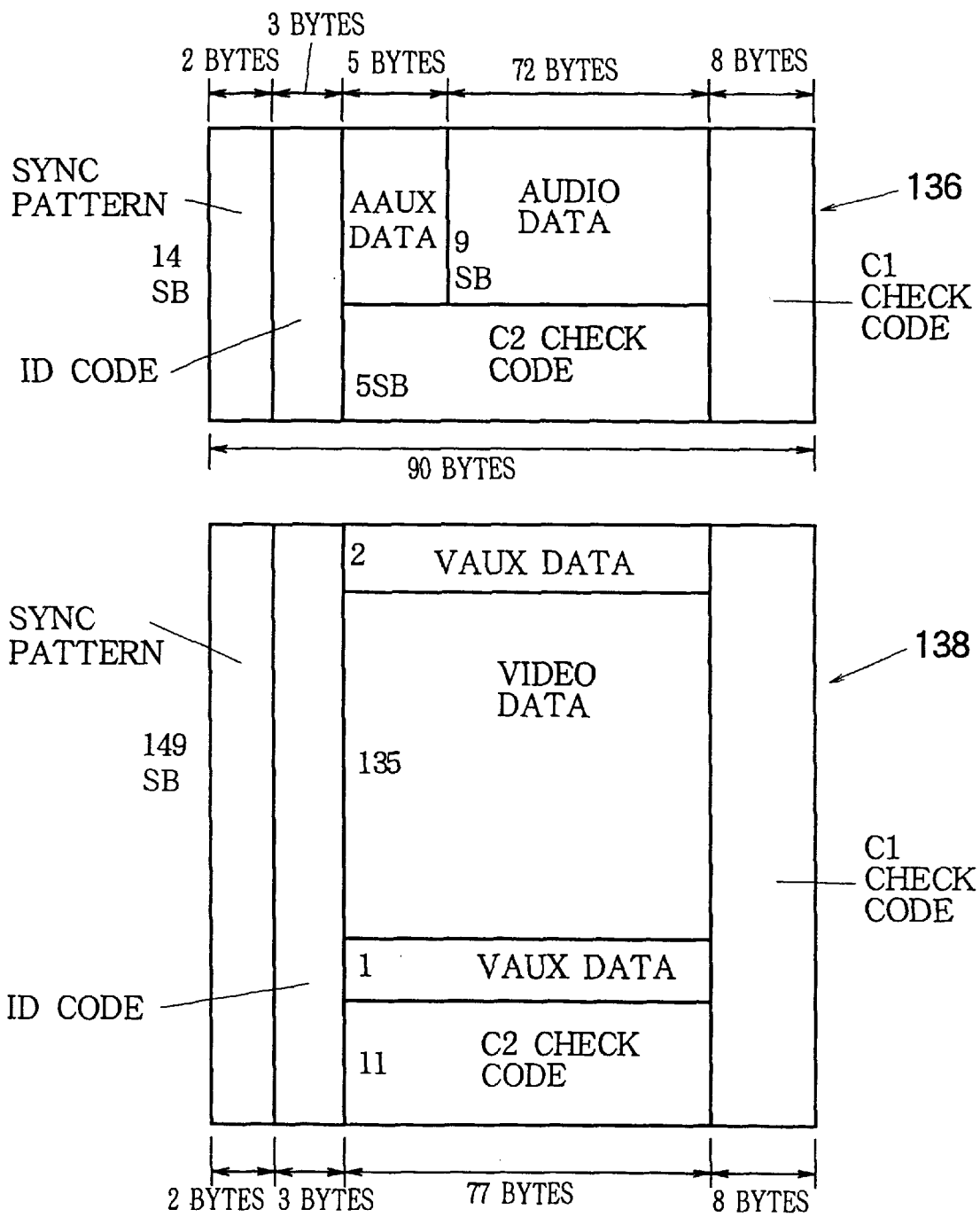
FIG. 18 shows the track configuration in Embodiment 3.

FIG. 18 shows the track configuration in Embodiment 3, and shows the data format of the audio area 136 and the video area 138.

The operation during recording will next be described with reference to FIG. 16 to FIG. 18, as well as FIG. 2A and FIG. 2B.

Referring in particular to FIG. 16, the bit stream received at the input terminal 50 contains digital video and audio signals, and digital data concerning the video and audio signals. It is transmitted, being partitioned into transport packets as shown in FIG. 2A. The packet is formed of a header 92 of four bytes and data section 94 of 184 bytes.

In Embodiment 3, the bit stream is detected transport packet by transport packet and the packets of intra encoded data are recorded in the audio areas. Transport packets are therefore detected at the packet detector 52 from the bit stream received at the input terminal 50, and input to the first memory 54 and the intra detector 56.

The data of the bit stream is stored in the first memory 54, packet by packet, and is read so as to form the data of the recording data blocks shown in FIG. 2B. FIG. 2B shows the example in which five sync blocks form two transport packets, where the data length of the one sync block is 77 bytes, as described above. In the drawing, H1 denotes a first header, H2 denotes a second header. Data recorded in the first header H1 include identification data indicating the sync block number of each sync block within the five sync blocks (which of the five sync blocks each sync block is), and data recorded in the second header H2 include identification data for indicating whether the data is video data or audio data.

The data of the transport packet read from the first memory 54 is supplied to the third error correction encoder 130, where first and second headers H1 and H2 are appended to form a configuration as shown in FIG. 2B, and then error correction encoding for the video area 138 is effected, and the data is then supplied to the digital modulator 134.

The bit stream output from the packet detector 52 is also supplied to the intra detector 56, where judgement is made whether the data in the transport packet is intra-encoded data or not. As described in connection with the prior art, in the MPEG2 bit stream, if the data is intra-frame or intra-field encoded (intra-encoded), intra transport packets are consecutively transmitted. By detecting such transport packets consecutively transmitted, the intra transport packets are extracted, and the extracted transport packets are written in the second memory 58.

When the intra-encoded transport packet is read from the second memory 58 in the form shown in FIG. 2B, and input to the fourth error correction encoder 132, where headers H1 and H2 are appended, and error correction encoding for the audio area 136 is effected, and the data is then supplied to the digital modulator 134.

The data configuration in the audio area 136 is next described.

Referring to FIG. 17(A) to FIG. 17(D), one track consists at least of a video area 138 and an audio area 136. The audio area 136 is formed of data #0 to #13 of 14 sync blocks (SBs), and each sync block is 90 bytes long (FIG. 17(B)).

As shown in FIG. 17(C), one sync block is formed of a header section 140 of 5 bytes, data (C2 check code) section 142 of 77 bytes, and C1 check code section of 8 bytes. The header section 140 is formed of a sync pattern of 2 bytes, and identification (ID) code of 3 bytes. As shown in FIG. 18, nine sync blocks are allotted to the data region, and five sync blocks are allotted to the C2 check code region, and the data section of 77 bytes is divided into an auxiliary data (AAUX data) and the audio data.

The recording data packets formed as shown in FIG. 2B are disposed as the AAUX data and audio data in FIG. 18, i.e., data section 142 (FIG. 17(d)). Each recording data packet is formed of five sync blocks. The data section 142 in the audio area 136 is formed of nine sync blocks, so that one recording data packet is recorded over a plurality of tracks.

As in the prior art example, in the digital VTR recording one frame of video over ten tracks, the rate of data recorded in the audio area is about 1.8 Mbps, and if the ATV signal rate is about 18 Mbps, the number of bits per intra-frame is predicted to be about 1.5 Mbps, so that about one picture can be recorded per second.

Figure 93:
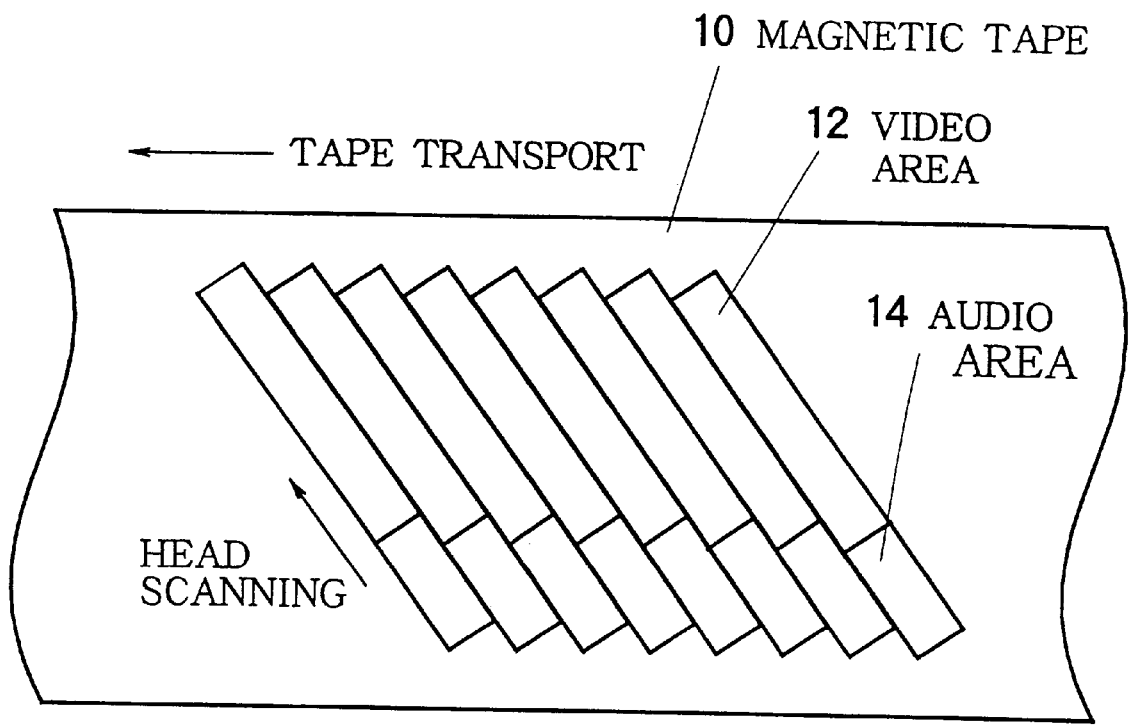
FIG. 93 shows a track pattern in a conventional common consumer digital VTR.
Figure 94A:
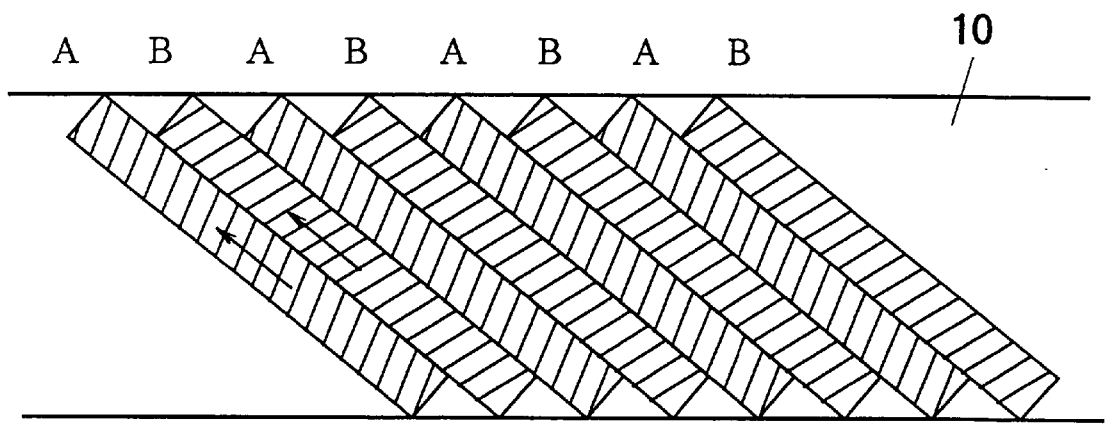
FIG. 94A shows rotary head scanning traces during normal replay in a conventional digital VTR.
Figure 94B:
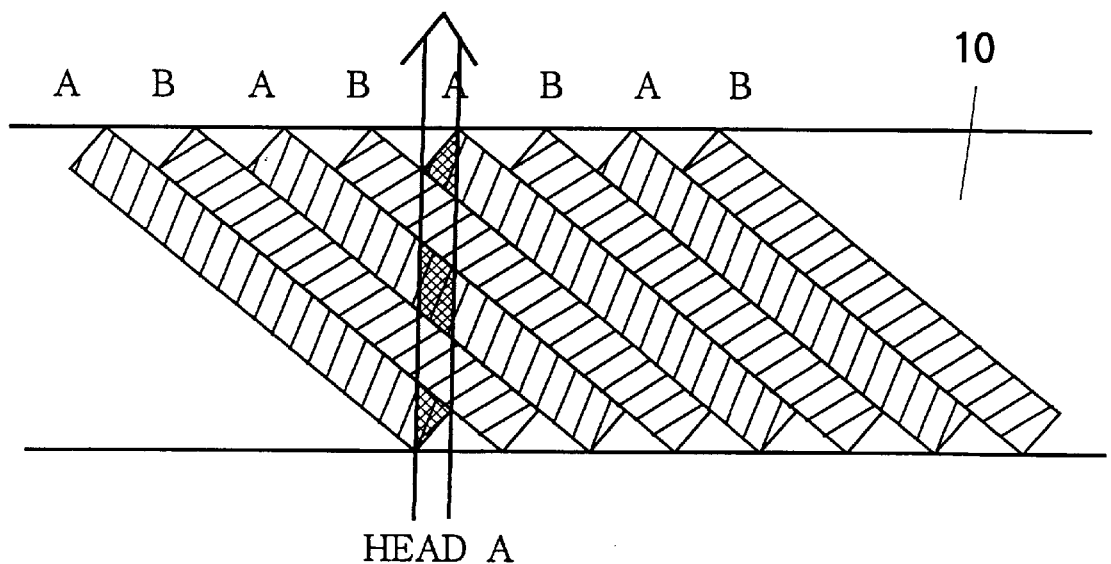
FIG. 94B shows a rotary head scanning trace during fast replay.
Figure 95:
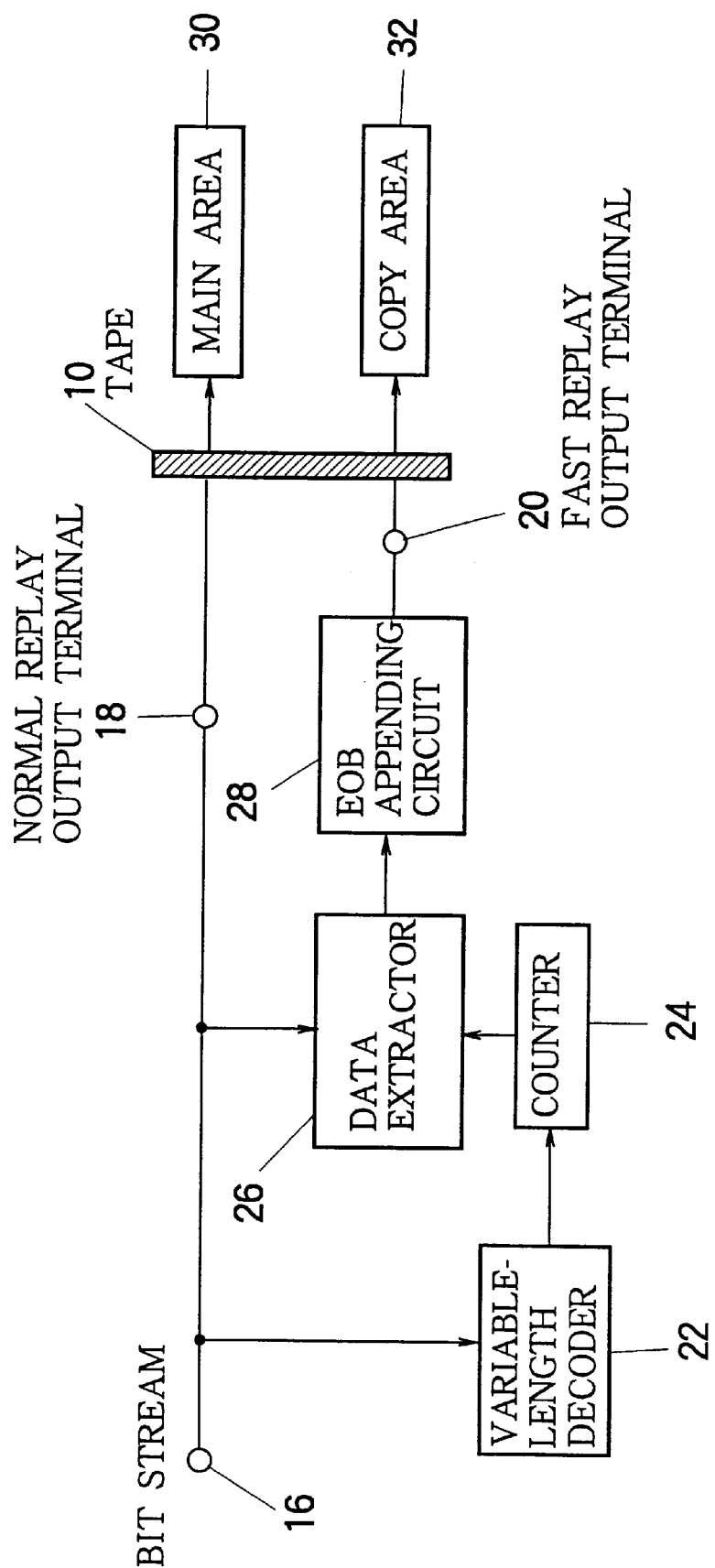
FIG. 95 is a block diagram showing an example of recording system in a conventional digital VTR.
Figure 96A:
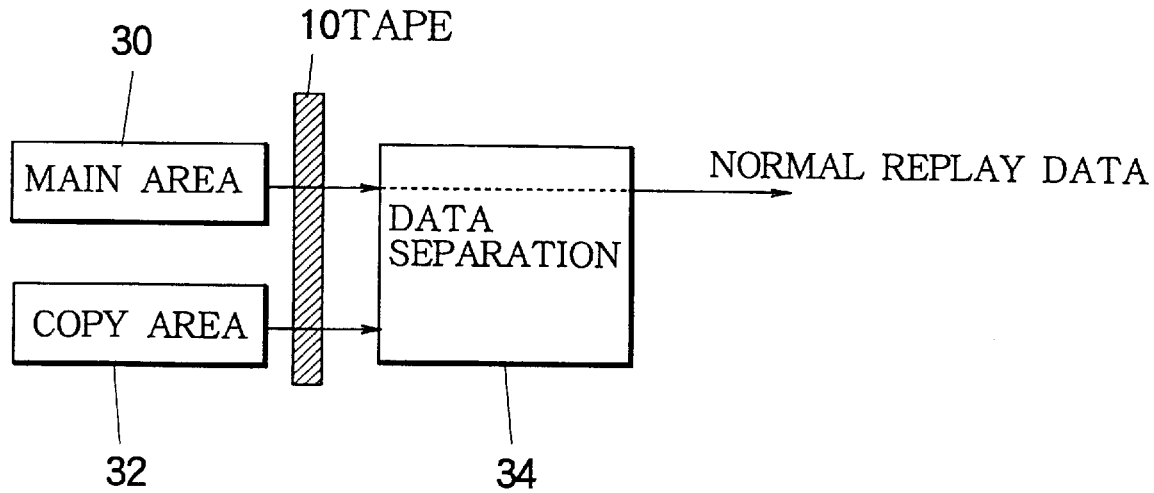
FIG. 96A shows normal replay in an example of replay system in a conventional digital VTR.
Figure 96B:
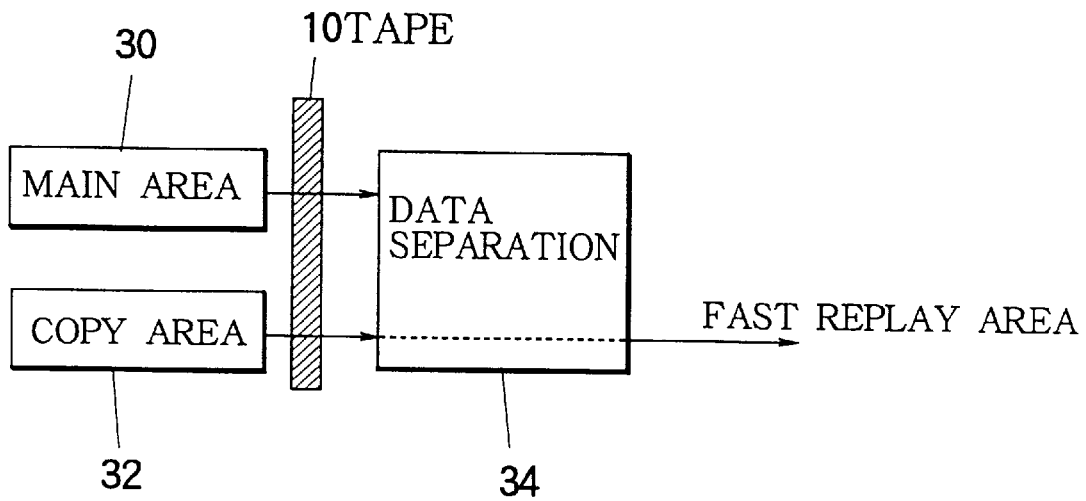
FIG. 96B shows fast replay in the same example of replay system.
Figure 97A:
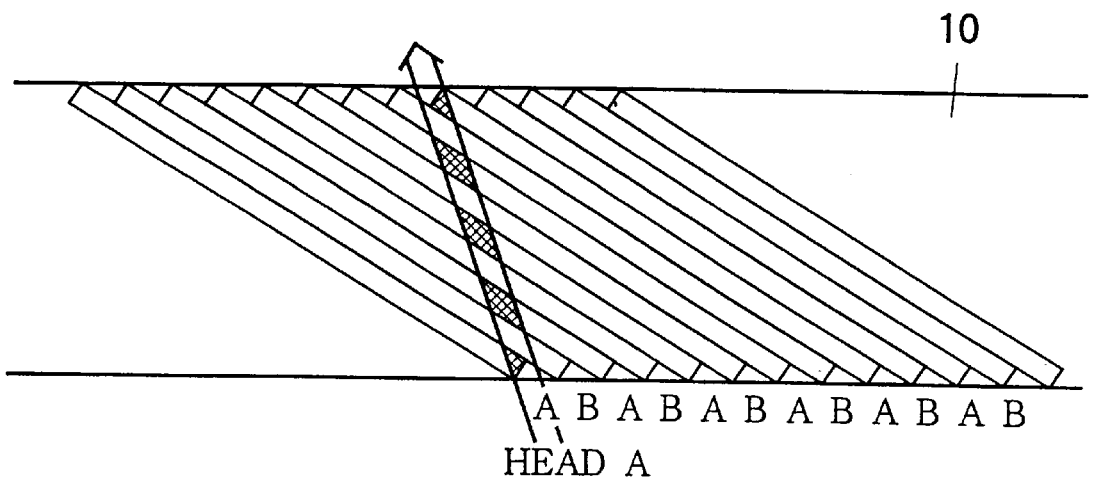
FIG. 97A a head scanning trace in a common fast replay.
Figure 97B:
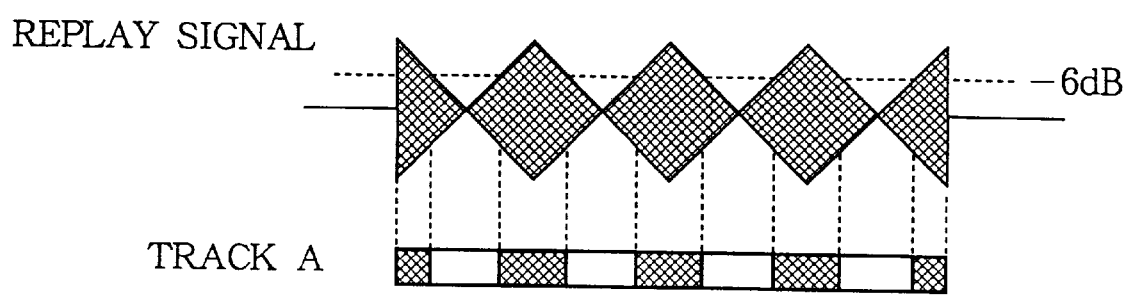
FIG. 97B shows track regions from which reproduction is possible.
Figure 99:
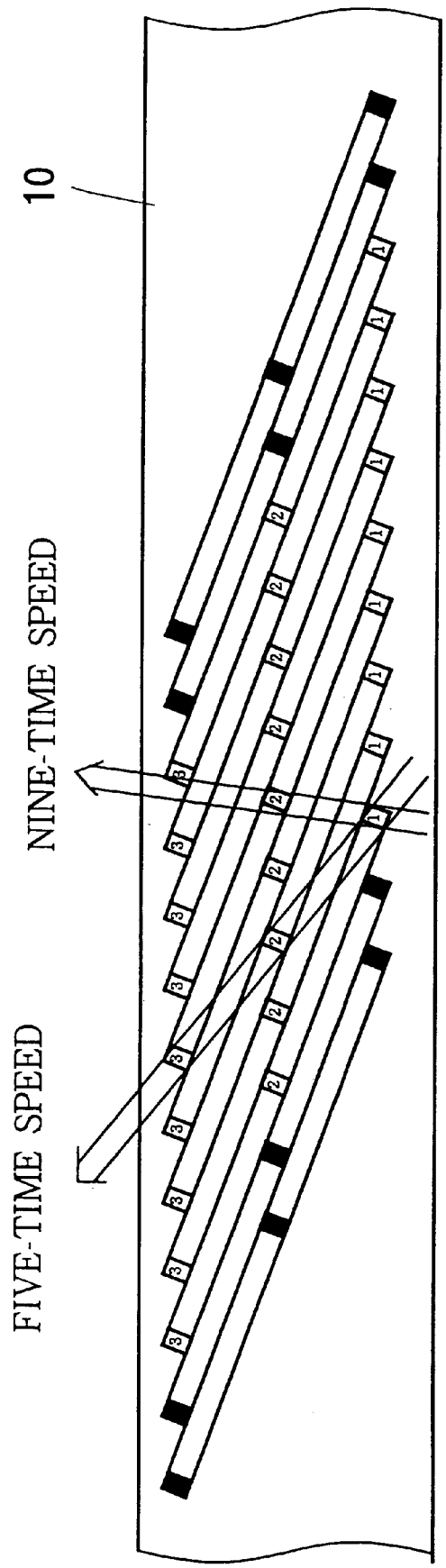
FIG. 99 shows an example of rotary head scanning traces with different tape speeds.
Figure 100A:
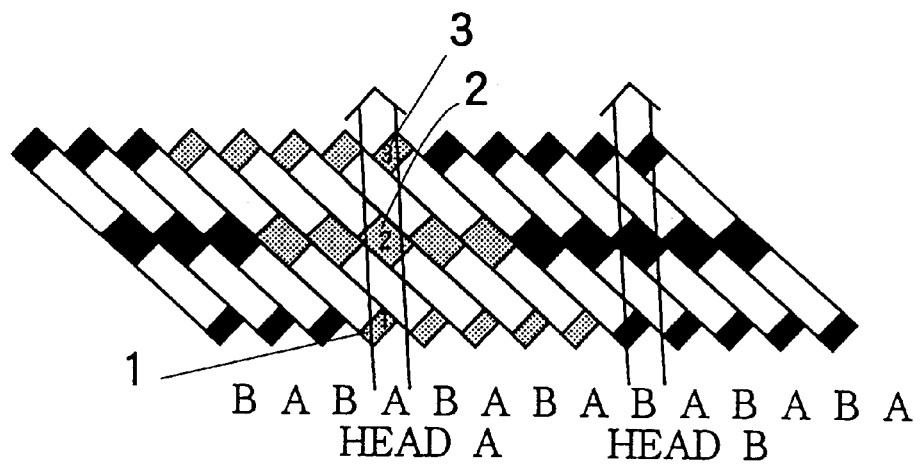
FIG. 100A and FIG. 100B respectively show rotary head scanning traces during five-time speed replay.
Figure 100B:
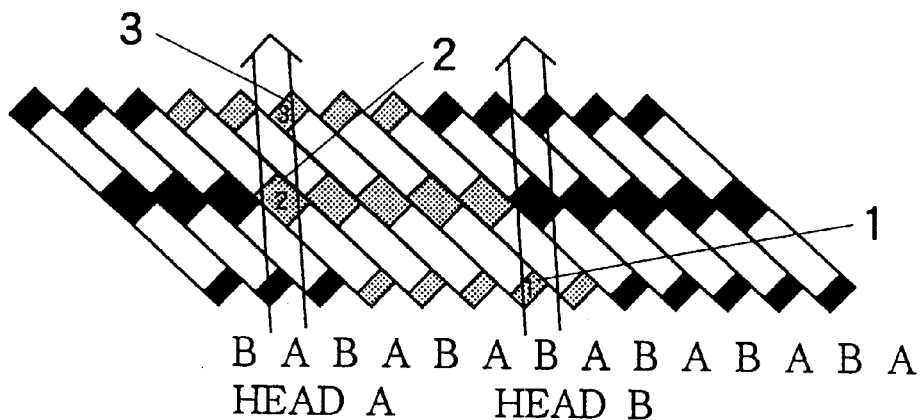
Figure 101:
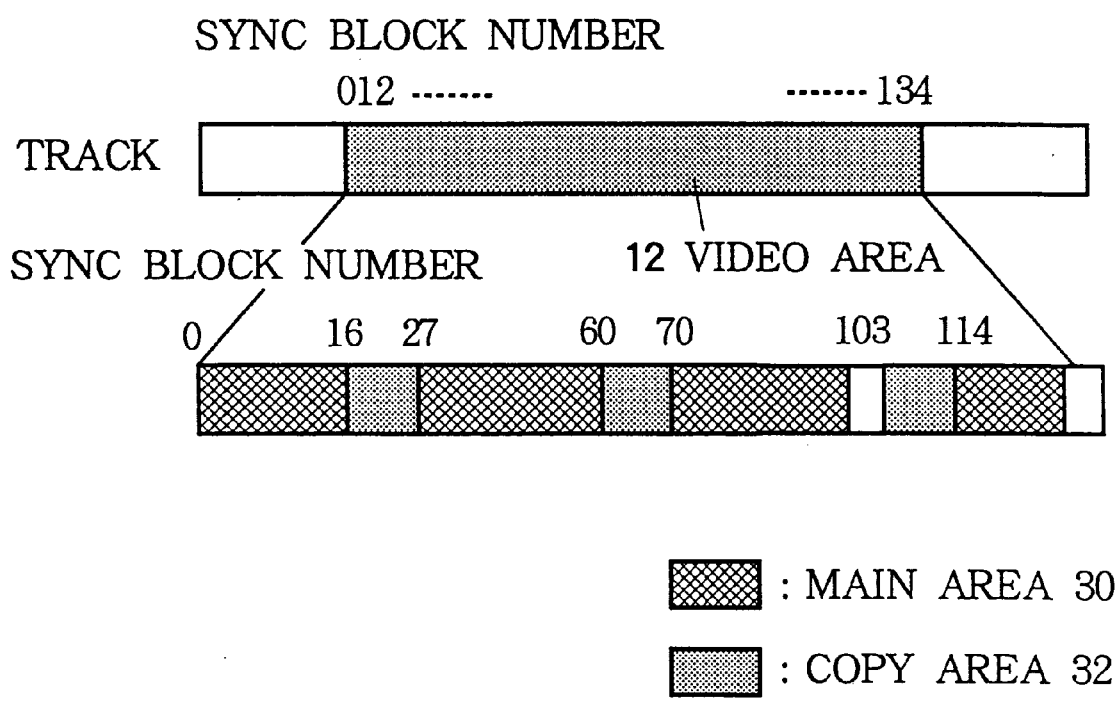
FIG. 101 shows a recording format on a track in a conventional digital VTR.

The output of the fourth error correction encoder 132 and the output of the third error correction encoder 130 are input to the digital modulator 134, where digital modulation such as interleaved NRZI in the data format of FIG. 17(A) to FIG. 17(D) and FIG. 18 is conducted. The modulated data is passed via the recording amplifier 66, and recorded on oblique tracks, shown in FIG. 93, formed on the magnetic tape by means of the rotary heads 70a and 70b.

Figure 19:
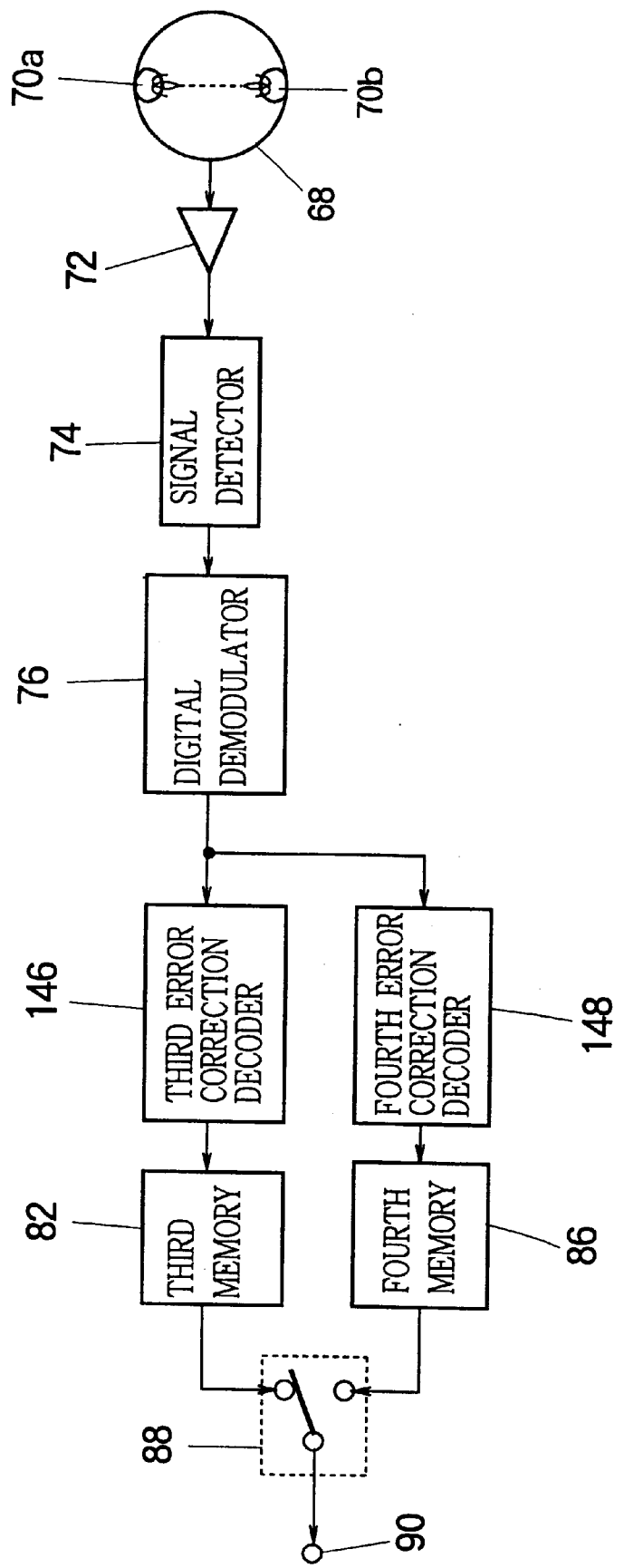
FIG. 19 is a block diagram of a replay system of a digital VTR in Embodiment 3.

FIG. 19 is a block diagram showing a replay system of the digital VTR of Embodiment 3. In the drawing, the rotary drum 68, the rotary heads 70a and 70b are identical to those in FIG. 1. Reference numeral 72 denotes a head amplifier, 74 denotes a signal detector for detection digital data from the replay signal, 76 denotes a digital demodulator for performing digital demodulation on the replay digital data, 146 denotes a third error correction decoder for correcting errors in the replay signal, 148 denotes a fourth error correction decoder for correcting errors in the replay signal, 82 denotes a third memory, 86 denotes a fourth memory, 88 denotes a selector and 90 denotes a data output terminal.

The operation of the replay system will next be described. Still replay is started either by selection of the still mode during normal replay, or by selection in the state of halting. First, the situations where the still mode is selected during normal replay is described.

During normal replay, the data replayed by the rotary heads 70*a* and 70*b* from the magnetic tape is amplified by the replay amplifier 72, and supplied to the signal detector 74 where signal detection is performed to produce the original digital data. At the digital demodulator 76, interleaved NRZI demodulation is effected, and the replay data from the video areas 138 in FIG. 17(A) is supplied to the third error correction decoder 146 and the replay data from the audio areas is supplied to the fourth error correction decoder 148. The third error correction decoder 146 and the fourth error correction decoder 148 respective correct errors during replay, and the error corrected data from the third error correction decoder 146 is written in the third memory 82 and the error corrected data from the fourth error correction decoder 148 is written in the fourth memory 86. The data selector 88 selectively outputs either the output of the third memory 82 or the output of the fourth memory 86, to the output terminal 90. During normal replay, the data selector 88 selects the output of the third memory 82, and the data identical to the bit stream input via the input terminal 50 is output via the output terminal 90.

When still mode is selected during normal replay, the replay data is stopped, and data is no longer input to the third and fourth memories 82 and 86. The input of the data selector 88 is then switched to select the output of the fourth memory 86. In this way, the still picture can be output via the output terminal 90. The data written in the third and fourth memories 82 and 86 include the data shown in FIG. 2B except the headers H1 and H2, i.e., the data of the transport packets shown in FIG. 2A. On the intra-encoded data in the audio area 136 is written in the fourth memory 86, so that it is sufficient to sequentially write the data transport packet by transport packet.

The situation where the still mode is selected from the state of halting will next be described. In the halting state, no correct data is stored in the third and fourth memories 82 and 86, and if the still mode is selected from this state, normal replay is conducted once, and one frame of data is stored in the fourth memory 86, and then the tape is stopped.

Next, the operation of the slow replay is described. During slow replay, the magnetic tape transport speed is lower than in the normal replay, so that the same track is repeatedly crossed and data is replayed from the same track for a certain number of times. By extracting the sync blocks which are correctly demodulated by the digital demodulator 76, and inputting them into the fourth error correction decoder 148, a still picture can be obtained. In particular, at the tape speed of one-half the normal or less, all the data recorded in the audio area 136 can be replayed.

Embodiment 4

Figure 20:
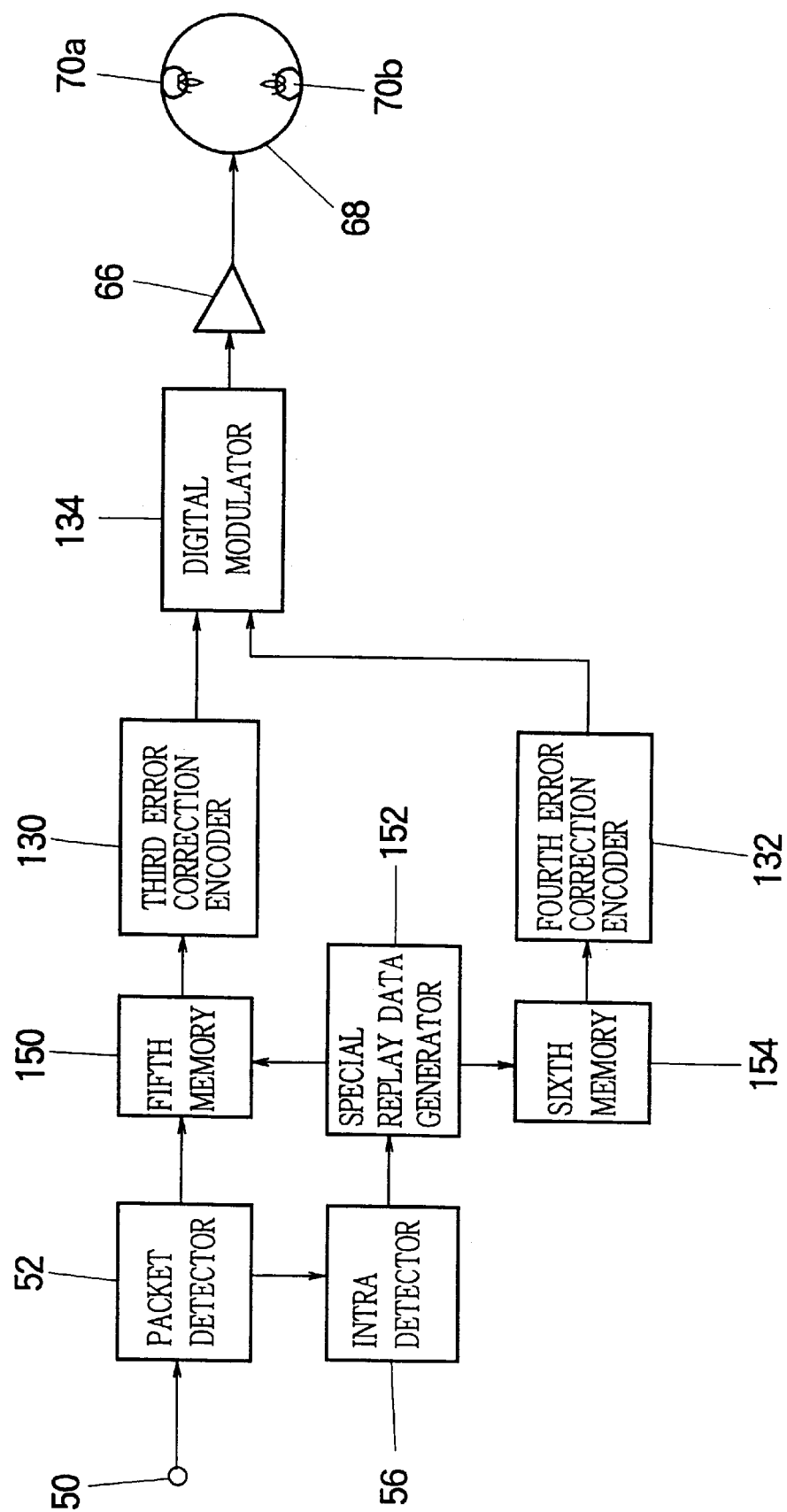
FIG. 20 is a block diagram showing a recording system in Embodiment 4 of the invention.

Description is next made of another embodiment with which deterioration in the picture quality is small even during special replay, such as fast replay. FIG. 20 is a block diagram showing a recording system of Embodiment 4. In Embodiment 4, the special replay data is recorded, being divided into the vide areas and audio areas.

In the drawings, reference numeral 150 denotes a fifth memory for receiving the bit stream via the input terminal 50, and special replay data, 152 denotes a special replay data generator receiving the intra-encoded transport packets and generating special replay data, and 154 denotes a sixth memory for receiving the special replay data.

The special replay data generator 152 extracts the low-frequency component from the packets of the intra-encoded data that have been detected, and supplies low-frequency component to the fifth memory 150, and the subsequent high-frequency component to the sixth memory 154. In the prior art example, the same data is recorded 17 times in the copy areas of about 5.8 Mbps, so that the data rate of the special replay data is 340 kbps. In this embodiment, the special replay data is also recorded in the audio area of about 1.8 Mbps, resulting in the copy areas of 7.6 Mbps. If the same data is recorded 17 times, the data rate of the special replay data will be about 450 kbps.

The special replay data generator 152 therefore encodes so that its output is about 450 kbps, and the data for 340 kbps is supplied to the fifth memory 150 and the data for the remaining 110 kbps is supplied to the sixth memory 154. To enable replay of the special replay data at a higher speed, it is necessary to record the data macro block by macro block.

Figures 21, 22:
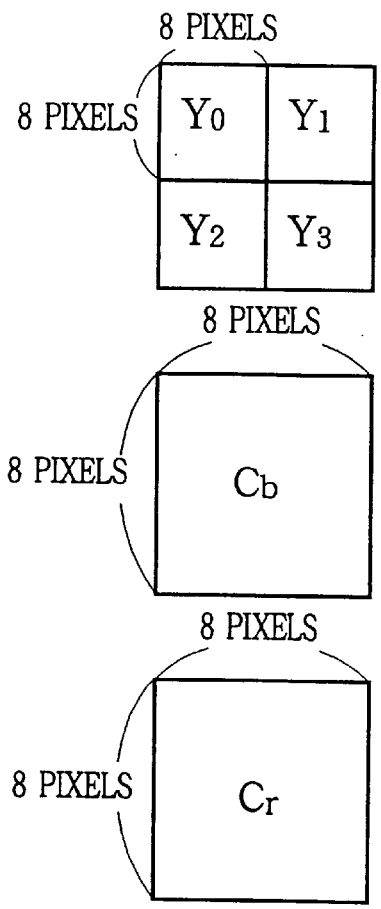
FIG. 21 shows digital video data of a macro block configuration.
FIG. 22 shows coefficients of frequency components.

FIG. 21 shows the digital video data of the macro block configuration in Embodiment 4. Each block is formed of 8 pixels by 8 pixels in horizontal and vertical directions on the screen, i.e., 64 pixels, and four blocks of a luminance signal (Y0, Y1, Y2, Y3), and two blocks of a chrominance signal (Cb, Cr) (the pixel density of the chrominance signal being ½ in each of the horizontal and vertical directions, compared with the pixel density of the luminance signal), i.e., six blocks in all form a video data of one macro block.

FIG. 22 shows coefficient of the frequency components in Embodiment 4. The pixel data of each block shown in FIG. 21 is subjected to orthogonal transform such as DCT, and decomposed into the frequency components as shown in FIG. 22. The respective frequency components are sequentially scanned, starting with a DC component, and in a so-called zig-zag scanning, to perform variable-length encoding. By controlling the variable-length encoding so that the data rate of the special replay data is about 450 kbps, the special replay data can be generated.

It is necessary that the special replay data is encoded macro block by macro block and partitioned into sync blocks. This is because in a fast replay in which tracks are crossed for the scanning for replay, data is replayed sync block by sync block.

Figure 23:
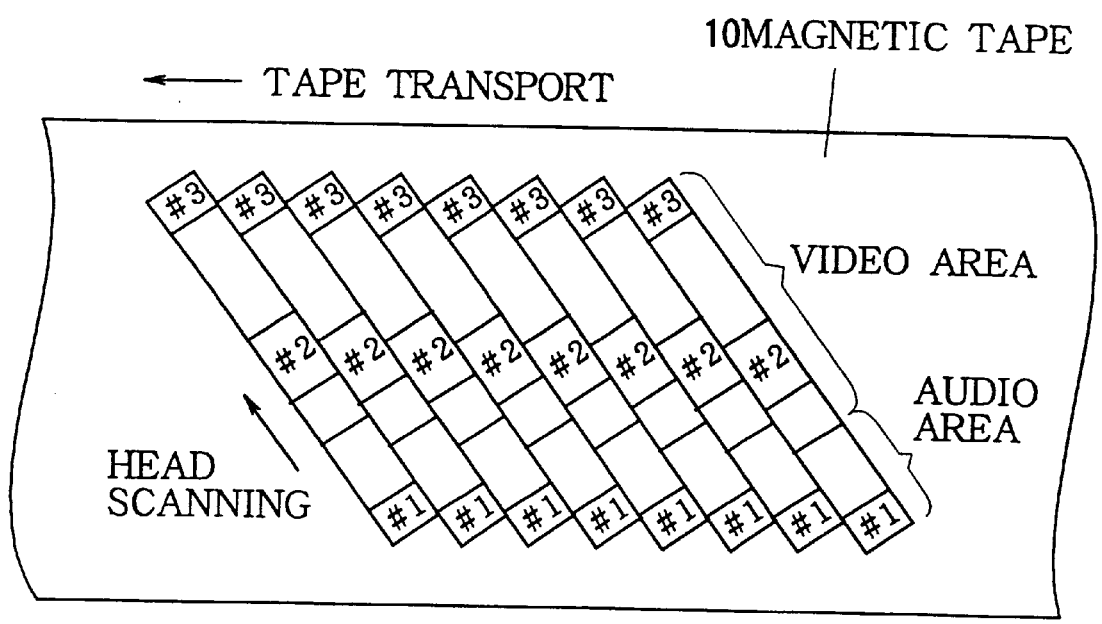
FIG. 23 shows dispositions in the special replay data recording areas in tracks in Embodiment 4.

FIG. 23 shows the disposition of the special replay data recording areas in the tracks in Embodiment 4. During replay, a process reverse to that for recording is followed to form special replay data. FIG. 23 shows the positions at which the special replay data is recorded in a predetermined track pattern. Since special replay data #1 is recorded in the audio areas, and special replay data #2 and #3 is recorded in the video areas, by replaying data from the audio area, special replay data of a higher data rate can be obtained. Even if the special replay data #2 and #3 only are reproduced, special replay data having the same quality as in the prior art can be obtained. This means even if the VTR cannot pick up data from the audio areas, special replay data can be replayed.

In Embodiment 3, description is made of the case where the data is intra-encoded frame by frame or field by field. The data may alternatively be encoded macro block by macro block. In this case, the recording packets shown in FIG. 2B can be reconstructed for each unit of intra-encoding, and the data may be recorded transport packet by transport packet.

In Embodiment 4, the special replay data is recorded in both of the vide areas and audio areas. The intra-encoded data may be recorded as is in both the areas. In this case, it is possible to record a great many still pictures for the still and slow replay. For instance, five pictures per second can be recorded with the special replay data rate of about 7.6 Mbps in Embodiment 4.

Embodiment 5

Figure 24A:
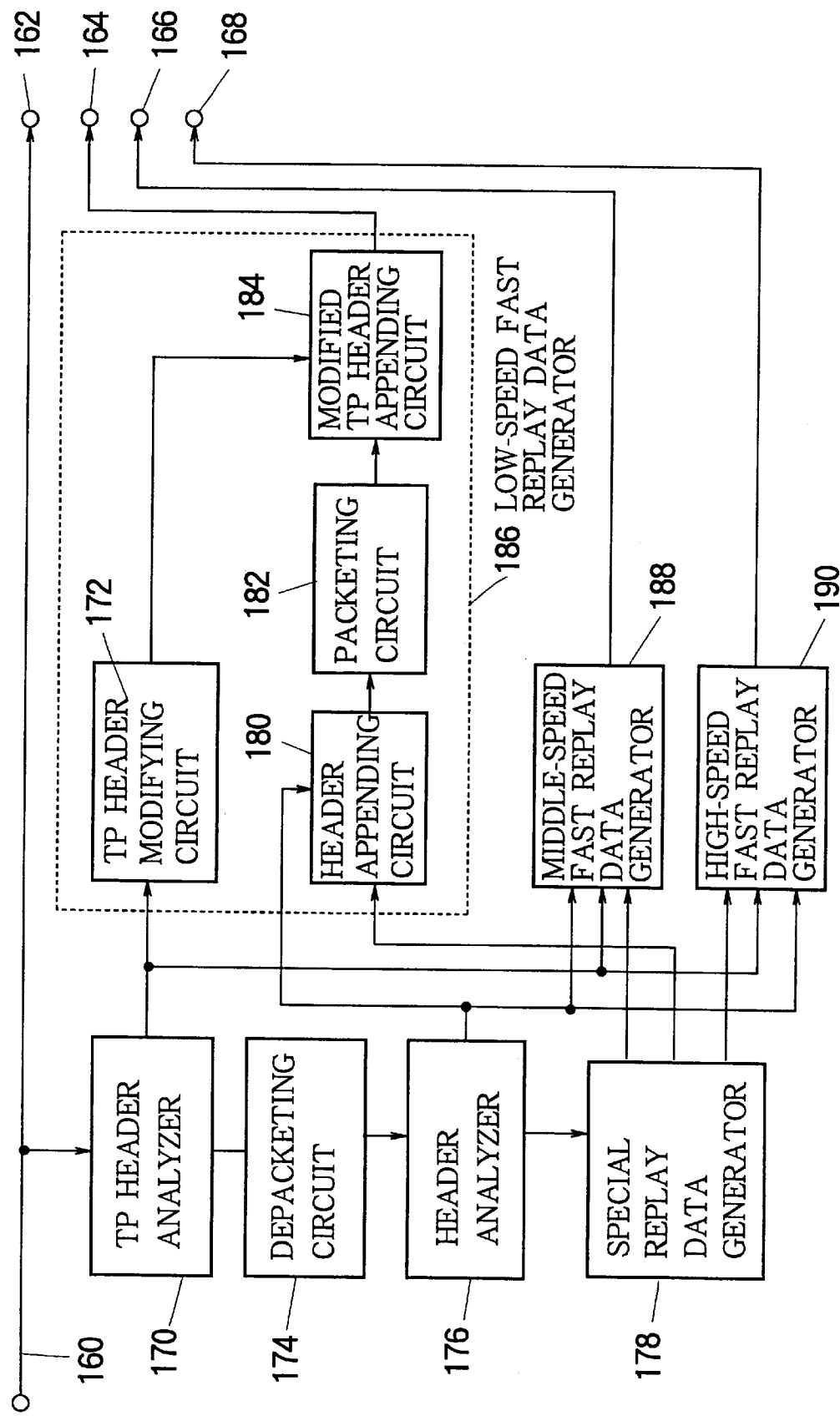
FIG. 24A is a block diagram showing a signal processing system in a recording system of a digital VTR in Embodiment 5 of the invention.

FIG. 24A is a block diagram showing a recording system of a digital VTR of Embodiment 5. In the drawing, reference numeral 160 denotes a bit stream input terminal, 162 denotes an output terminal for a bit stream for main areas, 164 denotes a low-speed fast replay replay data output terminal, 166 denotes a middle-speed fast replay data output terminal, and 168 denotes a high-speed fast replay data output terminal. Reference numeral 170 denotes a TP header analyzer for analyzing transport headers and outputting transport packets containing a transport header and intra data, 172 denotes a TP header modifying circuit for modifying the transport headers having been separated, and 174 denotes a depacketing circuit for converting transport packets into a bit stream, 176 denotes a header analyzer for analyzing headers such as sequence headers and picture headers contained in the bit stream and outputting the headers and intra data, and 178 denotes a special replay data generator for generating special replay data for the respective replay speeds from the intra bit stream and outputting it.

Reference numeral 180 denotes a header appending circuit for appending, to the low-speed fast replay data, those of the headers extracted at the header analyzer 176 which are necessary, 182 denotes a packeting circuit for packeting the data into the size of a transport packet, 184 denotes a modified TP header appending circuit for appending the modified transport headers, and 186 denotes a low-speed fast replay data generator formed of the TP header modifying circuit 172, the header appending circuit 180, the packeting circuit 182 and the modified TP header appending circuit 184. Reference numeral 188 denotes a middle-speed fast replay data generator 188. Reference numeral 190 denotes a high-speed fast replay data generator. The middle-speed fast replay data generator 188 and the high-speed fast replay data generator 190 have a configuration similar to that of the low-speed fast replay data generator 186.

The operation will next be described. The bit stream received at the input terminal 160 is output via the output terminal 162 for the bit stream for the main areas, as the data for the main areas. It is also supplied to the TP heater analyzer 170, where headers of the transport packets are detected from the input bit stream, and the headers are analyzed, and if data is contained in the succeeding bit stream, the transport packet is supplied to the depacketing circuit 174, and the transport header is supplied to the TP header modifying circuit 172.

The depacketing circuit 174 depackets the input transport packet, and supplies the resultant bit stream to the header analyzer 176, where headers such as sequence headers and picture headers in the bit stream are analyzed, any only the intra data is supplied to the special replay data generator 178 and the headers are output to the header appending circuit 180.

The special replay data generator 178 generates special replay data for low-speed fast replay, special replay data for middle-speed fast replay and special replay data for high-speed fast replay, from the input intra data. The subsequent data is identical for the respective replay speeds, so that description is made only in connection with the low-speed fast replay data. The low-speed fast replay data output from the special replay data generator 178 is input to the low-speed fast replay data generator 186. The low-speed fast replay data is input to the header appending circuit 180, where those of the input headers that are necessary are appended. The output of the header appending circuit 180 is supplied to the packeting circuit 182, where the low-speed fast replay data with the necessary headers having been appended is packeted, dividing the data into the size of the transport packet. The packeted low-speed fast replay data is supplied to the modified TP header appending circuit 184, where modified transport headers are appended, and then output. The modified transport headers are formed by modifying the transport headers separated at the TP header analyzer 170, into a suitable form. In this way, the low-speed fast replay data is converted into the form of transport packets, and is then output via the low-speed fast replay data output terminal 164.

The description has been made of the formation of transport packets from the low-speed fast replay data. Similar processings are applied to the middle-speed fast replay data and the high-speed fast replay data. The middle-speed fast replay data and the high-speed fast replay data output from the special replay data generator 178 are respectively input to the middle-speed fast replay data generator 188 and the high-speed fast replay data generator 190, and headers and modified headers are appended, and output in the form of transport packets via the middle-speed fast replay data output terminal 166 and the high-speed fast replay data output terminal 168.

Further description of the special replay data generator 178 will next be given.

Figure 24B:
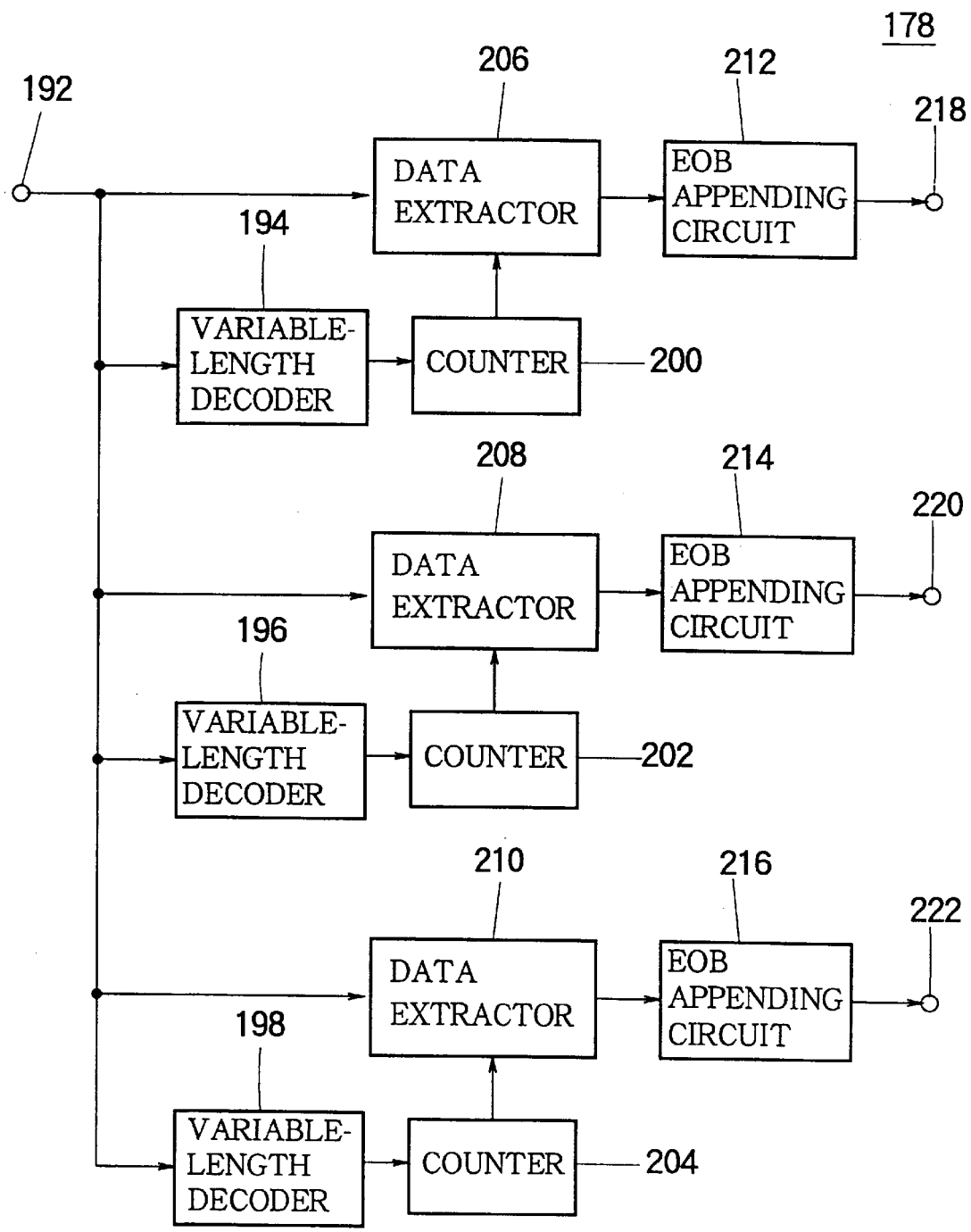
FIG. 24B is a block diagram showing an example of special data forming circuit in FIG. 24A.

FIG. 24B is a block diagram showing an example of the special replay data generator 178. In the drawing, reference numeral 192 denotes an input terminal for receiving a bit stream of intra data, 194 denotes a variable-length decoder for forming low-speed special replay data, 196 denotes a variable-length decoder for forming middle-speed special replay data, and 198 denotes denotes a variable-length decoder for forming high-speed special replay data. Reference numerals 200, 202 and 204 denote counters. Reference numerals 206, 208 and 210 denote data extractors for low-speed fast replay data, middle-speed fast replay data, and high-speed fast replay data, respectively.

Reference numeral 212 denotes an EOB appending circuit for appending EOB (end of block) code to the low-speed fast replay data, 214 denotes an EOB appending circuit for appending EOB code to the middle-speed fast replay data, and 216 denotes an EOB appending circuit for appending EOB code to the high-speed fast replay data. Reference numeral 218 denotes an output terminal for low-speed fast replay data, 220 denotes an output terminal for middle-speed fast replay data, and 222 denotes an output terminal for high-speed fast replay data.

The operation of the special replay data generator 178 (FIG. 24B) will next described. The variable-length decoder 194 variable-length decodes the input bit stream. On the basis of the decoding, the counter 200 counts the number of the decoded DCT coefficients, and outputs the result to data extractor 206 extracts the bits stream corresponding to the predetermined number of DCT coefficients, from the input bit stream, at a predetermined timing, on the basis of the input from the counter 200. The counter 202 and the data extractor 208, and the counter 204 and the data extractor 210 perform similar operation. The data extractor 206 extracts the low-speed fast replay data from the input bit stream, the data extractor 208 extracts the middle-speed fast replay data from the input bit stream, and the data extractor 210 extracts the high-speed fast replay data from the input bit stream. The extracted low-speed fast replay data is supplied to the EOB appending circuit 212 where EOB codes are appended, and then output as the low-speed fast replay data via the output terminal 218. The extracted middle-speed fast replay data is supplied to the EOB appending circuit 214 where EOB codes are appended, and then output as the middle-speed fast replay data via the output terminal 220. The extracted high-speed fast replay data is supplied to the EOB appending circuit 216 where EOB codes are appended, and then output as the high-speed fast replay data via the output terminal 222.

The timings at which the data is extracted at the respective data extractors may be identical to each other, or may be different. If they are different, the number of DCT coefficients within one video block to be recorded (the unit with which the orthogonal transform is performed at the encoding means) differs. Since the special replay area where special replay data is recorded is limited as will be described later, if the special replay area is of the same areas (size), increase in the number of the DCT coefficients of one video block requires more special replay areas for recording, and the refreshing of the screen during replay is slow. However, the picture quality is good. Decision on the timing for extraction is therefore made by trade-off between the delay in refreshing and the picture quality.

Figure 25:
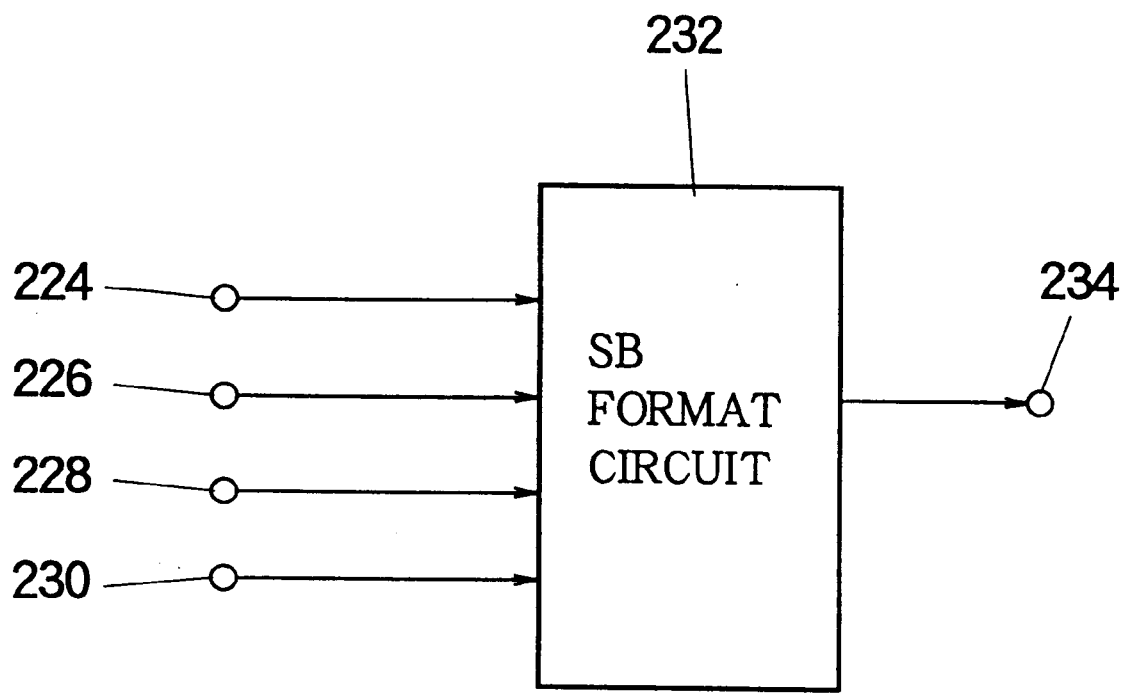
FIG. 25 is a block diagram showing a sync block forming circuit.
Figure 26A:
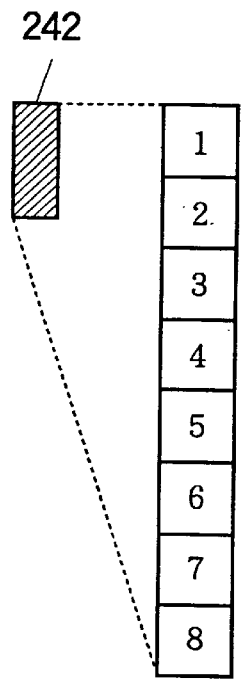
FIG. 26A to FIG. 26F show the configurations of the special replay data recording areas in Embodiment 5.
Figure 26B:
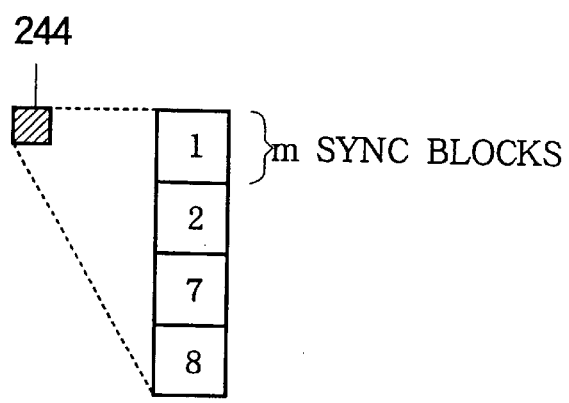
Figure 26C:
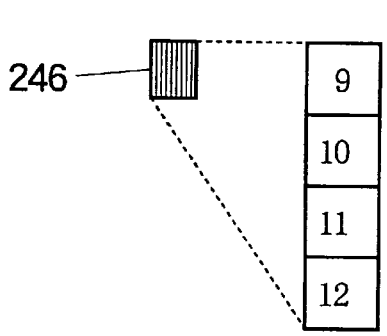
Figure 26D:
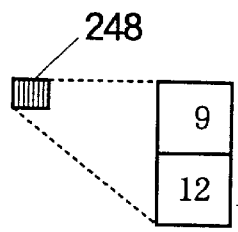
Figure 26E:
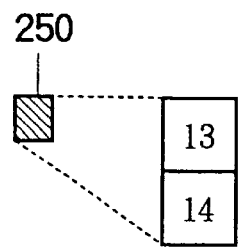
Figure 26F:
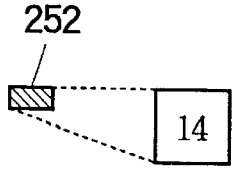

FIG. 25 is a block diagram showing a sync block forming circuit.

In FIG. 25, reference numeral 224 denotes an input terminal for a bit stream for main areas, 226 denotes an input terminal for low-speed fast special replay data, 228 denotes an input terminal for middle-speed fast special replay data, 230 denotes an input terminal for high-speed fast special replay data. The input terminals 224, 226, 228 and 230 are respectively connected to the output terminals 162, 164, 166 and 168 in FIG. 24A. Reference numeral 232 denotes an SB format circuit for converting the input data and the bit stream into a sync block format. Reference numeral 234 denotes an SB output terminal for outputting SB data.

The synthesis of the bit stream for the main areas and with special replay data for the respective fast will next be described with reference to FIG. 25. The data and the bit stream received at the input terminals 224 to 230 are input to the SB format circuit 232, where data to be recorded in the respective sync block are selected for each track and for each sync block. A header is appended to each sync block of data, and the sync blocks within a track are formed to thereby form the predetermined pattern as described later, and the resultant data is output via the SB output terminal 234.

The operation of the SB format circuit 232 will next be described. In this embodiment, the drum may be of any of 1 ch×2, 2 ch×1 and 2 ch×2 configurations. However, two azimuth angles are provided, and the head having one azimuth angle is called an A-channel head, and the head having the other azimuth angle is called B-channel head.

FIG. 26A to FIG. 26F are diagrams showing the configurations of the special replay data recording areas according to Embodiment 5. In the drawing, reference numeral 242 denotes A-channel low-speed fast replay recording area for recording low-speed fast replay data by means of an A-channel head, 244 denotes a B-channel low-speed fast replay recording area for recording low-speed fast replay data by means of a B-channel head, 246 denotes A-channel middle-speed fast replay recording area for recording low-speed fast replay data by means of an A-channel head, 248 denotes a B-channel low-speed fast replay recording area for recording low-speed fast replay data by means of a B-channel head, 250 denotes A-channel high-speed fast replay recording area for recording low-speed fast replay data by means of an A-channel head, and 252 denotes a B-channel high-speed fast replay recording area for recording low-speed fast replay data by means of a B-channel head. The B-channel data is that obtained when 2 ch×2 drum configuration is used. Compared with other drum configurations, in the case of the 2 ch×2 drum configuration (assuming that the replay speed is identical), the number of times the head crosses the track is larger, and the number of sync blocks reproduced per track is small. As a result, it is necessary to supplement the data of special replay data recording areas from which the data is not produced by the A-channel head.

The special replay data recording areas for the B-channel head are provided for the above-described reason. The B-channel low-speed fast replay data recording areas 244 supplement the A-channel low-speed fast replay data recording areas 242, the B-channel middle-speed fast replay data recording areas 248 supplement the A-channel middle-speed fast replay data recording areas 246, and the B-channel high-speed fast replay data recording areas 252 supplement the A-channel high-speed fast replay data recording areas 250. With regard to the size of the respective areas, since the same size of the areas for the A- and B-channels can be used in the 2 ch×2 drum configuration, and data can be replayed from about double the areas by means of the A-channel head in other drum configurations, the ratio of the A-channel special replay area to the B-channel special replay area is 2:1.

The numbers 1 to 14 allotted to the respective blocks in FIG. 26A to FIG. 26F indicate the content of the data. That is identical number denotes identical data. The data at the upper and lower ends of the A-channel special replay areas and also form the data of the B-channel special replay areas. The reason is as explained above. Each block is formed of m sync blocks (m being a natural number).

Figure 27:
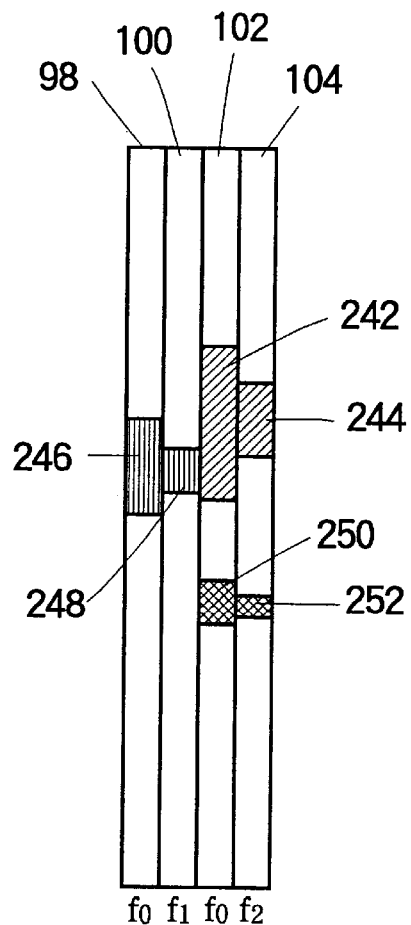
FIG. 27 shows dispositions of the special replay data recording areas in tracks in Embodiment 5.

FIG. 27 shows the disposition of the special replay data recording areas in the tracks. In this recording format, as in Embodiment 1, the special replay data recording areas are repeated at a period of four tracks. The special replay data recording areas corresponding to the respective replay speeds are provided in four tracks 98, 100, 102 and 104 of one period. In the drawing, the track 98 is a first track recorded by an A-channel head, the track 100 is a second track recorded by a B-channel head, the track 102 is a third track recorded by the A-channel head, the track 104 is a fourth track recorded by the B-channel head. The first to fourth tracks 98 to 104 form a unit.

f0, f1 and f2 represent pilot signals for identifying the the respective tracks. The pilot signal f1 is a signal of a frequency, denoted by f1, superimposed with the digital signal recorded on the track. The pilot signal f2 is a signal of another frequency, denoted by f2, different from f1, and superimposed with the digital signal recorded on the track. The pilot signal f0 is actually in the form of absence of superimposed signals f1 and f2. The areas other than the areas 242 to 252 are used as main areas for recording data for normal replay. Data from the areas for special replay can be reproduced by one scan of a head whatever is the configuration of the drum. In the case of the 2 ch×1 or 1 ch×2 drum configuration, the special replay data in concentrated areas on one track can be reproduced by one scan of a head. In the case of the 2 ch×2 drum configuration, the special replay data can be formed from adjacent tracks. By recording the special replay data collectively, in concentrated areas as shown in FIG. 27, it is possible to remove the effects of non-linearity of the tracks.

Figure 28:
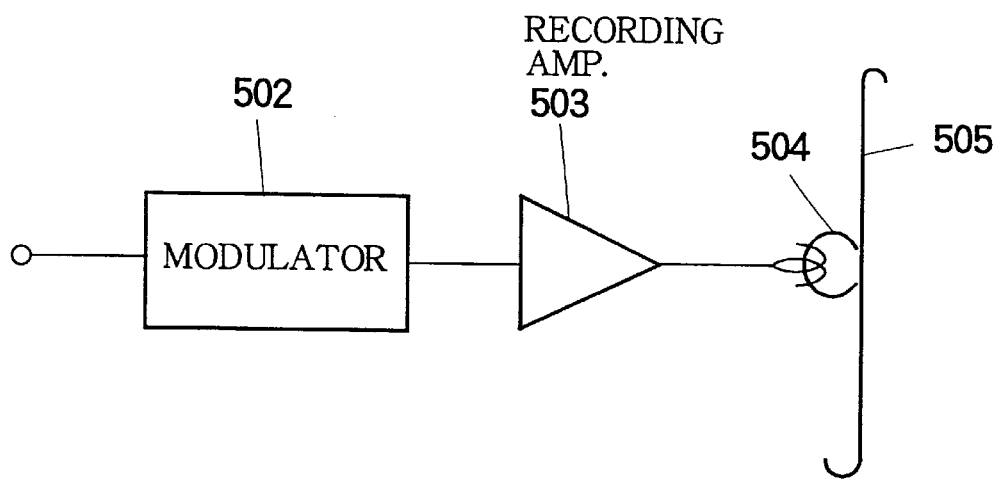
FIG. 28 is a block diagram showing a modulator in front of a recording amplifier.

The pilot signals can be superimposed on the digital data at a modulator 502, shown in FIG. 28, provided in front of a recording amplifier 503, from which recording signals are supplied to a recording head 504 for recording the signals on the magnetic tape 505. The superimposition can be achieved by dividing the code sequence into units of 24 bits, and adding one bit to the head of each unit of 24 bits, and selectively setting the additional bit to "0" or "1" to thereby vary the DSV (digital sum variation).

It should be noted, the system shown in FIG. 1, FIG. 16 and FIG. 20 also is provided with a modulator in front of the recording amplifiers 66, but such la modulator is not shown for simplicity of illustration.

Figure 29:
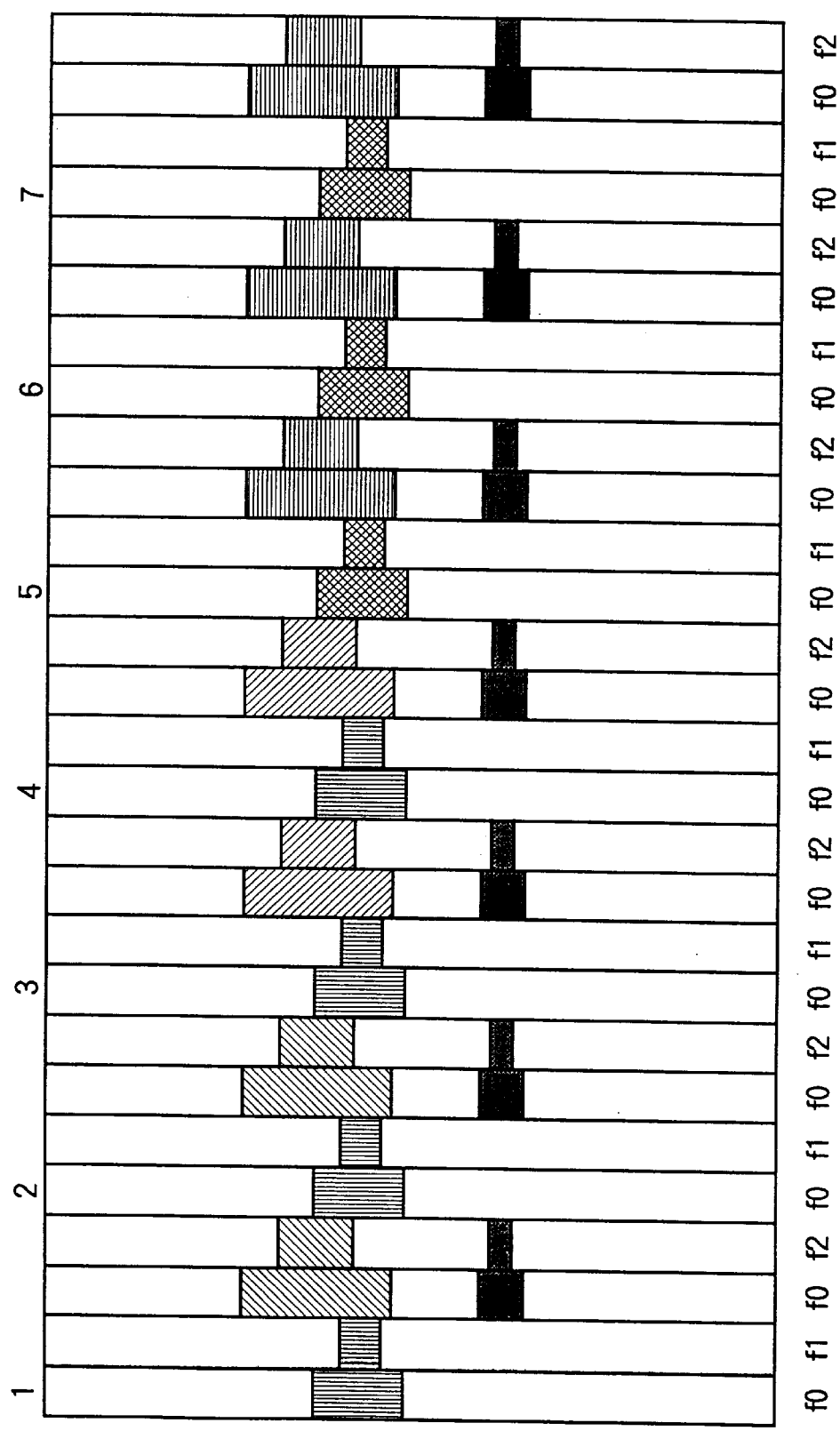
FIG. 29 shows a recording format on tracks in Embodiment 5.

FIG. 29 is a diagram showing a recording format on tracks in Embodiment 5. The unit of four tracks shown in FIG. 27 is repeated, and recording is made on the repeated units, to form the recording pattern. In the recording pattern shown in FIG. 29, four-time speed is set as the low-speed fast replay speed, eight-time speed is set as the middle-speed fast replay speed, and 16-time speed is set as the high-speed fast replay speed. The data for four-time speed is repeatedly recorded over two units of four tracks, the data for the eight-time speed is repeatedly recorded over four units of four tracks, and the data for the 16-time speed replay is repeatedly recorded over eight units of four tracks. To generalize, the data for the (M×i)-time speed replay is repeatedly recorded over 2×i units of four tracks, where M is four in the illustrated example, and i=1, 2, ... n.

By forming the recording pattern as described above, the effects of any non-linearity of tracks can be minimized. Moreover, because dedicated areas are provided for the respective fast replay speeds, the refreshing and the picture quality can be set for the respective fast replay speeds.

Embodiment 6

Embodiment 6 relates to a different configuration of a special replay data generator 178. The special replay data generator 178 in Embodiment 5 was in the form shown in FIG. 24B. The invention is not limited to such a configuration, but the configuration shown in FIG. 30 may be used.

Figure 30:
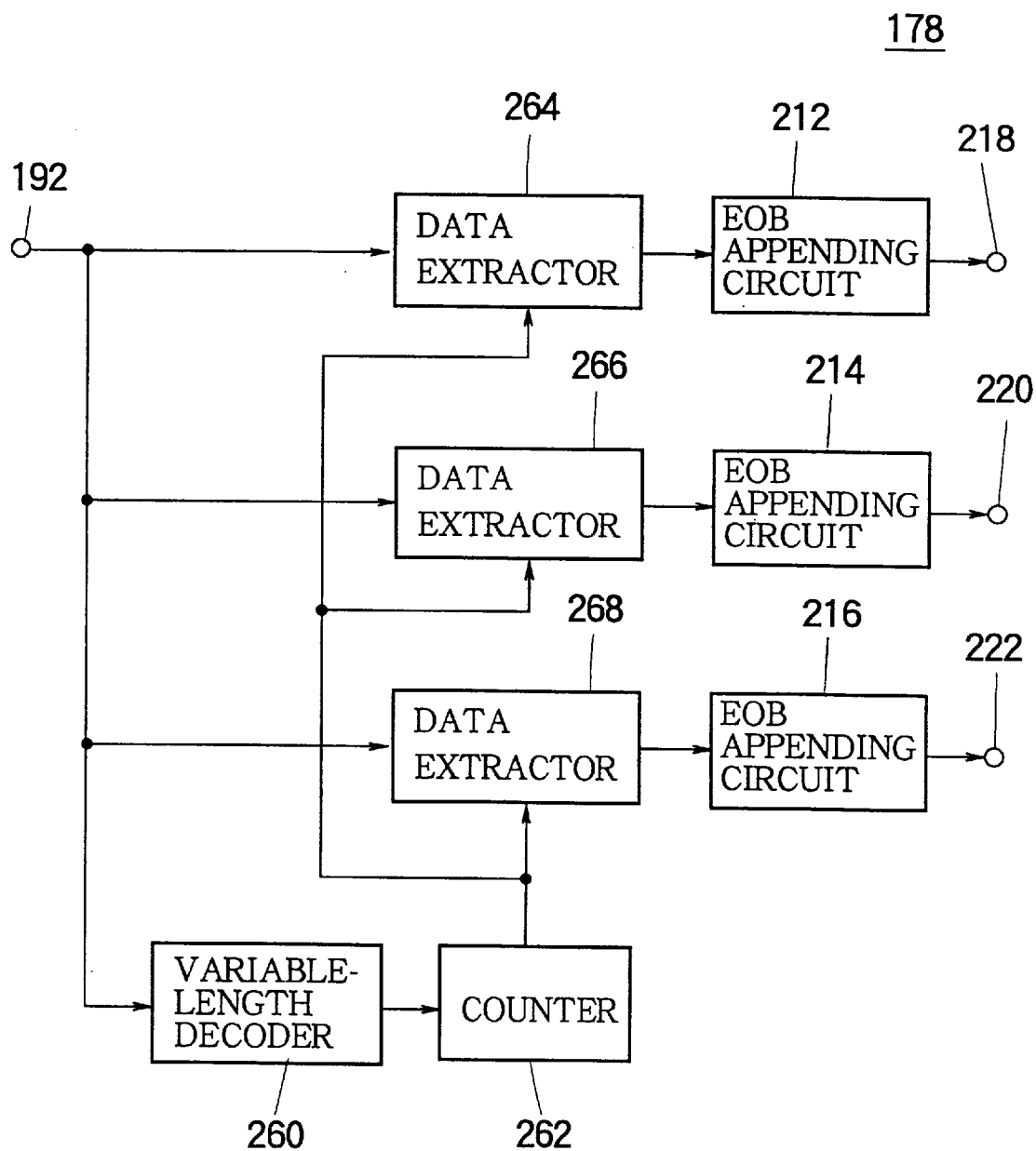
FIG. 30 is a block diagram showing a special replay data forming circuit in Embodiment 6.

Referring to FIG. 30, the differences from the special replay data generator 178 shown in FIG. 24B will be described.

Reference numeral 260 denotes a variable length decoder for variable-length decoding the input bit stream, 262 denotes a counter, 264 denotes a data extractor for extracting low-speed data, 266 denotes a data extractor for extracting middle-speed data, and 268 denotes a data extractor for extracting high-speed data. Reference numerals 192, 212, 214, 216, 218, 220 and 222 in FIG. 30 denote members identical to those in FIG. 24B.

The operation of the special replay data generator in Embodiment 6 will next be described. The intra data received at the input terminal 192 is input to the variable-length decoder 260, and the data extractors 264, 266 and 268. The variable-length decoder 260 performs variable-length decoding on the bit stream. The counter 262 counts the number of DCT coefficients obtained as a result of the decoding, and the count value is supplied to the data extractors 264, 266 and 268. The data extractor 262 extracts the data at a timing predetermined according to the input. Similarly, the data extractor 266 and the data extractor 268 respectively extract data at timings predetermined independently of each other. The extracted data is supplied to the EOB appending circuits 212, 214 and 216, where EOB code is appended, and then output via the output terminals 218, 220 and 222. By forming the circuit as described above, the special replay data similar to that of FIG. 24B can be generated.

Embodiment 7

Figure 31:
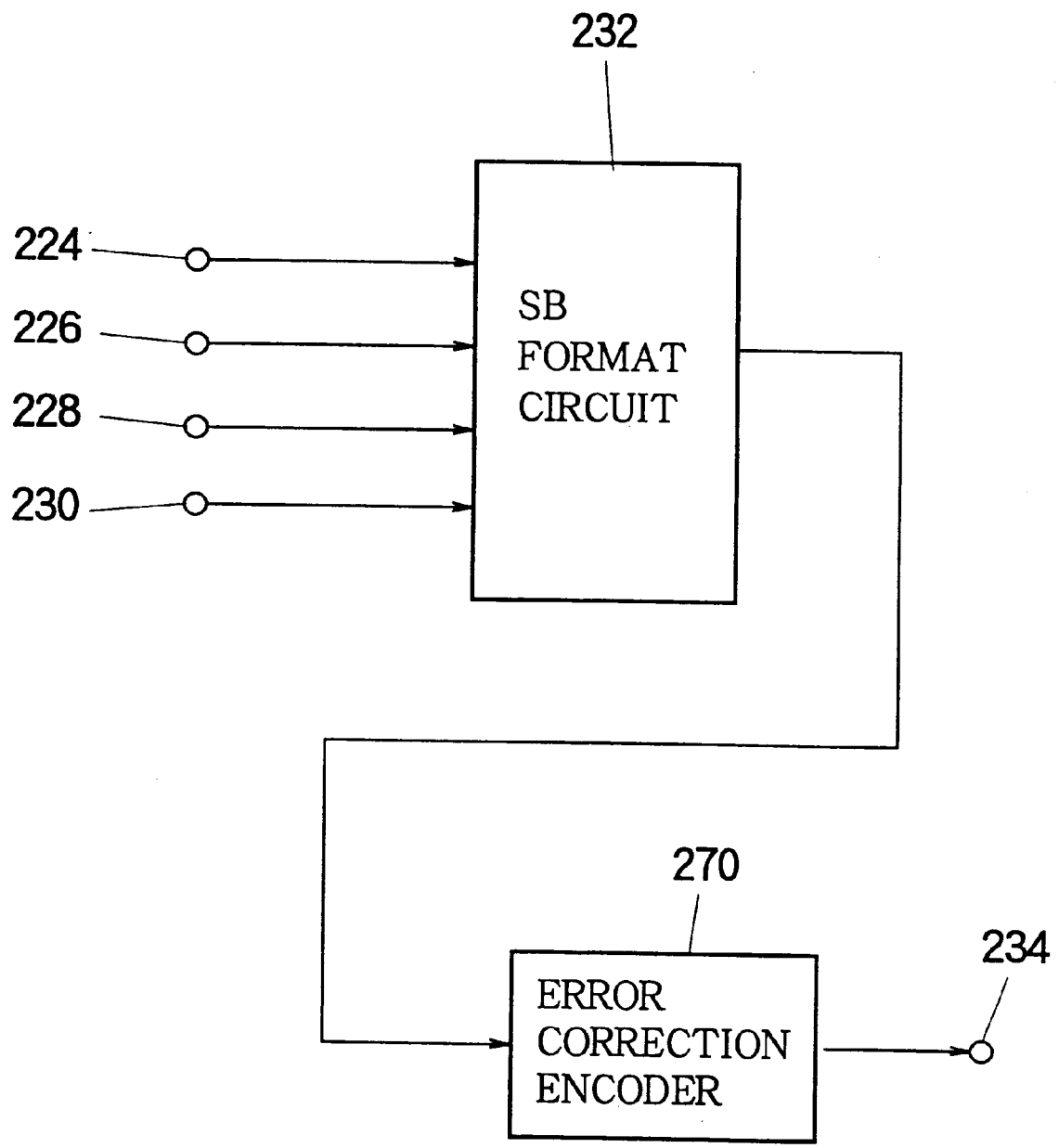
FIG. 31 is a block diagram showing an example of sync block forming circuit according to Embodiment 7 of the invention.

FIG. 31 is a block diagram showing an example of sync block forming circuit of Embodiment 7. In Embodiment 7, a configuration different from the sync block forming circuit of Embodiment 5 (FIG. 25) is used to synthesize the bit stream for the main areas and the special replay data for the respective fast replay speeds.

In FIG. 31, reference numeral 224 denotes an input terminal for receiving the main area bit stream, 226 denotes an input terminal for receiving special replay data for low-speed, 228 denotes an input terminal for receiving special replay data for middle-speed, and 230 denotes an input terminal for receiving special replay data for high-speed. Reference numeral 232 denotes an SB format circuit for converting the input data and bit stream into the format of sync blocks, 270 denotes an error correction encoder, and 234 denotes an output terminal for outputting the SB data.

Referring to FIG. 31, the operation for synthesizing the main stream bit stream and the special replay data for the respective fast replay speeds will next be described. The data and bit stream input via the input terminals 224 to 230 are input to the SB format circuit 232, where the data to be recorded in the respective sync blocks is selected, from the respective inputs, for each of the tracks and for each of the sync blocks. A header is appended to each of the sync block of data, and the sync blocks in each track are configured so as to form the predetermined pattern, to be described later, and a second parity (C1 code) formed of digital data, and a third parity (C2 code) formed of a plurality of items of digital data extending across a sync bit, are appended, and the result is output via the SB output terminal 234.

The configuration of the special replay data recording areas, and the disposition of the special replay data recording areas, and the recording format on the tracks may be identical to those described with reference to FIG. 26A to FIG. 29 in connection with Embodiment 5.

Description will next be made as to in what format, the transport packets are recorded in fixed areas, such as sync blocks.

Figure 32:
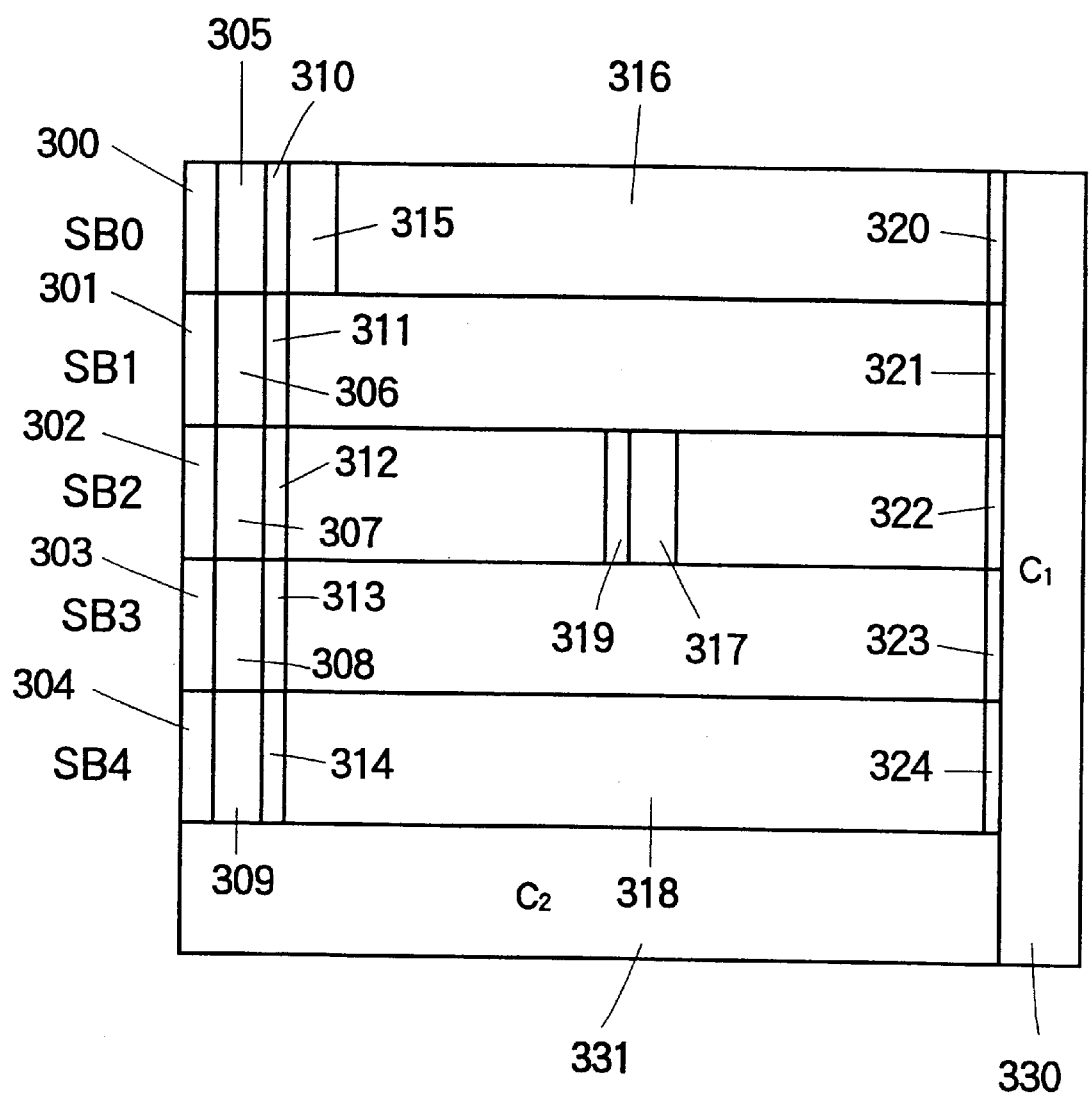
FIG. 32 shows an example of data packet according to Embodiment 7.

FIG. 32 is a diagram showing an example of the data packet according to Embodiment 7. It shows an example for the case where two transport packets are recorded over five sync blocks. In the drawings, reference numeral 300 denotes a sync of a sync block 0 (SB0), 301 denotes a sync of a sync block 1 (SB1), 302 denotes a sync of a sync block 2 (SB2), 303 denotes a sync of a sync block 3 (SB3), and 304 denotes a sync of a sync block 4 (SB4). Reference numeral 305 denotes ID of SB0, 306 denotes ID of SB1, 307 denotes ID of SB2, 308 denotes ID of SB3, and 309 denotes ID of SB4. Reference numeral 310 denotes a header appended to SB0, 311 denotes a header appended to SB1, 312 denotes a header appended to SB2, 313 denotes a header appended to SB3, and 314 denotes a header appended to SB4. Reference numeral 315 denotes a transport header of the transport packet A, 316 denotes data of the transport packet A, 317 denotes a transport header B of the transport packet B, and 318 denotes data of the transport packet B. Reference numeral 319 denotes a dummy area.

Reference numeral 320 denotes a sync parity generated from the digital data succeeding ID 305. Reference numeral 321 denotes a sync parity generated from the digital data succeeding ID 306. Reference numeral 322 denotes a sync parity generated from the digital data succeeding ID 307. Reference numeral 323 denotes a sync parity generated from the digital data succeeding ID 308. Reference numeral 324 denotes a sync parity generated from the digital data succeeding ID 309. Reference numeral 330 denotes a C1 check code which is a second parity appended at the error correction encoder 270. Reference numeral 331 denotes a C2 check code which is a third parity appended at the error correction encoder 270.

Description is made of SB0. ID 305 and header 310 contain an address for identifying the particular sync block within the five sync blocks, a signal indicating whether normal replay data or special replay data is recorded, a signal for identifying the speed where the special replay data is recorded, a signal for indicating the identity of data for several units needed since identical special replay data is recorded for several units and discriminating from the special replay data recorded in the succeeding several units, and a signal for identifying the assembly of the five sync blocks, for each unit of the five blocks, and a signal indicating whether the central part of the screen (picture) of an intra-frame or intra-field.

In Embodiment 7, address identifying each sync block within the group of five sync blocks and a signal indicating whether normal replay data or special replay data is contained are recorded in ID 305, and the remainder is recorded in the header 310 disposed after the ID, for each sync block. The ID 305 records the necessary signals among the signals stipulated by the SD specification.

That is, ID 305 contains a parity of the ID signal which is a first parity. This parity is for checking whether the ID signal containing the parity is correct, and its size is one byte. The C1 check code 330 which is the second parity is of eight bytes, and the C2 check code which is the third parity is of 11 bytes. The fourth parity is the sync parity 320 which is of one byte.

SB1, SB2, SB3 and SB4 record an ID and a header, like SB0. In this embodiment, the size of the sync block is 82 bytes (excluding the C1 area), the size of each sync is 2 bytes, the size of each ID is 3 bytes, and the size of each header is one byte. The size of each sync parity is one byte. The size of the transport packet is 187 bytes (as the signal of one byte which can be appended at the time of replay is removed from the transport header at the time of recording). Accordingly, two transport packets (187×2=374 bytes) can be recorded in the data regions of five sync blocks (76×5= 300 bytes). The remaining one byte forms the dummy area 319 in FIG. 32. In this way, two transport packets can be recorded in five sync blocks. By recording, at the tail of the sync block, sync parities generated from the digital data contained in the sync block, it is possible to provide a format permitting detection of whether the digital data contained in the sync block is erroneous.

Embodiment 8

Figure 33:
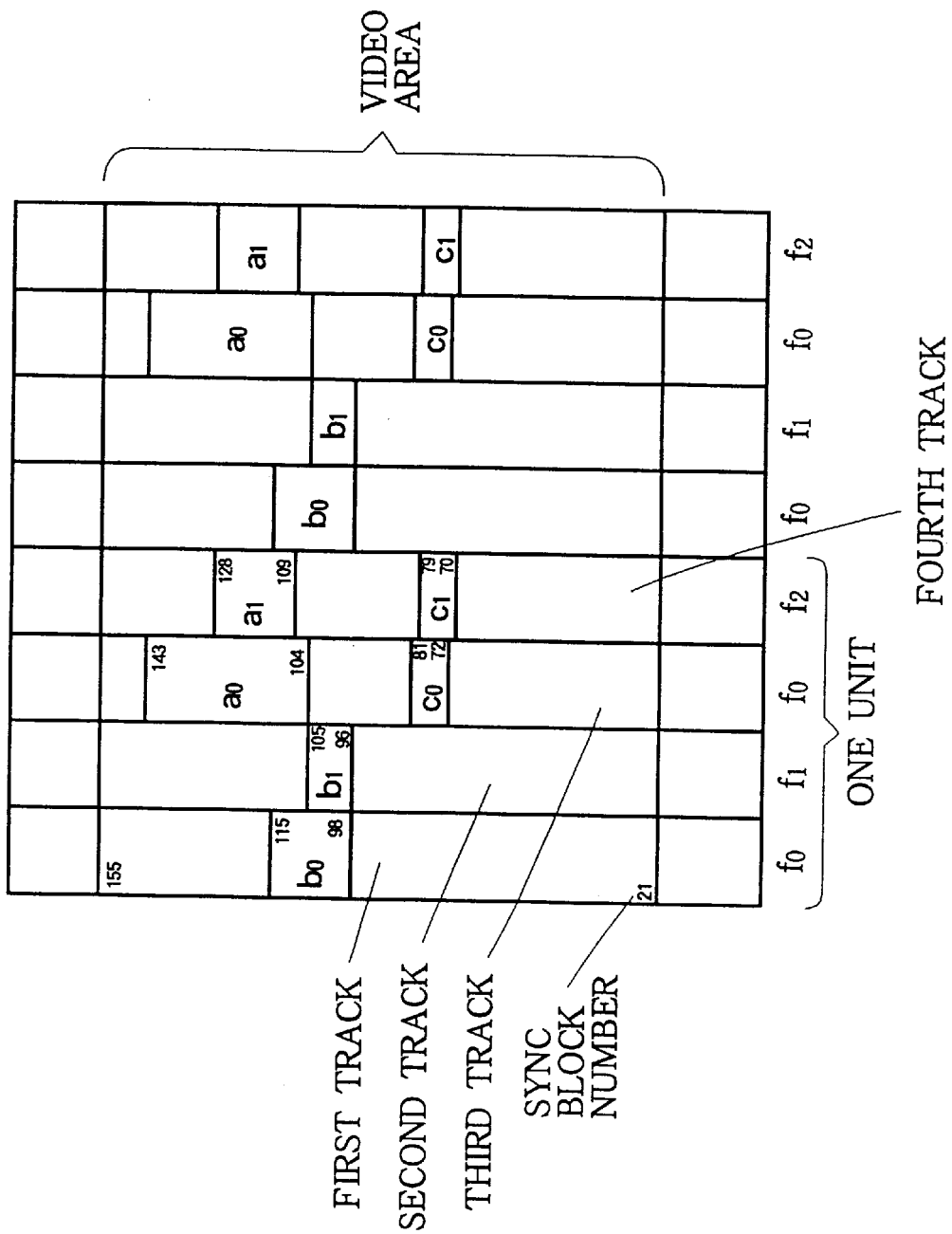
FIG. 33 shows a recording format on tracks in a digital VTR according to Embodiment 8.

FIG. 33 is diagram showing a recording format on tracks of a digital VTR according to Embodiment 8. In the drawings, four tracks form one unit, and a pattern formed of four tracks is repeated.

That is, of the 135 sync blocks of sync block Nos. 21 to 155 of the respective tracks, the data for +8-time speed replay and −6-time speed replay is recorded in the area b0 formed of the sync blocks Nos. 96 to 115 in the first track of the group of four tracks, and the area b1 formed of the sync blocks Nos. 96 to 106 in the second track of the group of four tracks. The data for +2-time speed replay, +4-time speed replay and −2-time speed replay is recorded in the area a0 formed of the sync blocks Nos. 104 to 143 in the third track of the group of four tracks, and the area a1 formed of the sync blocks Nos. 109 to 128 in the fourth track of the group of four tracks. The data for +16-time speed replay and −14-time speed replay is recorded in the area c0 formed of the sync blocks Nos. 72 to 81 in the third track of the group of four tracks, and the area c1 formed of the sync blocks Nos. 70 to 79 in the fourth track of the group of four tracks.

The data recorded in the areas a1, b1 and c1 are identical to the data recorded in the both end parts of the areas a0, b0 and c0, respectively, and is used to supplement when the data at the end parts of the areas a0, b0 and c0 is not obtained. With regard to the data for +2-time speed replay, +4-time speed replay and −2-time speed replay, identical data is recorded in two tracks. With regard to the data for +8-time speed replay and −6-time speed replay, identical data is recorded in four tracks. With regard to the data for +16-time speed replay and −14-time speed replay, identical data is recorded in eight tracks. In the remaining video areas, normal replay data is recorded, and the sync block number is recorded in each sync block. As in the SD mode, pilot signals for tracking control are recorded in the respective tracks, in the order of f0, f1, f0 and f2, in superimposition with the digital signal. Accordingly, the pilot signal f0 is recorded in the first and third tracks, the pilot signal f1 is recorded in the second track, and the pilot signal f2 is recorded in the fourth track.

The configuration of the head used for the recording or replay may for example be as shown in FIG. 5A to FIG. 5C, in which one head each is disposed at opposite positions 180° apart on the drum, two heads are disposed at positions close to each other on the drum, or two heads each are disposed at positions opposite positions 180° apart on the drum. In the following description, the 2ch×1 configuration in which two heads are disposed at positions close to each other on the drum will be taken as an example. The head having the same azimuth as the first and third tracks in which the pilot signal f0 is recorded is called a first head, while the head having the same azimuth as the second and fourth tracks in which the pilot signals f1 and f2 are recorded is called a second head.

During fast replay, the specific scanning trace is followed depending on the replay speed to reproduce the desired replay data. The method of tracking will be described.

Figure 34:
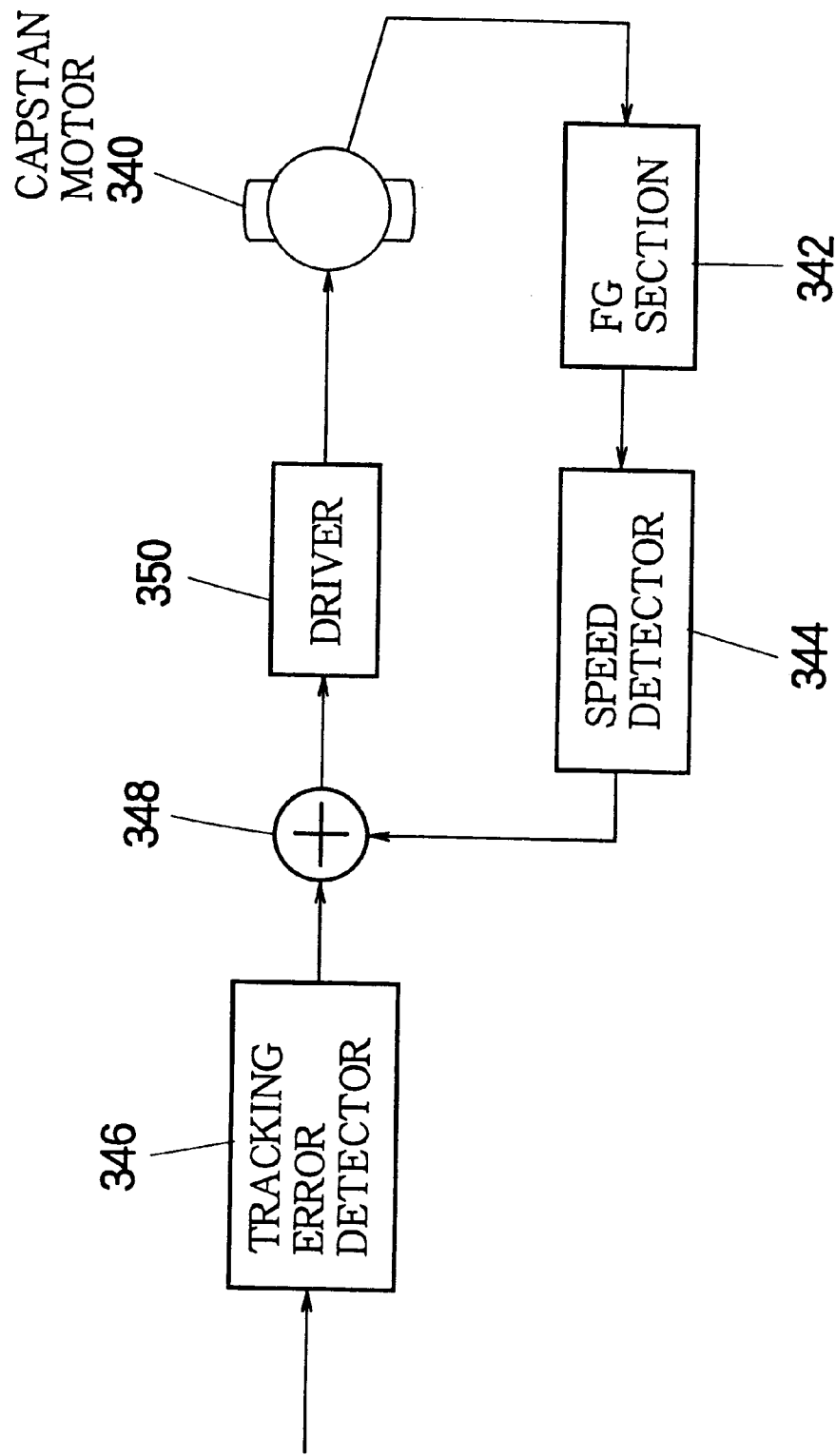
FIG. 34 is a block diagram showing the configuration of a capstan servo system.

FIG. 34 is a schematic block diagram showing the configuration of the capstan servo system. In the drawing, reference numeral 340 denotes a capstan motor, 342 denotes a FG (frequency generator) section for generating FG signal of a frequency corresponding to the rotary speed of the capstan motor 340, 344 denotes a speed detector for detecting the speed error of the capstan motor 340, by detecting the period of the FG signal, 346 denotes a tracking error detector for detecting the tracking error, 348 denotes an adder for adding the outputs of the speed detector 344 and the tracking error detector 346, and 350 denotes a driver for driving the capstan motor in accordance with the output of the adder 348.

Figure 35:
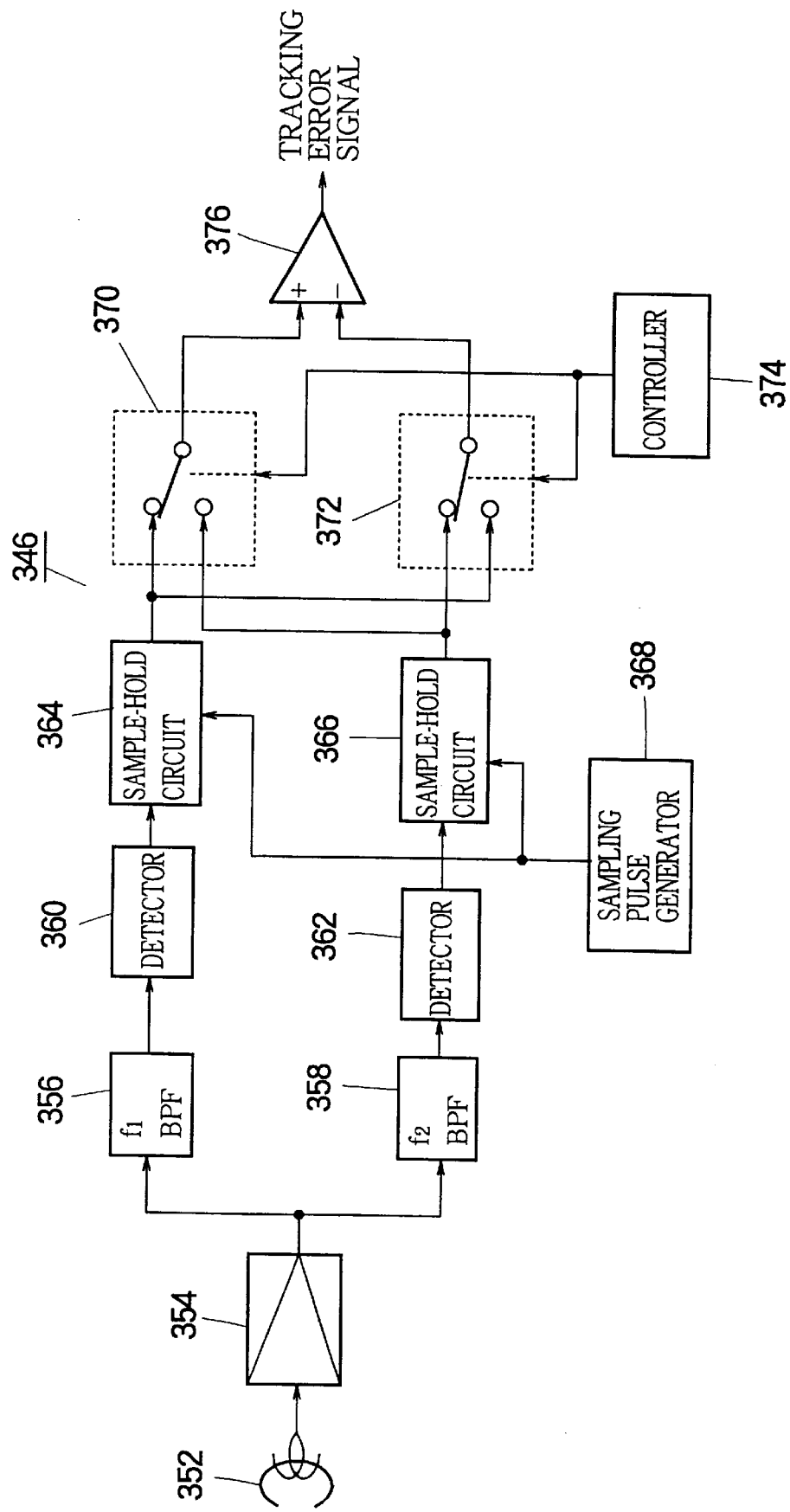
FIG. 35 shows a specific configuration of attracting error detector in FIG. 34.

FIG. 35 is a diagram showing an example of configuration of the tracking error detector 346 in FIG. 34. In the drawing, reference numeral 352 denotes a first head, 354 denotes a head amplifier, 356 and 358 respectively denote BPFs (bandpass filters) having central frequencies f1 and f2, respectively, 360 and 362 denote detectors, 364 and 366 denote sample-hole circuits, and 368 denotes a sampling pulse generator for generating sampling pulses for the sample-hold circuits 364 and 366. Reference numerals 370 and 372 denotes selectors for selecting the outputs of the sample-hold circuits 364 and 366. Reference numeral 374 denotes a controller for controlling the selectors 370 and 372. Reference numeral 376 denotes a subtractor for performing subtraction on the outputs of the selectors 370 and 372.

The replay operation of the digital VTR of Embodiment 8 will next be described with reference to FIG. 36 to FIG. 42.

Figure 36:
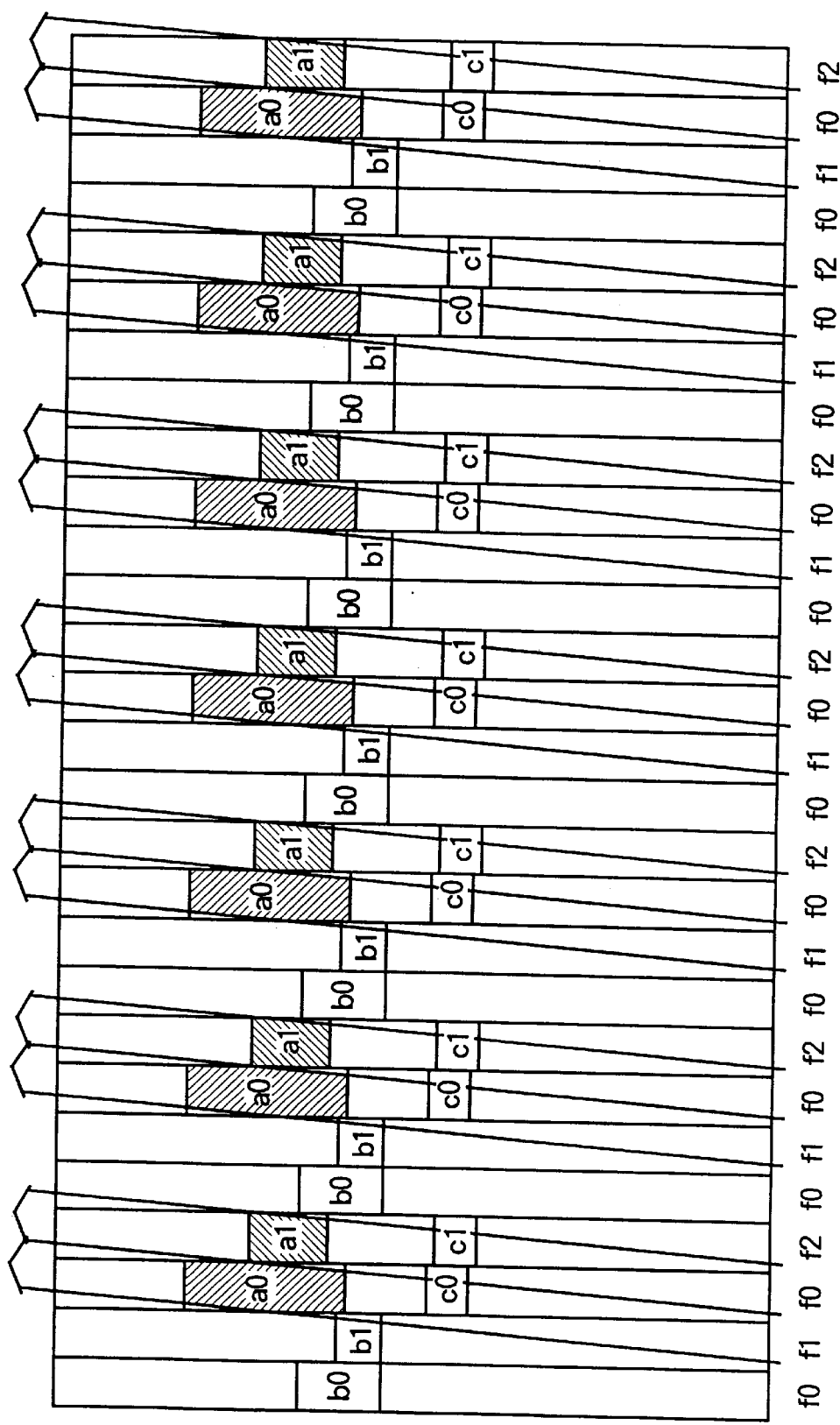
FIG. 36 shows head scanning traces during +2-time speed replay in the digital VTR in Embodiment 8.

FIG. 36 shows the head scanning traces. During +2-time speed replay, the target speed for the speed detector 344 is set at twice the speed during recording, and the tape speed is controlled to be the double speed. By the function of the tracking error detector 346, the tracking control is effected. The signal reproduced by the first head 352 at the +2-time speed is amplified by the head amplifier 354, and the frequency components of the pilot signals f1 and f2 are extracted by the BPFs 356 and 358. The amplitudes of the f1 and f2 components are substantially proportional to the amount over which the first head 352 is on the track. The pilot signals extracted by the BPFs 356 and 358 are envelope-detected at the detectors 360 and 362, and then sample-held at the sample-hold circuits 364 and 366. The timing for the sample-holding is determined by the sample-hold pulse from the sampling pulse generator 368.

In the case of +2-time speed replay, the sampling pulse generator 368 is made to generate one pulse per drum rotation such that the sampling takes place when the first head is at about the sync block No. 124 at the center of the area a0 formed of the sync block Nos. 104 to 143 where +2-time speed replay data is recorded. In the case of +2-time speed replay, the selector 370 is made to select the output of the sample-hold circuit 364 and the selector 372 is made to select the output of the sample-hold circuit 366, on the basis of the control signal from the controller 374. Accordingly, the output of the sample-hold circuit 364 is input to the "+" input terminal of the subtractor 376, while the output of the sample-hold circuit 366 is input to the "−" input terminal of the subtractor 376. The output of the subtractor 376 is a tracking error signal corresponding to the {(pilot signal f1 component)−(pilot signal f2 component)}.

If the head is toward the fourth track (of the four tracks), rather than the third track in the lateral direction of the tracks when the first head 352 is at about the sync block No. 124 in the longitudinal direction of the track, the pilot signal f2 component is larger than f1 component, and the tracking error signal will be small. This tracking error signal is output from the tracking error detector 346, and added to the output of the speed detector 344 at the adder 348. By the resultant output of the driver 350, the capstan motor 340 is decelerated, to retard the tracking phase. Conversely, if the head is toward the second track (of the four tracks), rather than the third track in the lateral direction of the tracks when the first head 352 is at about the sync block No. 124 in the longitudinal direction of the track, the pilot signal f2 component is smaller than f1 component, and the tracking error signal will be large. This tracking error signal is output from the tracking error detector 346, and added to the output of the speed detector 344 at the adder 348. By the resultant output of the driver 350, the capstan motor 340 is accelerated, the advance the tracking phase.

In this way, the tracking is so controlled that the pilot signal f1 and f2 components are equal so that the first head scans the center, in the lateral direction of the tracks, of the third track (of the four tracks) when the first head 352 is at about the sync block No. 124 in the longitudinal direction of the track. In the center of the first track (of the four tracks) the pilot signal f1 and f2 components are equal to each other, but as the front-rear relationship between f1 and f2 is opposite, the polarity of the tracking error signal will be opposite, and the tracking is not stabilized in this position, but is pulled into the center of the third track. That is, if the tracking is shifted toward the fourth track (of the preceding group of four track), the output of the driver 350 will decelerate the capstan motor 340 to retard the tracking phase, to thereby bring the head to the third track in the preceding group of four tracks. while if the tracking is shifted toward the second track (next to the first group (of the same group of four tracks), the output of the driver 350 will further accelerate the capstan motor 340 to advance the tracking phase, to thereby bring the head to the third track (of the same group of four tracks). When the first head 352 scans the center of the third track, the second heads scans the center of the fourth track. In this way, the +2-time speed replay data in the areas a0 and a1 in every group of four tracks is replayed.

Figure 37:
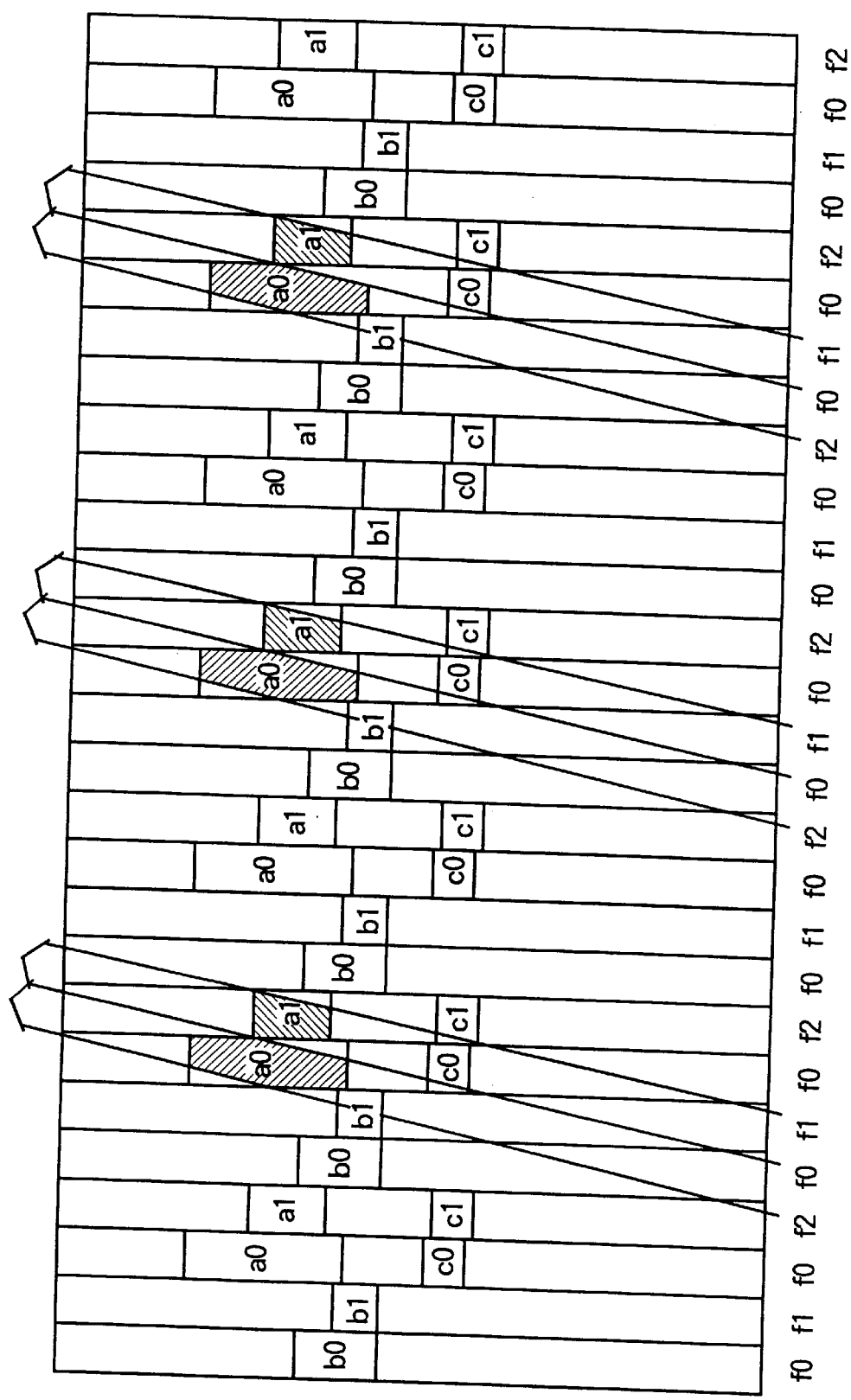
FIG. 37 shows head scanning traces during +4-time speed replay in a digital VTR in Embodiment 8.
Figure 38:
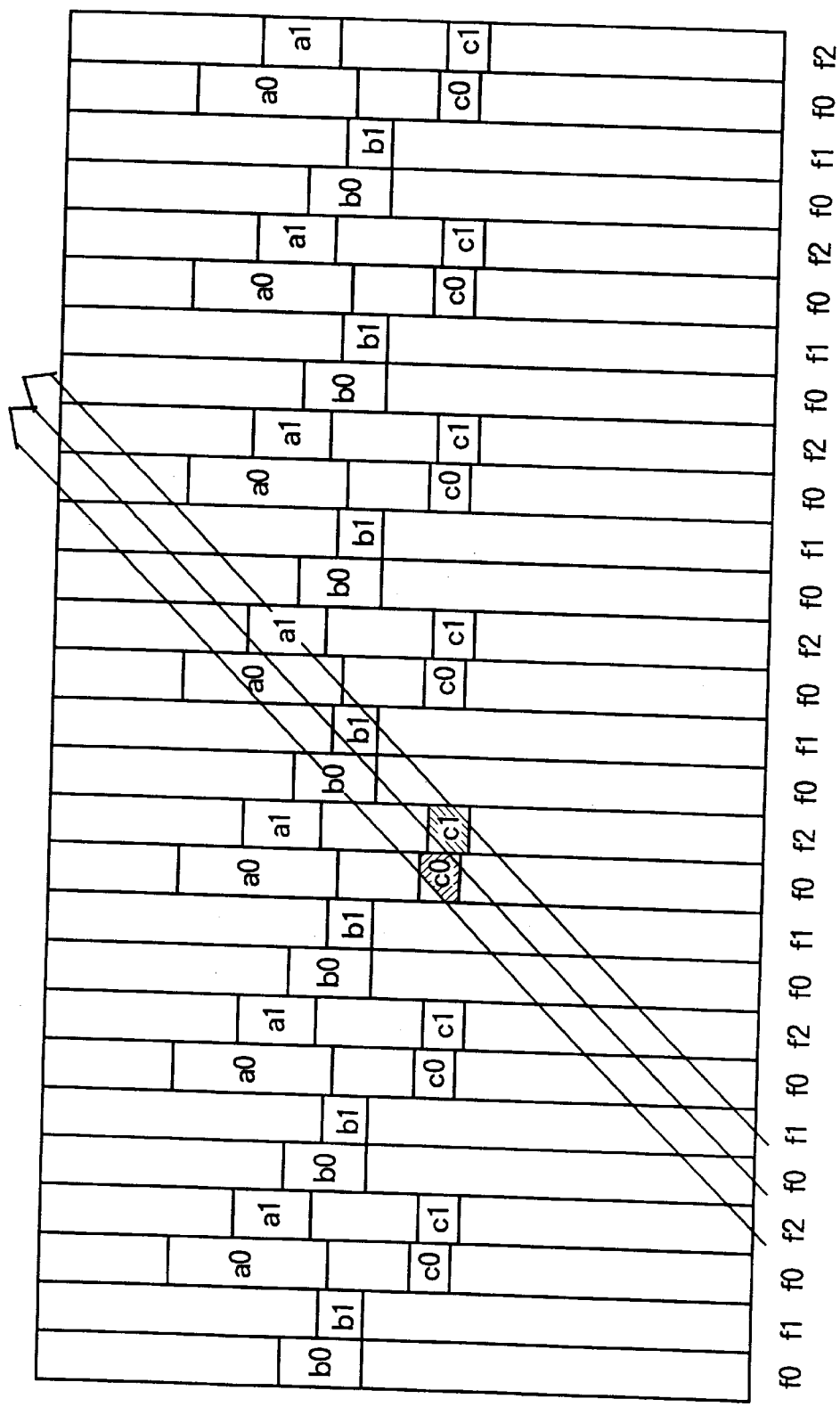
FIG. 38 shows head scanning traces during +16-time speed replay in a digital VTR in Embodiment 8.

FIG. 37 and FIG. 38 respectively show head scanning traces at the time of +4-time speed replay land +16-time speed replay, respectively. During +4-time speed replay and +16-time speed replay, the target speed of the speed detector 344 is set four-times and 16 times the recording speed, respectively, and by the function of the speed control system, the tape speed is controlled to be the +4-time speed and +16-time speed, respectively. The operation for producing the tracking error signal is similar to that described in connection with the case of +2-time speed replay. That is, in the case of +4-time speed replay, the tracking error detector 346 outputs the tracking error signal corresponding to the {(pilot signal f1 component)—(pilot signal f2 component)} when the first head is at about the sync block No. 124 at the center of the area a0 formed of the sync blocks Nos. 104 to 143 where the +4-time speed replay data is recorded. In the case of +16-time speed replay, the tracking error detector 346 outputs the tracking error signal corresponding to the (pilot signal f1 component)—(pilot signal f2 component) when the first head is at about the sync block No. 77 at the center of the area c0 formed of the sync blocks Nos. 72 to 81 where the +16-time speed replay data is recorded.

In accordance with this tracking error signal, the tracking is so controlled that the pilot signal f1 and f2 components are equal so that the first head scans the center, in the lateral direction of the tracks, of the third track (of the four tracks) when the first head 352 is at about the center, in the longitudinal direction of the track, of the area where the fast replay data for the respective speeds is recorded. In this way, +4-time speed replay data in the area a0 and the area a1 of every eight tracks, or +16-time speed replay data in the area c0 and the area c1 of every 32 tracks is reproduced. In the case of +4-time speed replay, the head scanning trace follow either of two patterns, but as the same data is recorded on two tracks, the same data is reproduced which ever of the scanning trace) patterns is followed. This also applies to other replay speeds.

Figure 39:
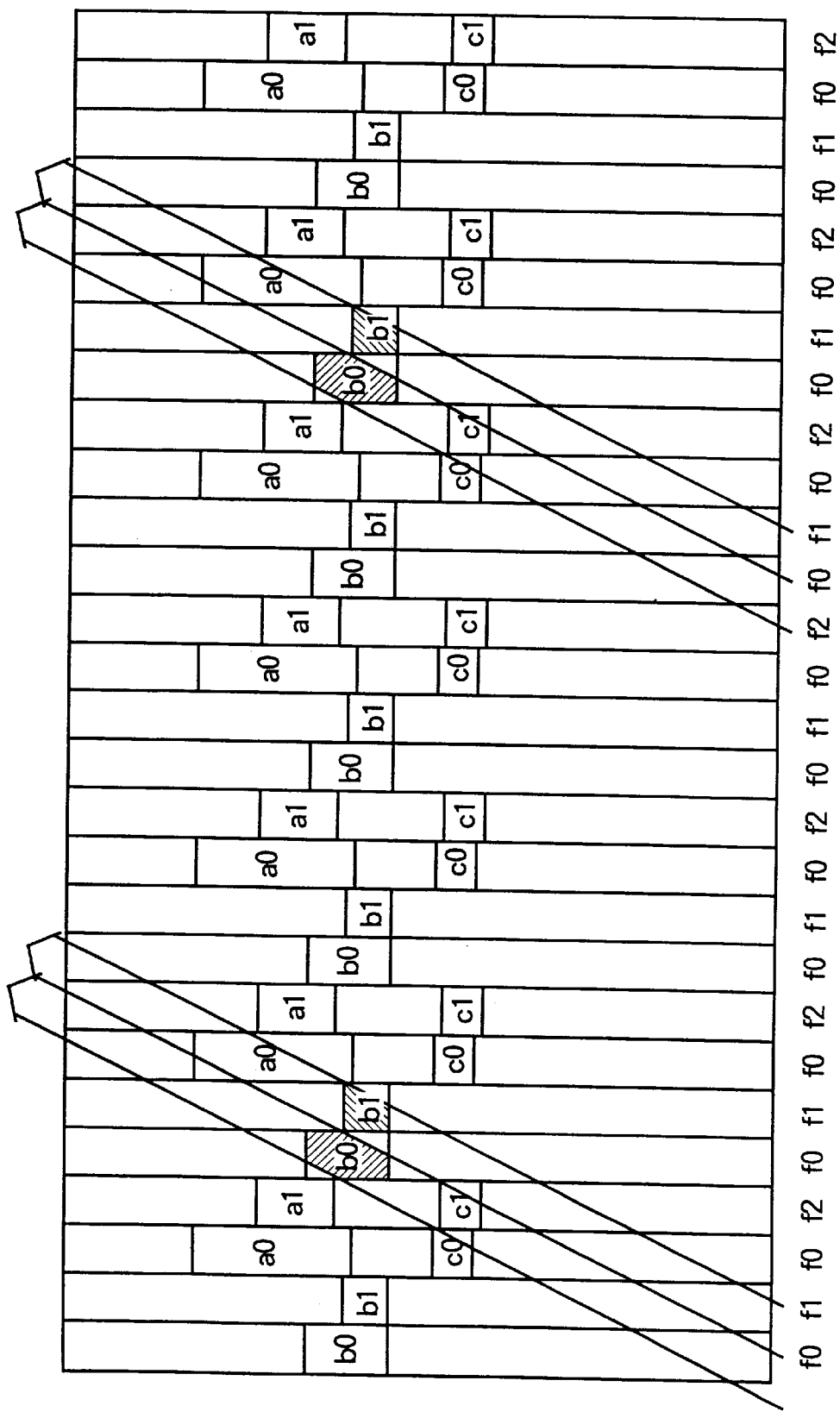
FIG. 39 shows head scanning traces during +8-time speed replay in a digital VTR in Embodiment 8.

The +16-time speed replay will next be described. FIG. 39 shows head scanning traces at the time of +8-time speed replay. During +8-time speed replay, the target speed of the speed detector 344 is set at eight times the recording speed, and by the function of the speed control system, the tape speed is controlled to be the eight-time speed. By the function of the tracking error detector 346, the tracking is controlled. At +8-time speed, the signal picked up by the first head 352 is amplified by the head amplifier 354, and pilot signal f1 and f2 components are extracted by the BPFs 356 and 358, respectively, and envelope-detected by the detectors 360 and 362, respectively, and then sample-held by the sample-hold circuits 364 and 366, respectively. The sampling timing is determined by the sampling pulses from the sampling pulse generator 368. In the case of the +8-time speed replay, the sampling pulse generator 368 is made to generate one pulse per drum rotation such that the sampling takes place when the first head is at about the sync block No. 106 at the center of the area b0 formed of the sync block Nos. 96 to 115 where +8-time speed replay data is recorded. In the case of +8-time speed replay, the selector 370 is made to select the output of the sample-hold circuit 366 and the selector 372 is made to select the output of the sample-hold circuit 364, on the basis of the control signal from the controller 374. Accordingly, the output of the sample-hold circuit 364 is input to the "−" input terminal of the subtractor 376, while the output of the sample-hold circuit 366 is input to the "+" input terminal of the subtractor 376. The output of the subtractor 376 is a tracking error signal corresponding to the {(pilot signal f2 component)—(pilot signal f1 component)}.

On the basis of this tracking error signal, the tracking is so controlled that the pilot signal f1 and f2 components are equal, and the first head 352 scans the center, in the lateral direction of the tracks, of the first track (of the four tracks) when the first head 352 is at about the sync block No. 106 in the longitudinal direction of the track. In this way, the +8-time speed replay data in the area b0 and b1 of every 16 tracks is reproduced.

Figure 40:
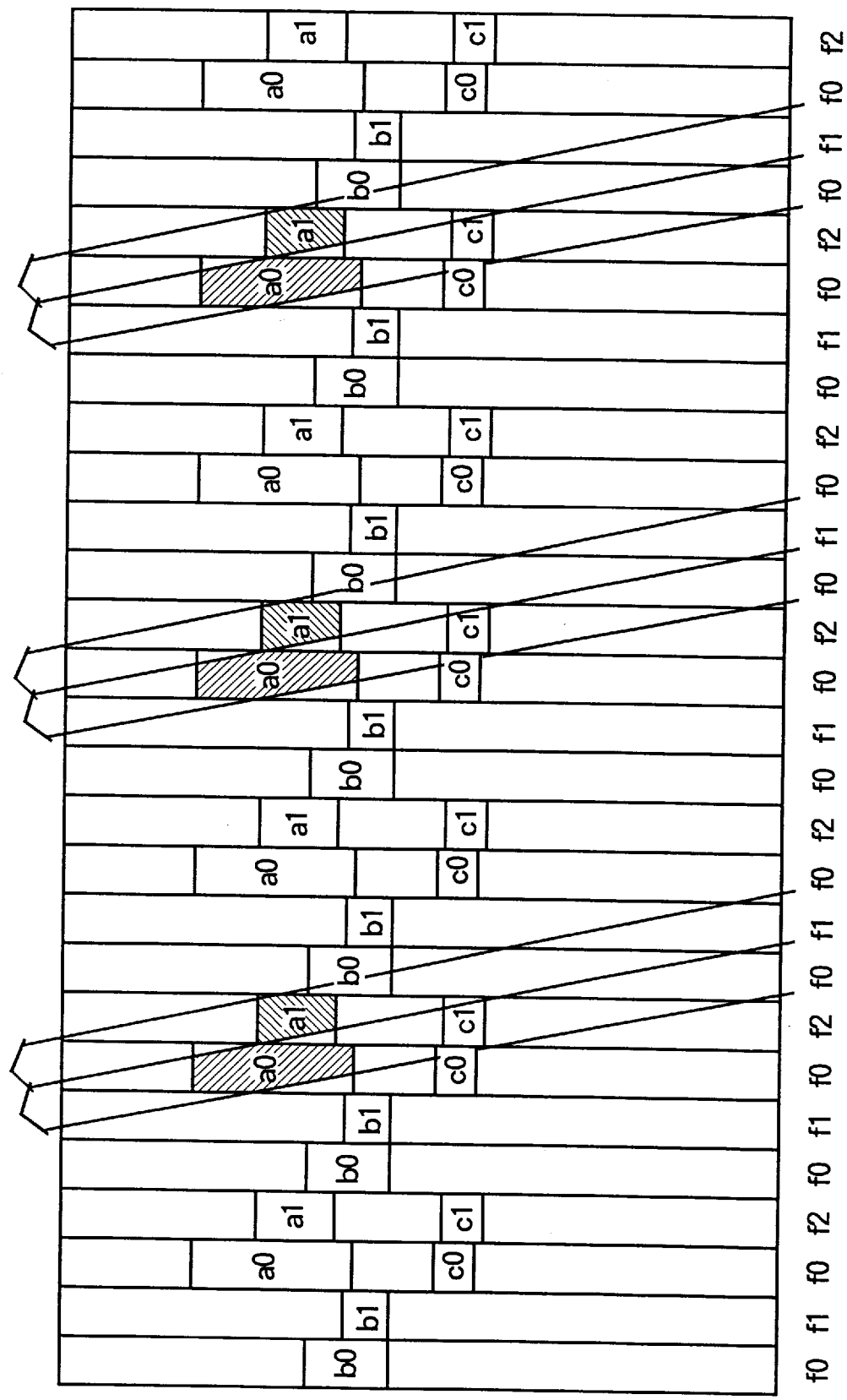
FIG. 40 shows head scanning traces during −2-time speed replay in a digital VTR in Embodiment 8.
Figure 41:
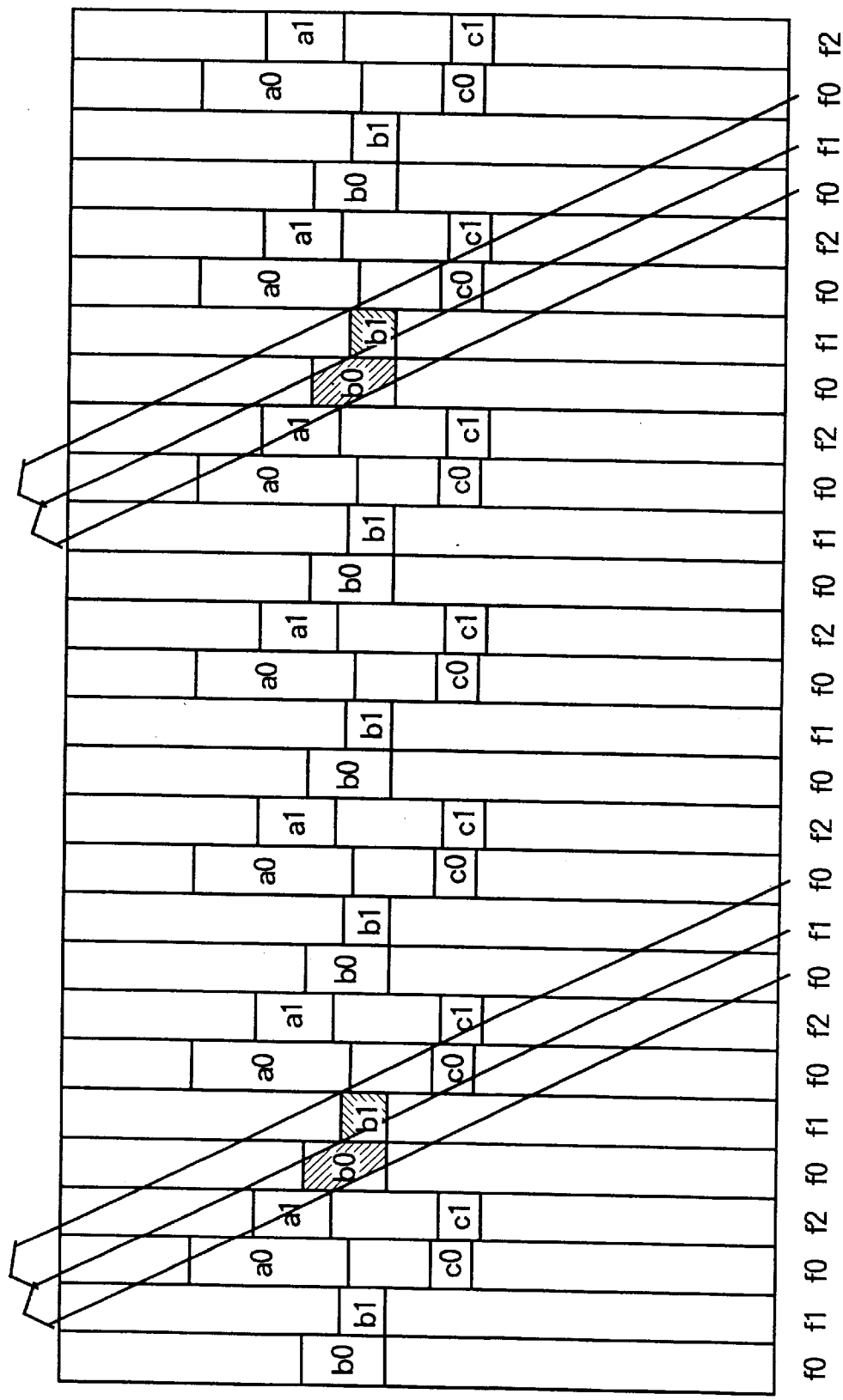
FIG. 41 shows head scanning traces during −6-time speed replay in a digital VTR in Embodiment 8.
Figure 42:
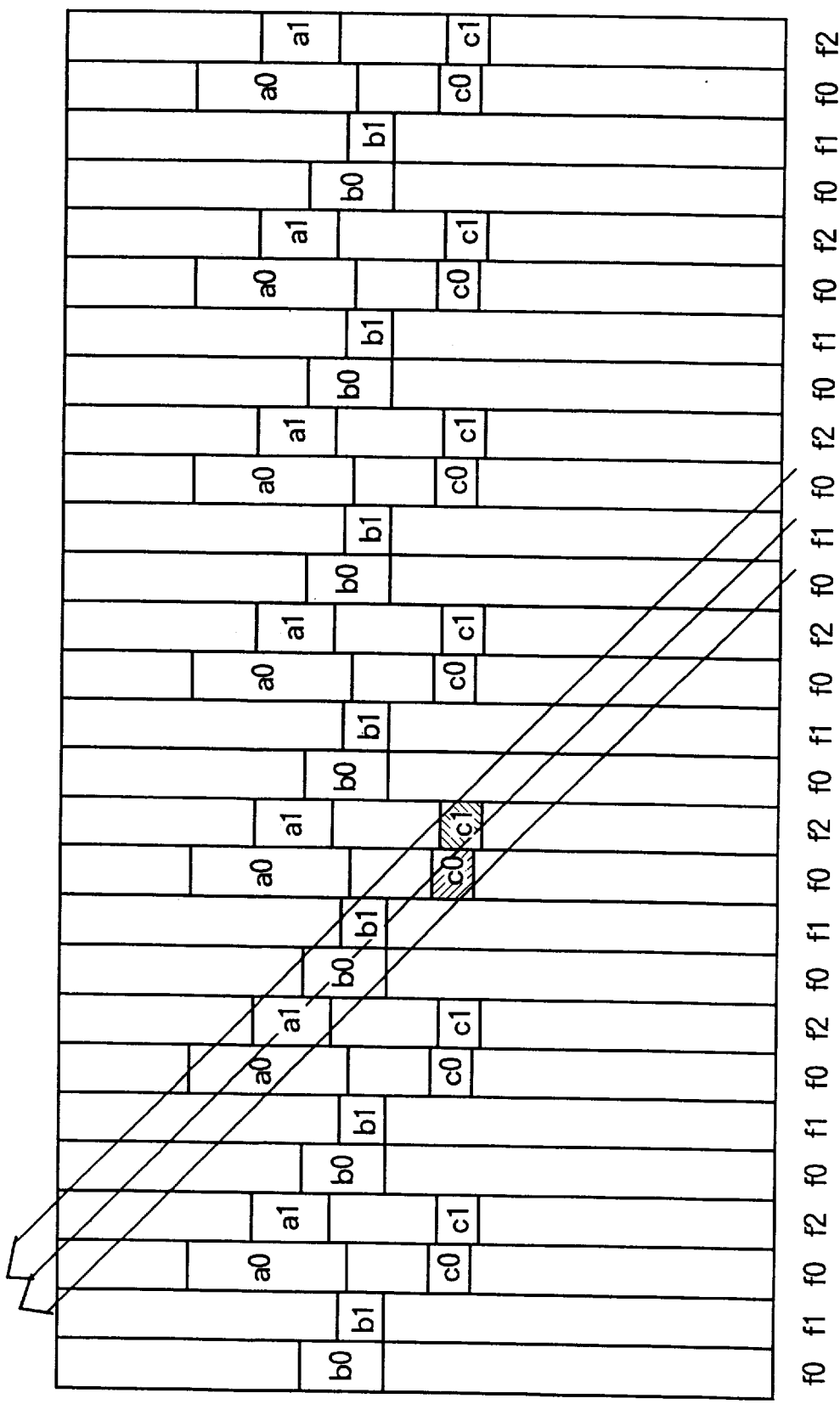
FIG. 42 shows head scanning traces during −14-time speed replay in a digital VTR in Embodiment 8.

FIG. 40, FIG. 41 and FIG. 42 respectively show head scanning traces at the time of −2-time speed replay, −6-time speed replay, and −14-time speed replay. In the case of reverse fast replay, the tape is transported in the reverse direction at the respective fast replay speeds, and the tracking control in −2-time speed replay, −6-time speed replay, and −14-time speed replay, is effected in the same way as in +4-time speed replay (for the −2-time speed replay), in +8-time speed replay (for the −6-time speed replay), and in +16-time speed replay (for the −14-time speed replay), respectively. However, since, in the reverse fast replay, the tape transport direction is opposite to forward fast replay, it is necessary to reverse the polarity of the tracking error signal (as compared with the case for forward fast replay), and the positions of the selectors 370 and 372 are opposite to those for the corresponding forward fast replay. That is, the positions of the selectors 370 and 372 in the −2-time speed replay is opposite to positions of the selectors in the +4-time speed replay; the positions of the selectors 370 and 372 in the −6-time speed replay is opposite to positions of the selectors in the +8-time speed replay; and the positions of the selectors 370 and 372 in the −14-time speed replay is opposite to positions of the selectors in the +16-time speed replay.

Embodiment 9

In Embodiment 8, the sampling timing pulses for the sample-hold circuits 364 and 366 are generated at the sampling pulse generator 368 in accordance with the signal indicative of the drum rotation phase. The accuracy of the sampling timing can be improved if the sync block number in the replay signal. This method will next be described.

Figure 43:
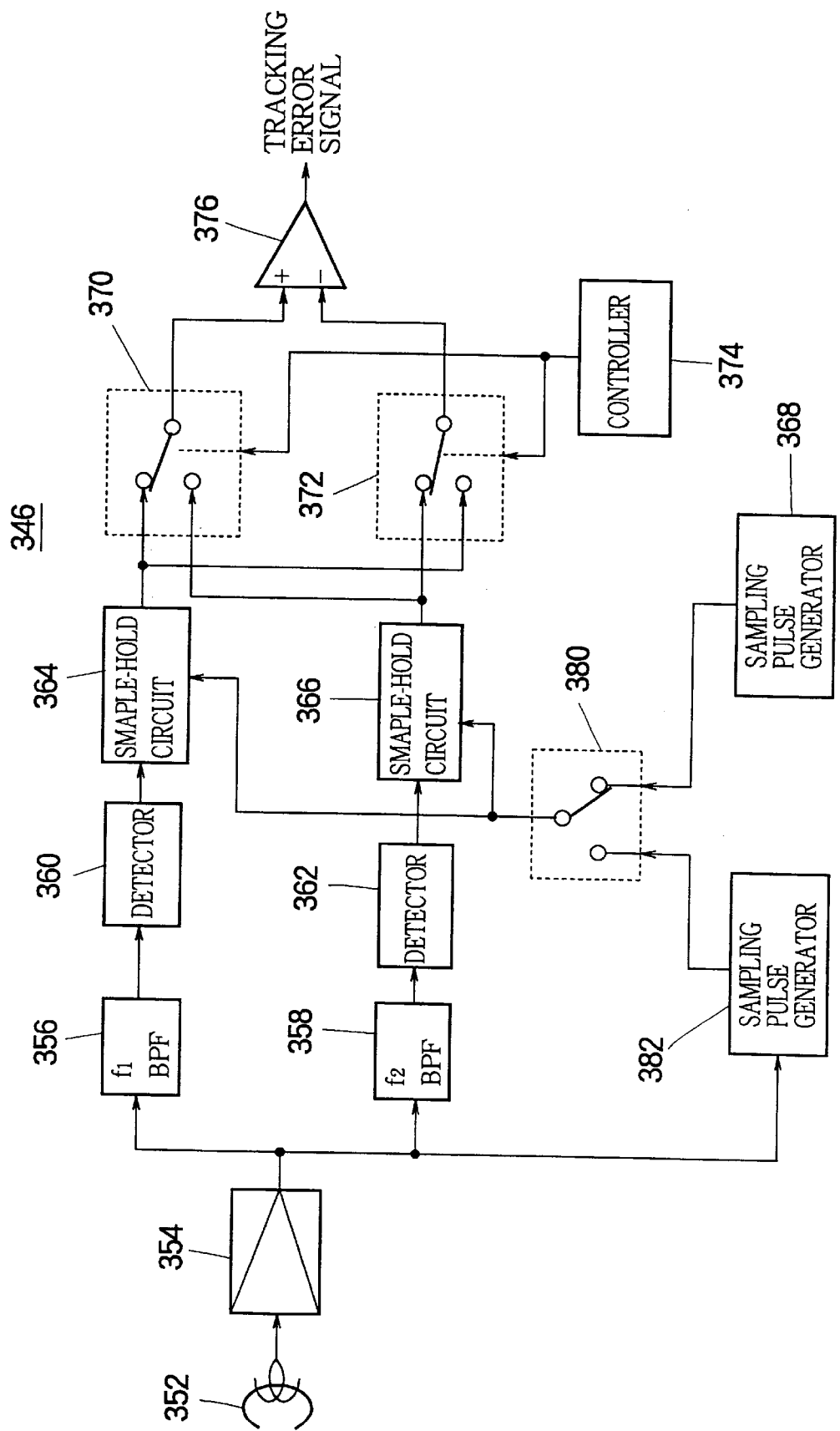
FIG. 43 shows a specific configuration of a tracking error detector according to Embodiment 9 of the invention.

FIG. 43 shows an example of configuration of a tracking error detector. The schematic illustration of the capstan servo system is identical to that illustrated in FIG. 34. The configuration of the tracking error detector shown in FIG. 43 is similar to that of FIG. 34, but a second sampling pulse generator 382 and a selector 380 are added. The selector 380 selectively connects the outputs of the sampling pulse generators 368 and 382 to the sample-hold circuits 364 and 366. The second sampling pulse generator 382 processes the replay signal output from the head amplifier 354 and detects the sync block number. The second sampling pulse generator 354 generates a sampling pulse when it detects the sync block number of the sync block at the center of the area formed of the sync blocks where the fast data for the selected replay speed is recorded, i.e., at the sync block No. 124 at the center of the sync block Nos. 104 to 143 (a0) where +2-time speed replay data and +4-time speed replay data are recorded, during +2-time speed replay or +4-time speed replay, the sync block No. 106 at the center of the sync block Nos. 96 to 115 (b0) where +8-time speed replay data is recorded, during +8-time speed replay, the sync block No. 77 at the center of the sync block Nos. 72 to 81 where +16-time speed replay data is recorded, during +16-time speed replay.

The operation for detecting the tracking error will next be described. Except that the manner of generating the sampling pulses is different, the operation is identical to that of Embodiment 8. Accordingly, the manner of sampling pulse generation will be described. When the fast replay is just started, and the tracking control is not in pull-in state, the selector 380 selects the output of the first sampling pulse generator 368, and the sampling pulse generated from the signal indicative of the drum rotation phase is supplied to the sample-hold circuits 364 and 366. When the system is brought into a state in which the tracking control is nearly in pull-in state, and the replay signal from the areas where the required fast replay signal is recorded is obtained, and sampling pulses are generated from the second sampling pulse generator 388, then the selector 380 selects the output of the second sampling pulse generator 382, and each time the predefined sync block is detected, a sampling pulse is supplied to the sample-hold circuits 364 and 366.

The switching operation of the selector 380 can be controlled by a control means, such as a microcomputer, not shown. For instance, judgement is made whether a sampling pulse is output from the second sampling pulse generator 382 is generated during each ration of the drum, and if a sampling pulse is output from the second sampling pulse generator 382 during each rotation of the drum, then the selector 380 is switched to select the output of the second sampling pulse generator 382. Otherwise, the selector is switched to select the output of the first sampling pulse generator 368.

In the description of Embodiments 8 and 9, the drum configuration is 2 ch×1 type in which two heads provided at positions close to each other. The drum configuration may alternatively be of the 1 ch×2 type in which two heads are at opposite positions, 180° apart on the drum, as described next.

Figure 44:
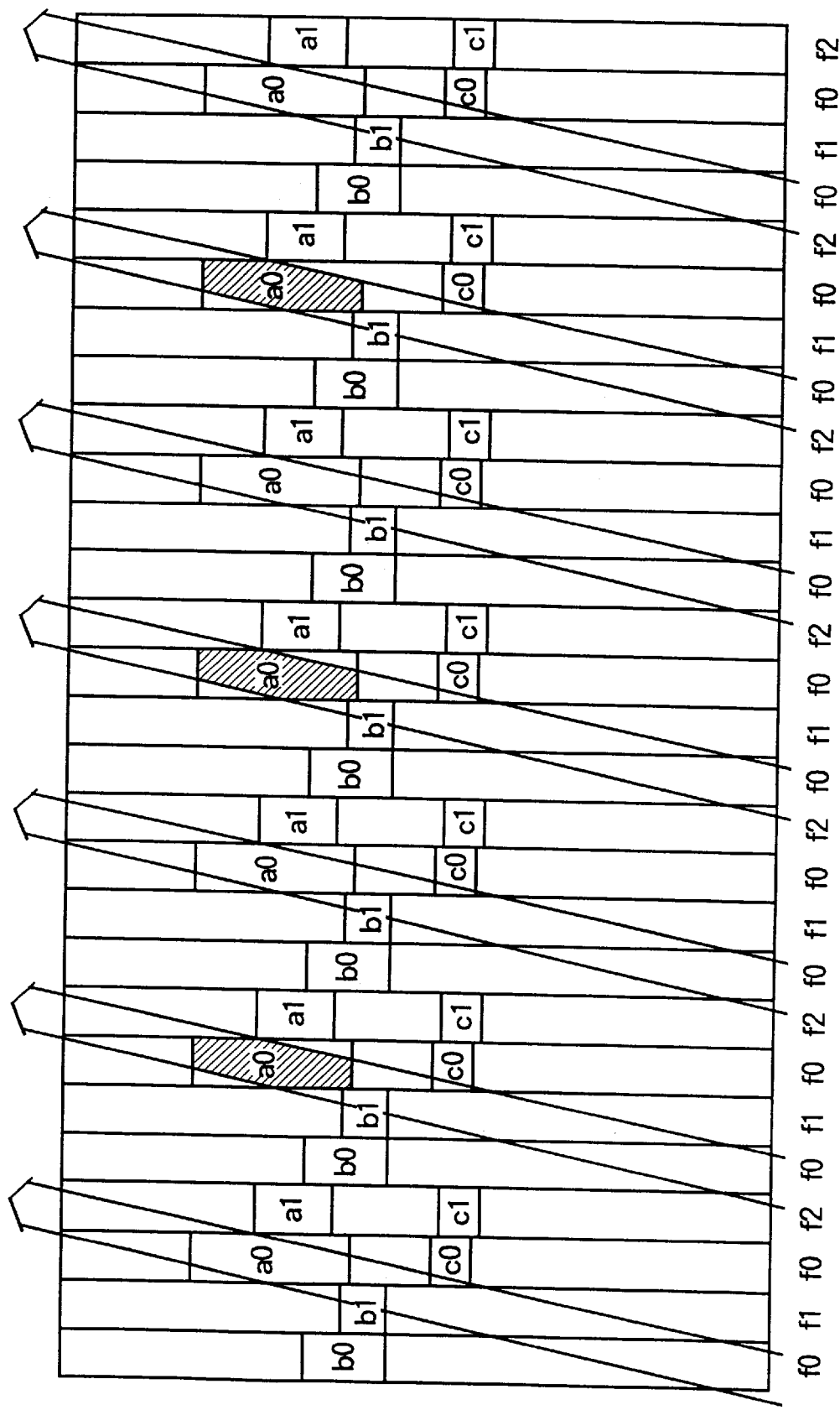
FIG. 44 shows head scanning traces during +4-time speed replay in a digital VTR of a modification of Embodiments 8 and 9.

FIG. 44 shows head scanning traces during +4-time speed replay in a modification of Embodiments 8 and 9. In this case, the head scanning traces of the first head is identical to those of the 2 ch×1 configuration, while the head scanning traces of the second head is different. The fast replay is effected using only the data in the areas a0, b0 or c0 picked up by the first head.

Figure 45:
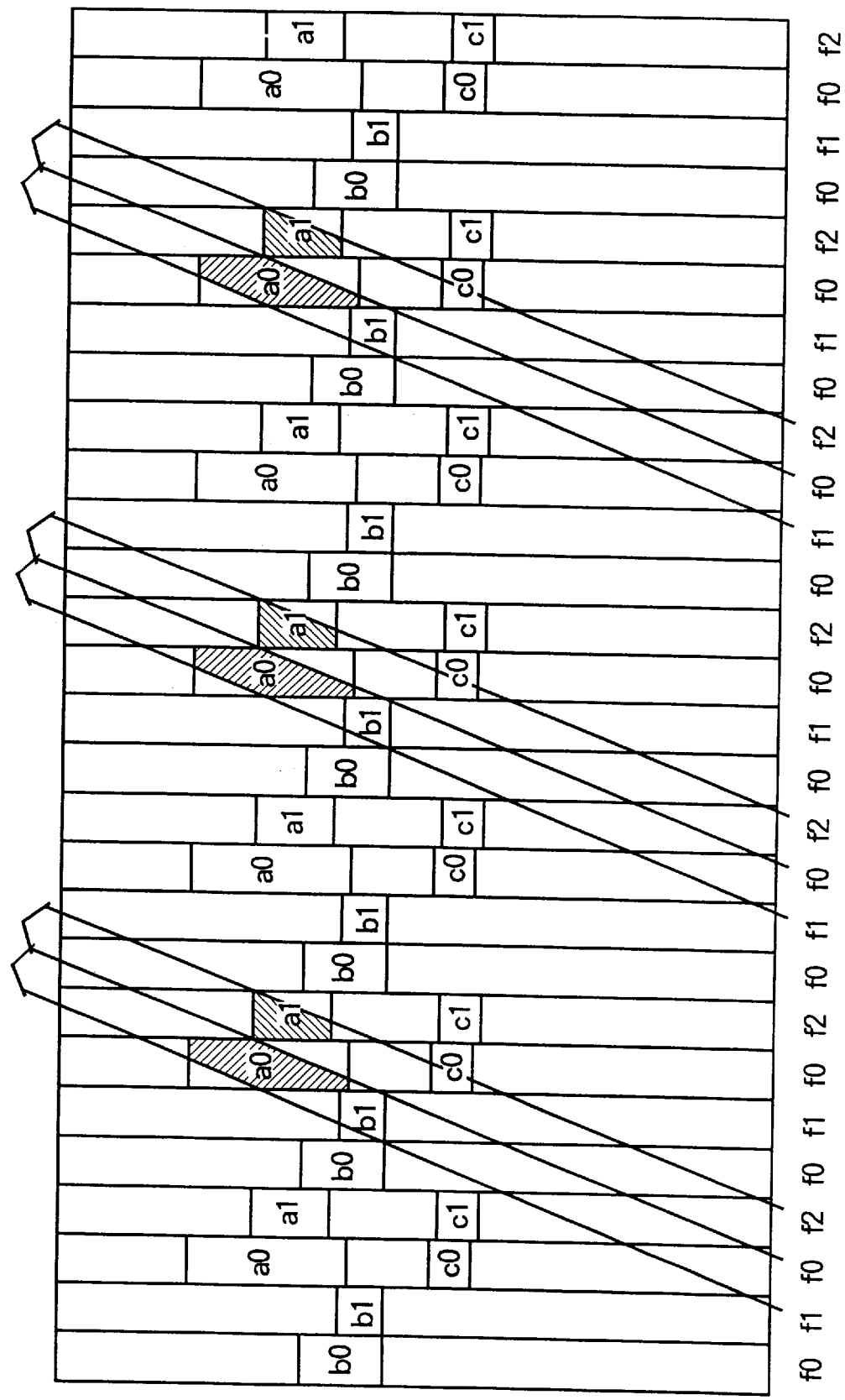
FIG. 45 shows head scanning traces during +4-time speed replay in a digital VTR of another modification of Embodiments 8 and 9.

The above-described tracking control can be achieved even in the 2 ch×2 system configuration in which two heads each are disposed at the opposite positions, 180° apart. FIG. 45 shows head scanning traces during +4-time speed replay in such a system configuration. In comparison with the case where two heads are at positions on the drum close to each other, the angle of inclination of the head scanning traces is different, but the data at both ends of the areas a0, b0 and c0 which cannot be reproduced is supplemented by the data at the areas a1, b1 and c1, so that the fast replay signal can be obtained in a similar manner.

In connection with Embodiments 8 and 9, description is made for the case of +2-, +4-, +8-, +16-, −2-, −6- and −14-time speed replays. But the replay may be at any of +4N- or (−4N+2)-time speed (N being a positive integer), and the the fast replay data may be recorded in positions other than those shown, as far as the data is collectively recorded.

In Embodiments 8 and 9, the pilot signals f1 and f2 of two different frequencies and f0 where none of them is recorded, are used as the pilot signals for tracking. Alternatively, four types of pilot signals may be used, as in 8 mm VTR, for tracking control, and yet similar result will be obtained.

Embodiment 10

In Embodiment 10, replay of a magnetic tape (FIG. 29) having been recorded as in Embodiment 5 will be described. In Embodiment 5, the low-speed fast replay speed was set at a four-time speed, the middle-speed fast replay speed was set at a eight-time speed and the high-speed fast replay speed was set at a 16-time speed. In Embodiment 10, the replay at the respective fast replay speeds will be described.

Figure 46:
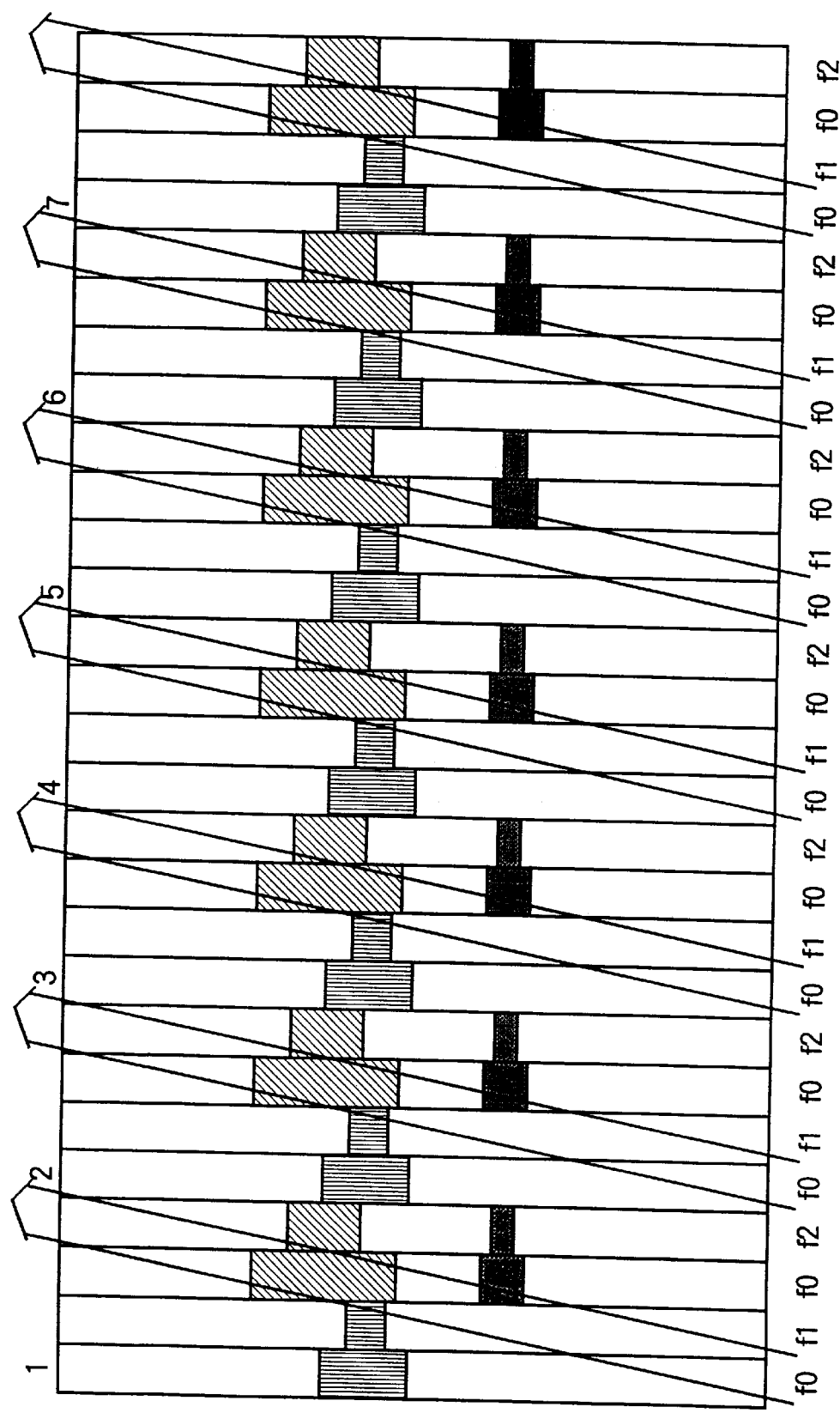
FIG. 46 shows rotary head scanning traces during +4-time speed replay of special replay data of a recording format according to Embodiment 10 of the invention, by means of a 1 ch×2 system.

FIG. 46 shows the rotary head scanning traces followed during four-time speed fast replay of the special replay data in the recording format, using a 1 ch×2 head system, according to Embodiment 10. The arrows indicate the head scanning traces. The servo is locked in the area where four-time speed replay data is recorded. Since two units of the four-time speed replay data is recorded repeatedly, one of the two units is scanned by the A-channel head, while the other is scanned by the B-channel head. In this way, it is possible to reproduce the four-time speed replay data recorded using the A-channel head.

Figure 47:
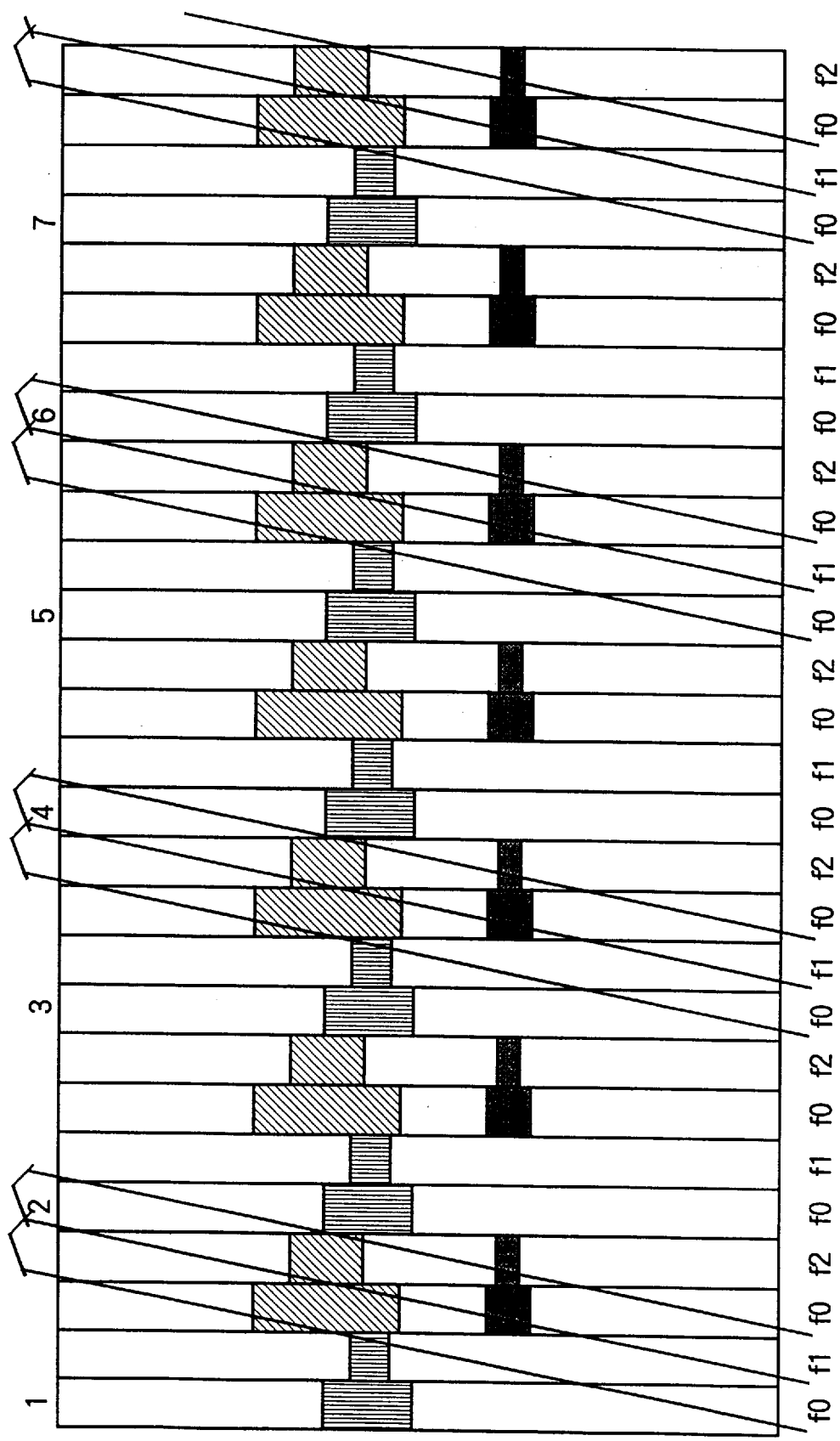
FIG. 47 shows rotary head scanning traces during +4-time speed replay of special replay data of a recording format according to Embodiment 10 of the invention, by means of a 2 ch×1 system.

FIG. 47 shows the rotary head scanning traces followed during four-time speed fast replay of the special replay data in the recording format, using a 2 ch×1 head system, according to Embodiment 10. The arrows indicate the head scanning traces. The servo is locked in the the area where four-time speed replay data is recorded. Since two units of the four-time speed replay data is recorded repeatedly, one of the two units is scanned by either of the 2 ch heads. In this way, it is possible to reproduce the four-time speed replay data recorded using the A-channel head.

Figure 48:
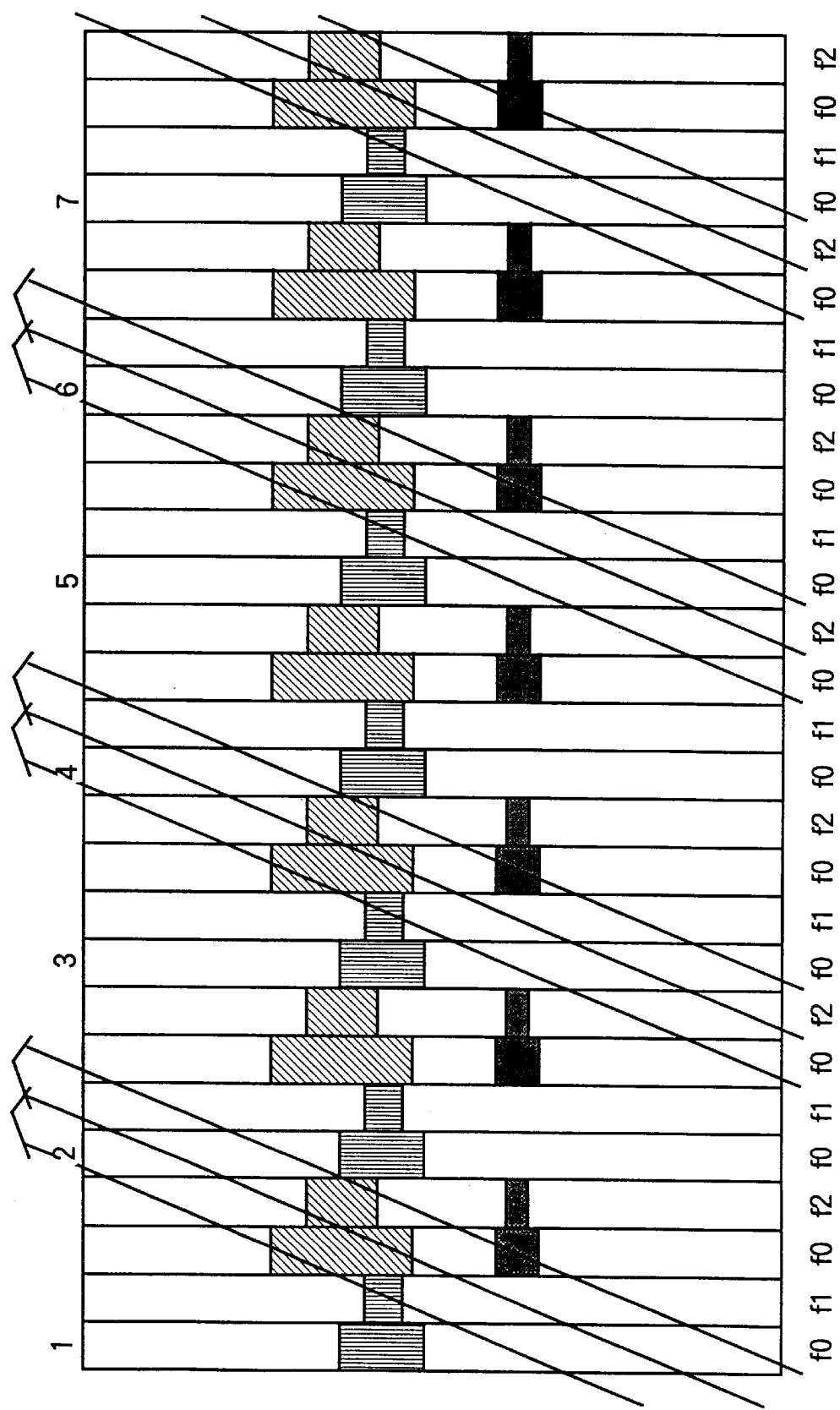
FIG. 48 shows rotary head scanning traces during +4-time speed replay of special replay data of a recording format according to Embodiment 10 of the invention, by means of a 2 ch×2 system.

FIG. 48 shows the rotary head scanning traces followed during four-time speed fast replay of the special replay data in the recording format, using a 2 ch×2 head system, according to Embodiment 10. The arrows indicate the head scanning traces. The servo is locked in the the area where four-time speed replay data is recorded. Since two units of the four-time speed replay data is recorded repeatedly, one of the two units is scanned by either of the 2 ch heads. However, for the reason described in connection with Embodiment 5, not all the four-time speed replay data can be reproduced by the A-channel head alone. However, by synthesis with the four-time speed replay data recorded by the B-channel head and picked up the B-channel head, the replay is possible.

Figure 49:
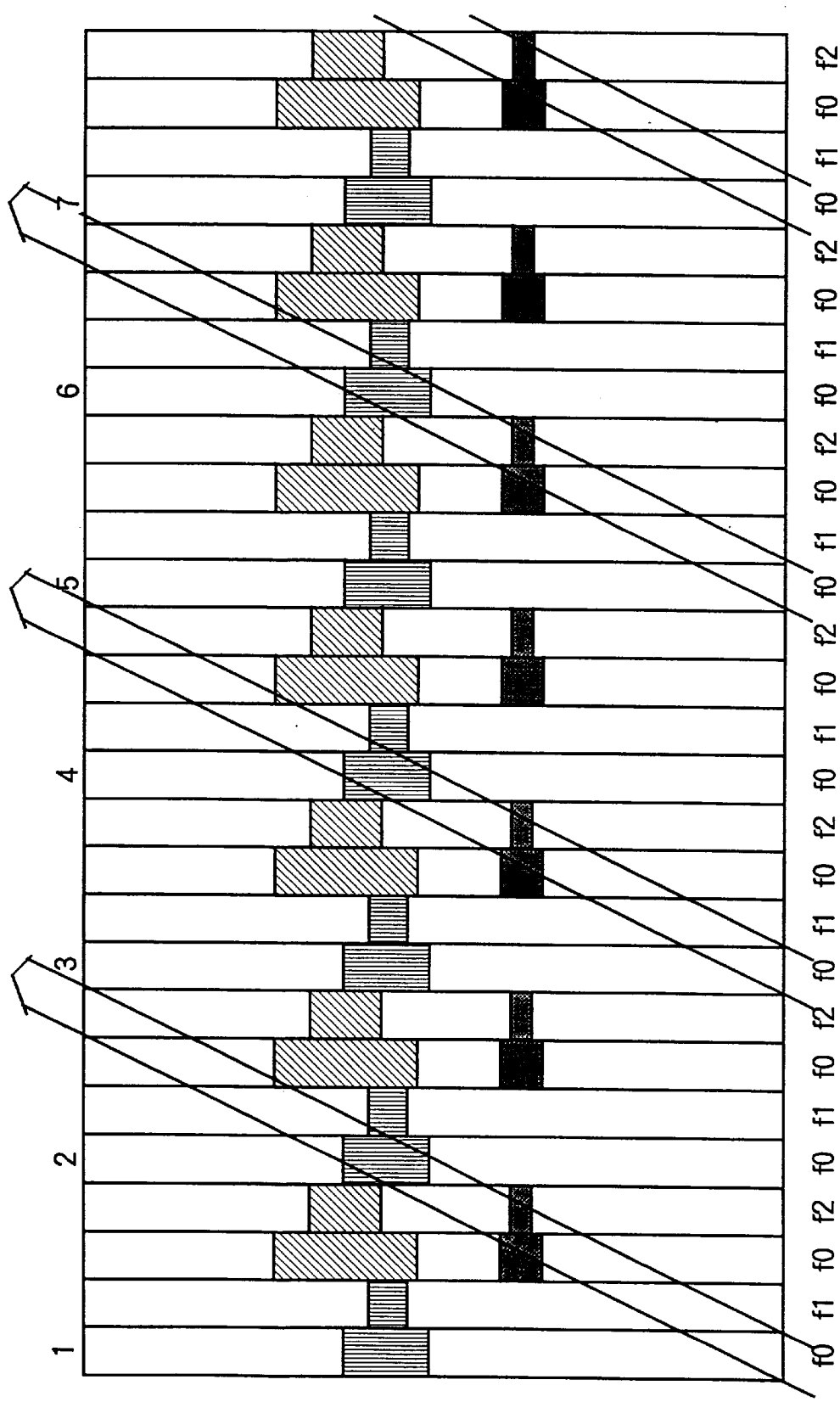
FIG. 49 shows rotary head scanning traces during +8-time speed replay of special replay data of a recording format according to Embodiment 10 of the invention, by means of a 1 ch×2 system.

FIG. 49 shows the rotary head scanning traces followed during eight-time speed fast replay of the special replay data in the recording format, using a 1 ch×2 head system, according to Embodiment 10. The arrows indicate the head scanning traces. The servo is locked in the the area where eight-time speed replay data is recorded. Since four units of the eight-time speed replay data is recorded repeatedly, one of the four units is scanned by the A-channel head, while another of the four units is scanned by the B-channel head. In this way, it is possible to reproduce the eight-time speed replay data recorded using the A-channel head.

Figure 50:
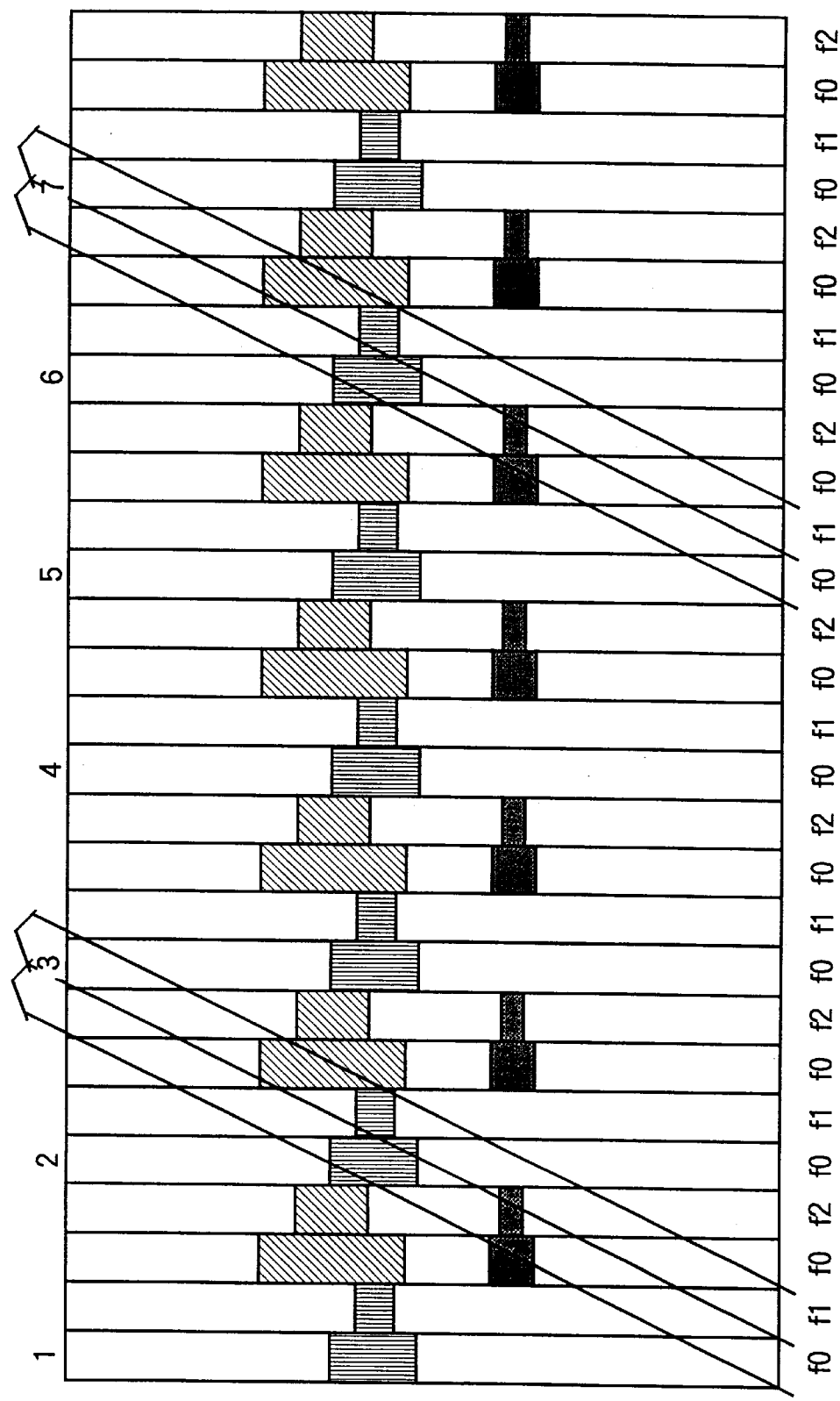
FIG. 50 shows rotary head scanning traces during +8-time speed replay of special replay data of a recording format according to Embodiment 10 of the invention, by means of a 2 ch×1 system.

FIG. 50 shows the rotary head scanning traces followed during eight-time speed fast replay of the special replay data in the recording format, using a 2 ch×1 head system, according to Embodiment 10. The arrows indicate the head scanning traces. The servo is locked in the the area where eight-time speed replay data is recorded. Since four units of the eight-time speed replay data is recorded repeatedly, one of the four units is scanned by either of the 2 ch heads. In this way, it is possible to reproduce the eight-time speed replay data recorded using the A-channel head.

Figure 51:
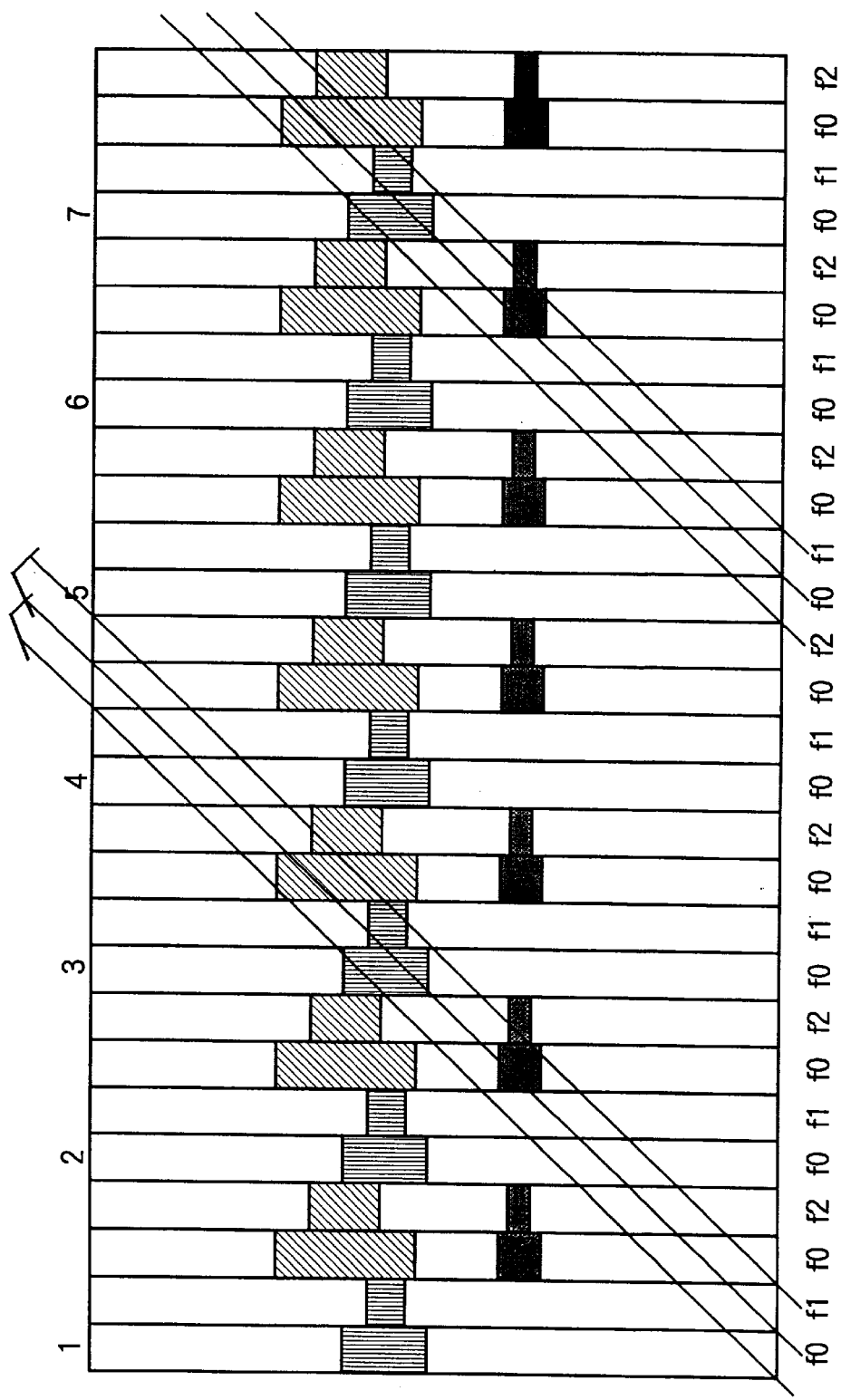
FIG. 51 shows rotary head scanning traces during +8-time speed replay of special replay data of a recording format according to Embodiment 10 of the invention, by means of a 2 ch×2 system.

FIG. 51 shows the rotary head scanning traces followed during eight-time speed fast replay of the special replay data in the recording format, using a 2 ch×2 head system, according to Embodiment 10. The arrows indicate the head scanning traces. The servo is locked in the area where eight-time speed replay data is recorded. Since four units of the eight-time speed replay data is recorded repeatedly, one of the four units is scanned by either of the 2 ch heads. However, for the reason described in connection with Embodiment 5, not all the eight-time speed replay data can be reproduced by the A-channel head alone. However, by synthesis with the eight-time speed replay data recorded by the B-channel head and picked up the B-channel head, the replay is possible.

Figure 52:
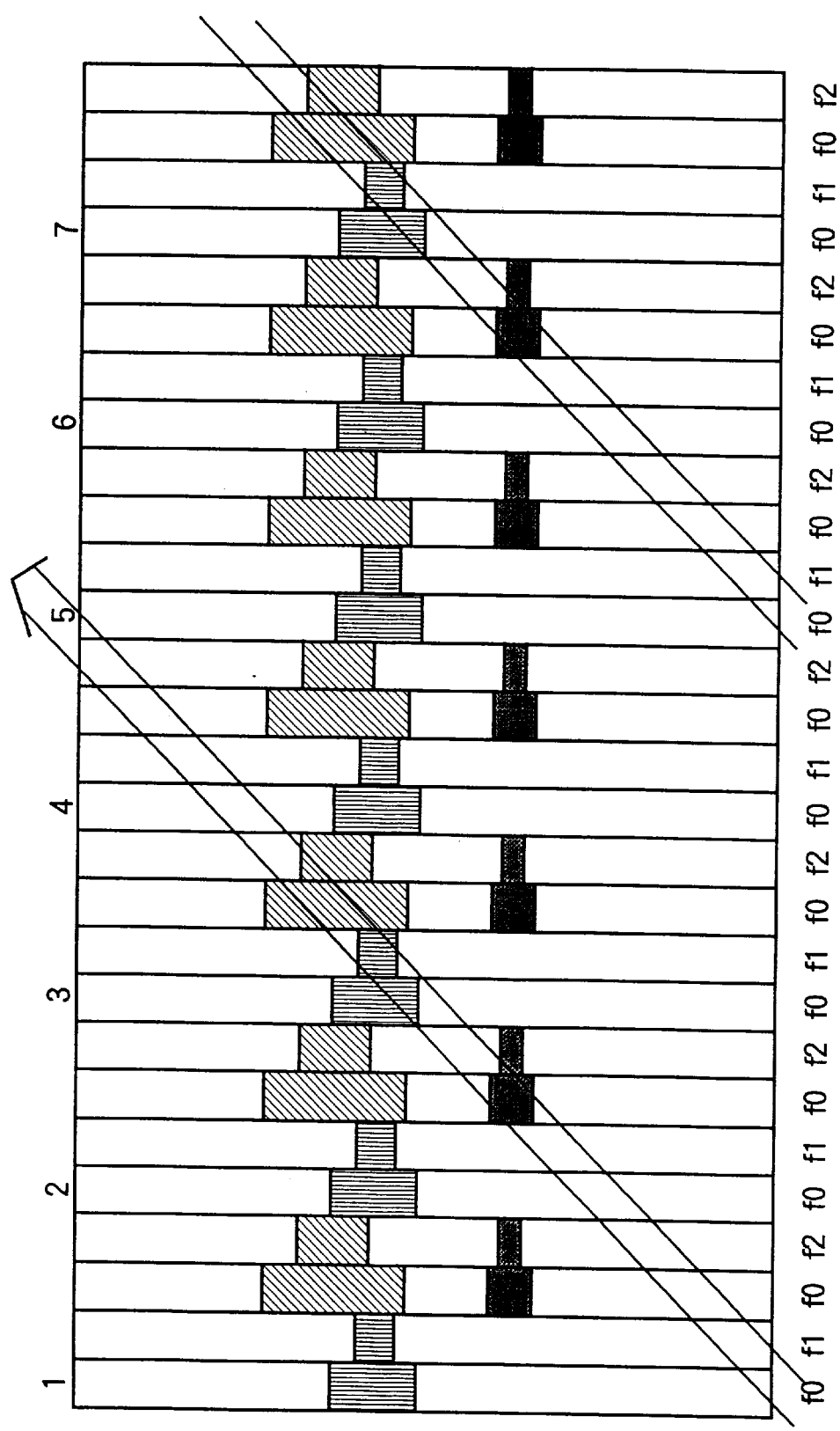
FIG. 52 shows rotary head scanning traces during +16-time speed replay of special replay data of a recording format according to Embodiment 10 of the invention, by means of a 1 ch×2 system.

FIG. 52 shows the rotary head scanning traces followed during 16-time speed fast replay of the special replay data in the recording format, using a 1 ch×2 head system, according to Embodiment 10. The arrows indicate the head scanning traces. The servo is locked in the the area where 16-time speed replay data is recorded. Since eight units of the 16-time speed replay data is recorded repeatedly, one of the eight units is scanned by the A-channel head, while another of the eight units is scanned by the B-channel head. In this way, it is possible to reproduce the 16-time speed replay data recorded using the A-channel head.

Figure 53:
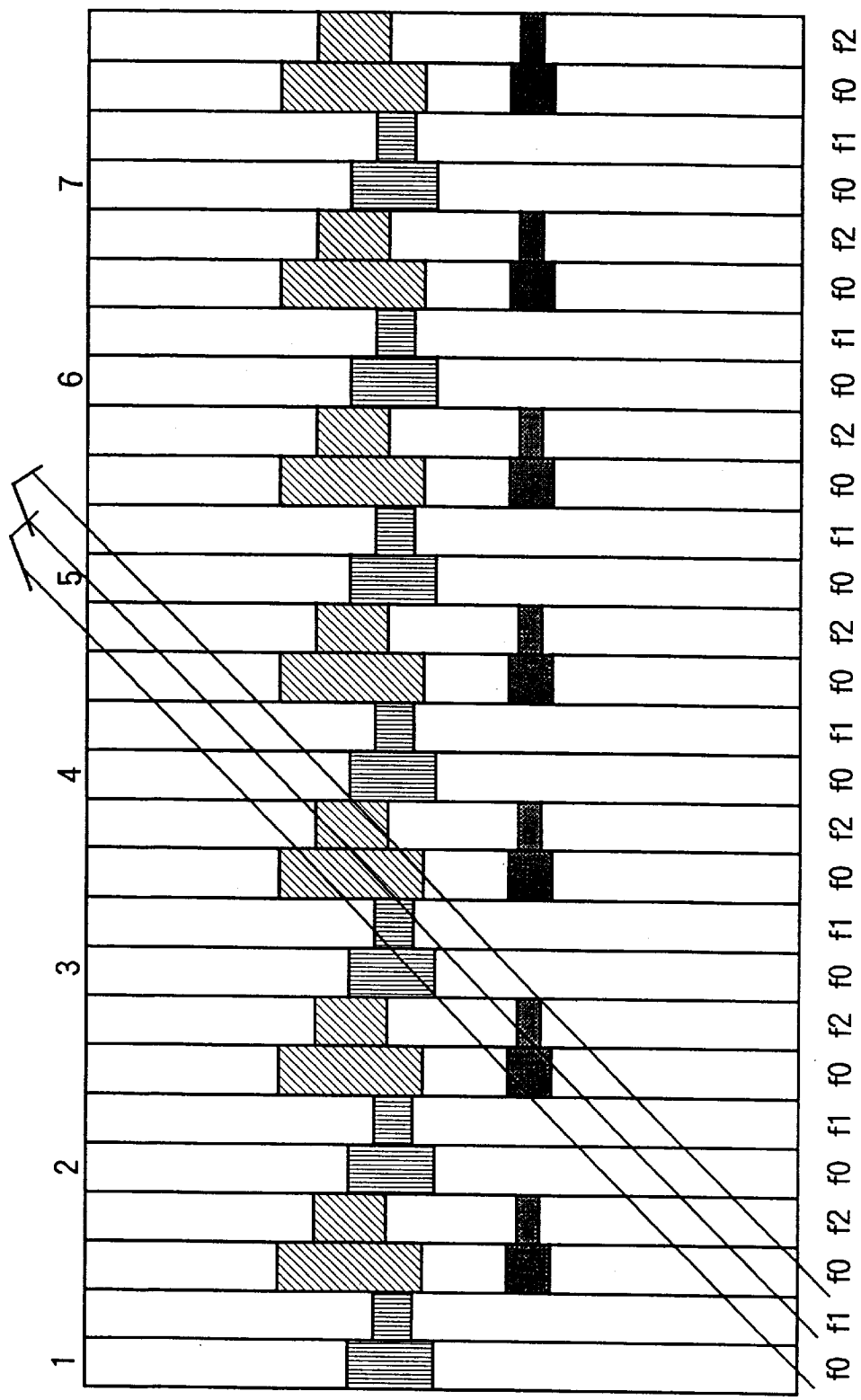
FIG. 53 shows rotary head scanning traces during +16-time speed replay of special replay data of a recording format according to Embodiment 10 of the invention, by means of a 2 ch×1 system.

FIG. 53 shows the rotary head scanning traces followed during 16-time speed fast replay of the special replay data in the recording format, using a 2 ch×1 head system, according to Embodiment 10. The arrows indicate the head scanning traces. The servo is locked in the area where 16-time speed replay data is recorded. Since eight units of the 16-time speed replay data is recorded repeatedly, one of the eight units is scanned by either of the 2 ch heads. In this way, it is possible to reproduce the 16-time speed replay data recorded using the A-channel head.

Figure 54:
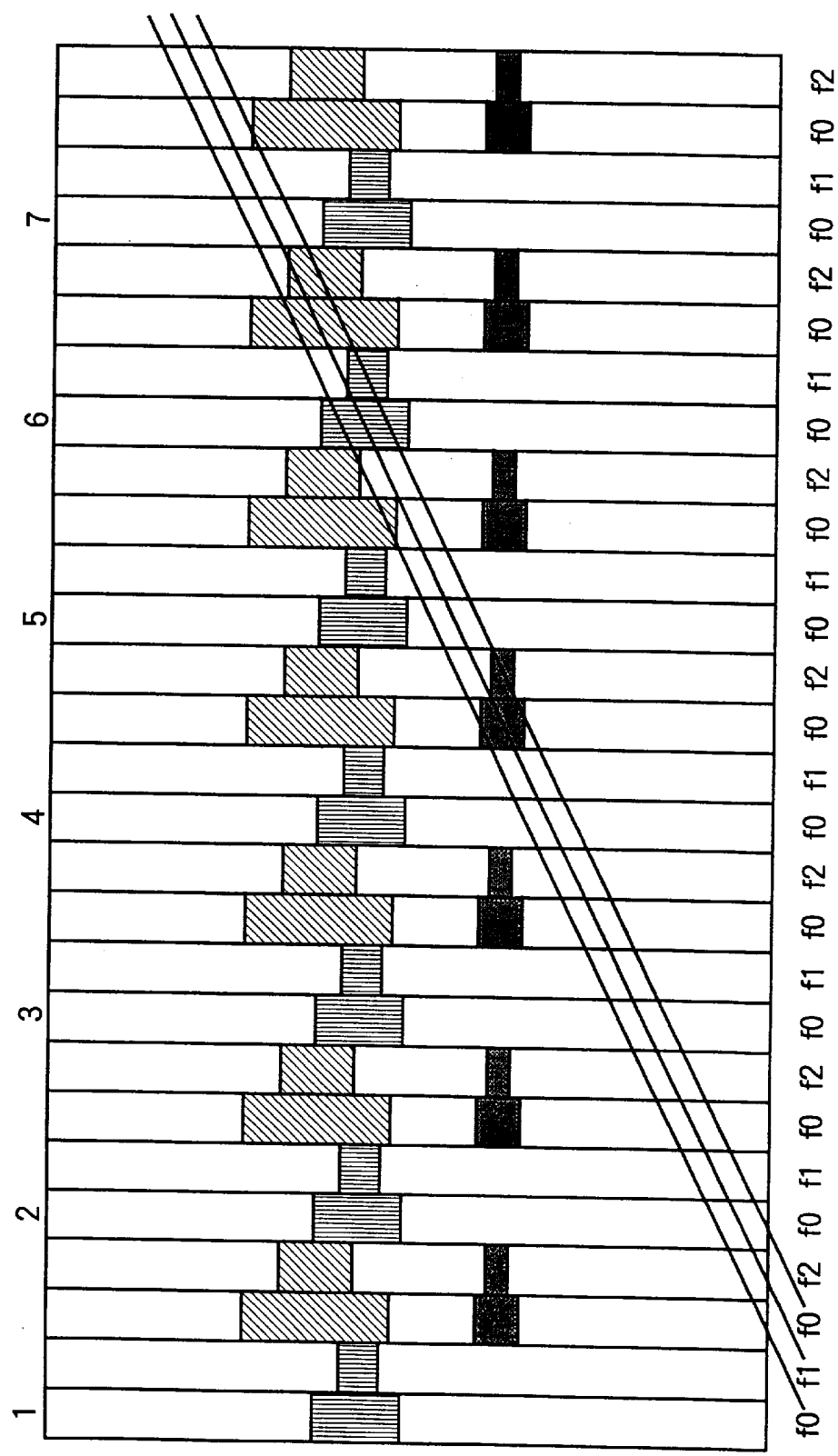
FIG. 54 shows rotary head scanning traces during +16-time speed replay of special replay data of a recording format according to Embodiment 10 of the invention, by means of a 2 ch×2 system.

FIG. 54 shows the rotary head scanning traces followed during 16-time speed fast replay of the special replay data in the recording format, using a 2 ch×2 head system, according to Embodiment 10. The arrows indicate the head scanning traces. The servo is locked in the area where 16-time speed replay data is recorded. Since eight units of the 16-time speed replay data is recorded repeatedly, one of the eight units is scanned by either of the 2 ch heads. However, for the reason described in connection with Embodiment 5, not all the 16-time speed replay data can be reproduced by the A-channel head alone. However, by synthesis with the 16-time speed replay data recorded by the B-channel head and picked up the B-channel head, the replay is possible.

The processing during replay will next be described.

Figure 55:
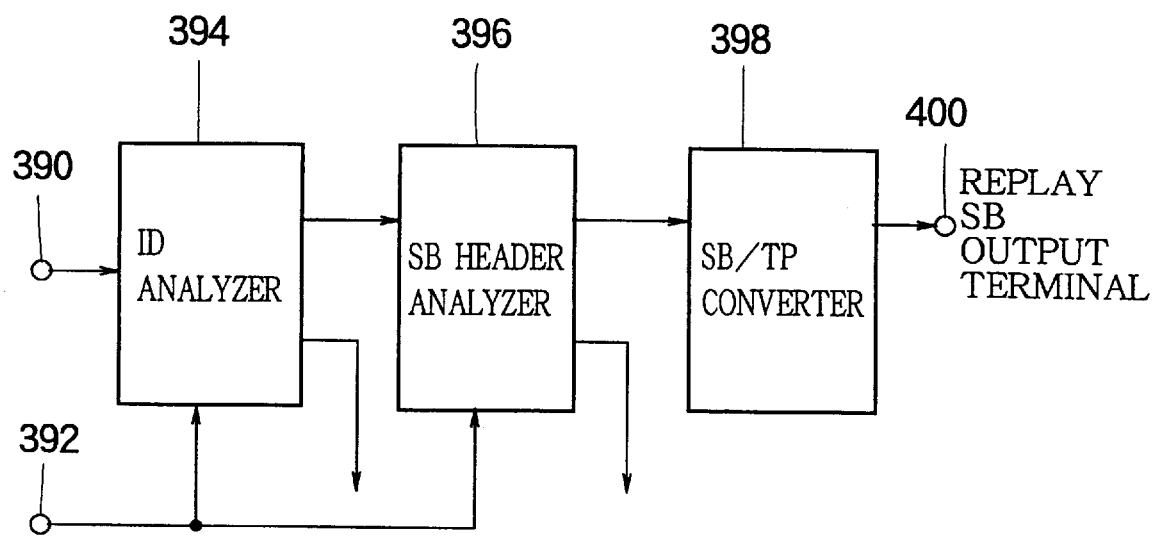
FIG. 55 is a block diagram showing a signal processor after the error correction decoding in a replay system according to Embodiment 10.

FIG. 55 shows a circuit for signal processing after the error correction decoding in the replay system according to Embodiment 10. Reference numeral denotes 390 a replay data input terminal for input of replay data, 392 denotes a mode signal input terminal for input of a mode signal from a system controller or the like, 394 denotes an ID analyzer for analyzing the ID of the sync block and selecting the replay data, 396 denotes an SB header analyzer for analyzing the header appended for each sync block and selecting the replay data, 398 denotes an SB/TP converter for converting the replayed sync block into transport packets, and 400 denotes a replay SB output terminal.

The replay operation of the signal processing circuit will next be described. The replay data received at the replay data input terminal (having received error correction decoding of the SD specification), is input to the ID analyzer 394. A signal indicating the replay mode is also input mode input terminal 392, and then to the ID analyzer 394. On the basis of the mode signal, the ID analyzer 394 judges whether the normal replay or the special replay is selected, and outputs the normal replay data recorded in the main areas, to the next stage. If the special replay is selected, the data recorded in the special replay areas is output, sync block by sync block, to the next stage. In each of the replay mode, data for the other replay mode is discarded. Whether each sync block is from the main areas or from the special replay areas is determined from the ID or the header appended for each sync block.

The data selected and output by the ID analyzer 394 is input to the SB header analyzer 396. On the basis of the replay mode signal, the SB header analyzer 396 is informed of the speed of the fast replay and outputs the sync blocks corresponding to the speed of the fast replay. The data from the special replay areas which do not correspond to the replay mode signal is discarded. During normal replay, the input data is output as is. The discrimination is made on the basis of the ID or the header appended for each sync block.

The data output from the SB header analyzer 396 is input to the SB/TP converter 398, which converts the sync blocks into transport packets, and output via replay SB output terminal 400.

In this way, only the data recorded in the main areas is used during normal replay, while only the data recorded in the special replay areas is used in the special replay at various replay speeds. Both the normal replay and special replay at various speeds can thus be achieved.

Embodiment 11

In Embodiment 11, replay of a magnetic tape having been recorded as in Embodiment 7 will be described. In Embodiment 7, like Embodiment 5, the low-speed fast replay speed was set at a four-time speed, the middle-speed fast replay speed was set at an eight-time speed and the high-speed fast replay speed was set at a 16-time speed. In Embodiment 11, the replay at the respective fast replay speeds is performed in the same way as in Embodiment 10.

Figure 56:
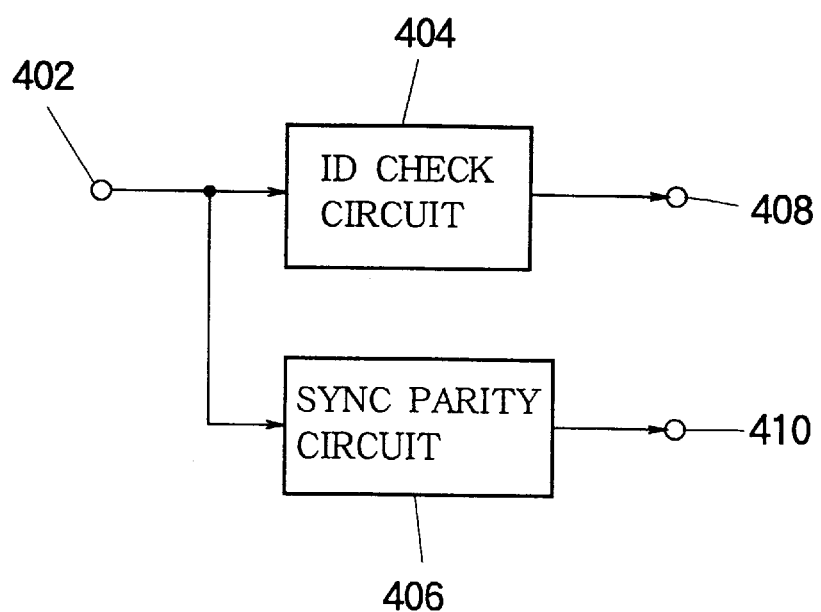
FIG. 56 is a block diagram showing a signal processor before error correction decoding in a replay system according to Embodiment 11.

The processing during replay will first be described. FIG. 56 is a circuit for processing after the error correction decoding in the replay system of Embodiment 11. In the drawing, reference numeral 402 denotes a replay data input terminal, 404 denotes an ID check circuit for checking whether the IDs are corrected reproduced, 406 denotes a sync parity circuit for checking the digital data within sync block after the ID, 408 denotes a replay data output terminal, and 410 denotes a flag output terminal.

The operation of the signal processing circuit will next be described. The replay data received at the replay data input terminal 402 is supplied to the ID check circuit 404, which checks the ID of the sync block of the replay data. If the ID is correctly reproduced, the data of the sync block is output via the replay data output terminal 408. The replay data received at the replay data input terminal is also supplied to the sync parity check circuit 406, which checks the digital data within the sync block and output a flag indicating the result of the check, via the flag output terminal 410. If it is found, as a result of the check of the digital data using the sync parity that an error is contained, the flag via the flag output terminal 410 indicates to the error correction decoder in the next stage, that the data being output via the replay data output terminal 408 may contain an error. In this way, it is possible to promptly detects input of replay data containing a burst error to the error correction decoder, and to detect erroneous correction at the error correction decoder.

The error correction decoder performs error correction using the c1 code 330 and C2 code 331 shown in FIG. 32. The processing of data output from the error correction decoder is similar to the processing after the error correction decoding (FIG. 55) described in connection with Embodiment 10.

In this way, only the data recorded in the main areas is used during the normal replay, while only the data recorded in special replay areas is used during special replay at various replay speeds, and normal replay and special replay at various speeds can be achieved.

In Embodiment 11, the flag is output to the error correction decoder. As an alternative, a grate circuit may be provided, and decision may be made as to whether or not the replay data should be supplied to the error correction decoder based on the flag. With such an arrangement, the data containing a burst error can be detected promptly.

Embodiment 12

In Embodiment 12, description is made of the format in which the transports packets are recorded in fixed areas such as sync blocks.

Figure 57:
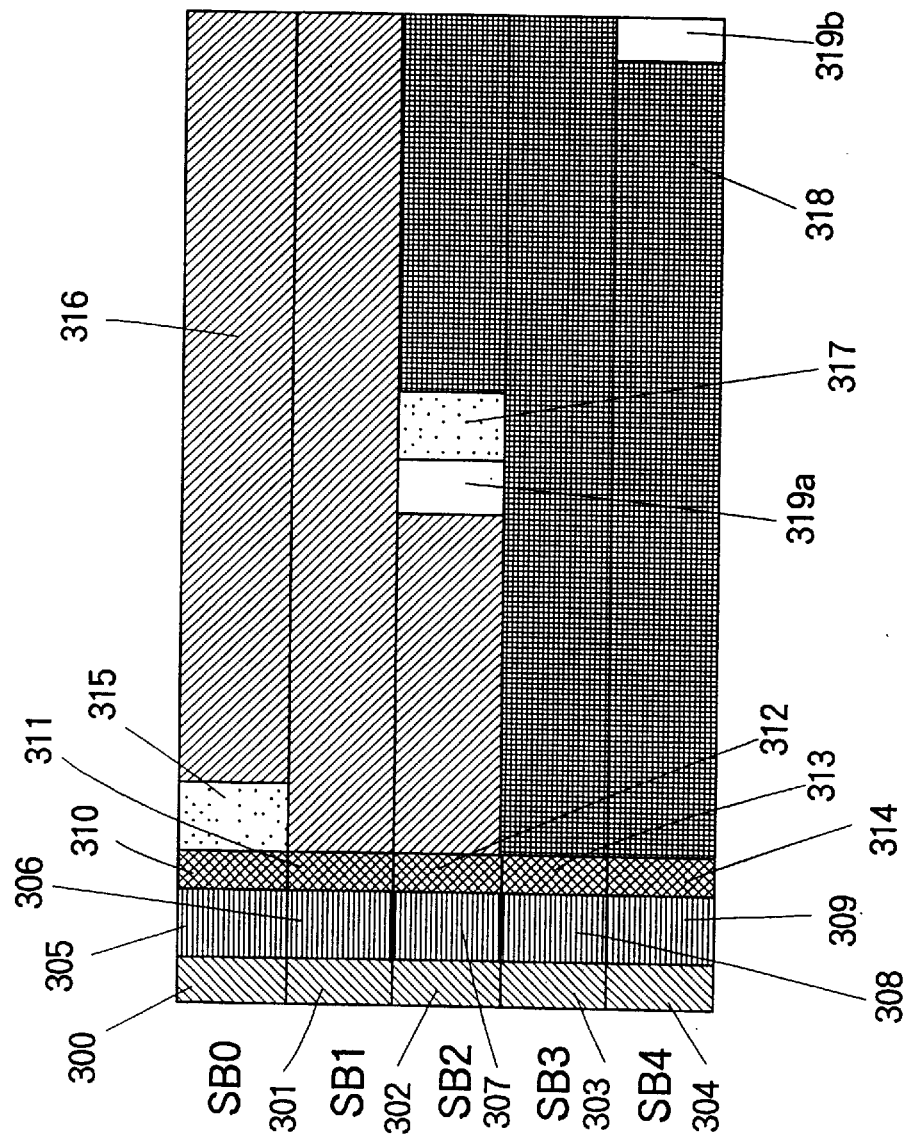
FIG. 57 shows an example of data packet according to Embodiment 12.

FIG. 57 shows an example of data packet according to Embodiment 12. This data packet format is basically identical to the format in which five sync blocks are recorded in two transport packets according to Embodiment 7. In the drawing, reference numeral 300 denotes a sync of a sync block 0 (SB0), 301 denotes a sync of a sync block 1 (SB1), 302 denotes a sync of a sync block 2 (SB2), 303 denotes a sync of a sync block 3 (SB3), and 304 denotes a sync of a sync block 4 (SB4). Reference numeral 305 denotes ID of SB0, 306 denotes ID of SB1, 307 denotes ID of SB2, 308 denotes ID of SB3, and 309 denotes ID of SB4. Reference numeral 310 denotes a header appended to SB0, 311 denotes a header appended to SB1, 312 denotes a header appended to SB2, 313 denotes a header appended to SB3, and 314 denotes a header appended to SB4. Reference numeral 315 denotes a transport header of the transport packet A, 316 denotes data of the transport packet A, 317 denotes a transport header B of the transport packet B, and 318 denotes data of the transport packet B. Reference numerals 319*a* and 319*b* denote dummy areas.

Description is made of SB0. ID 305 and header 310 contain an address for identifying the particular sync block within the five sync blocks, a signal indicating whether normal replay data or special replay data is recorded, a signal for identifying the speed where the special replay data is recorded, a signal for indicating the identity of data for several units needed since identical special replay data is recorded for several units and discriminating from the special replay data recorded in the succeeding several units, and a signal for identifying the assembly of the five sync blocks, for each unit of the five blocks, and a signal indicating whether the central part of the screen (picture) of an intra-frame or intra-field. In this embodiment, address identifying each sync block within the group of five sync blocks and a signal indicating whether normal replay data or special replay data is contained are recorded in ID 305, and the remainder is recorded in the header 310 disposed after the ID, for each sync block.

SB1, SB2, SB3 and SB4 record an ID and a header, like SB0. In this embodiment, the size of the sync block is 82 bytes (excluding the C1 area), the size of each sync is 2 bytes, the size of each ID is 3 bytes, and the size of each header is one byte. The size of the transport packet is 188 bytes. Accordingly, two transport packets (188×2=376 bytes) can be recorded in the data regions of five sync blocks (76×5=300 bytes). The remaining four byte may be allocated for dummy areas 319*a* and 319*b*, shown in FIG. 57, two bytes each, and a predefined values may be recorded there. In this way, two transport packets can be recorded in five sync blocks.

Figure 58:
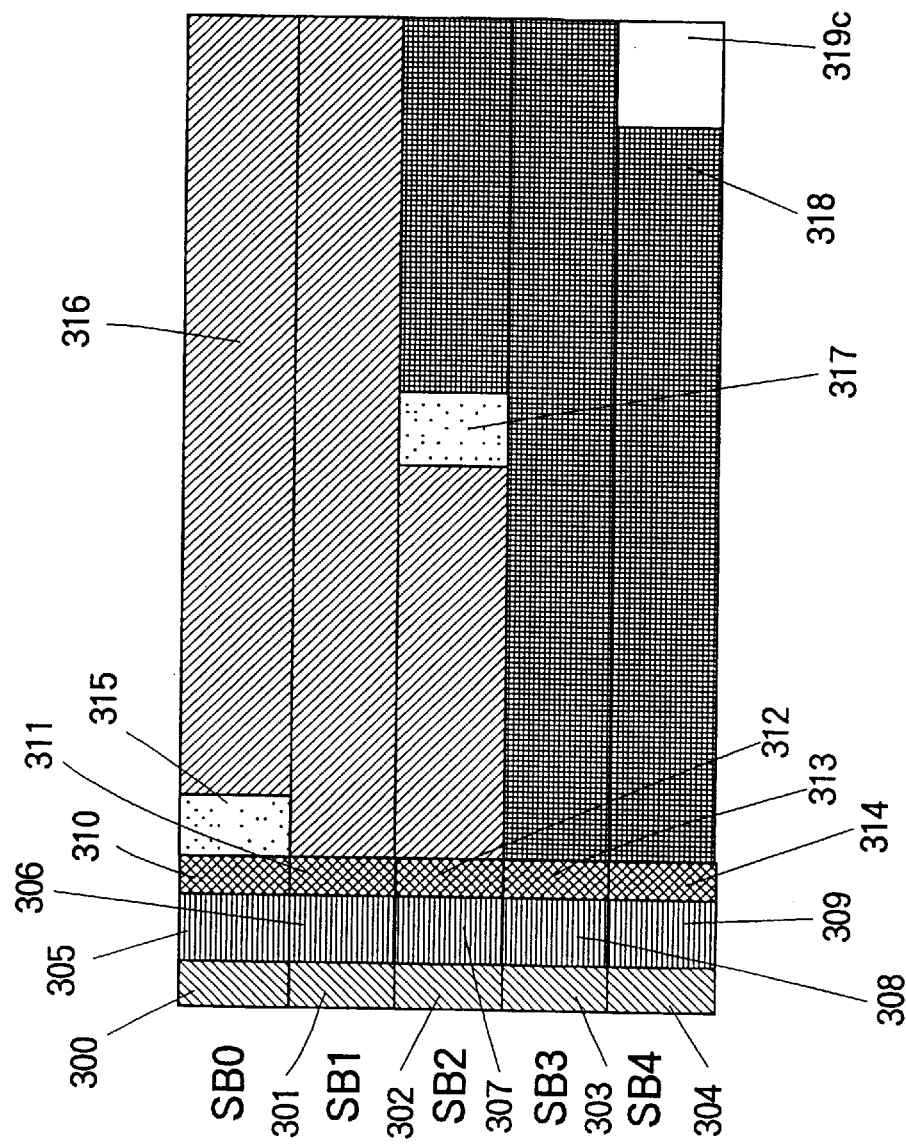
FIG. 58 shows another example of data packet according to Embodiment 12.

FIG. 58 shows a modification of the data packet format of FIG. 57. It is similar to that of FIG. 57. But in place of the two dummy areas 319*a* and 319*b*, a single dummy area 319*c* is provided, and four bytes of predefined values may be recorded in the dummy area 319*c*.

In the above-described embodiment, the size of the header is one byte. By removing, at the time of recording, the byte indicating the synchronization within the transport header, the size of the transport packet can be reduced, and the area spared may be added to form a larger header. Necessary signals other than those described in this embodiment may be recorded in the area spared in that way.

In this way, an identical format may be used in the main areas and the special replay areas, and reproduction can be made in the form of transport packets. It is therefor unnecessary to newly form transport packets at the time of replay.

Embodiment 13

Embodiment 13 relates to an arrangement with which a password can be recorded together with a video program, and the recorded video program can be replayed only upon input of a password identical to the password recorded with the program. By the use of a password, the program can be protected from unauthorized replay. The password can be recorded in the area which is used as the dummy area in Embodiment 12.

Figure 59:
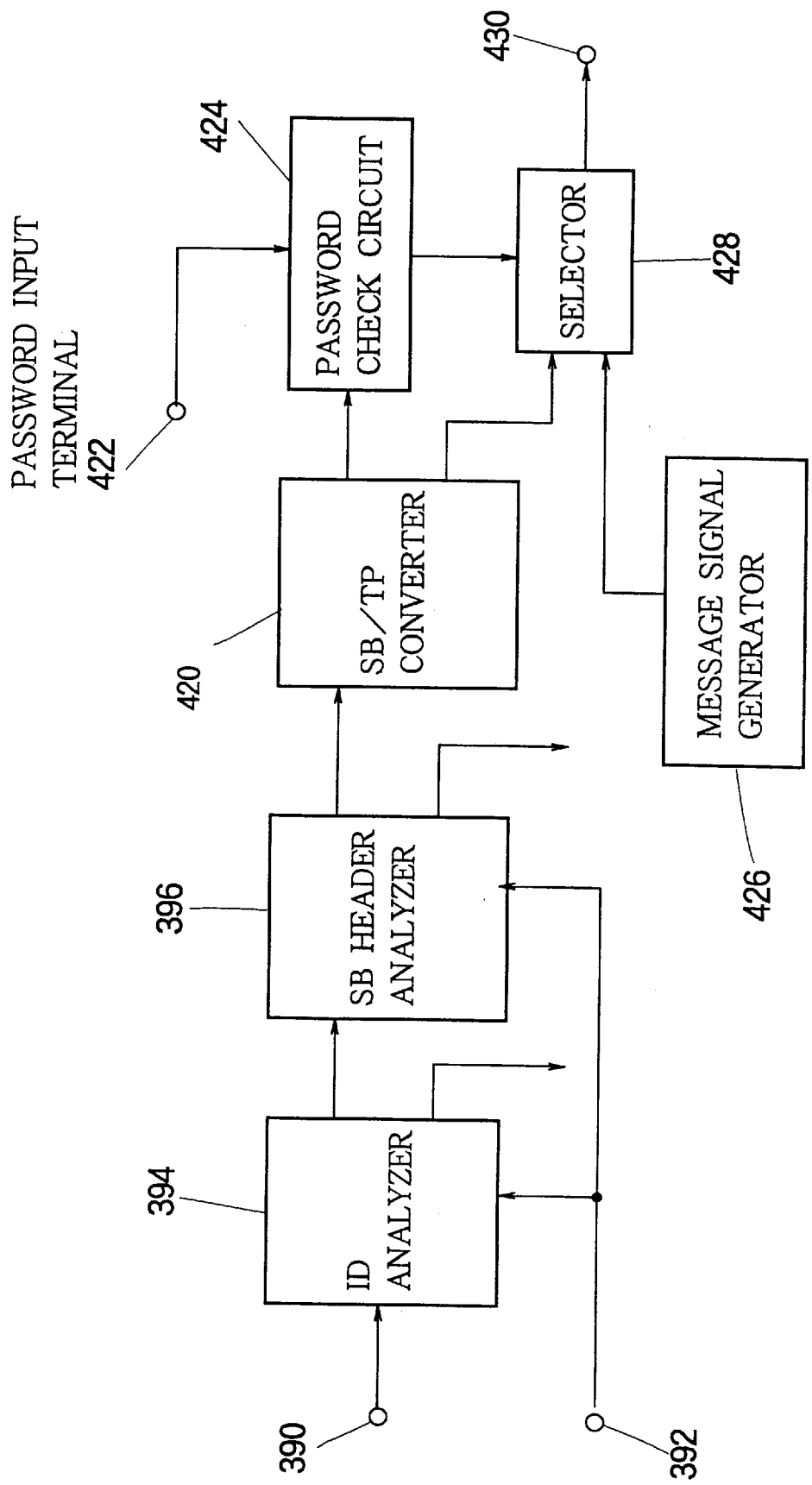
FIG. 59 is a lock diagram showing a signal processor after error correction decoding in a replay system according to Embodiment 13.

FIG. 59 is a circuit for signal processing after the error correction decoding in the replay system according to Embodiment 13. In the drawing, reference numerals 390 to 396 denote members identical to those in FIG. 55. Reference numeral 420 denotes an SB/TP converter for converting the sync blocks into transport packets, and separating the password from the replay data. Reference numeral 422 denotes a password input terminal for input of a password by a user, and 424 denotes a password check circuit for comparing the password input by the user wit the password from the replay data. Reference numeral 426 denotes a message signal generator for generating a video signal for displaying a message to the user (viewer) indicating that the recorded program is accompanied with a password, and cannot be replayed unless a correct password is input. The message signal is selected and output when the recorded program being reproduced from the tape is accompanied with a password, and no password is input by the user (viewer) at the time of replay, or the password input by the user (viewer) at the time of repay does not match the recorded password. Reference numeral 430 denotes a replay SB output terminal.

FIG. 60A and FIG. 60B show the configuration of the password area according to Embodiment 13. In FIG. 60A, reference numeral 440 denotes a dummy area 319*a* or dummy area 319*b* in FIG. 57. Subareas 441, 442, 443 and 444, each having four bits, are formed by dividing the dummy area 440 into four, and are called password subareas A, B, C and D.

In FIG. 60B, reference numeral 450 denotes a dummy area 319*c* in FIG. 58. Subareas 451, 452, 453 and 454, each having eight bits, are formed by dividing the dummy area 440 into four, and are called password subareas E, F, G and H.

Since the password subareas 441 to 444 each have four bits, each password subarea can express a number of 0 to 9, so that password of four digits can be recorded. Since the password subareas 451 to 454 each has one byte, each subarea can record an English aliphabetic letter, or a number, so a password of four digits, each digit being either a number or an English aliphabetic letter, can be recorded. The password can be set by the user at the time of recording a program, and recorded. When the user does not set the password, a predefined value, e.g., of "1" for all the bits, may be recorded to indicate that no password has been set.

Now the description is made of replay operation. The replay sync blocks are input to the SB/TP converter 420, where five sync blocks are synthesized, and two transport packets are extracted from the five sync blocks. The data (of four digits) recorded at the password area is extracted, and supplied to the password check circuit 424, while the transport packet is supplied to the selector 428. The data from the password area is checked by the password check circuit 424. If the data is of a predefined value, i.e., if the data consists of bits which are all "1" in the example under consideration, then the program is treated as being not protected by a password. If the data from the password area is not of the predefined value, and if a password is input by the user (viewer), which is supplied via the password input terminal 422 to the password check circuit 424, the input password is compared with the recorded password. If they match, the processing will be the same as in the case where the password is not recorded, and the selector 428 is made to select the transport packets forming the replay data. If the passwords do not match, or if no password is input by the user (and if the recorded program is accompanied with a password) the selector 428 is made to select the signal from the message signal generator 426, and a message is displayed, indicating that the program is protected by a program and cannot be replayed unless a correct password is input. It may alternatively be so arranged that when no password is input while the recorded program is protected by a password a message prompting the user to input a password is displayed, and when a wrong password is input a message indicating the input password is wrong, and a correct password should be input is displayed.

When the program is protected by a password, and a correct password is not input, display of the program is inhibited. This is achieved by the operation of the selector 428, which does not select the transport packets forming the replay data. Additionally (or alternatively), the tape transport and head scanning may also be stopped, unless or until a correct password is input.

With the configuration and operation described above, it is possible to protect the program from being seen by an unauthorized user.

Embodiment 14

In Embodiment 10, replay is performed at a speed set by Embodiment 5. In Embodiment 14, replay is performed from special replay areas for a specific speed, at a speed lower than the specific speed.

Figure 61:
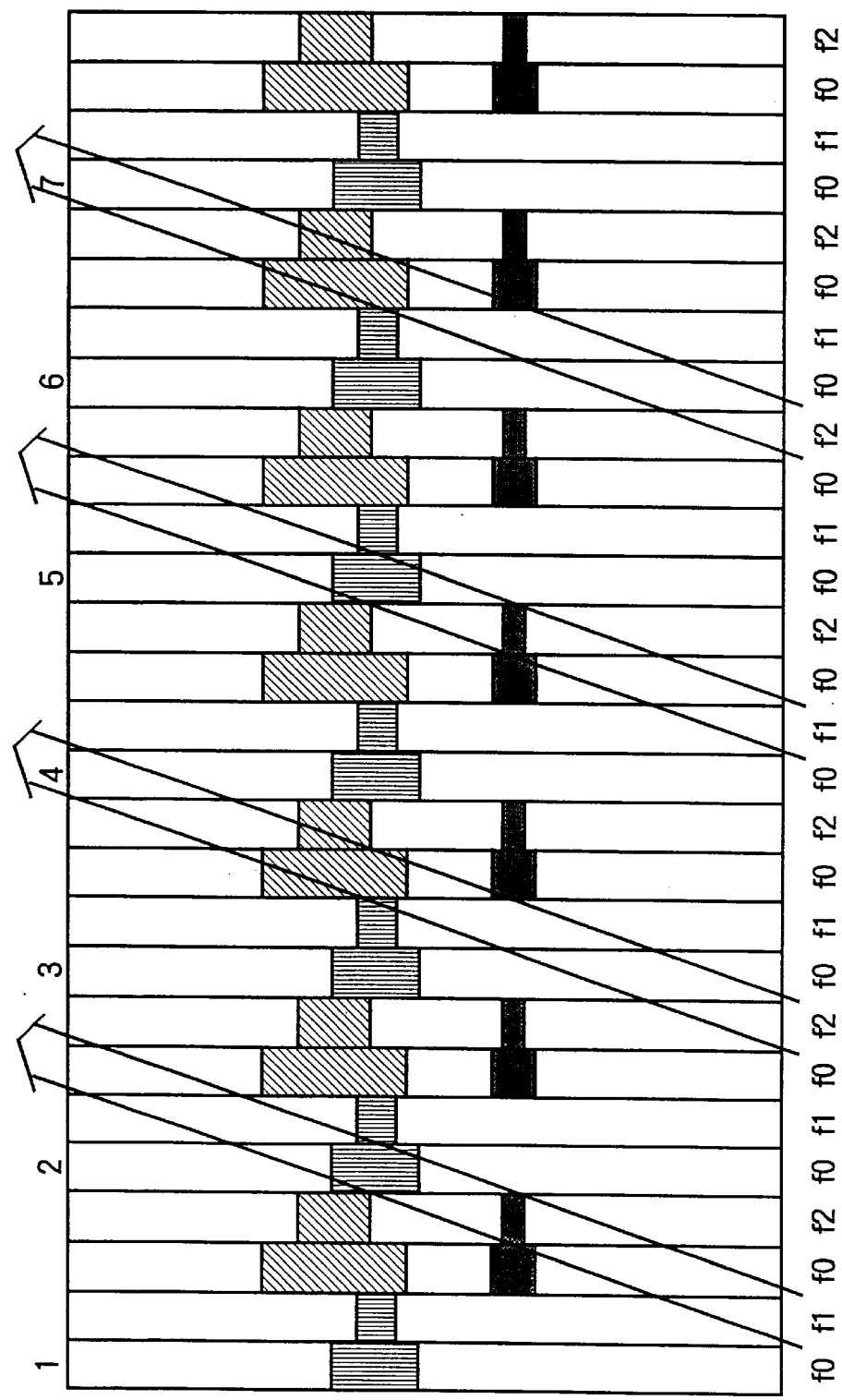
FIG. 61 shows rotary head scanning traces during +6-time speed replay of 8-time speed relay data of a recording format according to Embodiment 14 of the invention, by means of a 1 ch×2 system.

FIG. 61 shows head scanning traces of the rotary head during six-time speed replay of eight-time speed replay data in a recording format of FIG. 29, using a 1 ch×2 head system, according to Embodiment 14. The arrows indicate the head scanning traces. The special replay data for the six-time speed replay is obtained by reproducing the eight-time speed replay data, four units of which are repeatedly recorded in the eight-time speed replay areas. When reproducing at a six-time speed from the eight-time speed replay areas, the servo is locked at the eight-time speed replay areas. By this method, identical special replay data may be reproduced twice. In that case, one of them is discarded, to achieve replay at a six-time speed.

Figure 62:
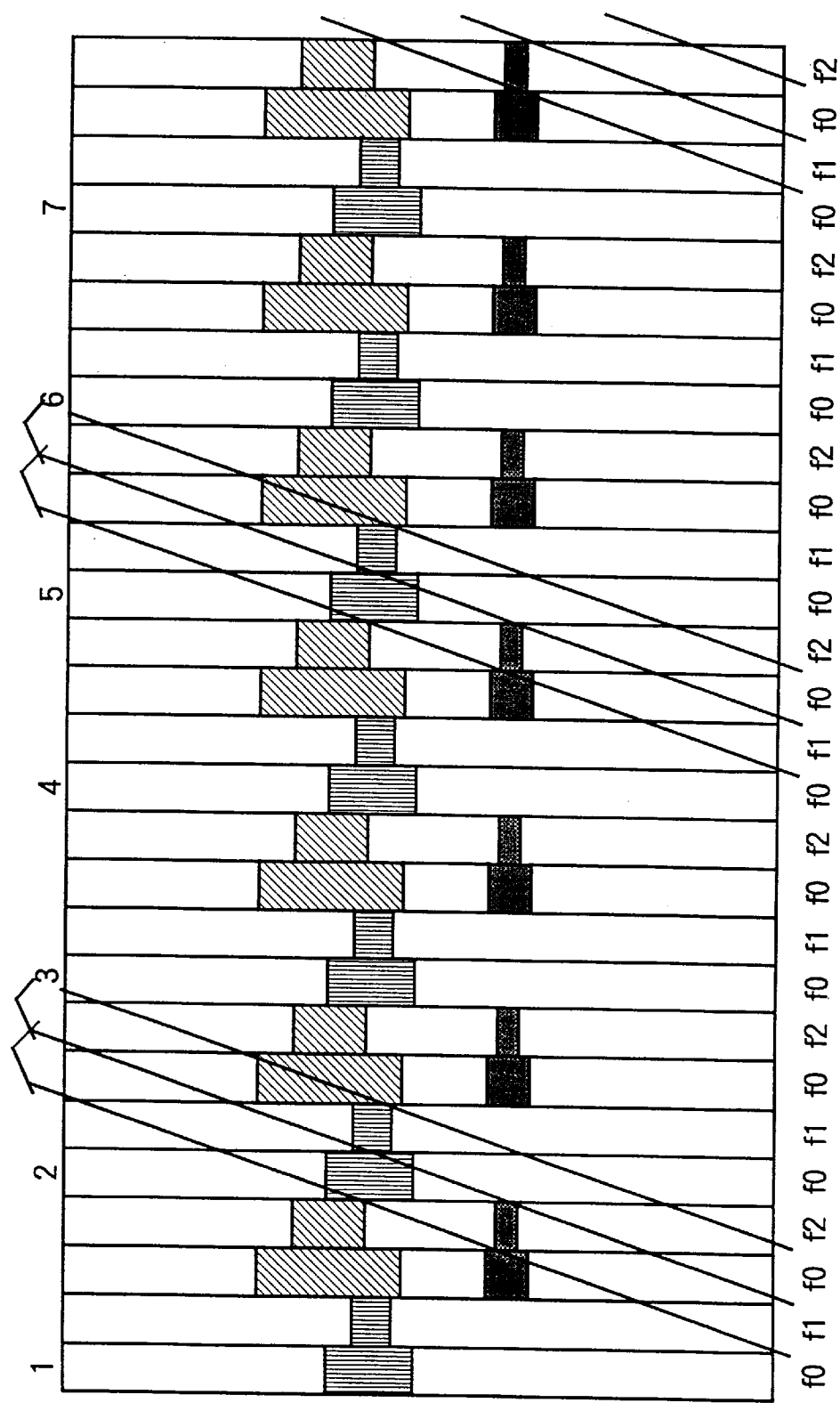
FIG. 62 shows rotary head scanning traces during +6-time speed replay of 8-time speed relay data of a recording format according to Embodiment 14 of the invention, by means of a 2 ch×1 system.

FIG. 62 shows head scanning traces of the rotary head during six-time speed replay of eight-time speed replay data in a recording format of FIG. 29, using a 2 ch×1 head system, according to Embodiment 14. The arrows indicate the head scanning traces. The special replay data for the six-time speed replay is obtained by reproducing the eight-time speed replay data, four units of which are repeatedly recorded in the eight-time speed replay areas. When reproducing at a six-time speed from the eight-time speed replay areas, the servo is locked at the eight-time speed replay areas. By this method, identical special replay data may be reproduced twice. In that case, one of them is discarded, to achieve replay at a six-time speed.

Figure 63:
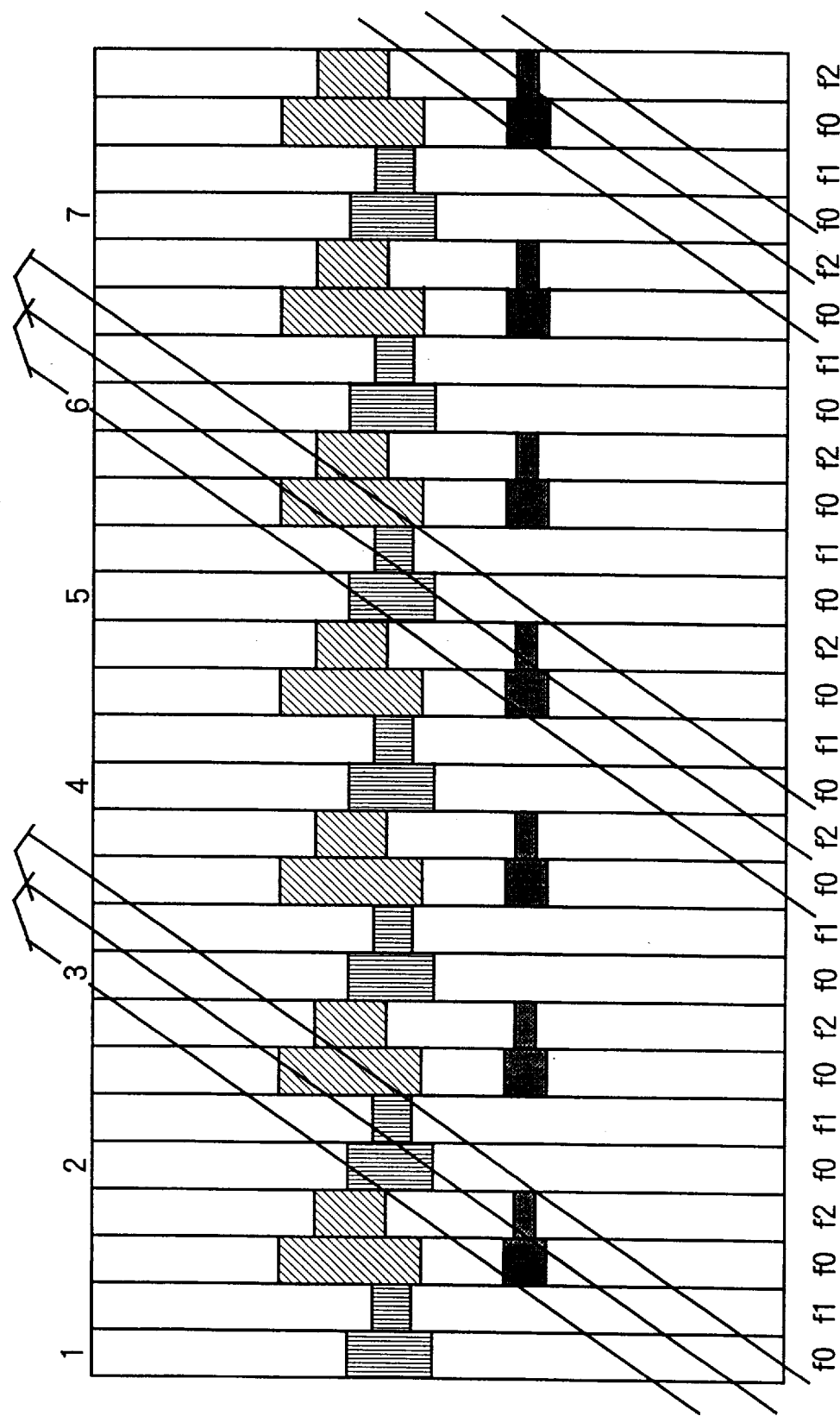

FIG. 63 shows head scanning traces of the rotary head during six-time speed replay of eight-time speed replay data in a recording format of FIG. 29, using a 2 ch×2 head system, according to Embodiment 14. The arrows indicate the head scanning traces. The special replay data for the six-time speed replay is obtained by reproducing the eight-time speed replay data, four units of which are repeatedly recorded in the eight-time speed replay areas. When reproducing at a six-time speed from the eight-time speed replay areas, the servo is locked at the eight-time speed replay areas. By this method, identical special replay data may be reproduced twice. In that case, one of them is discarded, to achieve replay at a six-time speed.

In Embodiment 14, description is made of the cases where the replay from the eight-time speed areas is conducted at a six-time speed. But the inventive concept described above can be applied to situations where replay from special replay areas for a set replay speed is conducted at a replay speed lower than the set speed.

Embodiment 15

In Embodiment 15, replay is made from special replay areas for a specific replay speed, at a replay speed higher than the specific replay speed. Description is made for the case in which replay is effected from the areas for four-time speed in Embodiment 5, at 12-time speed.

Figure 64:
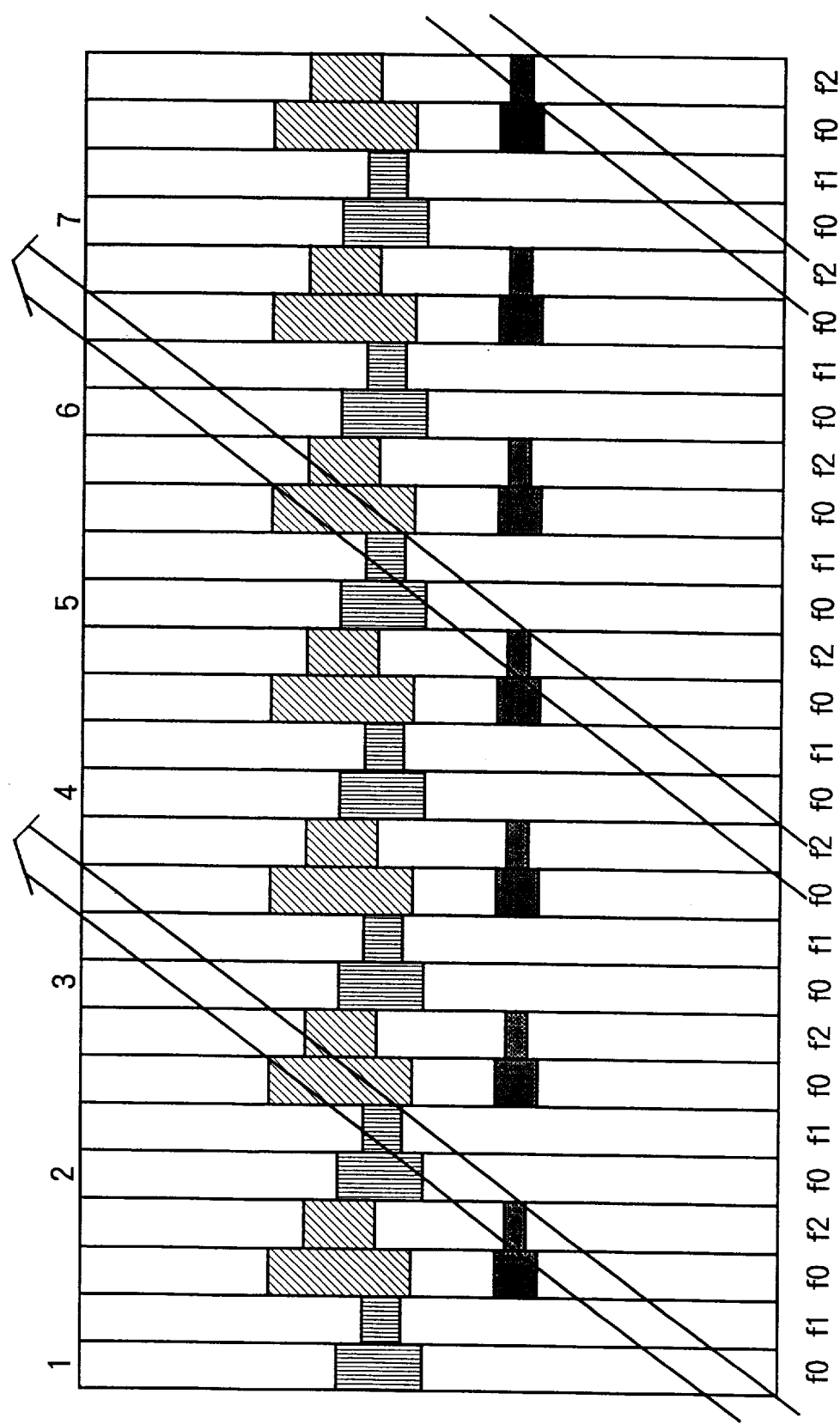
FIG. 64 shows rotary head scanning traces during +6-time speed replay of 8-time replay data of a recording format according to Embodiment 14 of the invention, by means of a 2 ch×2 system.

FIG. 64 shows head scanning traces of the rotary head during twelve-time speed replay of four-time speed replay data in a recording format of FIG. 29, using a 1 ch×2 head system, according to Embodiment 15. The arrows indicate the head scanning traces. The special replay data for the twelve-time speed replay is obtained by reproducing the four-time speed replay data, two units of which are repeatedly recorded in the four-time speed replay areas. When reproducing at a twelve-time speed from the four-time speed replay areas, the servo is locked at the four-time speed replay areas.

Figure 65:
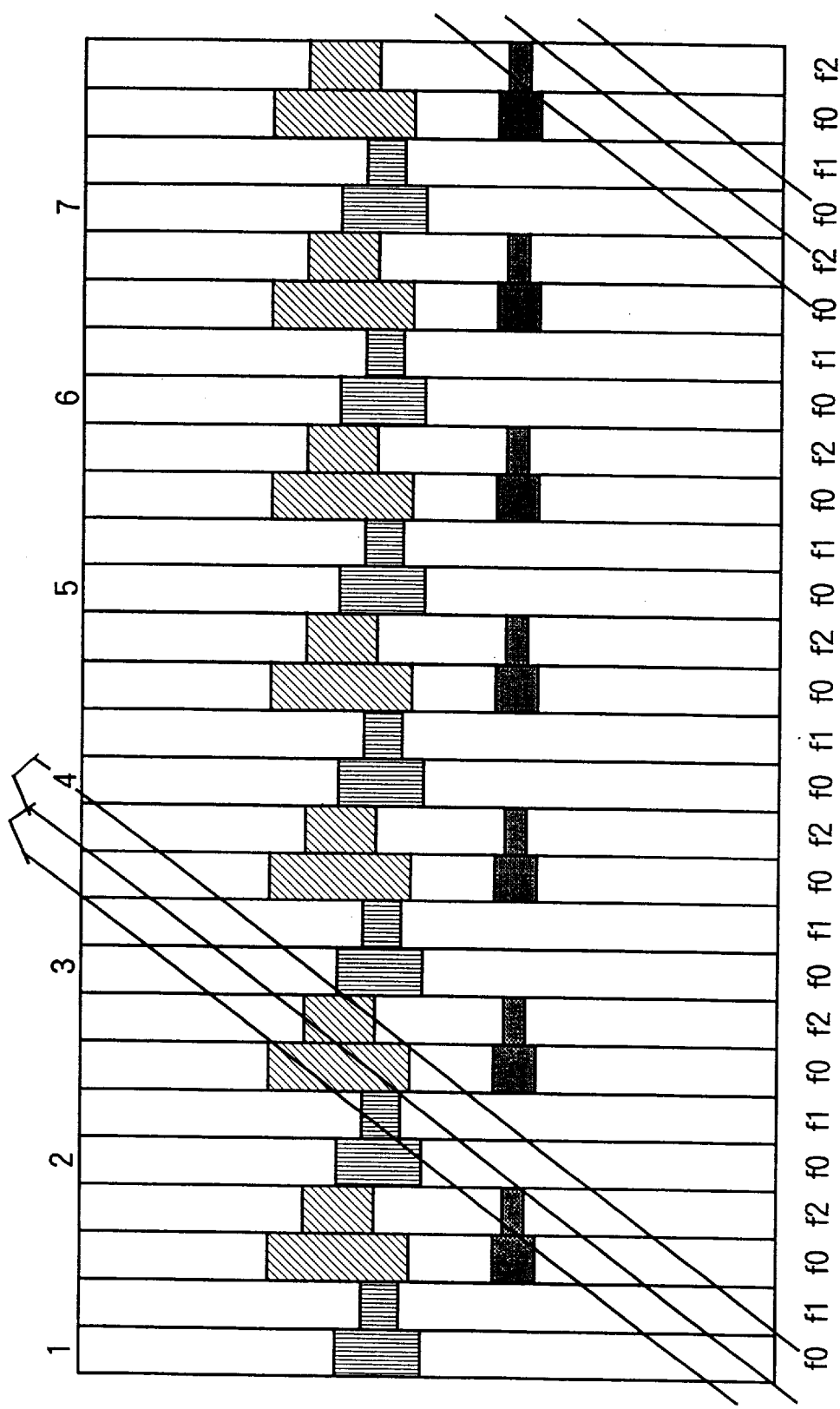
FIG. 65 shows rotary head scanning traces during +12-time speed replay of 4-time speed replay data of a recording format according to Embodiment 15 of the invention, by means of a 2 ch×1 system.

FIG. 65 shows head scanning traces of the rotary head during twelve-time speed replay of four-time speed replay data in a recording format of FIG. 29, using a 2 ch×1 head system, according to Embodiment 15. The arrows indicate the head scanning traces. The special replay data for the twelve-time speed replay is obtained by reproducing the four-time speed replay data, two units of which are repeatedly recorded in the four-time speed replay areas. When reproducing at a twelve-time speed from the four-time speed replay areas, the servo is locked at the four-time speed replay areas.

Figure 66:
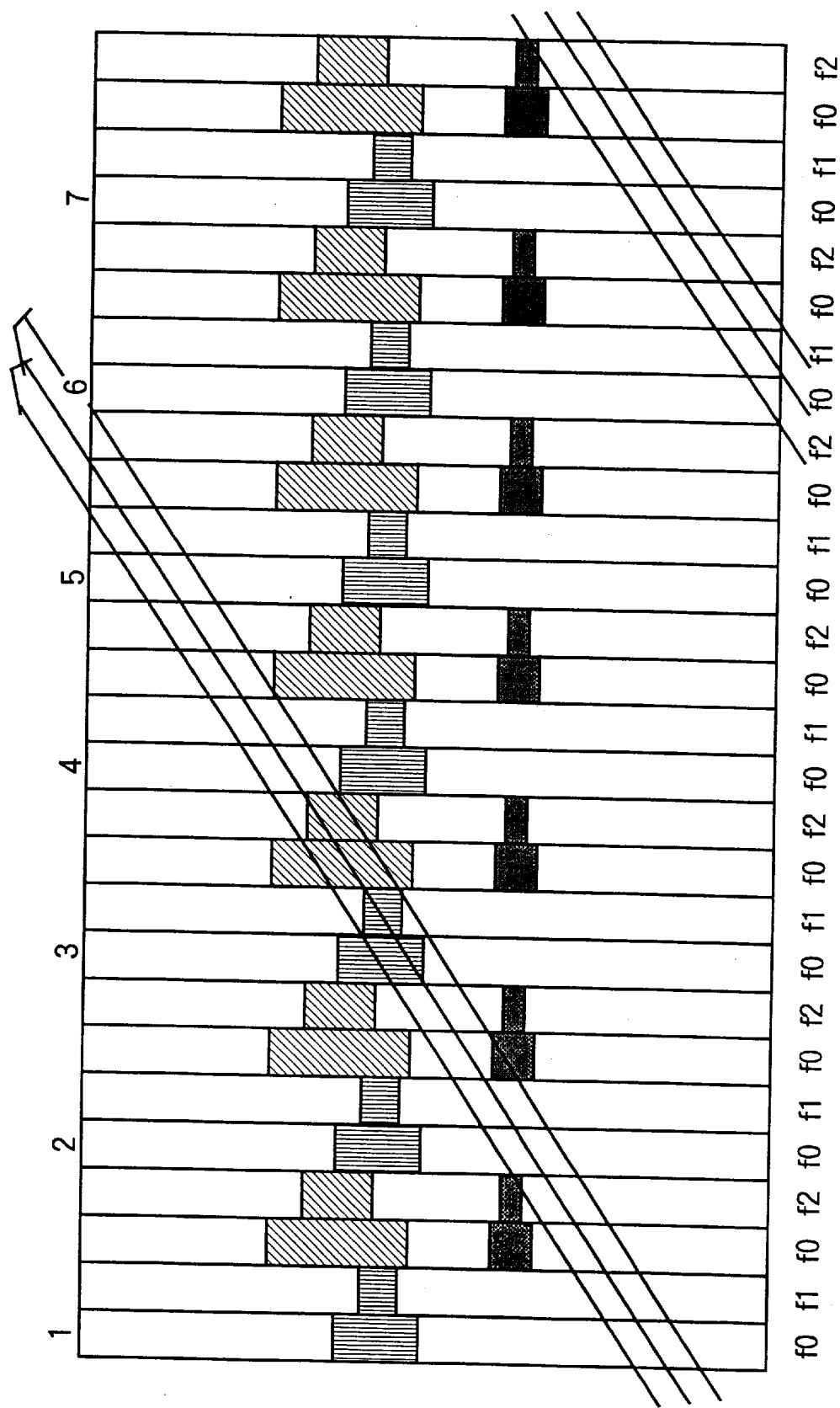
FIG. 66 shows rotary head scanning traces during +12-time speed replay of 4-time speed replay data of a recording format according to Embodiment 15 of the invention, by means of a 2 ch×2 system.

FIG. 66 shows head scanning traces of the rotary head during twelve-time speed replay of four-time speed replay data in a recording format of FIG. 29, using a 2 ch×2 head system, according to Embodiment 15. The arrows indicate the head scanning traces. The special replay data for the twelve-time speed replay is obtained by reproducing the four-time speed replay data, two units of which are repeatedly recorded in the four-time speed replay areas. When reproducing at a twelve-time speed from the four-time speed replay areas, the servo is locked at the four-time speed replay areas.

Figure 67A:
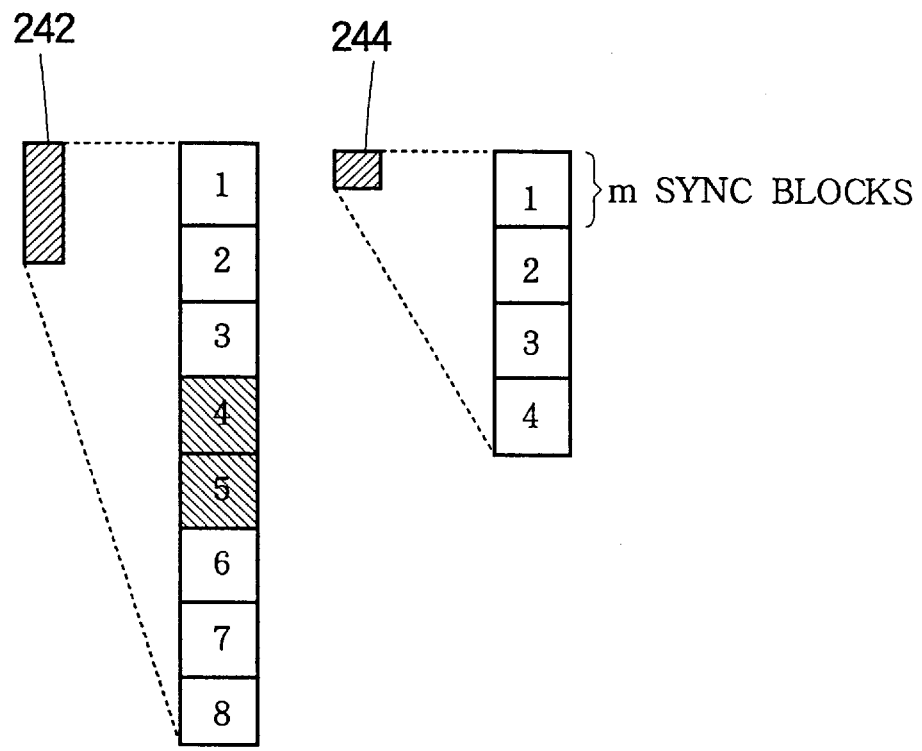
FIG. 67A shows the configuration of 4-time speed replay data recording areas used in fast replay according to Embodiment 15.
Figure 67B:
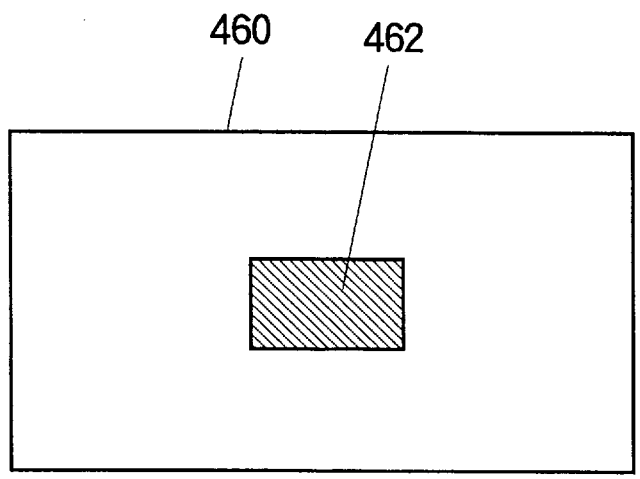
FIG. 67B shows the position on the screen which is reproduced in Embodiment 15.

FIG. 67A and FIG. 67B are used to explain the fast replay according to Embodiment 15. FIG. 67A shows the configuration of the recording areas of the four-time speed replay data. FIG. 67B shows the positions on the screen. In each of the cases shown in FIG. 64 to FIG. 66, it is necessary to record the data in the four-time speed special replay areas in the form shown in FIG. 67A and FIG. 67B. In the drawing, reference numeral 242 denotes a special replay area for four-time speed, recorded by an A-channel head, 244 denotes a special replay area for four-time speed, recorded by a B-channel head, 460 denotes a one intra-frame or one intra-field screen as a whole, and 462 denotes a central part of the one intra-frame or one intra-field screen.

Of the data recorded in the special replay area 242 for four-time speed, recorded by the A-channel head, the central part (in the embodiment under consideration, the servo is assumed to be locked at the central part of each special replay area) is used to record the data of the central part 462 of the screen of one intra-frame or intra-field picture. This data is part of the four-time speed data, and no additional four-time speed areas are used. It is sufficient if the four-time speed special replay areas 242, recorded by the A-channel head, is recorded at an interval of a predefined number of tracks. In this embodiment, since twelve-time speed replay is effected, the interval consists of six units, each unit consisting of four tracks. Of the the special replay areas 242 recorded by the A-channel head, the areas other than the areas where the data of the central part 462 of the screen (whole picture) of one intra-frame or intra-field picture, and the four-time special replay areas 244 recorded by the B-channel head are used to record the data other than the data of the central part 462 of the screen of one intra-frame or intra-field picture, that is the data of the screen 460 of one intra-frame or intra-field picture minus the data of the central part 462 of the screen of the one intra-frame or intra-field picture. By replaying the signal for the central part of the screen, the special replay with a high picture quality and with frequent refreshing can be obtained.

In Embodiment 15, description is made of the cases where the replay from the four-time speed areas is conducted at a twelve-time speed. But the inventive concept described above can be applied to situations where replay from special replay areas for a set replay speed, in a format in which the special replay areas for the set replay speed is collectively disposed, is conducted at a replay speed higher than the set speed.

In Embodiment 15, description is made of the cases where the central part of the screen of an intra-frame or intra-field image is recorded in part of the special replay area recorded by an A-channel head. The invention is not limited to this particular arrangement. The central part of the screen of an intra-frame or intra-field image may be recorded in such part of the special replay area for a set replay speed from which data can be reproduced at a speed higher than the set replay speed, in the recording format in which the special replay data is recorded at one location where the special replay area for the set replay speeds are concentrated as shown in FIG. 29.

Embodiment 16

In the following Embodiments 16 to 19, description is made of various devices for removing the effects of fluctuation in the head position to ensure reproduction of replay data at a high speed.

As an example, it is assumed, according to the basic specification of the prototype consumer digital VTR, each track on the tape corresponds to 186 sync blocks (SBs), the difference between the starting positions of the adjacent track in the track longitudinal direction is d sync blocks (d=0.35 SB), and the track width and the head width are identical. Embodiment 16 is described on the above assumption.

Figure 68:
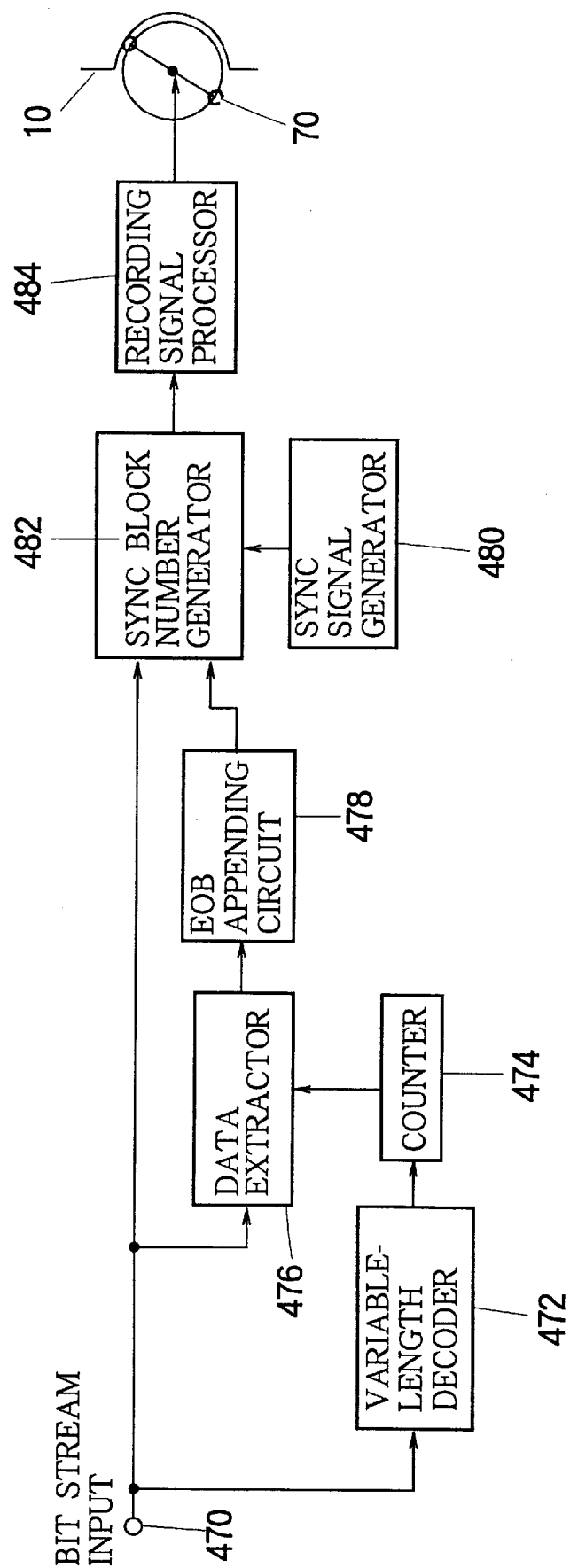
FIG. 68 is a block diagram showing a recording system in a digital VTR in Embodiment 16.

FIG. 68 is a block diagram showing a recording system of a digital VTR according to Embodiment 16. In the drawing, reference numeral 470 denotes an input terminal for an ATV signal bit stream, 472 denotes a variable-length decoder, 474 denotes a counter, 476 denotes a data extractor, 478 denotes an EOB (end of block) appending circuit, and 480 denotes a sync signal generator. Reference numeral 482 denotes a sync block generator, which appends the sync bytes to the bit stream, on the basis of the sync signal from the sync signal generator 480, to form sync blocks to be recorded in the main areas on the tracks, and forms fast replay sync blocks on the basis of the fast replay signal from the EOB appending circuit 478, to thereby form a signal to be recorded in the predefined sync blocks. Reference numeral 484 denotes a recording signal processor for performing recording signal processing such as recording modulation and recording amplification, 70 denotes heads of two different azimuths, and 10 denotes a magnetic tape.

The recording operation by the above recording system will next be described in detail. MPEG2 bit stream is input via the input terminal 470, and supplied to the sync block generator 482, where sync bytes are appended, on the basis of the sync signal from the the sync signal generator 480, to form sync blocks. The bit stream received at the input terminal 470 is also supplied to the variable-length decoder 472, where the syntax of the MPEG2 bit stream is analyzed, and intra-images are extracted, and timing signals are generated by the counter 474, and the low-frequency components of all the blocks of the intra-images are extracted at the data extractor, and EOBs are appended at the EOB appending circuit 478, to form fast replay data, which is output to the sync block generator 482. On the basis of the sync signal from the sync signal generator 480, the sync block generator 482 appends sync bytes to the fast replay signal from the EOB appending circuit 478, to form the sync blocks for fast replay, and forms a recording signal to be recorded in the predefined sync blocks.

The recording signal formed of the respective sync blocks from the sync block generator 482 is supplied to the recording signal processor 484, where various recording signal processing, such as digital recording modulation, and recording amplification, are applied, and then supplied to the heads 70 of two different azimuths, and recorded on the magnetic tape 10.

Next, description is made of the disposition on the tracks for recording fast replay sync blocks which are fast replay data.

Figure 69:
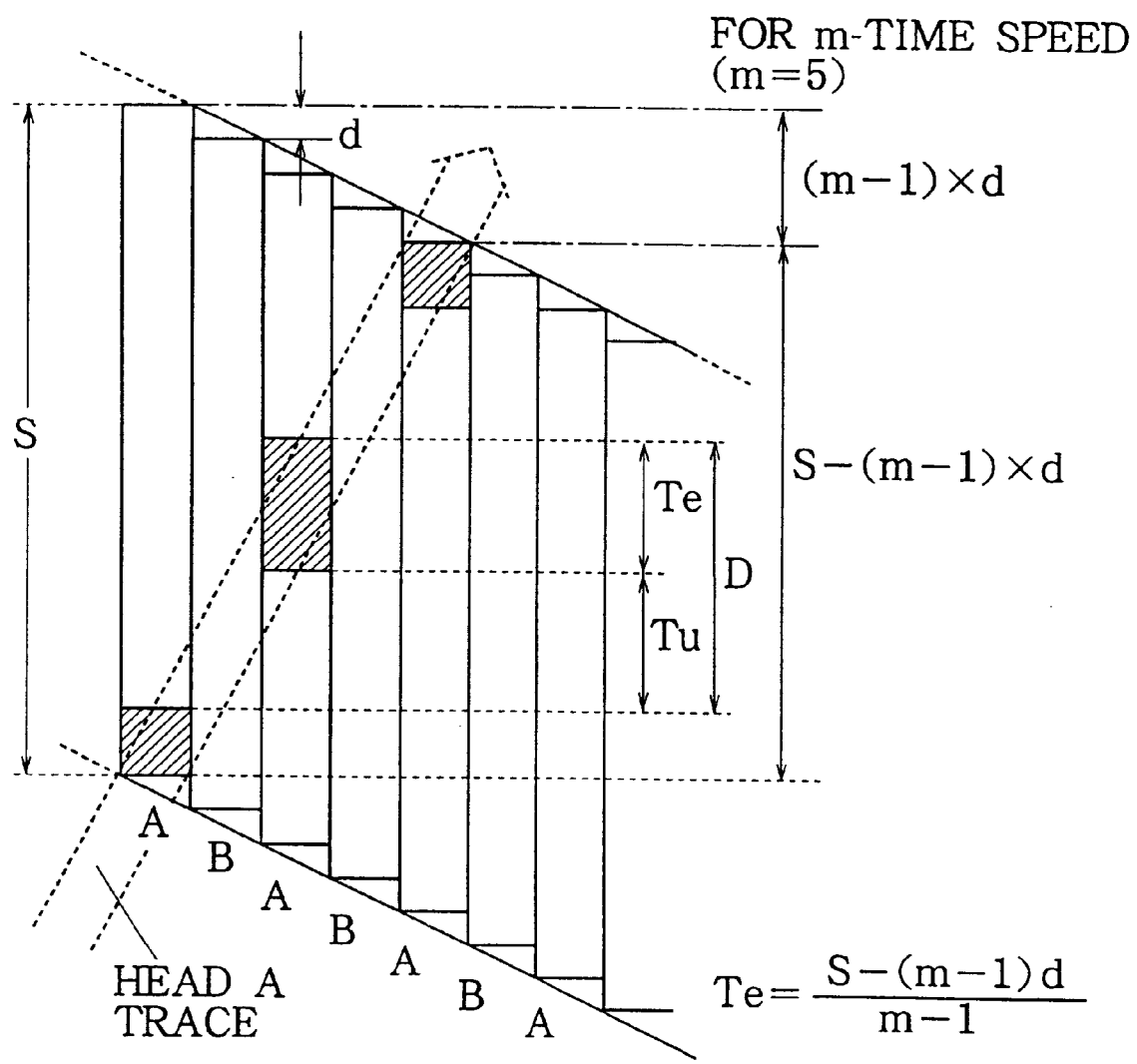
FIG. 69 shows a rotary head scanning trace on tracks during fast replay.

FIG. 69 shows a scanning trace of a rotary head on the tracks during fast replay. The drawing shows the case where the the replay speed is five-time speed, i.e., the speed multiplier m is five, and the length of the tracks in terms of the number of the sync blocks sync block is 186 SBs, and the difference d between the starting positions of the adjacent tracks A and B, in the track longitudinal direction is 0.35 SB. The relationship between the difference D between crossing positions in the track longitudinal direction, and the length Te of the areas of the track from which reproduction is possible is illustrated. If the tape speed m is an integer-multiple speed, and the phase lock is controlled, the head scanning is in synchronism with the tracks of the identical azimuth, and the positions of the data which is reproduced are fixed.

Referring to FIG. 69, if it is assumed that such part of the replay signal whose output level is −6 dB or greater is reproduced, the head A can reproduce data from the hatched regions. If the track width and the head width are identical, the different D between the crossing positions of the head A in the track longitudinal direction is $$D = Te + Tu, \text{ where } Te = Tu,$$

and the total length of the regions from which reproduction is possible is $$Te = \{S = (m-1) \times d\}/(m-1)$$

Figure 70:
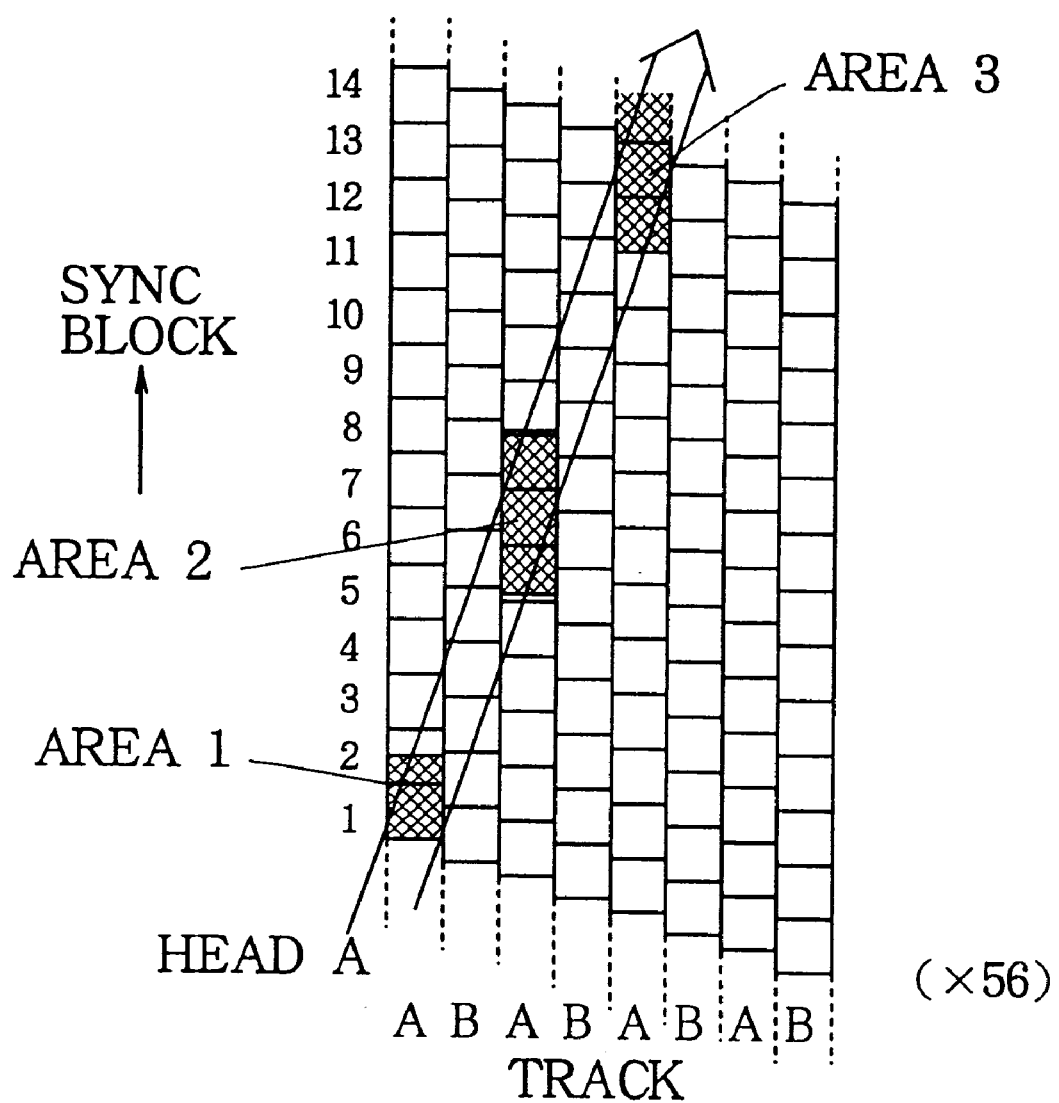
FIG. 70 shows a rotary head scanning trace during replay at a 56-time speed.
Figure 71A:
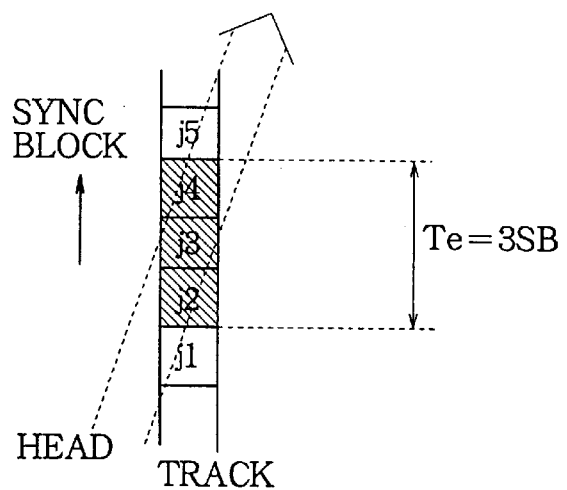
FIG. 71A shows scanning traces with which three sync blocks can be reproduced.
Figure 71B:
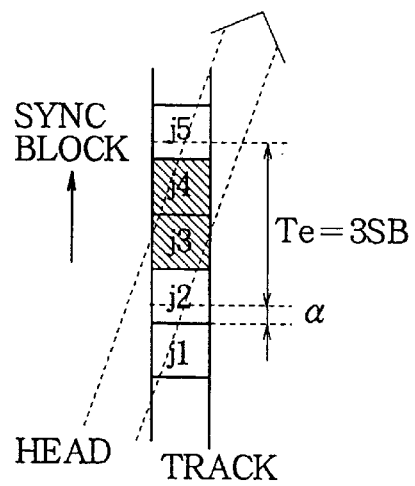
FIG. 71B and FIG. 71C show scanning traces which result with forward and backward shifts in the position.
Figure 71C:
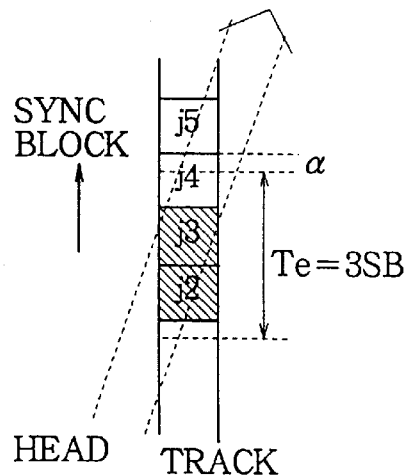

FIG. 70 shows a scanning trace of a rotary head during replay at 56-time speed. FIG. 71A to FIG. 71C are for explaining the position fluctuation of the rotary head scanning trace. FIG. 71A shows the scanning trace by which three sync blocks can be reproduced, while FIG. 71B and FIG. 71C show the scanning traces shifted forward and backward. The regions from which the reproduction of the signal is ensured during 56-time speed replay is hatched regions. Each of the regions from which reproduction is possible, as determined by the above-recited equation, amounts to:

$$Te = (S - 55 \times d)/55 = 3.0 \ SB$$

The maximum number n (n being an integer) of consecutive sync blocks which can always be reproduced from the above region Te=3.0 SB, in other words, minimum number n (n being an integer) of consecutive sync blocks within the above region Te=3.0 SB from which reproduction of data is ensured, is n=2 SB. This is because the limits of the region from which reproduction is possible do not necessarily coincide with the boundaries of the sync blocks, as shown in FIG. 71A to FIG. 71C. For instance, the sync block j2 is read in the case of FIG. 71A, but not in the case of FIG. 71B. The sync block j4 is read in the case of FIG. 71A, but not in the case of FIG. 71C. Accordingly, the maximum number of the consecutive sync blocks, within the region from which reproduction is possible, from which reproduction is possible without fail is 2 SB if Te=3 SBs. If Te is not an integer, such maximum number is n=t−1 SB, where t is a maximum integer which does not exceeds Te. It is seen from the above that, in the case of 56-time speed replay, fast replay sync blocks should be recorded in the areas 1 to 3 in FIG. 70.

When, however, fast replay is conducted using a rotary drum, the position at which the head crosses the respective tracks may be shifted because of the fluctuation in the head scanning trace due to the tape speed fluctuation, the drum rotational speed fluctuation, and like. In such a case, it is necessary to read the data of 2 SBs for fast replay, without fail. If the maximum value of shift, from the reference position, of the actual position at which the head crosses a specific track during fast replay at a certain speed is w sync blocks (having rounded up to the next integer, i.e., the actual shift being not more than w sync blocks, but more than (w−1) sync blocks), the range of shift is ±w SB in the track longitudinal direction from the reference position which is attained when the phase is locked.

Figure 72:
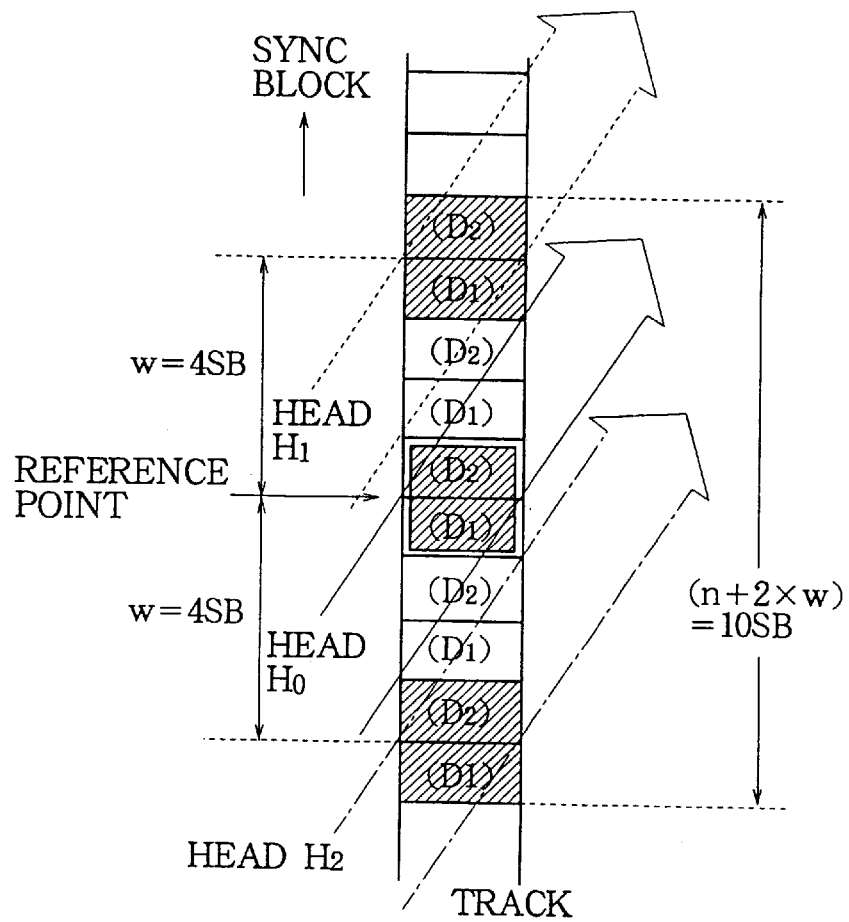
FIG. 72 shows disposition of the fast replay data according to Embodiment 16.
Figure 73:
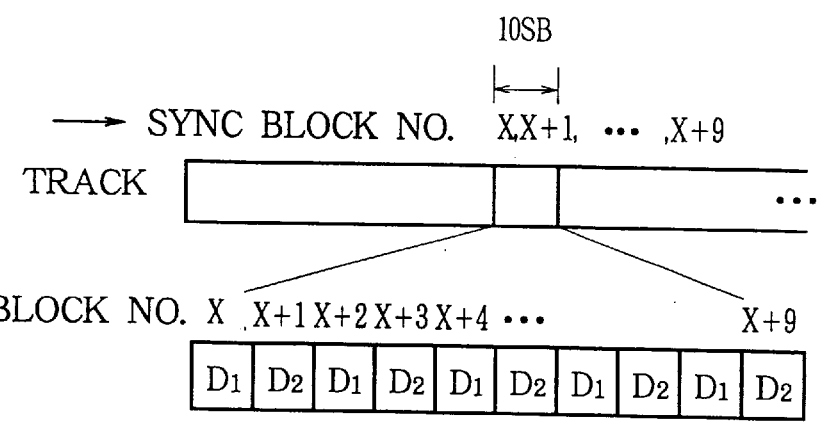
FIG. 73 shows an example of disposition of fast replay data on tracks according to Embodiment 16.

FIG. 72 shows disposition of the fast data according to Embodiment 16. It is assumed that the shift at 56-time speed is w=4 SB. The region within which the sync blocks may be scanned because of the shift extend (n+2×w)=10 SB. Accordingly, if the data for 2 SB is designated by D1 and D2, the data D1 and data D2 are repeatedly and cyclically recording for the range of (n+2×w) sync blocks. FIG. 73 shows an example of disposition of the fast replay data on a track according to Embodiment 16. High-speed replay data is sequentially (in the ascending order of suffix i to D) and repeatedly (or cyclically) recorded over 10 sync blocks, numbered X, X+1, ... X+9, centered on the reference position of the region where replay is possible by the head crossing a specific track.

With this arrangement, it is possible to ensure reproduction of the recorded sync block data D1 and D2 of 2 SB for fast replay during fast replay at a certain speed, even when the position at which the head crosses the specific track is shifted.

Figure 74:
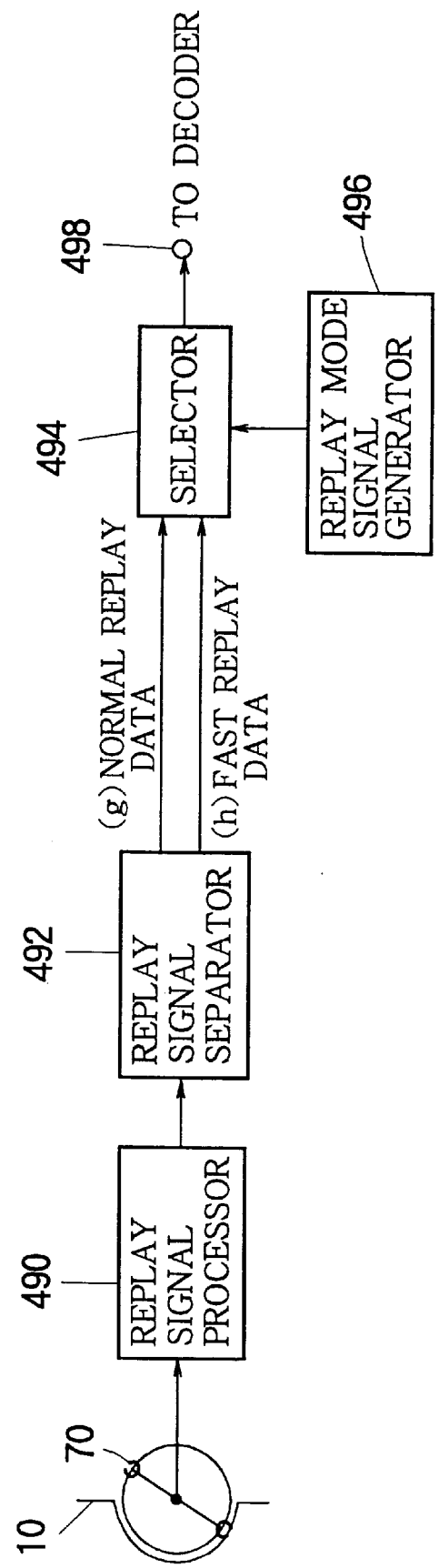
FIG. 74 is a block diagram showing a replay system of a digital VTR in Embodiment 16.

FIG. 74 is a block diagram showing a replay system of a digital VTR of Embodiment 16. In the drawing, reference numerals 70 and 10 denote members identical to those in the recording system shown in FIG. 68. Reference numeral 490 denotes a replay signal processor for performing replay signal processings, such as waveform equalization, signal detection and recording demodulation, 492 denotes a replay data separator for separating the normal replay data and the fast replay data in the replay signal, 494 denotes a selector, 496 denotes a replay mode signal generator for generating a signal indicating the replay mode, and 498 denotes an output terminal.

During replay, the replay signal replayed by the head 70 from the magnetic tape 10 is supplied to the replay signal processor 490, where replay signal processings, such as waveform equalization, signal detection, and recording demodulation, are applied. The replay signal is then supplied to the replay signal separator 492, where the signal replayed from the tracks is separated into the bit stream (g) for normal replay data, and the sync block data for fast replay, which are then supplied to the selector 494. On the basis of the signal indicating the replay mode, from the replay mode signal generator 496, the selector 494 selects the normal replay data (g) during normal replay, and the fast replay data during fast replay, and the selected data is output via the output terminal 498, and sent to an MPEG2 decoder provided outside of the digital VTR.

In the manner described above, by recording n pieces of data Di (i=1, 2, ... n) each of which can be recorded in one sync block sequentially and repeatedly in (n+2×w) consecutive sync blocks from which data is reproduced at m-time speed, it is ensured to read fast replay data even when the position of the head scanning trace fluctuates, because of the tape transport speed fluctuation, or the drum rotary speed fluctuation, and fast replay pictures with a good quality can be obtained, and much of the data for fast replay can be recorded and replayed.

Embodiment 17

In Embodiment 16, sync block data for fast replay is recorded in predefined positions on predefined tracks which are scanned during m-time speed replay. It is also possible to repeatedly record the fast replay data so that the fast replay data can be can be read regardless of the identical-azimuth track at which (at whose end) the rotary head begins scanning. In that case, the pull-in of the servo system is quick and the fast replay image can be obtained instantly.

Figure 75:
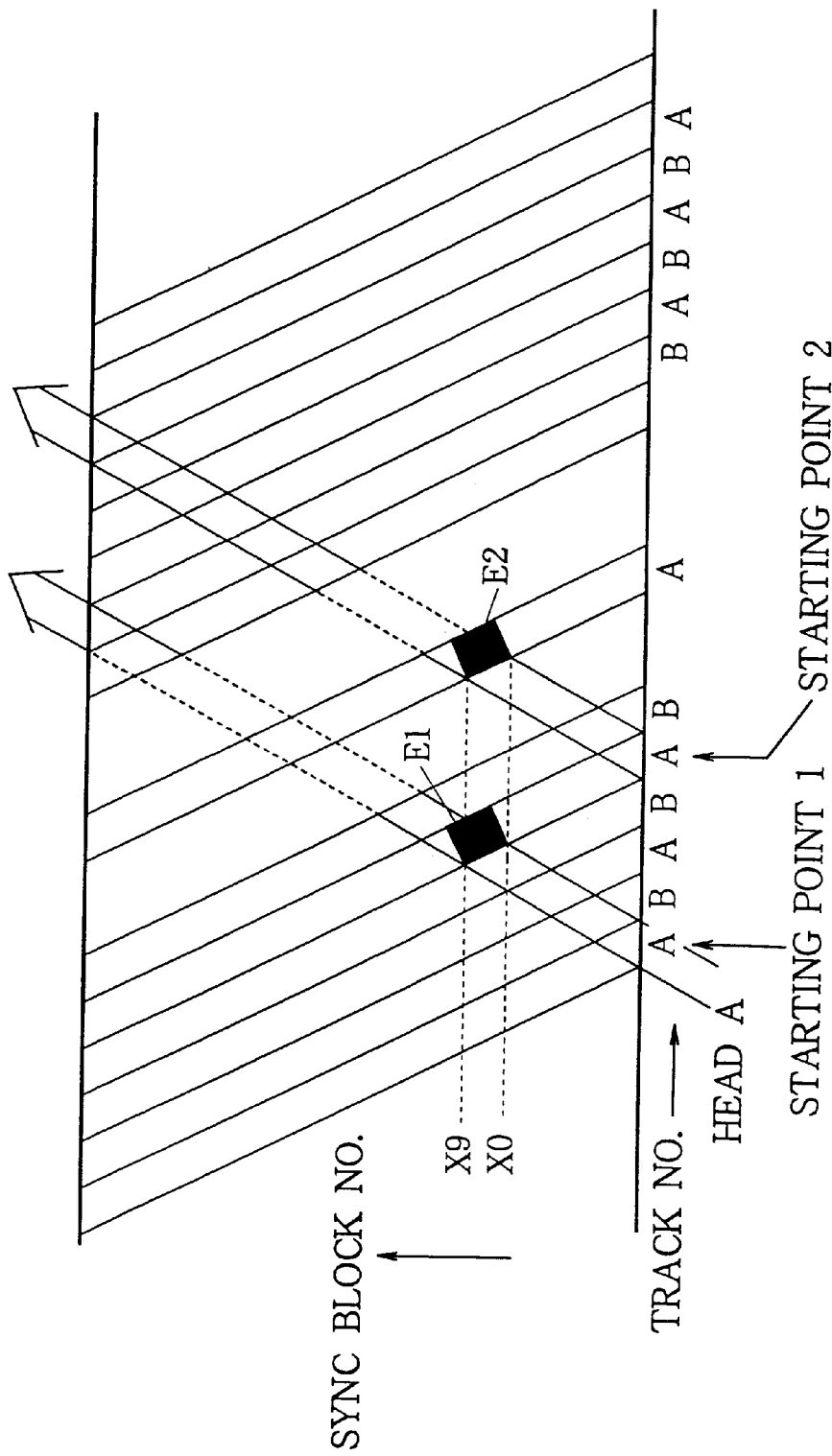
FIG. 75 shows the positional relationship between the scanning traces and the fast replay data according to Embodiment 17.
Figure 76:
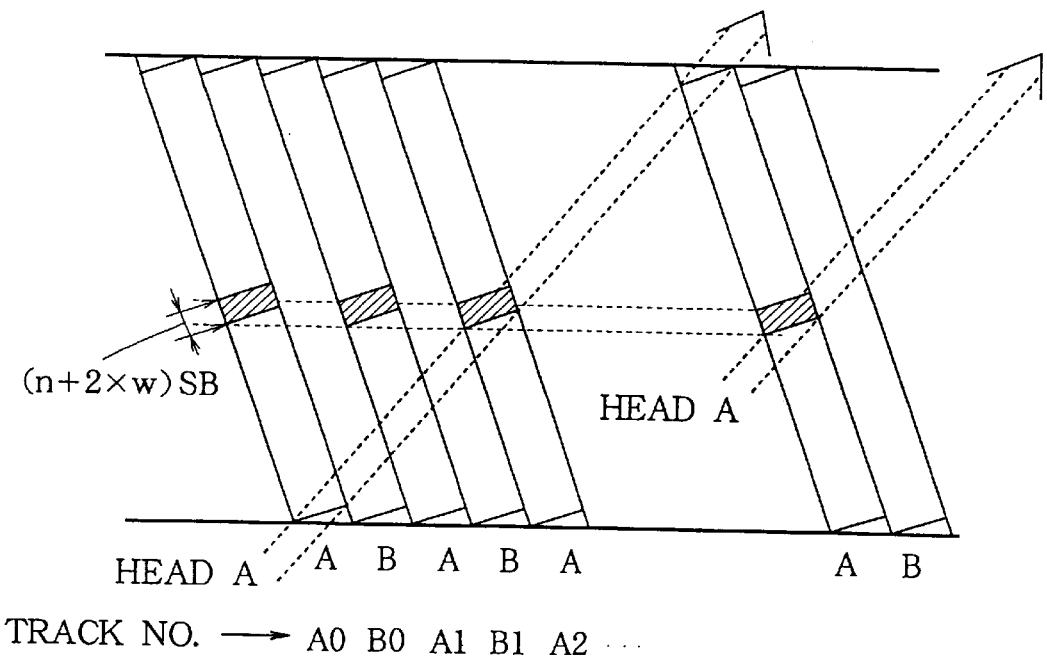
FIG. 76 shows an example of disposition of fast replay data according to Embodiment 17.

FIG. 75 shows the positional relationship between the scanning traces and the fast replay data according to Embodiment 17. Identical sync block positions on various identical-azimuth tracks are scanned, from respective starting points. To enable m-time speed replay, identical sync block data for fast replay is repeatedly recorded over (n+2×w) consecutive sync blocks at identical position on each of at least m consecutive identical-azimuth tracks, as shown, by way of example, in FIG. 76. In this way, regardless of the track (of the identical azimuth) at which the fast replay is started, the replay data can be obtained.

In the manner described above, by repeatedly recording m-time speed signal is recorded in (n+2×w) consecutive sync blocks at identical positions on m consecutive identical-azimuth tracks, reading of the fast replay data is ensured in the event of fluctuations in the head scanning traces due to tape speed fluctuation and drum rotary speed fluctuation, and reproduction of good quality pictures is ensured, and much fast replay data can be recorded and replayed.

Embodiment 18

Embodiment 18 relates to a bit stream recording and replay device capable of fast replay, with a different example of disposition, on tracks, of fast replay sync block forming fast replay data.

Figure 77:
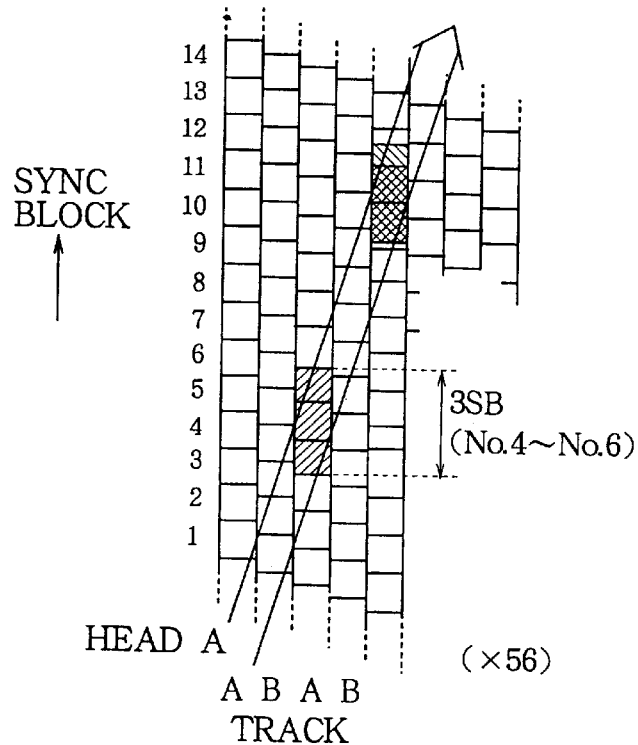
FIG. 77 shows a rotary head scanning trace during fast replay at a 56-time speed according to Embodiment 18.
Figure 78:
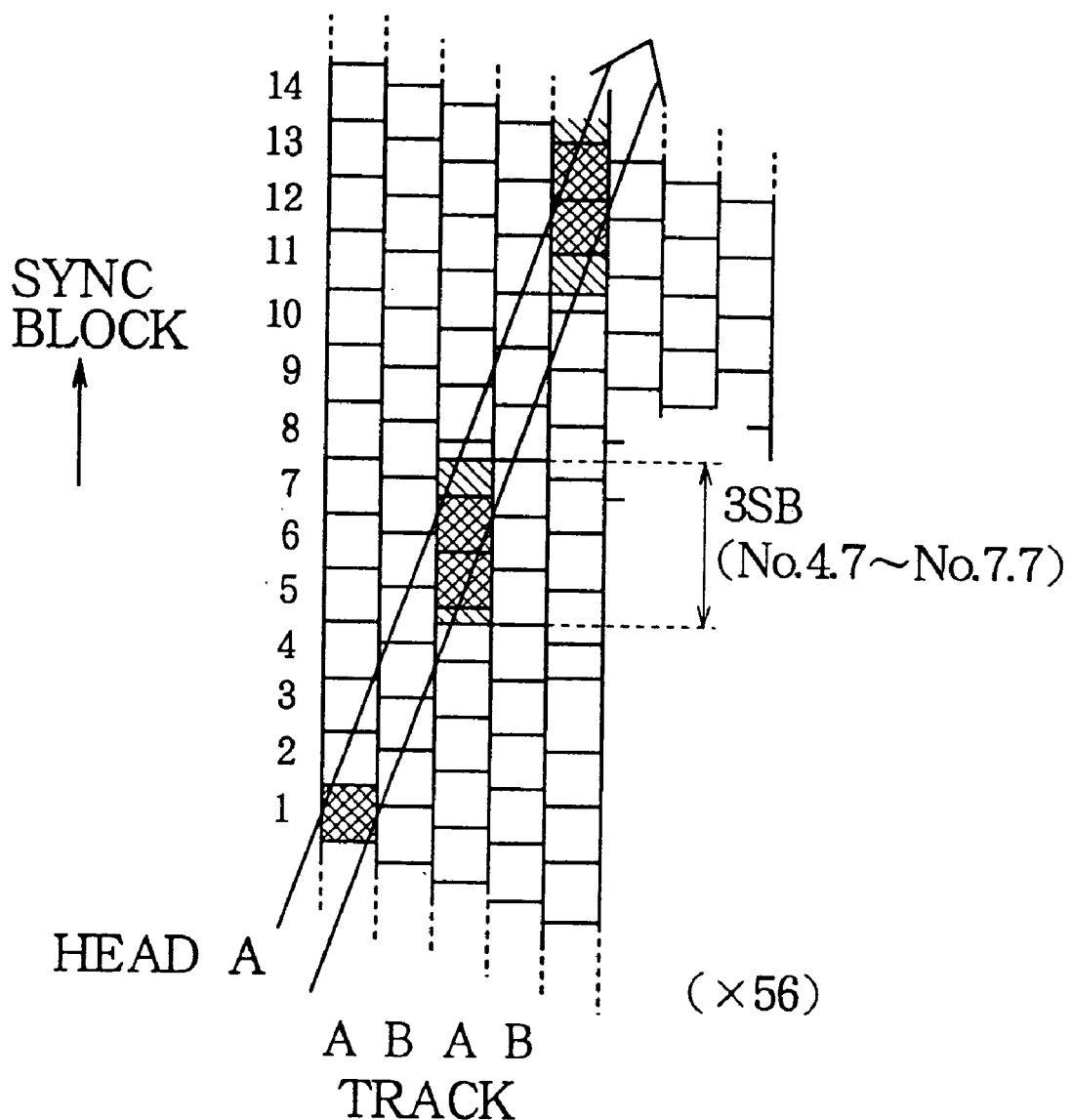
FIG. 78 shows sync blocks which can be reproduced when the position of the rotary head scanning trace is shifted.
Figure 79:
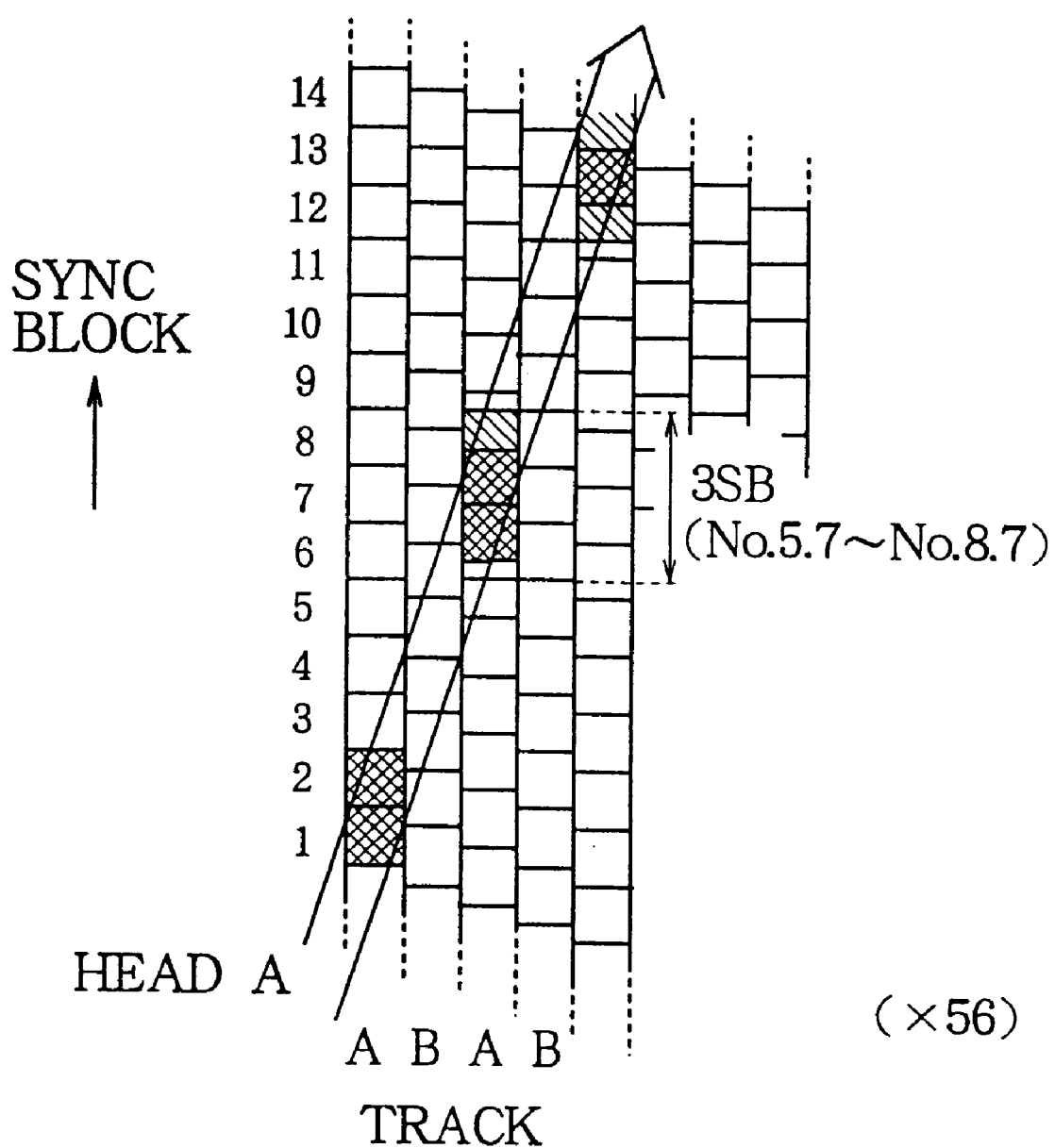
FIG. 79 shows sync blocks which can be reproduced when the position of the rotary head scanning trace is shifted.

FIG. 77 to FIG. 79 show rotary head scanning traces during 56-time speed replay according to Embodiment 18. FIG. 77 to FIG. 79 show examples of 56-time speed replay, with different phase control positions and different head traces. Replay signals are picked up from the hatched portions. For instance, in FIG. 77, the fourth to sixth sync blocks i.e., from the beginning of the fourth sync block to the end of sixth sync block, or 4.0-th to 7.0-th sync blocks are read. Similarly, in FIG. 78, the 4.7-th to 7.7-th sync blocks are read, and in FIG. 79, the 5.7-th to 8.7-th sync blocks are read.

To ensure reading of replay data at fast replay, at whichever phase the head traces is achieved, it is so arranged that, even when the fast replay signal is not obtained from one track during fast replay, reading of the signal from the next identical-azimuth track is ensured. That is, even when the head trace position is shifted due to phase fluctuation, the recorded sync block data for fast replay can be obtained from the total of one track and a next identical-azimuth track.

Figure 80:
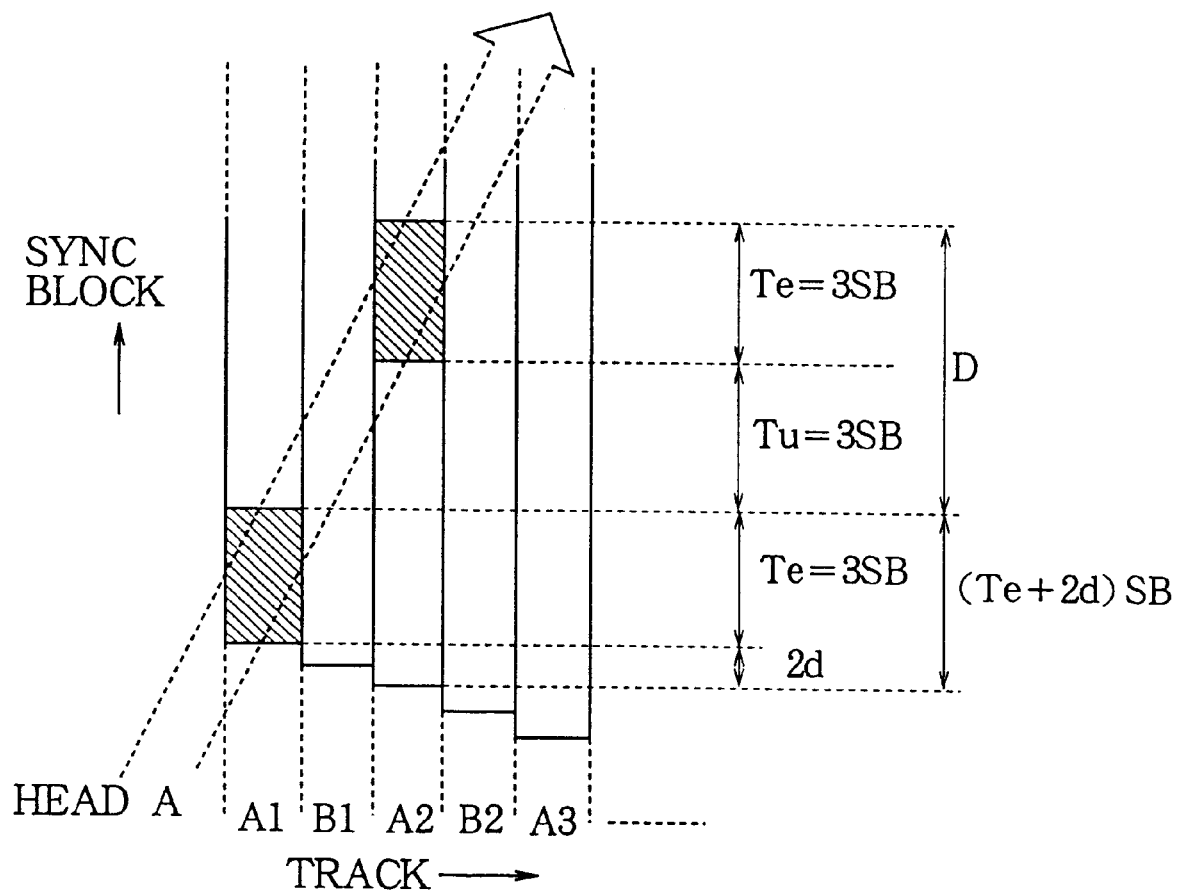
FIG. 80 shows the positional relationship between a scanning trace and the fast replay data according to Embodiment 18.

FIG. 80 shows the positional relationship between the scanning trace and the fast replay data according to Embodiment 18. It shows the positions of the regions Te in two identical-azimuth tracks A1 and A2 from which reproduction is possible during fast replay. In FIG. 80, if the reproduction is possible from the portions where the level of the output replay signal is greater than −6 dB, the signals are reproduced from the hatched regions in the tracks A1 and A2. If the track width and the head width are identical, the length Tu which is the difference between the upper end and lower ends of the regions on the tracks A1 and A2 is given by:

$$Tu = \{S - (m-1) \times d\}/(m-1)$$

The position of the sync block in track A2 is 2d sync blocks higher than the position in track A1.

Figure 81A:
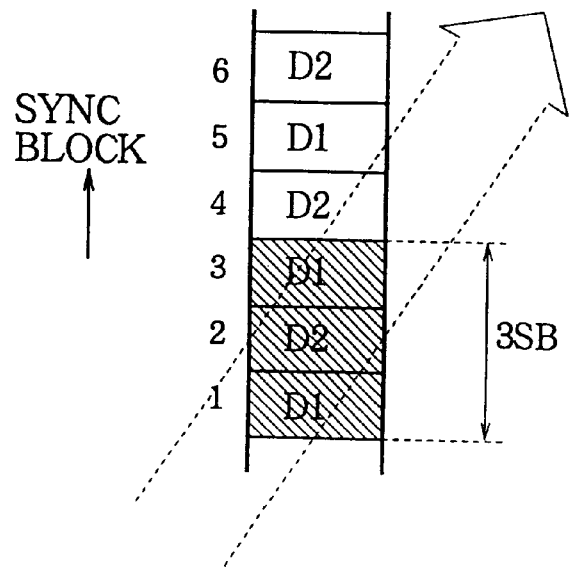
FIG. 81A shows a scanning trace with which three sync blocks can be reproduced.
Figure 81B:
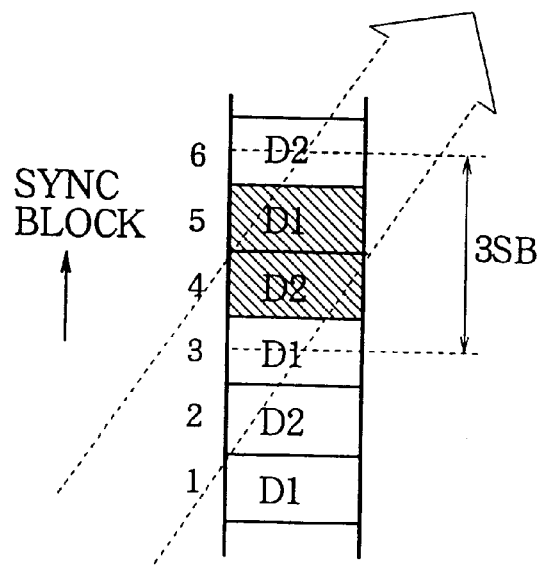
FIG. 81B shows a scanning trace with a shift in the position.

FIG. 81A and FIG. 81B show the fluctuation in the position of the rotary head scanning trace according to Embodiment 18. (A) shows the scanning trace by which 3 sync blocks can be reproduced, and (B) shows the scanning trace followed when the position is varied. To ensure reproduction of fast replay sync block data from the two identical-azimuth tracks A1 and A2 during fast replay, even when head scanning phase is changed in the two identical-azimuth tracks A1 and A2, sync block data of a length of not less than (Te+Tu) sync blocks is repeatedly recorded on track A1, from the starting point of the region where the fast replay sync block is recorded, toward the tail end of the track.

For instance, when fast replay is performed at 56-time speed, the maximum number of sync blocks which can always be consecutively reproduced from the track region on the tape is n=2, and the length of the region from which the replay signal can be obtained is Te=3 SB. If fast replay sync block data D1 and D2 is repeatedly record over 6 SB in the direction of from sync block 1 to sync block 6, in FIG. 81A and FIG. 81B, the fast replay data can be read, even if the phase is shifted in the track longitudinal direction, toward the tail end of the track. In track A2 also, if fast replay data is repeatedly recorded over (Tu+Te+2d) from the tail end of the region from which the reproduction is possible toward the head end of the track, as shown in FIG. 80, the fast replay data D1, D2 can be read from the track A2, even if the phase is shifted in the track longitudinal direction, toward the head end of the track.

Figure 82:
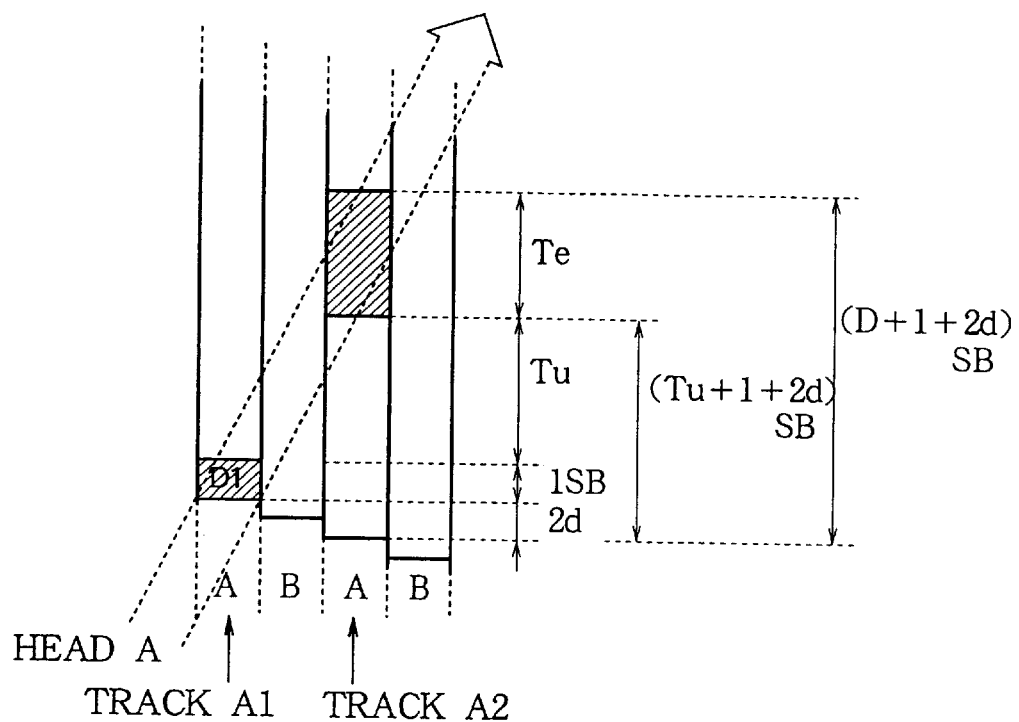
FIG. 82 shows an example of disposition of fast replay data according to Embodiment 18.

Let us now consider the case where the sync block data D1, D2 is to be obtained from the track A2 only, or the case where the sync block D1 is obtained from track A1, and D2 is obtained from track A2. In the case where the sync block data D1, D2 is to be obtained from track A2, the sync block data should be recorded up to such a position that sync block data D1 can be read from track A1 and sync block data D1, D2 can be read from the track A2. FIG. 82 is a schematic diagram showing the position at which sync block data D1 can be read from track A1 and sync block data D1, D2 can be read from the track A2. The fast replay signal D1, D2 should be disposed in the sync blocks in the hatched region of from the (Tu+2d+1)-th sync block to (D+2d+1) on the track A2.

Figure 83:
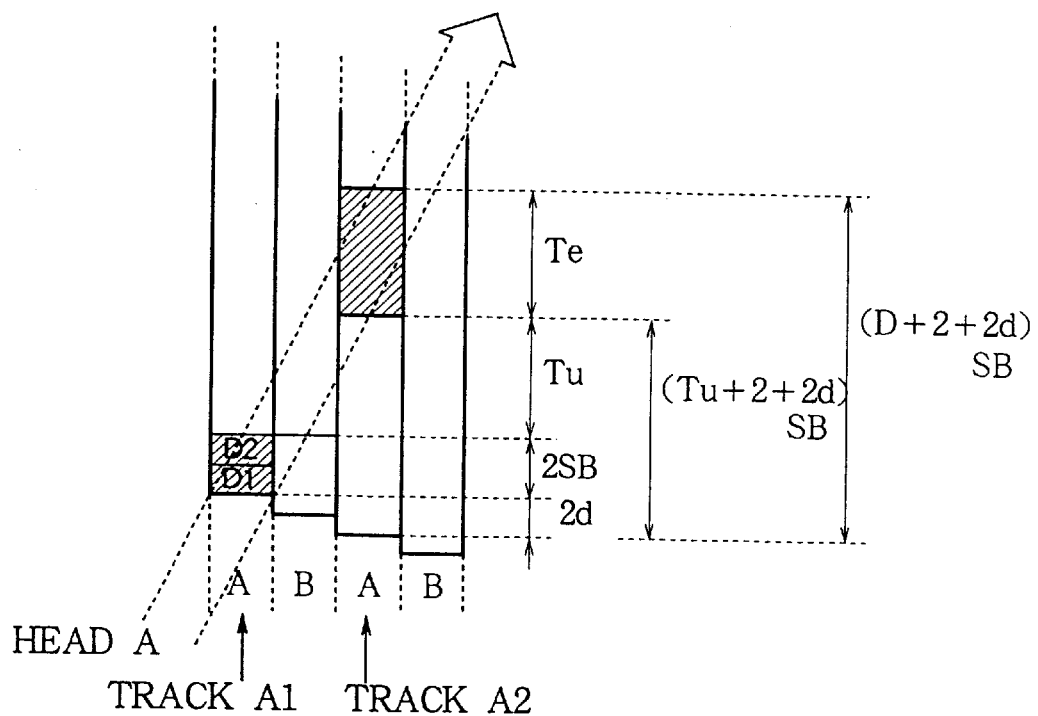
FIG. 83 shows another example of disposition of fast replay data according to Embodiment 18.

In the case where sync block data D1 is obtained from the track A1, and the sync block data D2 is obtained from the track A2, the sync block data should be recorded to such a position that the sync block data D1, D2 can be read from the track A1 and the sync block data D2 can be read from the track A2. FIG. 83 shows the schematic diagram showing the position at which the sync block data D1, D2 can be read from the track A1 and the sync block data D2 can be read from the track A2. The fast replay signal D2 should be disposed in the sync blocks in the hatched region of from (Tu+2d+2)-th sync block to (D+2d+2) sync block on the track A2 in the drawing.

Figure 84:
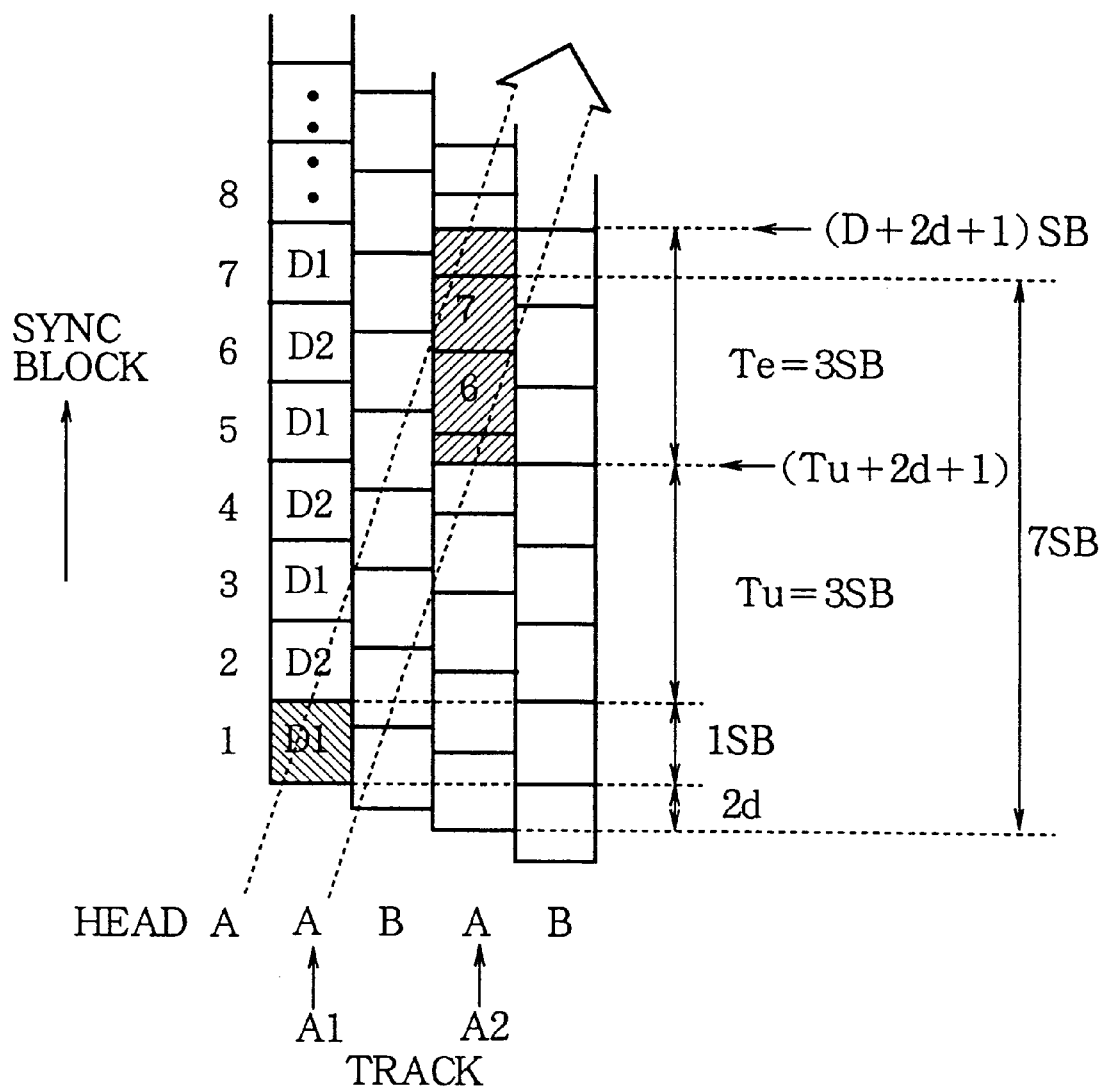
FIG. 84 shows an example of disposition of fast replay data on identical-azimuth tracks A1 and A2, during 56-time speed replay according to Embodiment 18.
Figures 85, 86:
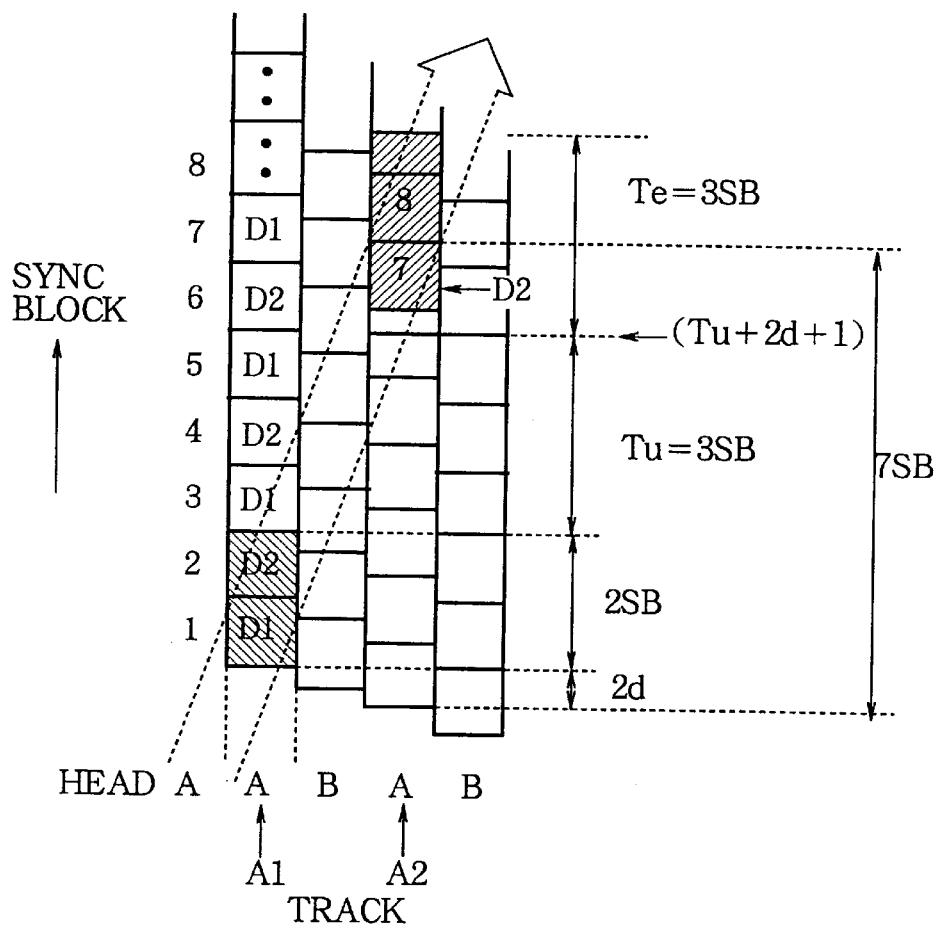
FIG. 85 shows another example of disposition of fast replay data on identical-azimuth tracks A1 and A2, during 56-time speed replay according to Embodiment 18.
FIG. 86 shows an example of disposition of fast replay data according to Embodiment 18.

From the above it is seen that, when fast replay is performed at 56-time speed for instance, the maximum number of sync blocks which can always be reproduced consecutively is n=2 SB, the length of the region from which the replay signal can be obtained is Te=3 SB, and where the sync block data D1 is read from the track A1, and the sync block data D1, D2 is read from the track A2, the fast replay signal D1, D2 are disposed in the sixth and seventh sync blocks in the region on the track A2 from which reproduction is possible, as shown in FIG. 84. When the sync block data D1, D2 is read from the track A1 and the sync block data D2 is read from the track A2, the fast replay signal D2 is disposed in the seventh sync block as shown in FIG. 85. In the case, the fast replay speed signal is repeatedly recorded in the respective identical-azimuth tracks, and, in doing so, the two pieces of sync block data D1, D2 are sequentially (in the ascending order of the suffix i to D) repeatedly recorded in seven consecutive sync blocks at identical position on the respective tracks, and the data are so disposed that the seventh data of the track identical to the second data (D2 in the example of FIG. 85) of the seven pieces of fast replay data recorded in the identical sync block position on the immediately preceding identical-azimuth track, and the disposition in the fast replay regions on the tracks is as shown in FIG. 86.

Figure 87:
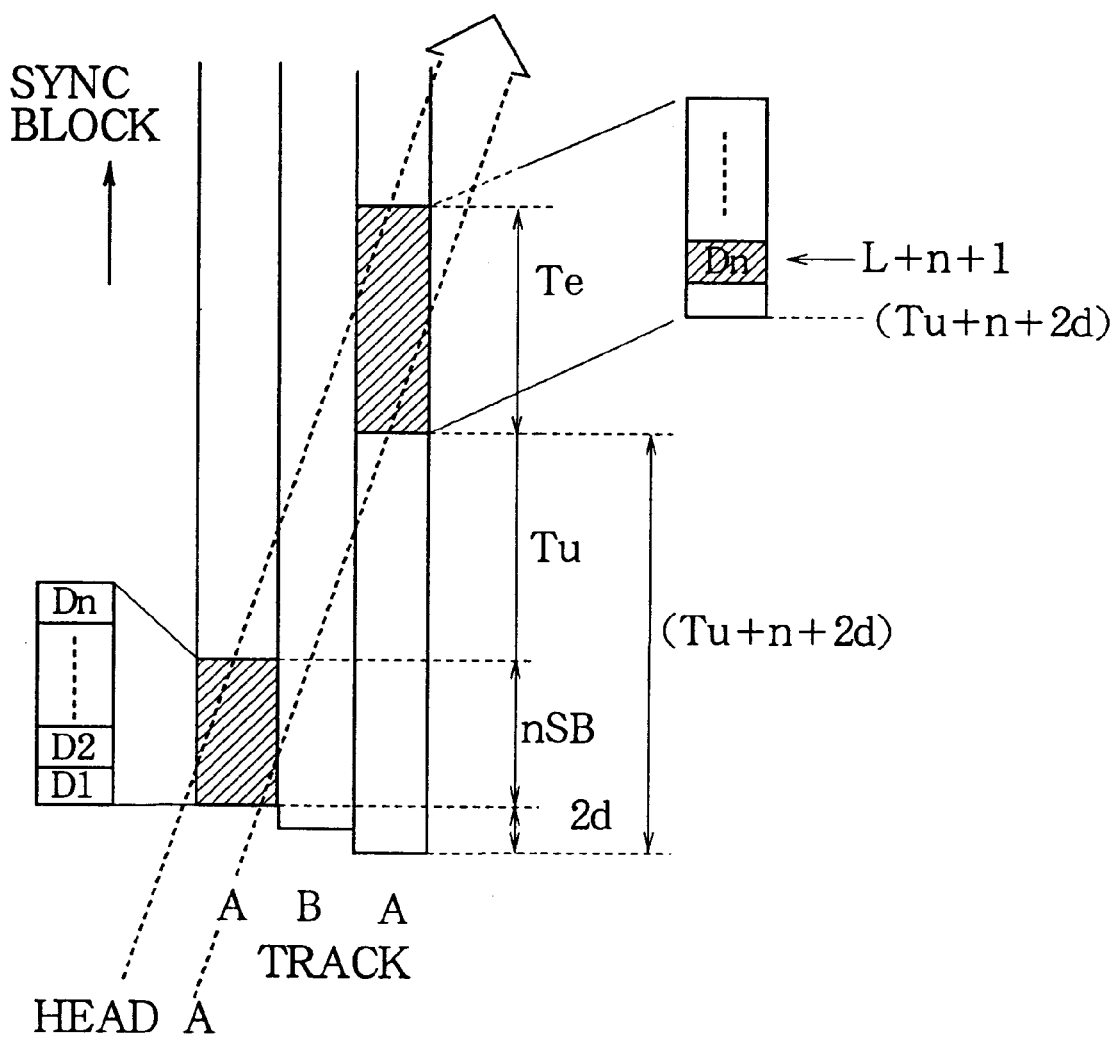
FIG. 87 shows an example of disposition of a m-time speed replay data according to Embodiment 18.

FIG. 87 shows the length of the sync blocks for the fast replay data where the fast replay is performed at m-time speed, the maximum number of the sync blocks which can always be reproduced consecutively form the region on the track of the tape is n, and the length of region from which the reproduction signal can be obtained is Te, the difference between the head crossing positions in the track longitudinal direction is D=Te+Tu, and n pieces of sync block data D1, D2, . . . Dn are consecutively recorded. When the minimum integer which is not smaller than (Tu+2d) corresponds to L (here, Tu=D−Te), n sync block data are sequentially (in the ascending order of the suffix i to D) repeatedly recorded in (L+n+1) consecutive sync blocks at identical positions on the tracks and the data are so disposed that the (L+n+1)-th data in the track is identical to the n-th data (Dn in the example shown in FIG. 87) of the fast replay data recorded in the identical sync block position on the immediately preceding identical-azimuth track, and recorded on at least m identical-azimuth track. With such an arrangement, the reading of the fast replay signal is ensured even if the phase is varied.

Disposing the data such that the (L+n+1)-th data on the track to be identical to the n-th data of the fast replay data recorded at the same sync block position on the immediately preceding identical-azimuth track means recording the data Di to satisfy the relationship $$e2 = \text{mod}\,[\{e1+n-\text{mod}(n+L+1, n)\}, n]$$

where mod (a, b) expresses the remainder of numeral a divided by numeral b, and the suffixes of D recorded first on tracks A1 and A2 are e1 and e2 (integers not less than 1 and not more than n).

When the fast replay signal for m-time speed is recorded in the above manner, n pieces of data D1 (i=1, 2, . . . n) each of which can be recorded in one sync block are sequentially (in the ascending order of the suffix i to D) and repeatedly recorded in (L+n+1) consecutive sync blocks, and the data are so disposed that the (L+n+1)-th data on the track is identical to the n-th data of the fast replay data recorded at the same sync block position on the immediately preceding identical-azimuth track. Accordingly, reading of fast replay data is ensured even when the head trace phase is varied due to variation in the head scanning traces, and fast replay images with a good quality can be obtained, and much fast replay data can be reproduced.

Embodiment 19

In Embodiment 18, fast replay data of the maximum number n of sync blocks which can always be reproduced consecutively from the region of the track on the tape, during m-time speed replay of fast replay data, is repeatedly recorded in a necessary number of sync blocks, (L+n+1). The number p of the fast replay data may be less than n(p being a natural number), and the number of the regions for the fast replay may be more than (L+n+1).

Figure 88:
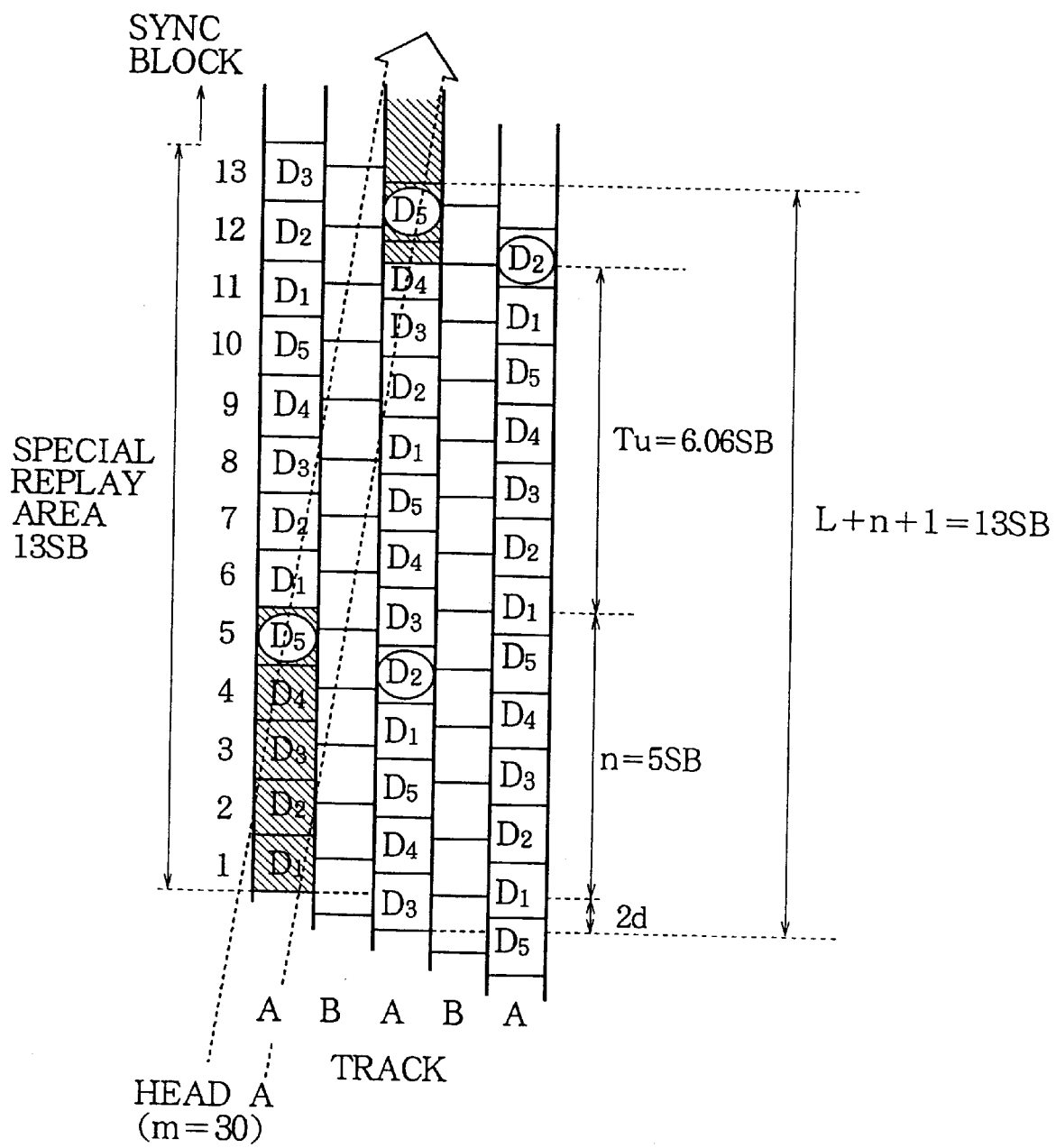
FIG. 88 shows an example of disposition of fast replay data on identical-azimuth tracks A1 and A2, during 30-time speed replay according to Embodiment 19.

FIG. 88 is a schematic view showing the data on the respective tracks in the case where the data of the maximum number n of sync blocks which can always be reproduced consecutively from the region of the track on the tape during the fast replay at 30-time speed is recorded as the fast replay data. At 30-time speed, the maximum number of sync blocks which can always be reproduced consecutively from the region of the track on the tape is five, and the length of the region from which the replay signal can be obtained is Te=6 SB, and the length of the sync blocks of the fast replay data where the five sync block data D1, D2, . . . D5 are consecutively recorded is (L+n+1)=13 sync blocks which are consecutive at identical positions on the tracks. (Here, L is again a minimum integer not smaller than (Tu+2d).) The data are sequentially (in the ascending order of the suffix i to D) and repeatedly recorded, and the data are so disposed that the 13-th data on the track is identical to the fifth data of the fast replay data recorded at the identical sync block position on the immediately preceding identical-azimuth track. In this way, reading of the fast replay signal is ensured even if the phase fluctuates.

Figure 89:
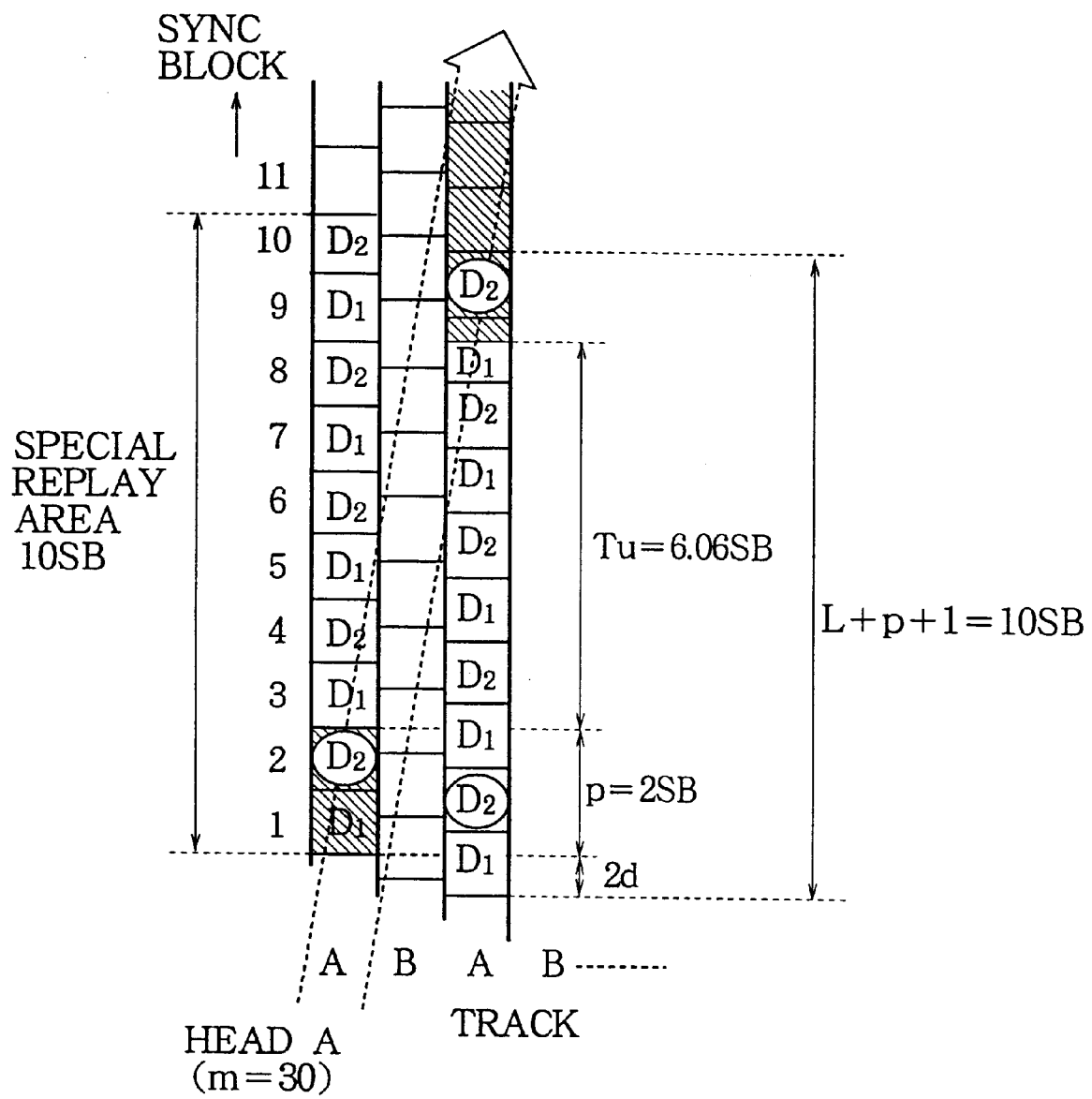
FIG. 89 shows another example of disposition of fast replay data on identical-azimuth tracks A1 and A2, during 30-time speed replay according to Embodiment 19.

FIG. 89 shows disposition of the data in the fast replay region in the case where the fast replay data is for the fast replay at 30-time speed and is formed of p=2 sync blocks. For conducting 30-time speed replay, the length of the sync blocks of the fast replay data used for recording the two sync block data D1, D2 consecutively is (L+p+1)=10 sync blocks and these 10 sync blocks are consecutive at the same position on the track. (Here, L is again a minimum integer not smaller than (Tu+2d).) The data are sequentially (in the ascending order of the suffix i to D) and repeatedly recorded, and the data are so disposed that the 10-the data of the track is identical to the p=2nd data of the fast replay data recorded at the same sync block position on the immediately preceding identical-azimuth track. In this way, even when the phase fluctuates the reading of the fast replay signal is ensured. FIG. 90 shows an example of disposition of fast replay data. Specifically, it shows the disposition of data in the fast replay region for the case where the data for the 30-time speed replay is formed of p=2 sync blocks.

Figure 91:
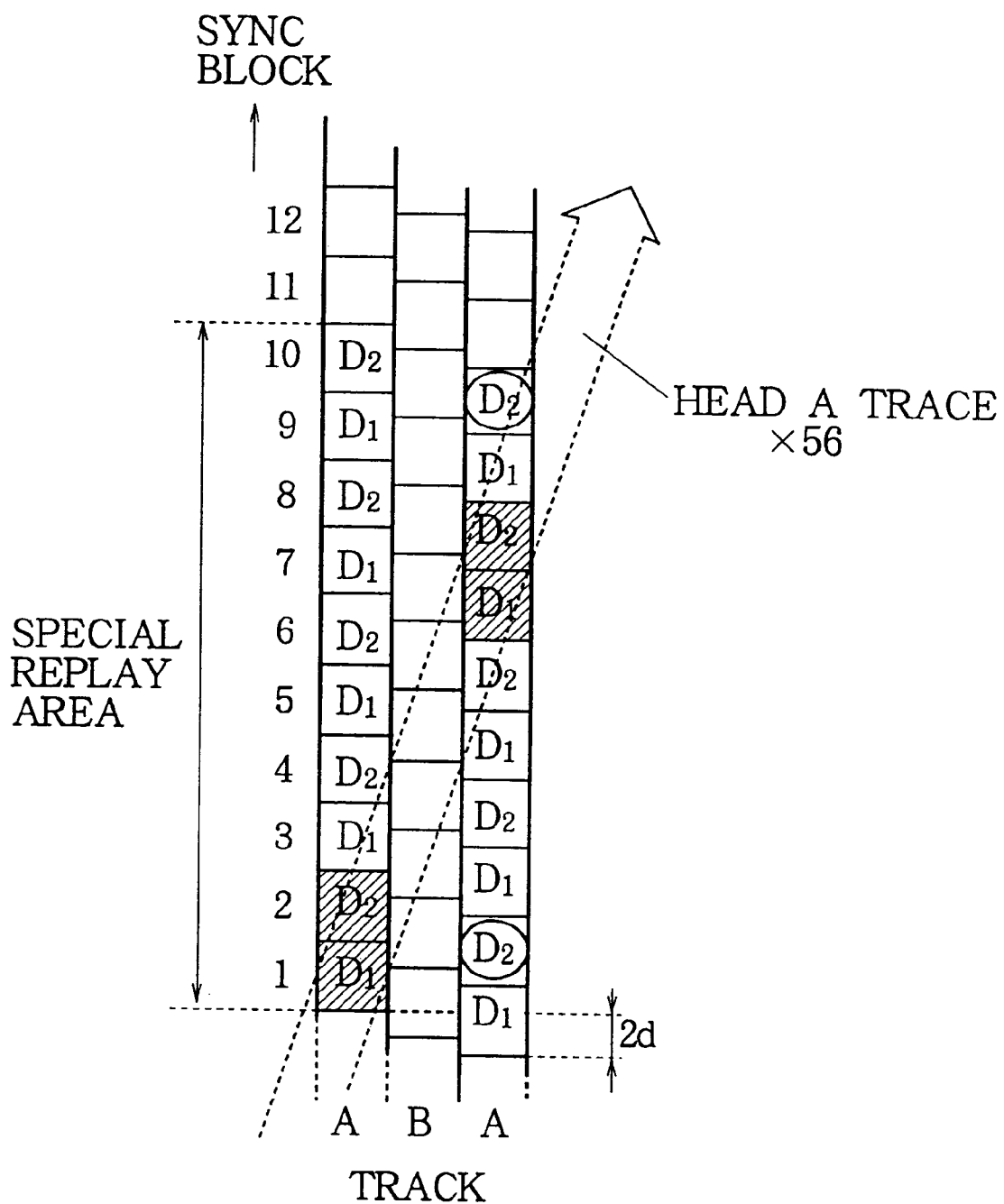
FIG. 91 shows an example of disposition of fast replay data on identical-azimuth tracks A1 and A2, during 56-time speed replay according to Embodiment 19.
Figure 92:
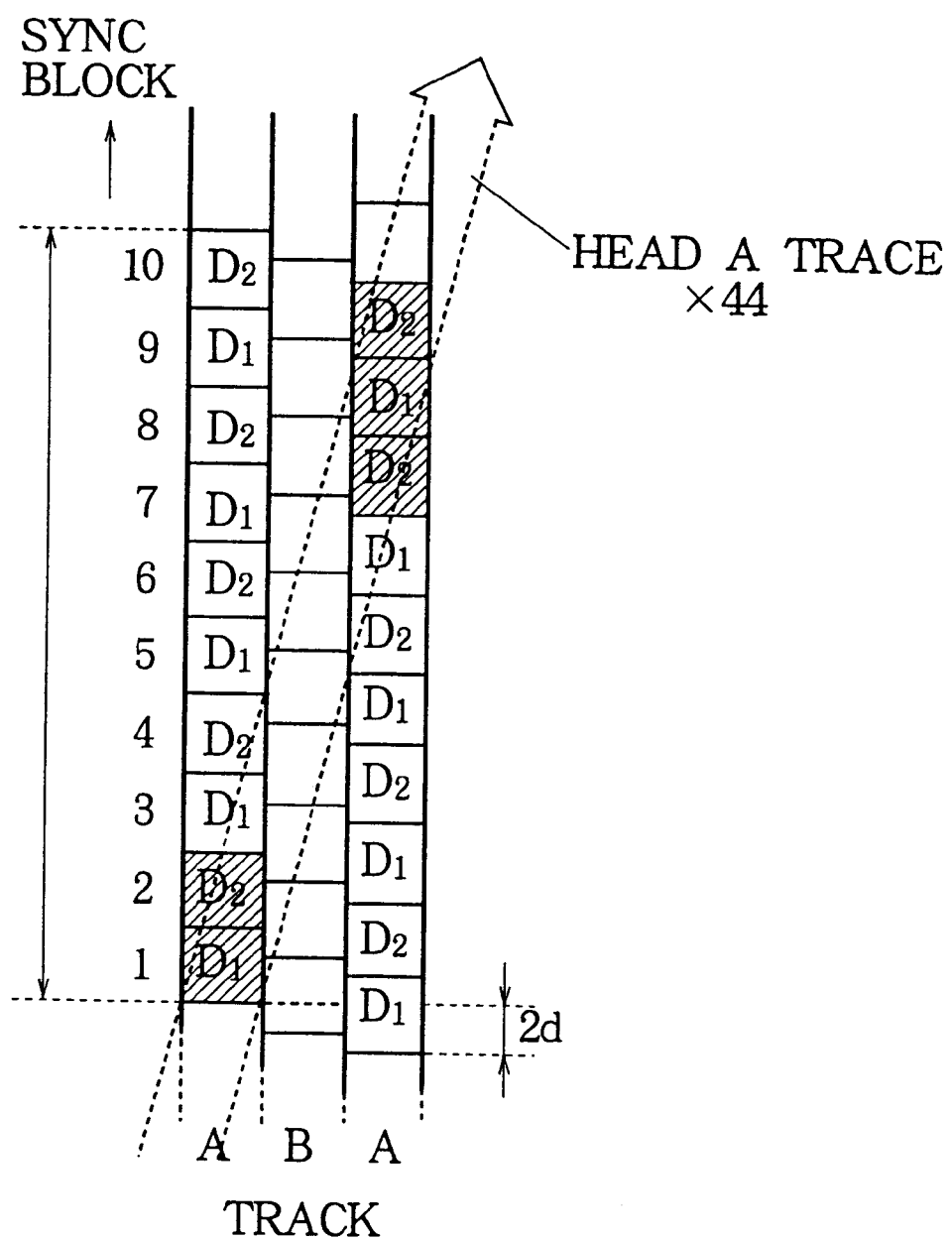
FIG. 92 shows an example of disposition of fast replay data on identical-azimuth tracks A1 and A2, during 44-time speed replay according to Embodiment 19.

Since the length of the region for the fast replay data is 10 sync blocks, the 56-time speed replay according to Embodiment 18, and the fast replay at a speed with which the maximum number of sync blocks which can always be reproduced consecutively is not less than 2 and not more than 6 may be performed, and yet the reading of the fast replay signal is ensured even if the phase fluctuates. FIG. 91 shows scanning traces in 56-time speed replay. In this case, the length of sync blocks necessary for always reading two data is 7 as was explained in connection with Embodiment 18, and with the arrangement of FIG. 90, reading is ensured regardless of the phase. FIG. 92 shows disposition of the fast replay data and head traces during 44-time speed replay. The maximum number of sync blocks which can always be reproduced consecutively is 3, land Te=Tu=4.0 SB, so (L+p+1) is 8 SB. With the disposition of FIG. 90, too, reading is ensured at 44-time speed regardless of the phase. Accordingly, the example of FIG. 90 enables fast replay from 30-time speed to 56-time speed.

Disposing the data such that the (L+p+1)-th data on the track is identical to the p-th data of the fast replay data recorded at the same sync block position on the immediately preceding identical-azimuth track means recording data Di in such a manner as to satisfy the relationship:

$$e2 = \text{mod}\ [\{e1 + p - \text{mod}\ (p + L + 1, p)\}, p]$$

where mode (a, b) expresses the remainder of a divided by b; and e1, e2 (integers not less than 1 and not more than n) are suffixes to data D which are recorded first on the tracks A1 and A2, respectively.

In the manner described above, in recording the m-time speed fast replay signal on the tracks, p pieces of data Di (i=1, 2, . . . p) each of which can be recorded in one sync block are sequentially (in the ascending order of the suffix i to D) and repeatedly recorded in the (L+p+1) consecutive sync blocks at the same position on the identical-azimuth tracks, and the data are so disposed that the (L+p+1)-th data on the track is identical to the p-th data of the fast replay data recorded at the identical sync block position on the immediately preceding identical-azimuth track, and the data is recorded on at least m identical-azimuth tracks. With such an arrangement, even when the head scanning traces fluctuates or the head trace phase is shifted, reading of the fast replay data is ensured, and fast replay image of a good quality is obtained, and much fast replay data can be recorded and replayed.

What is claimed is:

1. A digital VTR for recording digital video signals in respective designated areas of oblique tracks in a predetermined track format, comprising:

an input unit for receiving a bit stream of encoded video signals;

data separating means for extracting a fast replay signal from said bit stream of encoded video signals;

recording means for recording a first portion of said fast replay signal in a region of a first track and for recording a supplemental fast replay portion in a region of a second track adjacent to said first track, said supplemental fast replay portion containing part of said first portion of said fast replay signal; and identification signal recording means for recording an identification signal for identifying said first track and said second track.

2. The digital VTR as set forth in claim 1, wherein said recording means records data on said first and second tracks at different azimuth angles, and the length of the recording region in said second track is about half the length of the recording region in said first track, and the center of the recording region within the second track is at about the same position as the center of the recording region within the first track.

3. The digital VTR as set forth in claim 2, wherein, in the upper and lower end parts of the recording region of said first track which extend beyond the region corresponding to the recording region of said second track, the signal identical to that in the recording region of said second track is recorded.

4. The digital VTR as set forth in claim 1, wherein said recording means forms the fast replay signal dedicated for the particular fast replay signal for each of the fast replay speeds, and records the fast replay signal at different positions on the magnetic recording tape.

5. The digital VTR as set forth in claim 4, wherein said recording means repeatedly records the fast replay signal for ((M×i)-time speed replay (i=1, 2, . . . n) at predetermined positions in predetermined tracks of consecutive M (M being a natural number) tracks, and repeatedly records the fast replay signal for (M×i)-time speed replay, 2×i times, taking the M tracks as one unit for each speed.

6. The digital VTR as set forth in claim 5, wherein said recording means repeatedly records the fast replay signal for 4i-time speed replay (i=1, 2, . . . n) at predetermined positions in predetermined tracks of consecutive M (M being a natural number) tracks, and said identification signal recording means records three types of frequency signals as pilot signals for tracking control on these four tracks which are superimposed with the digital data.

7. The digital VTR as set forth in claim 1, further comprising:

error correction code appending means for appending the error correction code formed of a predetermined number of sync bits inserted at a predetermined period in the signal sequence recorded in the magnetic recording tape, a predetermined number of ID bits succeeding said sync bits, a predetermined number of first parity bits generated from the ID bits, second parity bits generated from a predetermined amount of digital data succeeding the first parity bits, third parity bits generated from a plurality of digital data extending over said sync bits, and fourth parity bits generated from the digital data and positioned at the back of said digital data; and erroneous correction detection means for comparing the fourth parity bits with the first parity bits reproduced by a replay means, and detecting erroneous correction on the basis of the result of comparison.

8. The digital VTR as set forth in claim 7, wherein said error correction code appending means appends the fourth parity bits only to the fast replay signal.

9. An apparatus for storing digital video data in a predetermined track format on a video tape, the video signals including main video data corresponding to image data for display during a normal playback mode and special playback data corresponding to image data for display during a special playback mode, said system comprising:

an input unit for receiving a bit stream of encoded video signals to be stored on video tape for later replay;

an intracoded block detector for detecting and separating intra-encoded data to be used as special playback data from the received bit stream of encoded video signals; and a recorder for recording the separated intra-coded data as special playback data on the video tape in a predetermined recording track format; wherein said predetermined recording track format includes alternating first channel and second channel tracks, said recorder records a first special playback portion on a said first channel track and records a supplemental special playback portion on a said second channel track adjacent to said first channel track, said supplemental special playback data portion containing part of said first special playback data portion.

10. The apparatus according to claim 9, wherein said recorder records data on a said first channel track at la first azimuth angle and records data on a said second channel track at a second azimuth angle, said second azimuth angle being different than said first azimuth angle.

11. The apparatus according to claim 9, wherein said recorder records said first special playback data portion in a said first channel track as a number of consecutive sync blocks, and records said supplemental special playback portion in a said second channel track, said supplemental special playback portion consisting of the outer sync blocks of said consecutive sync blocks of said first special playback data portion.

12. The apparatus according to claim 9, wherein said special playback data includes three types of data: low fast replay data, medium fast replay data, and high fast replay data.

13. The apparatus according to claim 12, wherein said recorder records a portion of low fast replay data on a said first channel track as n sync blocks, records a portion of medium fast replay data on a said first channel track as n/2 sync blocks, and records a portion of high fast replay data on a said first channel track as n/4 sync blocks.

14. The apparatus according to claim 12, wherein said recorder records a portion of low fast replay data in a track number p and again records said portion of fast replay data in a track p+4, said recorder records a portion of medium fast replay data recorded in a track number p+2 and again records said portion of medium fast replay data in tracks p+6, p+10, and p+14, and said recorder records a portion of high fast replay data in a track number p and again records said portion of high fast replay data in tracks p+4, p+8, p+12, p+16, p+20, p+24, and p+28.

15. The apparatus according to claim 9, wherein a track period includes four recording tracks, said recorder records medium fast replay data in the first track of said four recording tracks, said recorder records supplemental medium fast replay data in the second track of said four recording tracks, said recorder records slow fast replay data and high fast replay data in the third track of said four recording tracks, and said recorder records supplemental slow fast replay data and supplemental high fast replay data in the fourth track of said four recording tracks.

16. A method for storing digital video data in a predetermined track format on a video tape, the video signals including main video data corresponding to image data for display during a normal playback mode and special playback data corresponding to image data for display during a special playback mode, said method comprising:

receiving a bit stream of encoded video signals to be stored on video tape for later replay;

detecting and separating intra-encoded data to be used as special playback data from the received bit stream of encoded video signals; and recording the separated intra-coded data as special playback data on the video tape in a predetermined recording track format; wherein said predetermined recording track format includes alternating first channel and second channel tracks, said recording step records a first special playback portion on a said first channel track and records a supplemental special playback portion on a said second channel track adjacent to said first channel track, said supplemental special playback data portion containing part of said first special playback data portion.

17. The method according to claim 16, wherein said recording step records data on said first channel tracks at a first azimuth angle and records data on said second channel tracks at a second azimuth angle, said second azimuth angle being different than said first azimuth angle.

18. The method according to claim 16, wherein said recording step records said first special playback data portion in a said first channel track as a number of consecutive sync blocks, and records said supplemental special playback portion in a said second channel track, said supplemental special playback portion consisting of the outer sync blocks of said consecutive sync blocks of said first special playback data portion.

19. The method according to claim 16, wherein said special playback data includes three types of data: low fast replay data, medium fast replay data, and high fast replay data.

20. The method according to claim 19, wherein said recording step records a portion of low fast replay data on a said first channel track as n number of sync blocks, records a portion of medium fast replay data on a said first channel track as a n/2 number sync blocks, and records a portion of high fast replay data on a said first channel track as a n/4 number of sync blocks.

21. The method according to claim 19, wherein
said recording step records a portion of low fast replay data in a track number p and again records said portion of low fast replay data in a track p+4,
said recording step records a portion of medium fast replay data recorded in a track number p+2 and again records said portion of medium fast replay data in tracks p+6, p+10, and p+14, and
said recording step records a portion of high fast replay data in a track number p and again records said portion of high fast replay data in tracks p+4, p+8, p+12, p+16, p+20, p+24, and p+28.

22. The method according to claim 16, wherein a track period includes four recording tracks, said recording step records medium fast replay data in the first of said four recording tracks, said recording step records supplemental medium fast replay data in the second track of said four recording tracks, said recording step records slow fast replay data and high fast replay data in the third track of said four recording tracks, and said recording step records supplemental slow fast replay data and supplemental high fast replay data in the fourth track of said four recording tracks.

23. A digitally recorded tape having digital video signals stored thereon by a digital video tape recorder in a specific track format for later playback by a video tape player, the track formatted data stored on said tape including:
main video data corresponding to image data for display during normal playback; and
special playback data corresponding to image data for display during a special playback mode, said special playback data including intra-encoded data extracted from an original bit stream of encoded video signals, said specific track format including
a first portion of said special playback data in a region of a first track, and
a supplemental special playback portion in a region of a second track adjacent to said first track, said supplemental special playback portion containing part of said first special playback data portion, said supplemental special playback portion causing said video tape player to supplement the special playback data read from said first track during the playback mode so that sufficient image data may be retrieved during special playback.

24. The digitally recorded tape according to claim 23, wherein said first track is a first channel track having data recorded therein at a first azimuth angle, and said second track is a second channel track having supplemental data recorded therein at a second azimuth angle.

25. The digitally recorded tape according to claim 23, wherein said first special playback data portion is recorded in said first track as a number of consecutive sync blocks, and said supplemental special playback portion consists of the outer sync blocks of said consecutive sync blocks of said first special playback data portion.

26. The digitally recorded tape according to claim 23, wherein said special playback data includes three types of data: low fast replay data, medium fast replay data, and high fast replay data.

* * * * *